United States Patent [19]
Miyaza

[11] Patent Number: 5,896,470
[45] Date of Patent: Apr. 20, 1999

[54] IMAGE PROCESSOR PROVIDING IMPROVED READABILITY OF CHARACTERS

[75] Inventor: Masao Miyaza, Osaka, Japan

[73] Assignee: Sharp Kabushiki Kaisha, Osaka, Japan

[21] Appl. No.: 09/090,623

[22] Filed: Jun. 4, 1998

Related U.S. Application Data

[62] Division of application No. 08/677,863, Jul. 10, 1996, Pat. No. 5,825,942, which is a division of application No. 08/275,960, Jul. 15, 1994, Pat. No. 5,566,252.

[30] Foreign Application Priority Data

| Jul. 16, 1993 | [JP] | Japan | 5-177104 |
| Aug. 27, 1993 | [JP] | Japan | 5-212972 |
| Sep. 22, 1993 | [JP] | Japan | 5-236771 |
| Dec. 17, 1993 | [JP] | Japan | 5-318752 |

[51] Int. Cl.$^6$ ............................... G06K 9/32
[52] U.S. Cl. ............... 382/298; 382/301; 382/177
[58] Field of Search ...................... 382/298, 299, 382/301, 173, 177, 178, 179, 181; 358/451, 452, 453, 401; 345/127, 128, 129

[56] References Cited

U.S. PATENT DOCUMENTS

| 5,093,868 | 3/1992 | Tanaka et al. | 382/177 |
| 5,100,248 | 3/1992 | Packard | 400/76 |
| 5,384,864 | 1/1995 | Spitz | 382/177 |
| 5,391,889 | 2/1995 | Nishijima et al. | 382/173 |
| 5,452,380 | 9/1995 | Uehara et al. | 382/317 |

FOREIGN PATENT DOCUMENTS

| 0 397 429 A2 | 11/1990 | European Pat. Off. |
| 57-085163 | 5/1982 | Japan |
| 58-086668 | 5/1983 | Japan |
| 3-276380 | 12/1991 | Japan |
| 4-014957 | 1/1992 | Japan |
| 4-032983 | 2/1992 | Japan |
| 4-099657 | 3/1992 | Japan |
| 4-112284 | 4/1992 | Japan |

OTHER PUBLICATIONS

Patent Abstracts of Japan, vol. 6, No. 168, Sep. 2, 1982, abstracting JP 57-085 163.
Patent Abstracts of Japan, vol. 7, No. 184, Aug. 13, 1983, abstracting JP 58-086 668.
Patent Abstracts of Japan, abstracting JP 4-014957A, Fujioka/Ricoh.

*Primary Examiner*—Phuoc Tran
*Attorney, Agent, or Firm*—David G. Conlin; George W. Neuner

[57] ABSTRACT

With an image processor of the present invention, when a reduction mode is selected, image data of a document is stored, and whether the image data includes a character or not is detected. If no character is recognized, copying is performed. On the other hand, if a character is recognized, the character is reduced. Subsequently, the reduced character is re-recognized, and an unrecognized character rate is calculated. If the unrecognized character rate is smaller than a reference rate, copying is performed and the reduction mode comes to an end. On the other hand, if the unrecognized character rate is higher than or equal to the reference rate, a warning massage is displayed to show that reduction processing is unavailable so as to terminate the copying operation, or correct the reduced character while comparing the previously recognized character with the reduced character and start copying. With this structure, since the reduced image contains easily readable characters, the handling of the image processor is improved and its value is increased. Moreover, since only a practically usable reduced image is output, the waste of sheets is prevented.

26 Claims, 91 Drawing Sheets

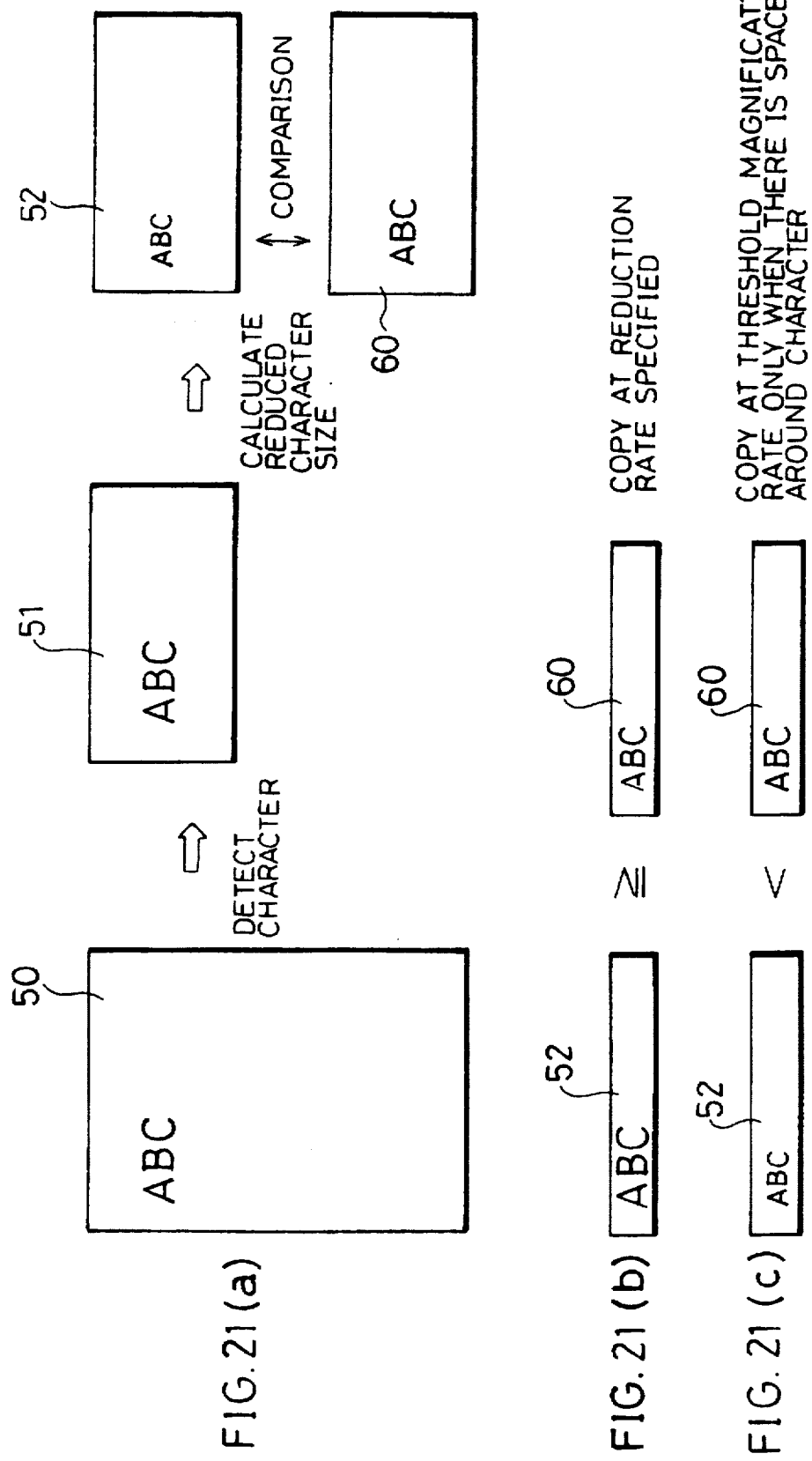

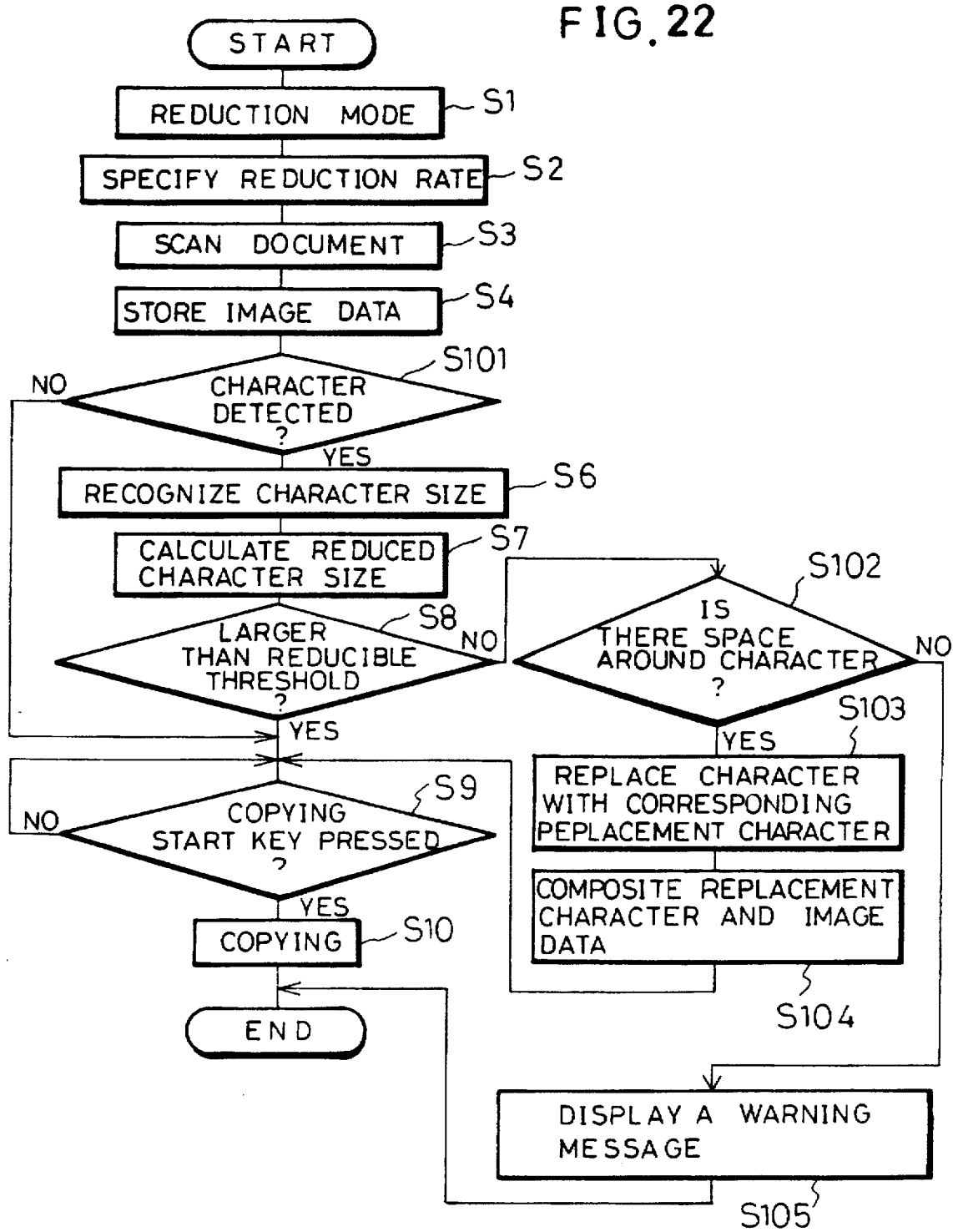

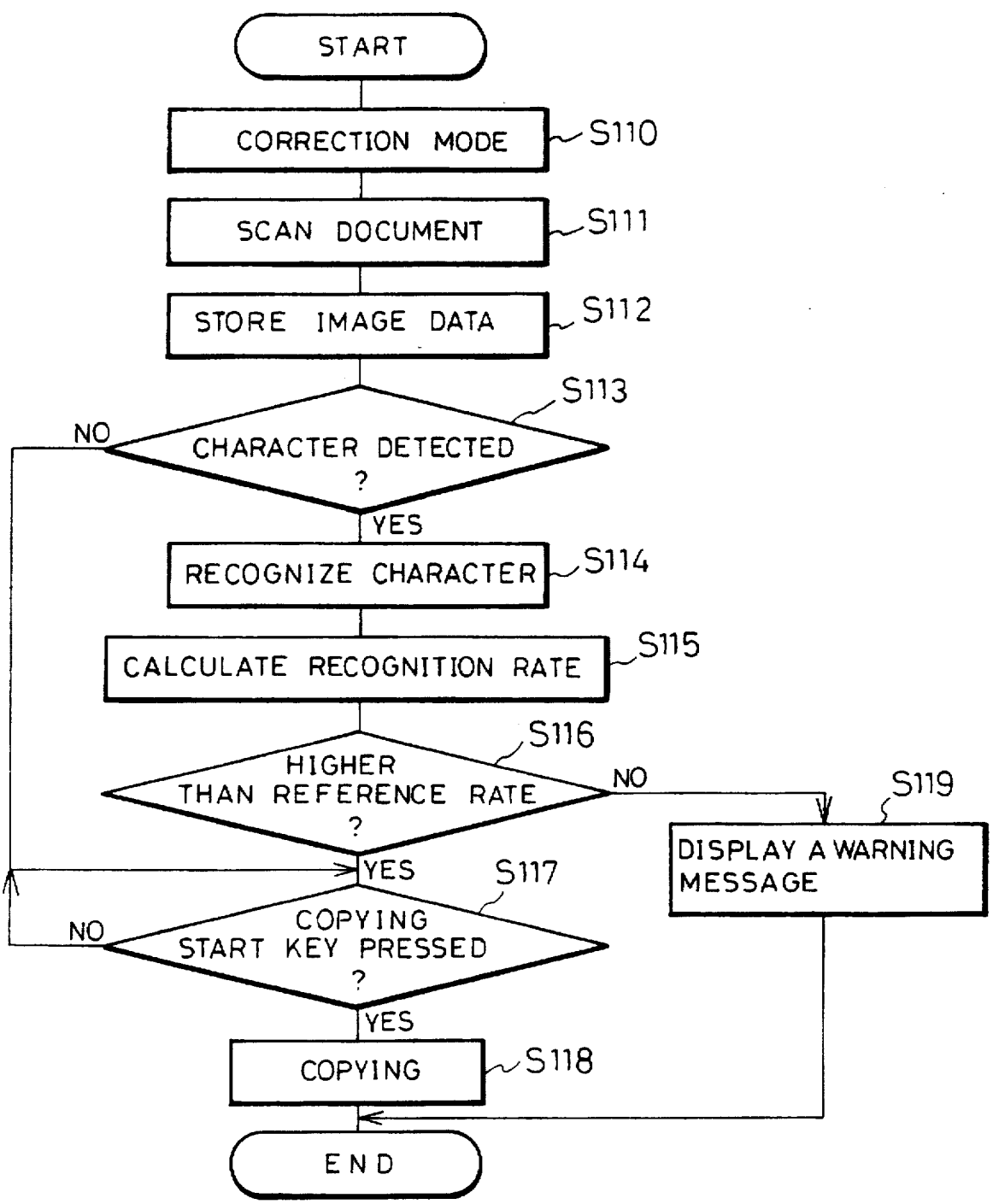

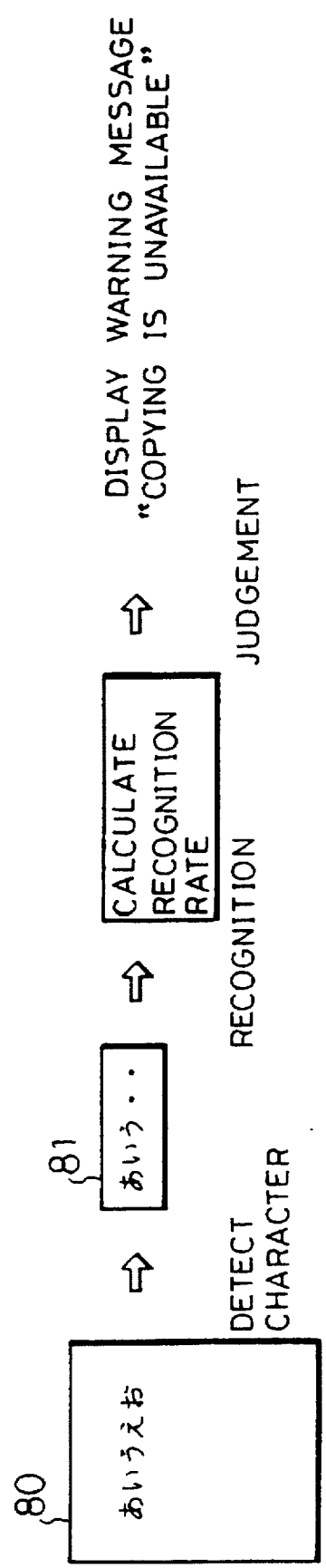

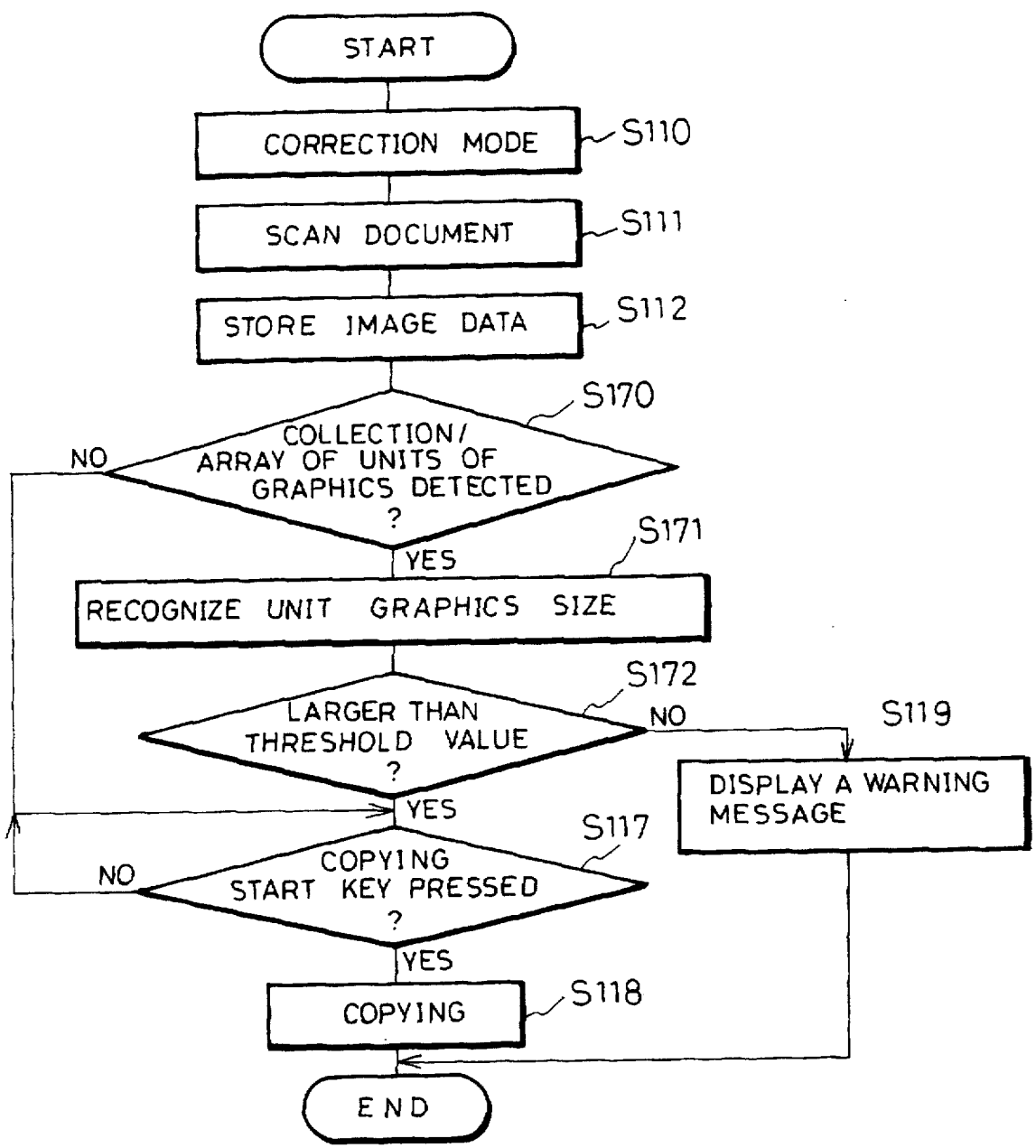

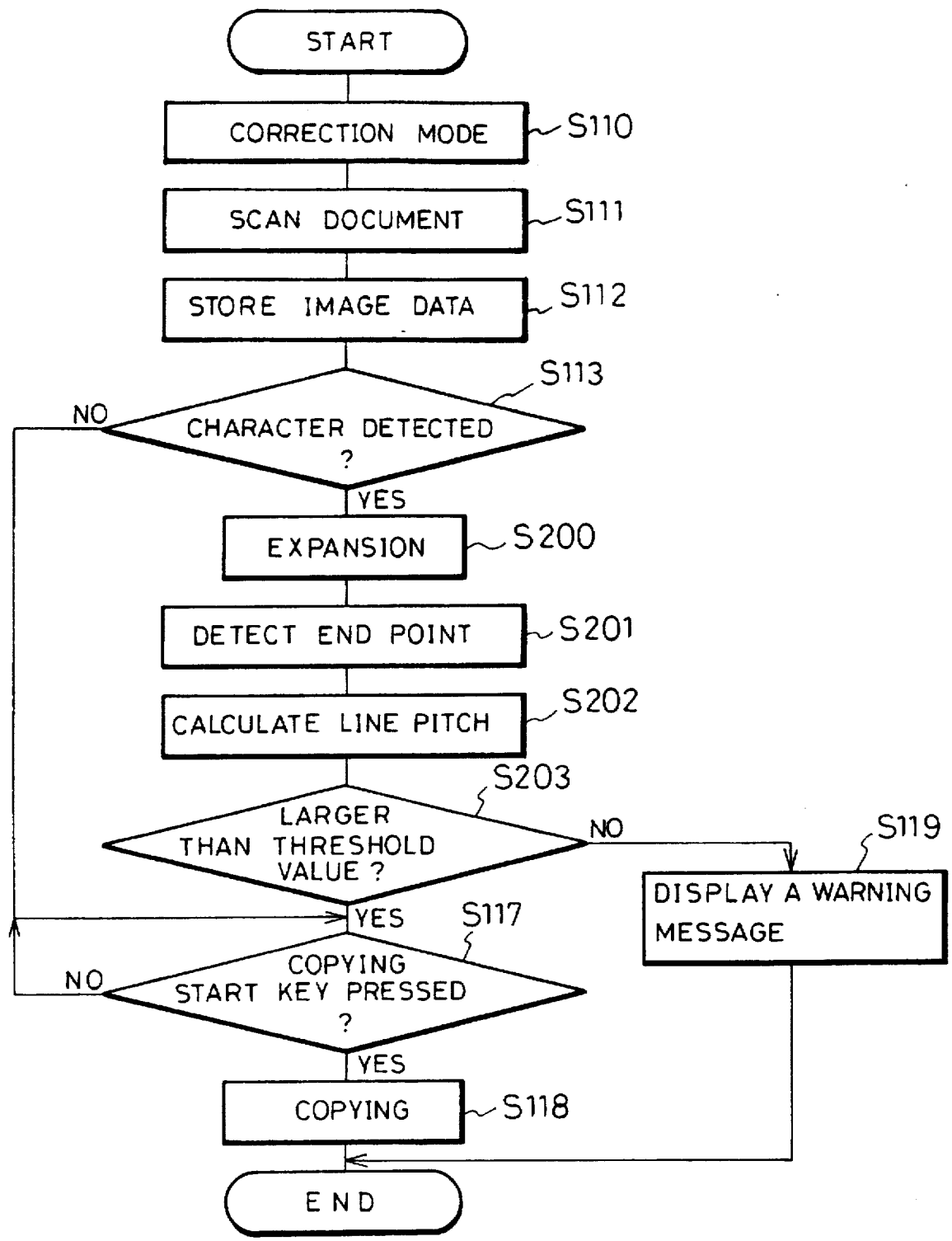

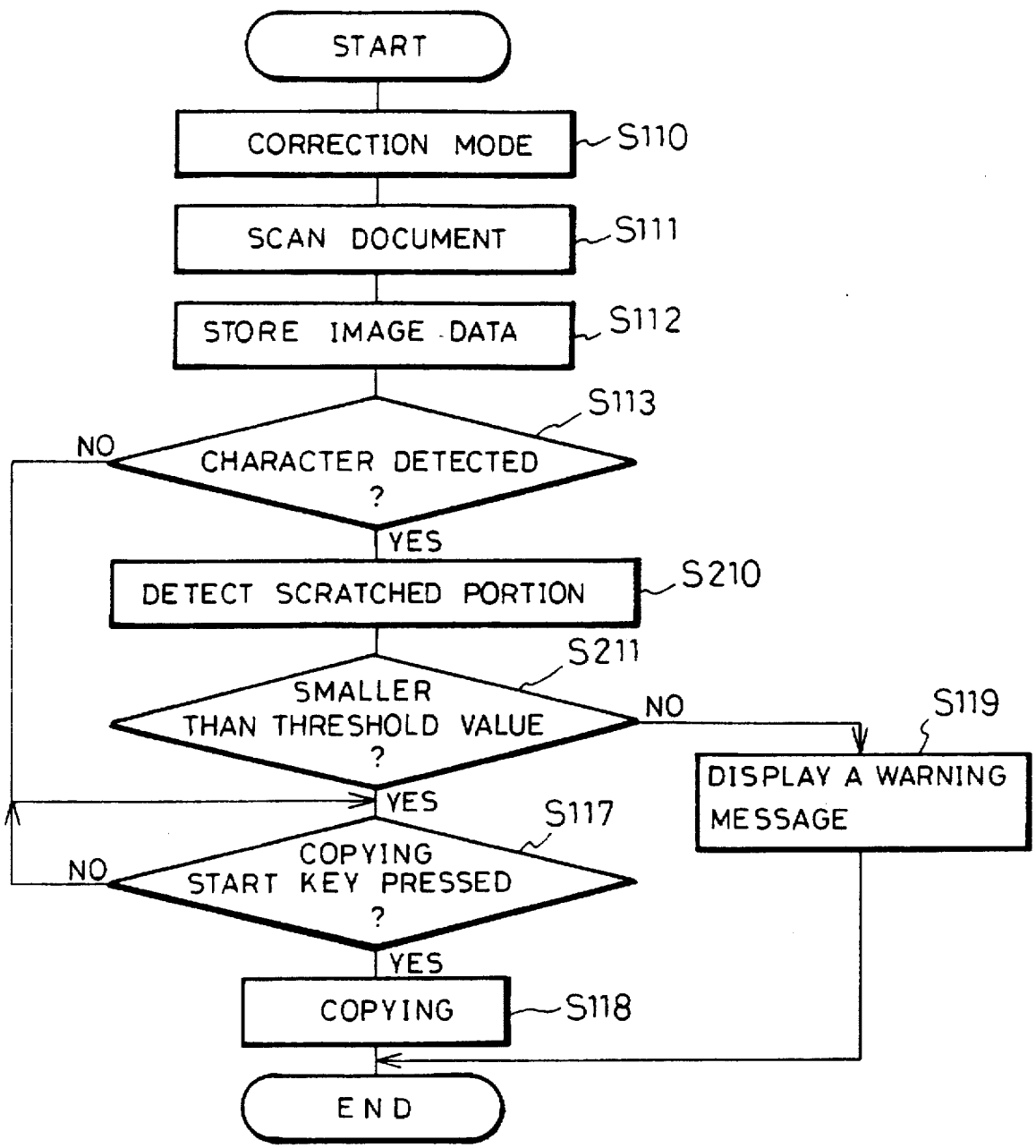

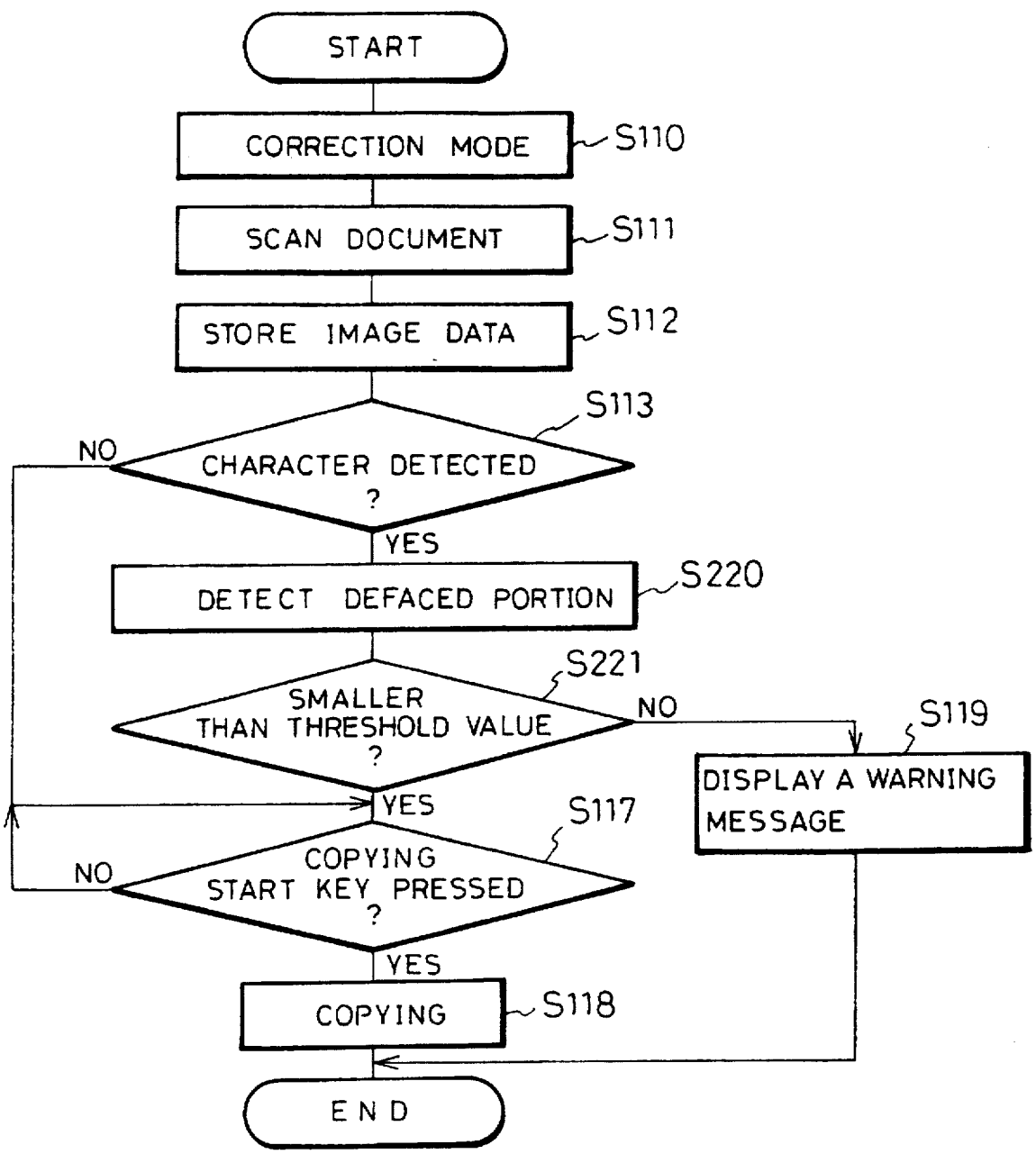

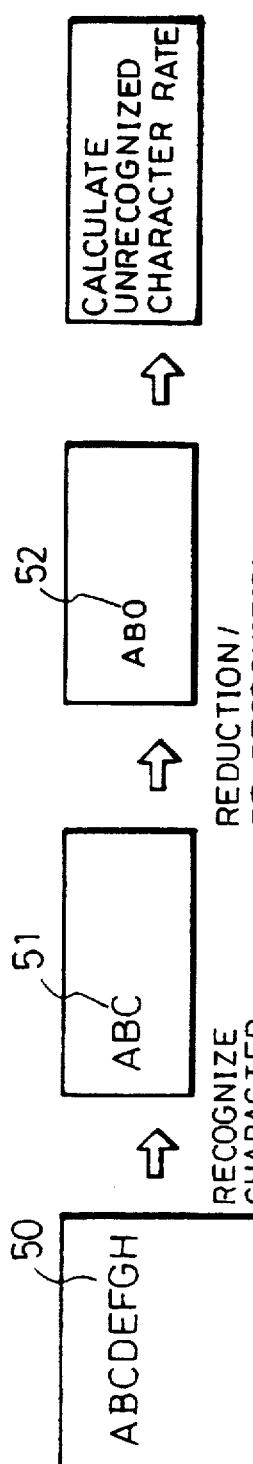
FIG.87(a)
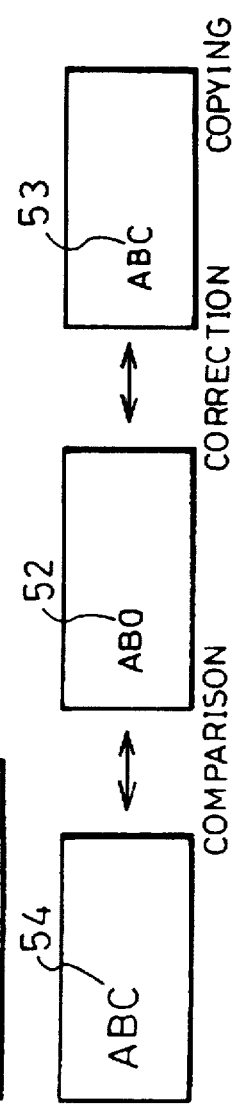
FIG.87(b)
FIG.87(c)

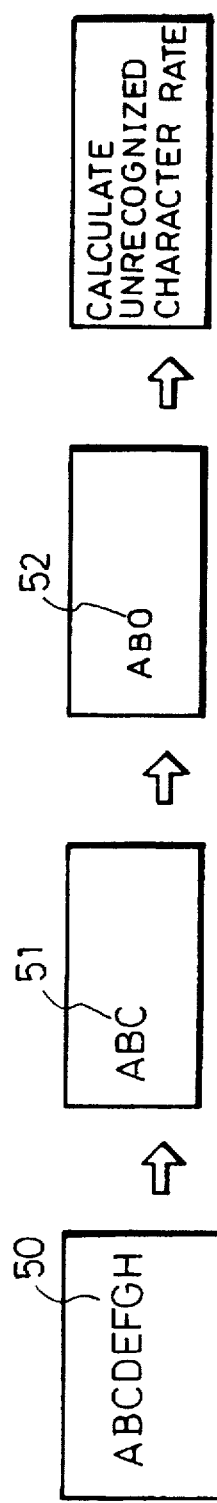
FIG.89(a)
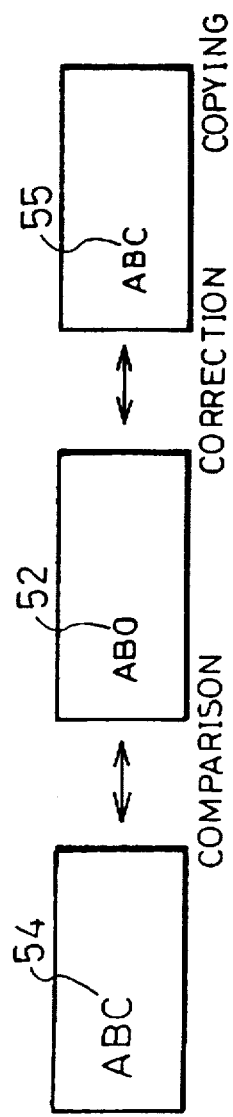
FIG.89(b)
FIG.89(c)

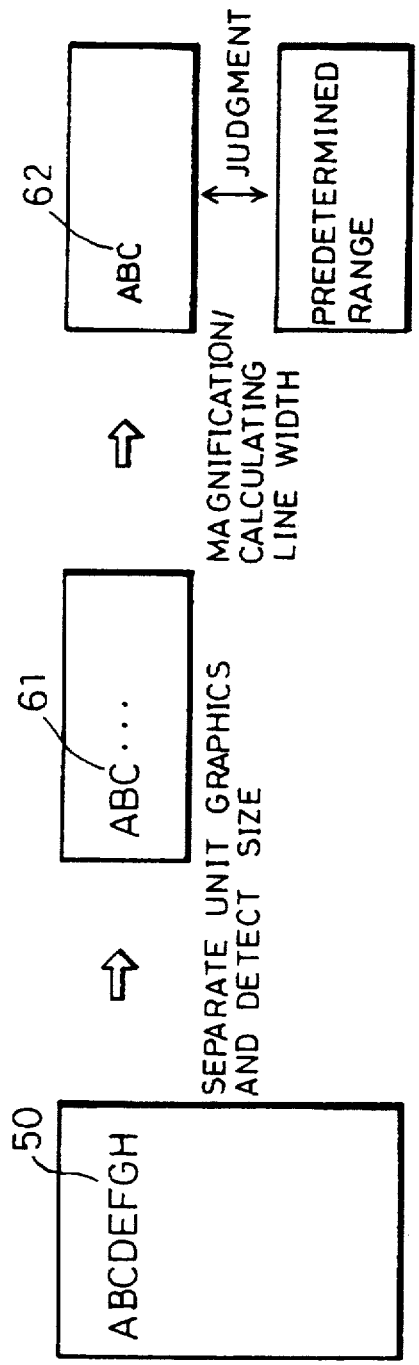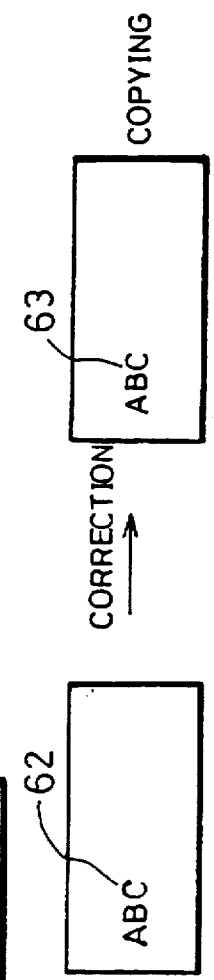

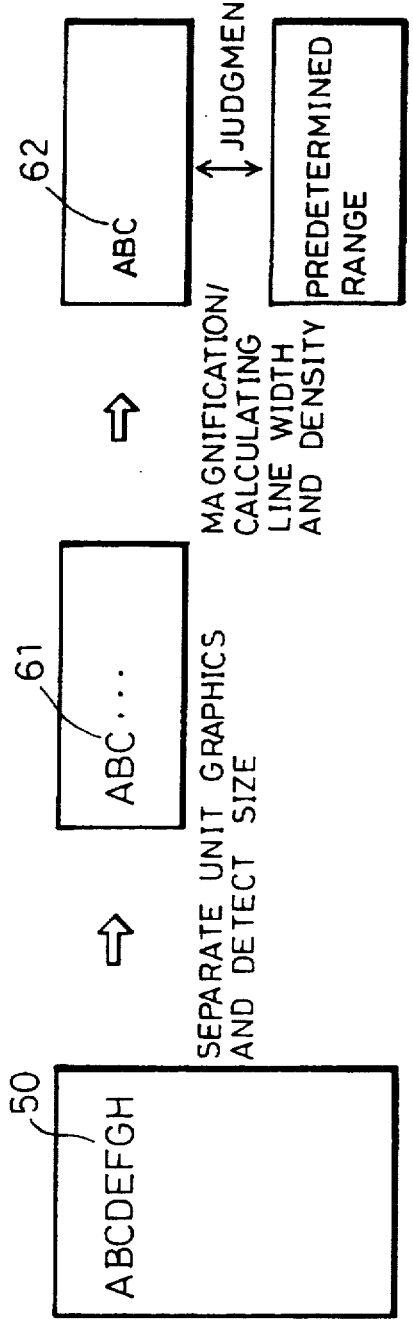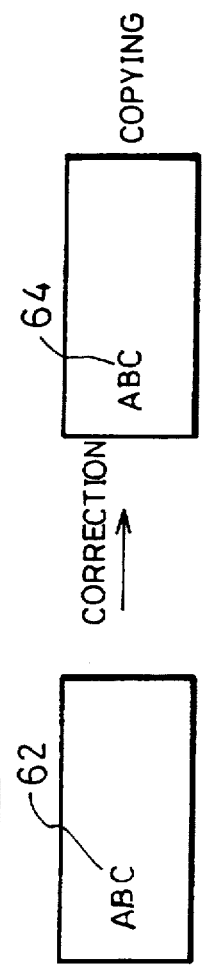
FIG.93(a)
FIG.93(b)
FIG.93(c)

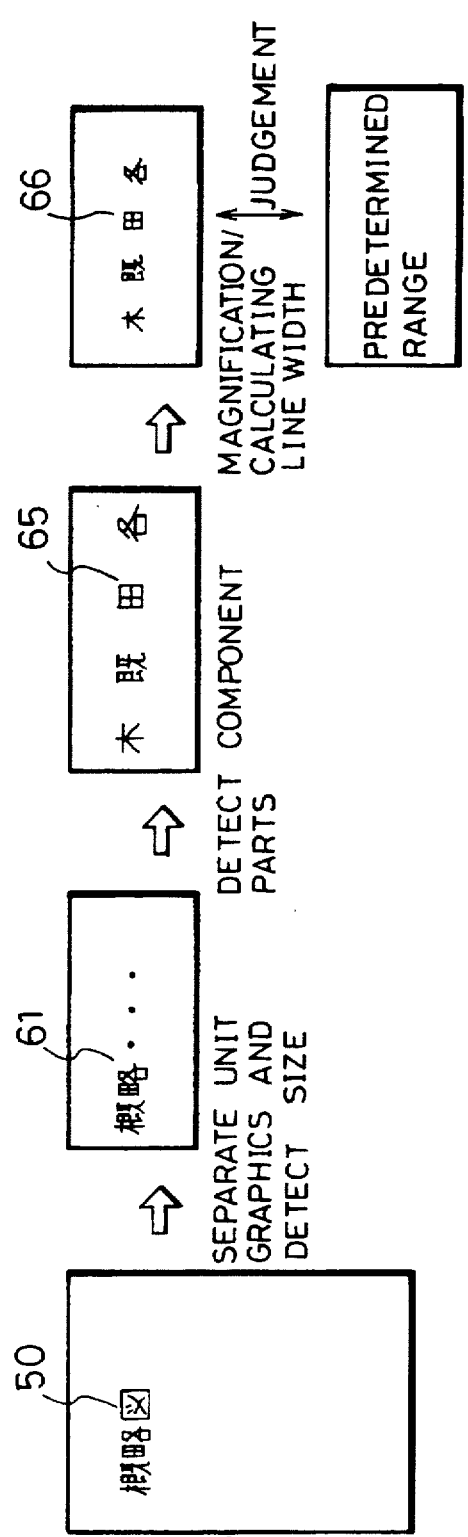
FIG.95(a)
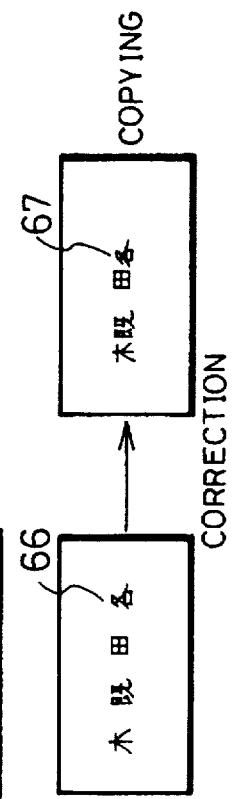
FIG.95(b) SIZE AND LINE WIDTH ARE WITHIN PREDETERMINED RANGE
FIG.95(c) SIZE AND LINE WIDTH ARE OUT OF PREDETERMINED RANGE

IMAGE PROCESSOR PROVIDING IMPROVED READABILITY OF CHARACTERS

This is a divisional application of application Ser. No. 08/677,863 filed on Jul. 10, 1996, now U.S. Pat. No. 5,825,942, which is a divisional application of application Ser. No. 08/275,960 filed on Jul. 15, 1994, now U.S. Pat. No. 5,566,252.

FIELD OF THE INVENTION

The present invention relates to an image processor, such as a copying machine, a digital printer, a facsimile, and a scanner printer, which outputs image data of a document read by input means in original, reduced or enlarged size.

BACKGROUND OF THE INVENTION

In recent years, image processors, for example, copying machines capable of producing a copy of an original document in original, reduced, or enlarged size are widely used. Such a copying machine easily produces reduced or enlarged copies of the original document by magnifying the image of the document at a desired reduction or magnification rate. The copying machines of this type are thus often used for copying various types of documents, maps, or plans of machines and architecture.

A so-called digital copying machine is widely used as a copying machine of this type. The digital copying machine reads a scanned image of a document by an image pickup element, for example, a CCD (charge coupled device) sensor, stores the image data in an image memory, and outputs the image data, for example, after reducing/enlarging the image. Since the image data of the document is temporarily stored in the image memory, the reduction/enlargement processing is easily performed on the image data.

However, for example, when producing a reduced copy, the conventional digital copying machine merely reduces the size of the entire image. Therefore, for example, when the image of the document is reduced by the reduction processing, the characters in the reduced document become too small or the outlines of the characters become unclear. In other words, reading the characters in the document becomes unavailable, resulting in virtually useless copies. Namely, although the conventional digital copying machine easily processes the image data, it performs poor functions, thereby having a rather low value. Hence, the image processor such as copying machine is desired to have a developed structure capable of preventing characters in a reduced copy from becoming too small or unclear and of increasing the value of the image processor.

When a reproduction of a document is used as an original document, i.e., when a copy is produced from a reproduced image of the original, the image quality would be degraded. If a copy is produced from such a degraded document, the outlines of characters in the document become unclear and can not be read, resulting in a virtually useless copy of the image. Thus, there is a demand for developing an image processor which is capable of preventing the characters in a document from becoming unclear even when the image quality of the document is degraded.

SUMMARY OF THE INVENTION

An object of the present invention is to provide an image processor capable of preventing characters in a document from becoming unreadable when reduced at a selected reduction rate. Another object of the present invention is to provide an image processor capable of preventing characters in a reproduction of a document from becoming unreadable when the image on the document is unclear, for example, the document is a reproduction of the original.

In order to achieve the above objects, an image processor of the present invention incorporates: input means for reading an image on a document; setting means for freely selecting a reduction rate of the document; storage means for storing image data of the document read by the input means; character detecting means for detecting character data from the image data stored in the storage means; calculating means for recognizing the size of a character in the character data detected by the character detecting means and for calculating the size of the character after being reduced at a reduction rate set by the setting means; judging means for judging whether the size of the reduced character calculated by the calculating means is smaller than a predetermined minimum readable size; and warning means for giving a warning that a reduced image of the document becomes unreadable when the judging means judges that the size of the reduced character is smaller than the predetermined size.

With this structure, whether or not a character after being reduced becomes smaller than a predetermined minimum readable size is judged, and a warning "the reduced image of the document becomes unreadable" is given when the character becomes smaller than the predetermined size after reduction. It is thus possible to prevent a reduced image of a virtually useless size from being produced.

It is still another object of the present invention to provide an image processor capable of preventing characters in a document from becoming unreadable when magnified at a selected magnification rate. It is yet another object of the present invention to provide an image processor capable of preventing characters in a copy of a document from becoming unreadable when the document is a reproduction of an original.

In order to achieve the above objects, another image processor of the present invention incorporates: input means for reading an image on a document; setting means for freely selecting a reduction rate of the document; storage means for storing image data of the document read by the input means; recognizing means for detecting character data from the image data stored in the storage means and recognizing a character in the detected image data; reducing means for reducing the character data detected by the recognizing means at a reduction rate set by the setting means; re-recognizing means for re-recognizing the character in the character data reduced by the reducing means; character judging means for judging whether the character re-recognized by the re-recognizing means coincides with the character before reduced; unrecognized character rate judging means for judging whether a ratio of characters which do not coincide with the characters before reduced is higher than a predetermined ratio; processing means for processing character data which does not coincide with character data before reduced in a predetermined manner so that the re-recognizing means recognizes the character data as being identical to the character before reduced when the unrecognized character rate judging means judges that the ratio of characters which do not coincide with the characters before reduced is higher than the predetermined ratio; compositing means for compositing the image data processed by the processing means and the image data; and output means for visualizing and outputting the image data composited by the compositing means.

With this structure, whether the re-recognized character coincides with the character before reduced is judged, and then whether the ratio of characters which do not coincide with the characters before reduced is higher than a predetermined ratio is judged. When the ratio is higher than the predetermined ratio, the characters which do not coincide with the characters before reduced are processed in a predetermined manner so that the characters after being reduced and the characters before reduced are recognized as being identical. When the processed character data and the image data are composited, the composited image data is visualized and output. Thus, characters in the reduced image of the document supplied by the output means are easily readable.

For a fuller understanding of the nature and advantages of the invention, reference should be made to the ensuing detailed description taken in conjunction with the accompanying drawings.

BRIEF DESCRIPTION OF THE DRAWINGS

FIG. 21 is an explanatory view of the arrangement of the steps shown in FIG. 20.

FIG. 22 is a flowchart showing the arrangement of the steps in a reduction process performed by a digital copying machine as an image processor according to still another embodiment of the present invention.

FIG. 24 is a flowchart showing the arrangement of the steps in a correction process performed by a digital copying machine as an image processor according to still another embodiment of the present invention.

FIG. 25 is an explanatory view of the arrangement of the steps shown in FIG. 24.

Fig. 36 is a flowchart showing the arrangement of the steps in a correction process performed by a digital copying machine as an image processor according to still another embodiment of the present invention.

FIG. 42 is a flowchart showing the arrangement of the steps in a correction process performed by a digital copying machine as an image processor according to still another embodiment of the present invention.

FIG. 44 is a flowchart showing the arrangement of the steps in a correction process performed by a digital copying machine as an image processor according to still another embodiment of the present invention.

FIG. 46 is a flowchart showing the arrangement of the steps in a correction process performed by a digital copying machine as an image processor according to still another embodiment of the present invention.

FIG. 87 is an explanatory view of the arrangement of the steps.

FIG. 89 is an explanatory view of the arrangement of the steps shown in FIG. 88.

FIG. 91 is an explanatory view of the arrangement of the steps shown in FIG. 90.

FIG. 93 is an explanatory view of the arrangement of the steps shown in FIG. 92.

FIG. 95 is an explanatory view of the arrangement of the steps shown in FIG. 94.

DESCRIPTION OF THE PREFERRED EMBODIMENTS

EMBODIMENT 1

The following description discusses one embodiment of the present invention with reference to FIGS. 1 to 5.

Figure 3:
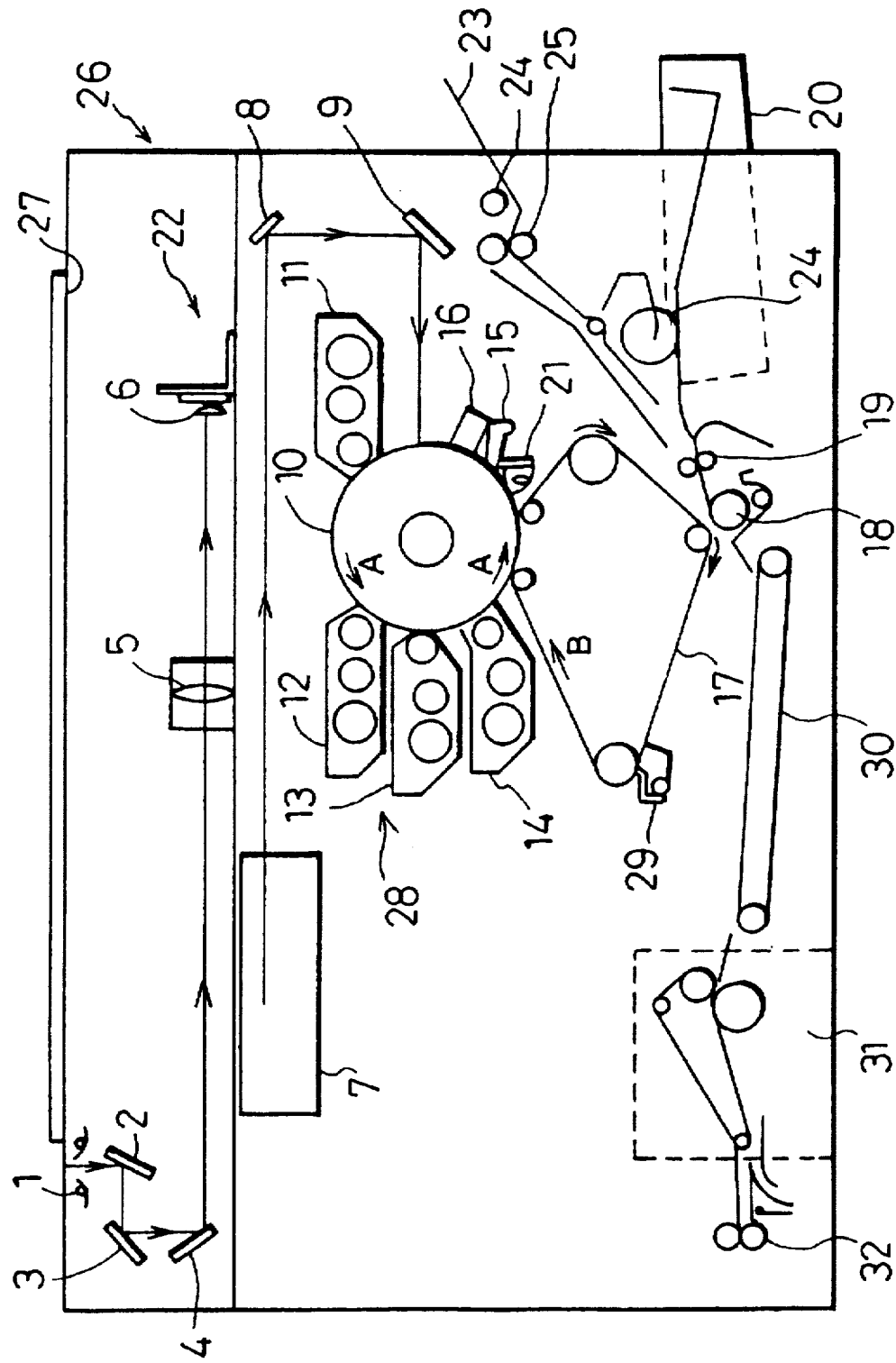
FIG. 3 is a view schematically showing the entire structure of the digital copying machine.

As illustrated in FIG. 3, a digital copying machine as an image processor of this embodiment incorporates a main body 26, and a document platen 27 made of transparent rigid glass at the top of the main body 26. Disposed under the document platen 27 is a scanner unit (input means) 22 including a lamp unit 1, mirrors 2, 3, and 4, a lens unit 5, and a CCD (charge coupled device) sensor 6. Light is applied to a document, not shown, on the document platen 27 by the lamp unit 1. Reflected light from the document is reflected by the mirrors 2, 3, and 4, passes through the lens unit 5, guided to a light receiving surface of the CCD sensor 6, and readout as electric signals.

Provided under the scanner unit 22 is a laser driver unit 7. The image data of the document readout as electric signals by the CCD sensor 6 is temporarily stored in a main memory (storage means) 73 incorporated into an image processing system (to be described later and shown in FIG. 5). The image data is processed in a predetermined manner by the image processing system and transmitted to the laser driver unit 7. The laser driver unit 7 includes a semiconductor laser, a polygon mirror, and an f-θ lens (none of them are shown). The semiconductor laser emits laser light according to the input image data. The polygon mirror deflects the laser light at a constant angular velocity. The f-θ lens adjusts the laser light so that the laser light deflected at a constant angular velocity is again deflected on a photoreceptor drum 10 at a constant angular velocity.

The laser light emitted by the laser driver unit 7 is reflected by mirrors 8 and 9 disposed on the light path, and applied to a photoreceptor drum 10 which is rotatable in the A direction so as to form an electrostatic latent image on the photoreceptor drum 10. A charger 16, a transfer belt 17, a developing device 28, a cleaning device 21, and a charge removing lamp 15 are mounted in this order along the rotating direction of the photoreceptor drum 10. The charger 16 charges the surface of the photoreceptor drum 10 to a predetermined potential before the photoreceptor drum 10 is exposed to light from the laser driver unit 7. The developing device 28 supplies toner to the electrostatic latent image on the photoreceptor drum 10 so as to form a toner image. The toner image on the photoreceptor drum 10 is intermediately transferred to the transfer belt 17. The cleaning device 21 removes toner remaining on the photoreceptor drum 10. The charge removing lamp 15 removes residual charge on the photoreceptor drum 10 prior to the next charging operation.

The developing device 28 includes a black developer container 11, a yellow developer container 12, a magenta developer container 13, and a cyan developer container 14. Each of the developer containers 11, 12, 13, and 14 contains toner of the corresponding color. The transfer belt 17 is an endless belt and is movable in the B direction. When a part of the transfer belt 17 is pressed against the photoreceptor drum 10, the toner image on the photoreceptor drum 10 is transferred to the transfer belt 17. Also disposed around the transfer belt 17 is a cleaning device 29 for removing toner remaining on the transfer belt 17.

Register rollers 19, paper feed cassette 20 for storing sheets of paper, and a paper feed tray 23 on which sheets of paper are to be set are arranged on the paper feeding side of the transfer belt 17. The register roller 19 timely feeds a sheet to the transfer belt 17. A feeding roller 24 and transport rollers 25 for transporting a sheet are located in the vicinity of the paper feed cassette 20 and the paper feed tray 23. Disposed under the transfer belt 17 is a transfer roller 18 for pressing the sheet fed from the register roller 19 against the transfer belt 17 so as to transfer the toner image on the transfer belt 17 to the sheet.

Mounted on the paper output side of the transfer belt 17 are a transport belt 30 for transporting the sheet having thereon the toner image, a fixing device 31 for fusing the toner image onto the sheet, and a discharging roller 32 for sending the sheet having the fused toner image from the apparatus. Output means is formed by the laser driver unit 7, the photoreceptor drum 10, the charger 16, the transfer belt 17, the cleaning devices 21 and 29, the charge removing lamp 15, the black developer container 11, the yellow developer container 12, the magenta developer container 13, the cyan developer container 14, and the paper feed cassette 20.

Figure 4:
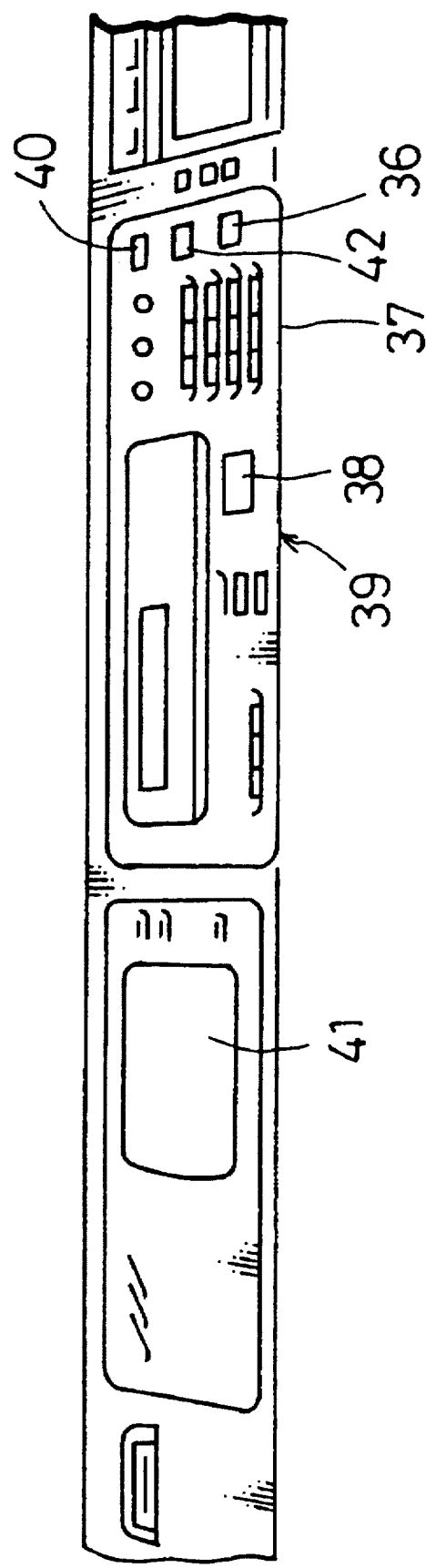
FIG. 4 is a perspective view of a control panel section of the digital copying machine.

A control panel 39 shown in FIG. 4 is provided near the document platen 27 at the top of the main body 26. The control panel 39 includes a ten-key (setting means) 37, a copying start key 38, a clear key 36, a reduction mode key 40, a correction mode key 42, and a liquid crystal display panel 41. The reduction mode key 40 is pressed when selecting a reduction mode in which a reduced copy of a document is produced. The correction mode key 42 is pressed when selecting a correction mode in which the image of the document is corrected. The liquid crystal display panel 41 has a touch panel provided with a touch sensor, displays various information given by the main body, and transmits instructions, for example, a selected mode using the touch panel to an image processing CPU 74 in the image processing system, to be described later. The ten-key 37 is used for inputting the number of copies to be produced, and a reduction rate, for example, when the reduction mode is selected.

With the above-mentioned structure, a color (three-color) copy is produced by the following processes. First, when the charger 16 uniformly charges the surface of the photoreceptor drum 10, the scanner unit 22 performs first scanning. The image data of the document read by the CCD sensor 6 is output as laser light representing yellow data by the laser driver unit 7 through the image processing system. When the surface of the photoreceptor drum 10 is exposed to the laser light, an electrostatic latent image corresponding to yellow color is formed at the exposed portion. Then, yellow toner is supplied from the yellow developer container 12 to the electrostatic latent image in the image area so as to form a yellow toner image.

The yellow toner image is transferred to the transfer belt 17 which is pressed against the photoreceptor drum 10. At this time, some toner which was not used for the transfer remains on the surface of the photoreceptor drum 10, and the remaining toner is scraped off by the cleaning device 21. The charge removing lamp 15 removes residual charges on the surface of the photoreceptor drum 10.

When the above-mentioned series of operations is complete, the charger 16 again uniformly charges the surface of the photoreceptor drum 10, and the scanner unit 22 performs second scanning. The image data obtained is output as laser light representing magenta data through the image processing system. When the photoreceptor drum 10 is exposed to the laser light, an electrostatic latent image corresponding to magenta color is formed. Then, magenta toner is supplied from the magenta developer container 13 to form a magenta toner image. Subsequently, the magenta toner image is transferred to the transfer belt 17 and superimposed on the yellow toner image.

The cleaning device 21 and the charge removing lamp 15 perform the above-mentioned operations. Then, the charger 16 uniformly charges the photoreceptor drum 10, and the scanner unit 22 performs third scanning. When the photoreceptor drum 10 is exposed to laser light representing cyan data, an electrostatic latent image corresponding to cyan color is formed. Cyan toner is supplied from the cyan developer container 14 to the photoreceptor drum 10 so as to form the toner image of cyan color. The cyan toner image is then transferred to the transfer belt 17 and finally superimposed on the above-mentioned toner images.

Next, the superimposed toner image on the transfer belt 17 is transferred to a sheet, fused onto the sheet by the fixing device 31, and output from the copying machine by the discharging rollers 32.

The above mentioned processes are programmed for making a three-color copy. When producing a four-color copy, a process using black toner contained in the black developer container 11 is added to the above-mentioned processes. Meanwhile, a black-and-white copy is produced by supplying black toner from the black developer container 11 to the electrostatic latent image on the photoreceptor drum 10 and transferring the toner image to a sheet through the transfer belt 17.

Figure 5:
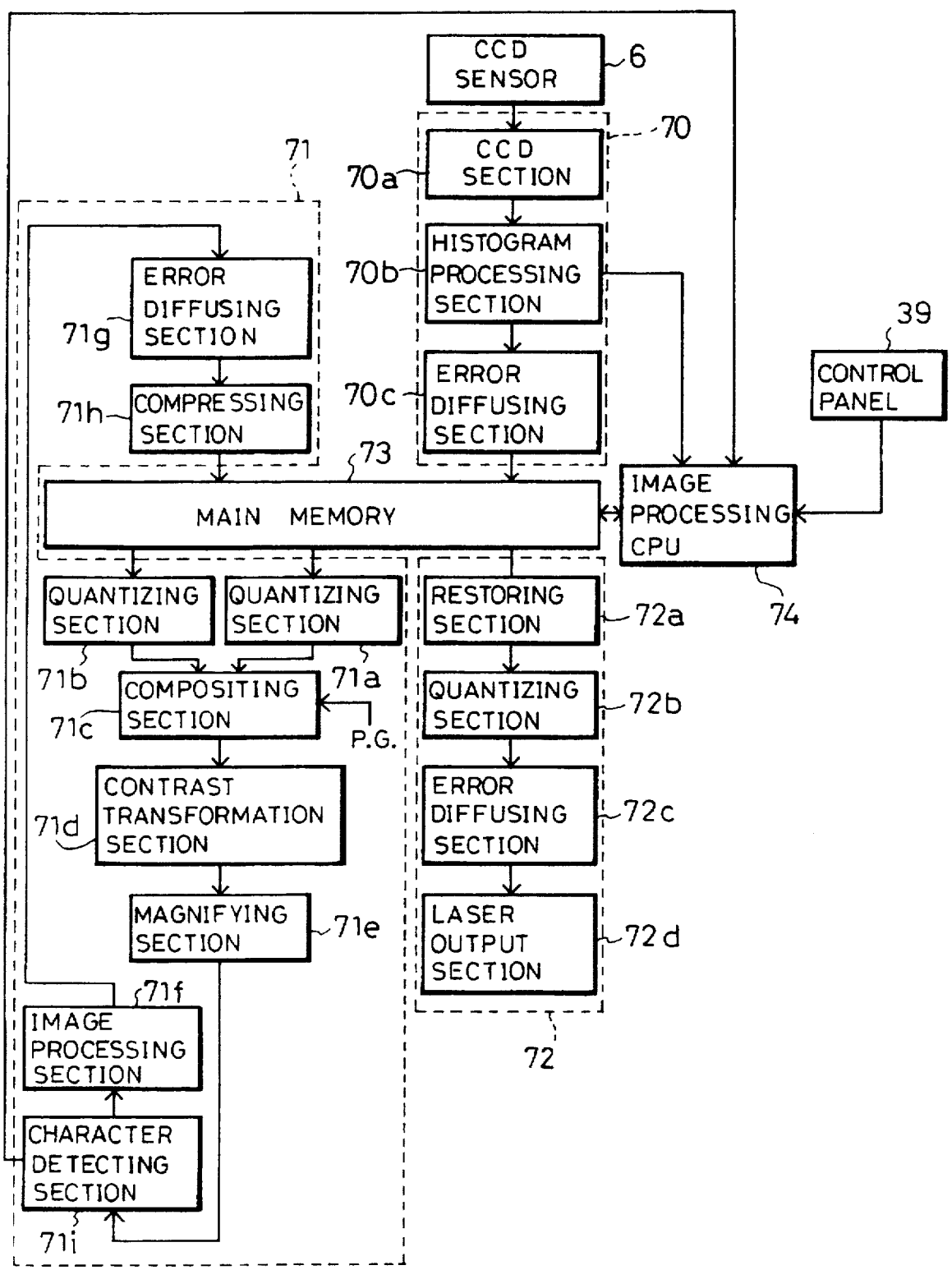
FIG. 5 is a block diagram showing the structure of an image processing system in the digital copying machine.

With reference to FIG. 5 the following description discusses the structure and function of the image processing system which processes the image data read by the CCD sensor 6 in a predetermined manner and outputs the processed data to the laser driver unit 7.

The image processing system reproduces colors corresponding to the document, calculates a size of the image when the reduction mode (to be described later) is selected, and corrects the image when the correction mode (to be described later) is selected. As illustrated in FIG. 5, the image processing system includes an image-data input section 70, an image transformer section 71, an image-data output section 72, a main memory 73, and an image processing CPU (central processing unit 74). The main memory 73 is formed by a RAM (random access memory) and a ROM (read only memory).

The image-data input section 70 includes a CCD section 70a, a histogram processing section 70b, and an error diffusing section 70c. The image-data input section 70 converts the image data of a document read by the CCD sensor 6 into a binary form, makes a histogram of the digital data, processes the image data by an error diffusing method, and temporarily stores the data in the main memory 73.

How the image-data input section 70 processes the image data is discussed in detail hereinbelow. First, the CCD section 70a converts analog electric signals corresponding to the respective pixel densities of the image data into digital signals, and corrects MTF (modulation transfer function), black-and-white level, or gamma. The resulting digital signals of 256 tones (8 bits) are output to the histogram processing section 70b.

In the histogram processing section 70b, the digital signal input from the CCD section 70a is added according to the pixel density of 256 tones to obtain density information (histogram data). The density information is sent to the image processing CPU 74 if necessary and to the error diffusing section 70c as pixel data. In the error diffusing section 70c, the 8-bit/pixel digital signal input from the histogram processing section 70b is converted to a 1-bit (binary) signal by the error diffusing method, and relocation is performed for faithfully reproducing the densities of local portions of the document. The error diffusing method is a type of pseudo-half-tone processing, and an error caused by conversion to binary form is reflected when converting adjacent pixels into binary form.

The image transformer section 71 includes quantizing sections 71a and 71b, a compositing section 71c, a contrast transformation section 71d, a magnifying section (reducing means and magnifying means) 71e, an image processing section 71f, an error diffusing section 71g, a compressing section 71h, and a character detecting section (character detecting means) 71i.

The image transformer section 71 converts the input image data into image data of a form desired by a user. The image transformer section 71 processes the image data until all the image data is converted into the desired form and stored in the memory 73. Although the processing sections 71a to 71i in the image transformer section 71 do not always perform their functions, they perform their functions if need be.

The functions of the processing sections 71a to 71i are explained hereinbelow in detail. The image data which has been converted into binary form by the error diffusing section 70c is reconverted to 256 tones by the quantizing sections 71a and 71b. In the compositing section 71c, a logical operation, i.e., logical OR, logical AND, or exclusive-OR operation is selectively carried out with respect to each pixel. The data subjected to the logical operation is the pixel data stored in the memory 73 and bit data from a pattern generator (P.G., not shown) which stores preset characters and symbols.

In the contrast transformation section 71*d*, the relation between the output density and input density is freely determined according to a predetermined contrast transformation table with respect to the respective digital signals of 256 tones. In the magnifying section 71*e*, interpolation is performed based on data input according to a magnification specified by a user to obtain pixel data (a density level) of target pixels after magnified, and main scanning is magnified after magnifying sub scanning.

In the character detecting section 71*i*, the input image data is stored in a memory, not shown, in the character detecting section 71*i*. In the memory, the features of the character data are extracted from the image data in the memory by a so-called isolated graphics separating method or a stroke extraction separating method, and transmitted to the image processing section 71*f* and the image processing CPU 74. Namely, when the reduction mode or the correction mode is selected, the character detecting section 71*i* detects the character data from the image data read by the scanner unit 22.

By the isolated graphics separating method, the character data is detected as follows. Each character is relatively smaller than graphics, and is isolated. Considering these characteristics, the image data is separated into units of connected graphics, and a rectangle is formed to circumscribe a unit of graphics. Then, whether or not the rectangle is smaller than a predetermined range of a character size is judged. If the rectangle is smaller than the predetermined range of a character size, the unit of graphics is detected as character data.

The stroke extraction separating method detects the character data as follows. Segments constituting graphics are extracted from the image data, and the stroke of each segment is detected. Subsequently, whether the stroke is shorter than a predetermined length or not is judged. If the stroke is shorter than the predetermined length, the graphics from which the stroke is detected as character data.

The image processing section 71*f* performs various image processing corresponding to the reduction mode or the correction mode on the input image data, and collects information about data strings, for example, extracts features. The error diffusing section 71*g* performs the same processing as that performed by the error diffusing section 70*c* of the image-data input section 70.

In the compressing section 71*h*, the binary data is compressed by run-length encoding. The compressing section 71*h* performs compressing in the final processing loop when the image data to be output last is obtained.

The image-data output section 72 includes a restoring section 72*a*, a quantizing section 72*b*, an error diffusing section 72*c*, and a laser output section 72*d*. The image-data output section 72 restores the image data stored in compressed form in the memory 73, reconverts it to 256 tones, diffuses an error caused when obtaining quaternary data corresponding to a half-tone image which is smoother than the image formed by binary data, and transfers the data to the laser output section 72*d*.

More specifically, the restoring section 72*a* restores the image data compressed by the compressing section 71*h*. The Quantizing section 72*b* performs processing similar to that performed in the quantizing sections 71*a* and 71*b* of the image transformer section 71. The error diffusing section 72*c* performs processing similar to that performed by the error diffusing section 70*c* of the image-data input section 70.

The laser output section 72*d* converts the digital pixel data into an ON/OFF signal for switching the laser (not shown) between ON and OFF according to a control signal from the image processing CPU 74. The laser is switched ON or OFF by the ON/OFF signal. The image data handled by the image-data input section 70 and the image-data output section 72 is basically stored in binary form in the memory 73 in order to save the capacity of the memory 73. However, considering degradation of the image data, it is also possible to process the image data in quaternary form.

Signals from the control panel 39 and the character detecting section 71*i* are input to the image processing CPU 74. The image processing CPU 74 performs, for example, reduction processing according to these signals as follows. Since the image processing CPU 74 includes calculating means, judging means, and warning means, it recognizes the size of a character from the character data based on an output of the character detecting section 71*i*, calculates a size of the character after being reduced (hereinafter referred to as the reduced character), and judges whether the reduced character is larger than a predetermined reducible threshold value. If the size of the reduced character is smaller than the reducible threshold value, the image processing CPU 74 warns that the reduced character becomes unreadable.

The reducible threshold value indicates the smallest size of reduced character which are reproduced without being defaced and thus readable. Therefore, if the reduced character is smaller than the reducible threshold value, it is too small or defaced, and unreadable. The reducible threshold value is determined depending on, for example, the performance such as resolution of a digital copying machine, and is stored in the main memory 73.

Figure 1:
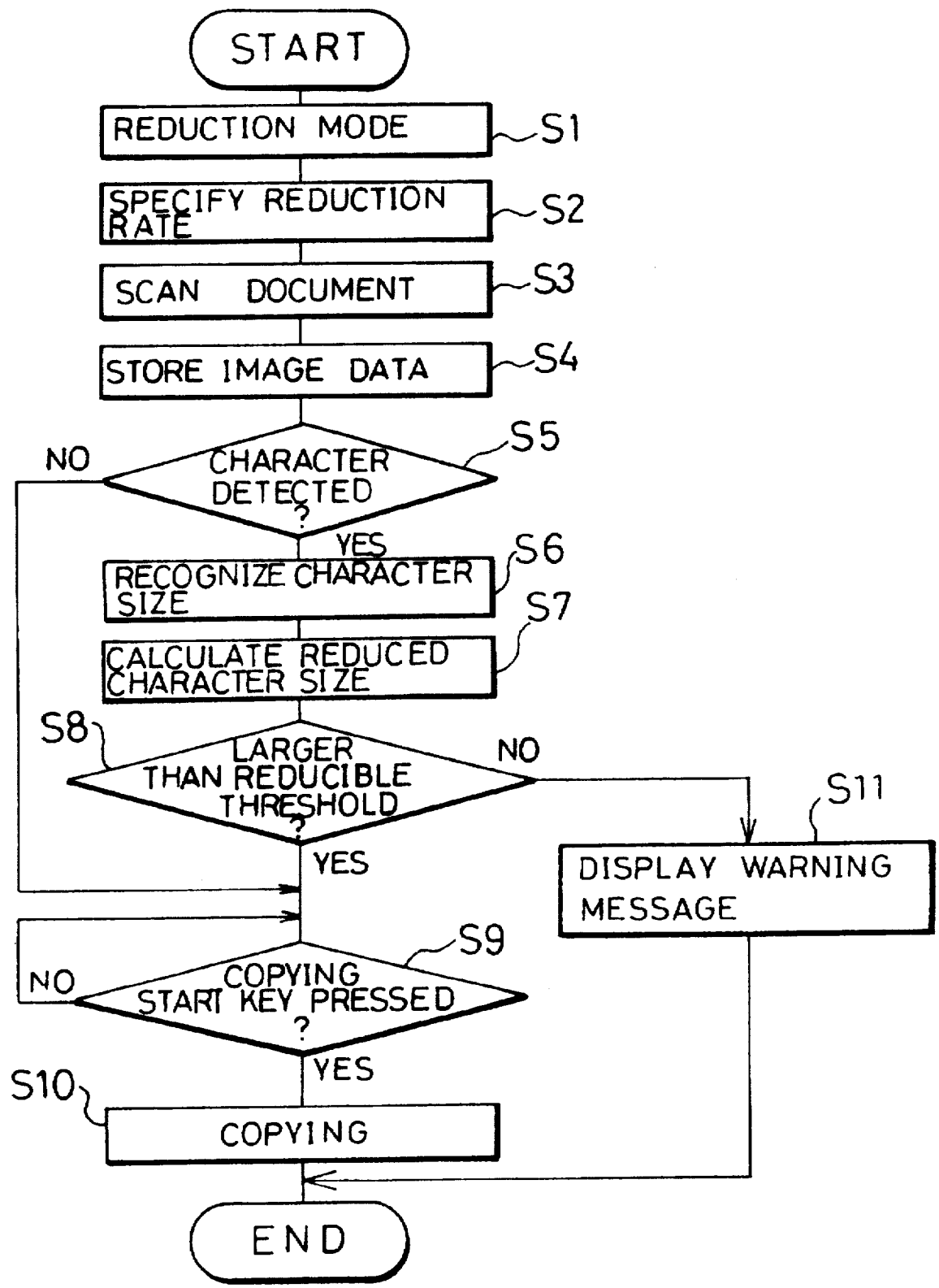
FIG. 1 is a flowchart showing the arrangement of the steps in a reduction process performed by a digital copying machine as an image processor according to one embodiment of the present invention.
Figure 2:
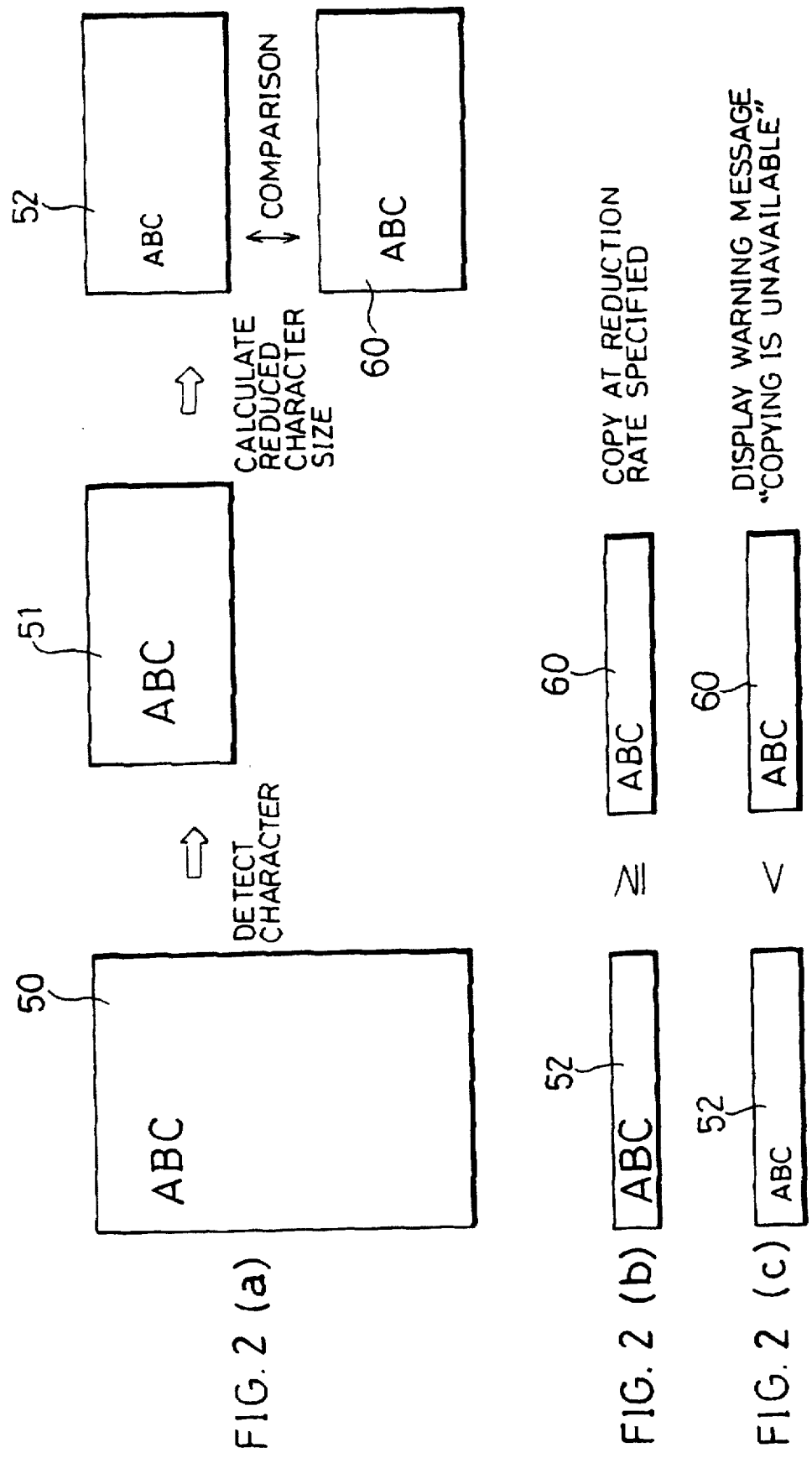
FIG. 2 is an explanatory view of the arrangement of the steps shown in FIG. 1.

With reference to the flowchart of FIG. 1 and FIG. 2, how the digital copying machine of this embodiment performs reduction processing is explained.

First, before selecting the reduction mode, a sheet size is selected through the operation panel 39. If the sheet size is not particularly specified, a sheet size corresponding to the document size is selected. At this time, if the sheet size is manually selected or not is also specified.

After selecting a sheet size, the reduction mode is selected by pressing the reduction mode key 40 on the control panel 39 (step 1), and a reduction rate is entered using the ten-key 37 (step 2). After confirming a document 50 (see FIG. 2) is set on the document platen 27, the document 50 is scanned (step 3), and the image data read by the CCD sensor 6 is stored in the main memory 73 (step 4).

When scanning is complete, as illustrated in FIG. 2(*a*), whether character data is contained in the image data of the document 50 is detected by the character detecting section 71*i* of the image transformer section 71 (step 5). If the image data does not contain character data, the operation proceeds to step 9, to be described later, and copying is performed. On the other hand, if the character data, i.e., characters 51 are detected from the image data, the image processing CPU 74 recognizes the size of the characters 51 (step 6).

Subsequently, the size of reduced characters 52 is calculated from the size of the characters 51 and the reduction rate (step 7). Then, whether the size of the reduced characters 52 is larger than a predetermined reducible threshold value 60 is compared (step 8). As illustrated in FIG. 2(*b*), if the size of the reduced characters 52 is larger than or equal to the threshold value 60, when a reduced copy is produced at the reduction rate specified in step 2, the reduced characters 52 are readable. Consequently, when the copying start key 38 is pressed (step 9), the copying operation is executed (step 10) and the reduction mode comes to an end.

Meanwhile, as illustrated in FIG. 2(c), when the size of the reduced characters 52 is smaller than the threshold value 60, if a reduced copy is produced at the reduction rate specified in step 2, the reduced characters 52 become too small or defaced, resulting unreadable characters. Then, a warning message "reduction processing is unavailable" is displayed (step 11), and the copying operation is stopped.

As described above, the digital copying machine having this structure terminates the copying operation when the reduced characters become too small or defaced, and unreadable. It is therefore possible to prevent a reduced image of a virtually useless size from being formed, i.e., a worthless reduced copy from being produced. Accordingly, the digital copying machine is handled more easily, its value is increased, and the waste of sheets is prevented. Additionally, since the copying operation is executable only when the reduced characters are in readable condition, a satisfactory image is obtained.

EMBODIMENT 2

The following description discusses another embodiment of the present invention. The means having the same function as that in EMBODIMENT 1 will be designated by the same code and their description will be omitted.

A digital copying machine as an image processor of this embodiment incorporates a character recognition section, not shown, instead of the character detecting section 71i of EMBODIMENT 1. In the character recognition section (character recognizing means), input image data is stored in a memory in the character recognition section. Features of character data are extracted from the image data in the memory by a so-called superimposing method, a feature extraction method, or a structural analysis method, and is sent to the image processing section 71f and the image processing CPU 74. More specifically, when the reduction mode is selected, the character recognition section detects the character data from the image data read by the scanner unit 22, and recognizes characters in the detected character data. Except for this difference the digital copying machine of this embodiment has the same structure as that of the digital copying machine of EMBODIMENT 1.

With the superimposing method, the data of various characters which is stored in advance is successively superimposed on the image data and, when the image data and the data of a particular character match, the image data is recognized as the character. With the feature extraction method, in order to recognize the character in the image data, the feature of a character, such as the mark ".", "'" or ",", a short line and curved line, or a portion enclosed by the line as is seen in the character "a" or "b", for example, is extracted. With the structural analysis method, the image data is separated into units of connected graphics, and characters in the image data are recognized by analyzing the positional relation between the units of graphics, and the shape of each unit graphics.

In this digital copying machine, reduction processing is executed in a manner similar to that performed in the digital copying machine of EMBODIMENT 1. More specifically, the digital copying machine having this structure terminates the copying operation when the reduced characters become too small or defaced, and unreadable. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

EMBODIMENT 3

Figure 6:
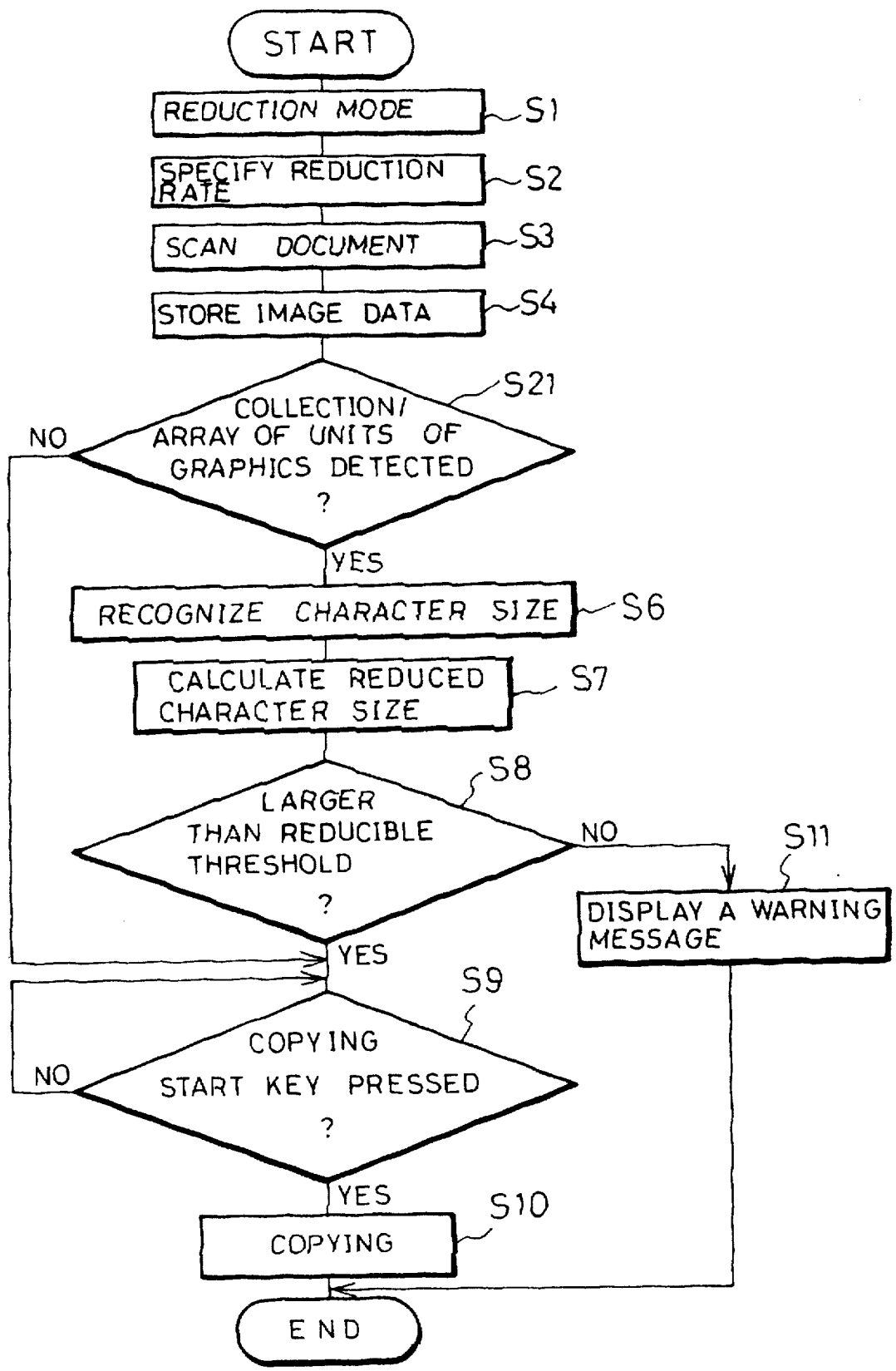
FIG. 6 is a flowchart showing the arrangement of the steps in a reduction process performed by a digital copying machine as an image processor according to another embodiment of the present invention.
Figure 7:
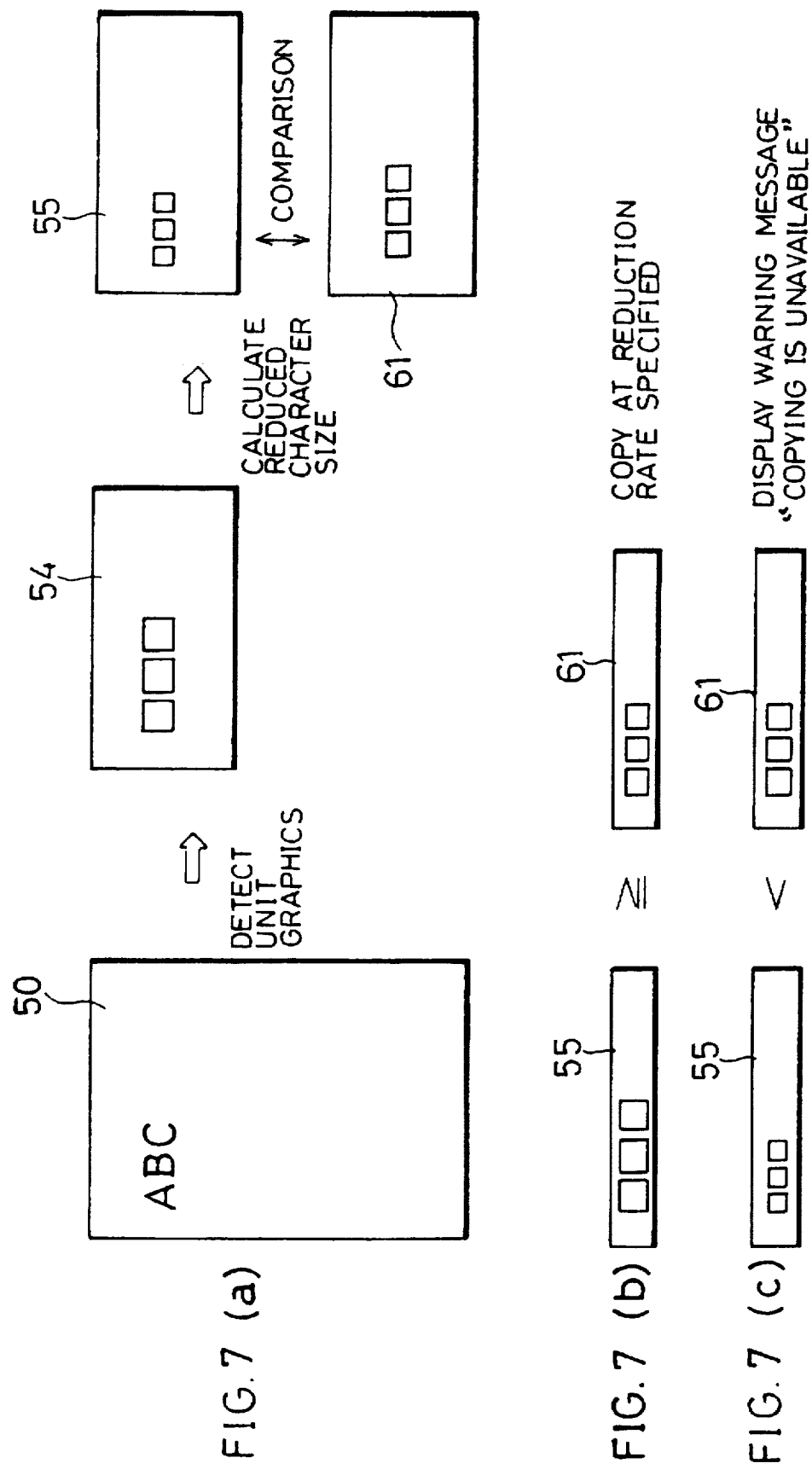
FIG. 7 is an explanatory view of the arrangement of the steps shown in FIG. 6.

The following description discusses still another embodiment of the present invention with reference to FIGS. 6 and 7. The means having the same function as that in EMBODIMENT 1 will be designated by the same code and their description will be omitted.

A digital copying machine as an image processor of this embodiment incorporates a unit graphics detecting section, not shown, instead of the character detecting section 71i of EMBODIMENT 1. Input image data is stored in a memory in the unit graphics detecting section (unit graphics detecting means). And, the image data is separated into units of connected graphics, and the positional relation of these units of connected graphics is analyzed so as to extract units of graphics having a particular positional relation. The extracted units of graphics are sent to the image processing section 71f and the image processing CPU 74. Namely, when the reduction mode is selected, the unit graphics detecting section extracts units of graphics from the image data read by the scanner unit 22 and detects the units of graphics as character data. Except for this difference, the digital copying machine of this embodiment has the same structure as that of the digital copying machine of EMBODIMENT 1.

The reason why detecting units of graphics having a particular positional relation as the character data is as follows. Characters are relatively smaller than graphics, isolated, and regularly aligned in a particular direction to form a character string. Additionally, a text is formed by a collection of several character strings. Therefore, when the positional relation between units of graphics is analyzed, if these units of graphics have features similar to the features of a character, the units of graphics are detected as character data.

Next, with reference to the flowchart of FIG. 6 and FIG. 7, how the digital copying machine of this embodiment performs reduction processing is explained hereinbelow.

First, like the digital copying machine of EMBODIMENT 1, a sheet size and the reduction mode are selected (step 1). When a reduction rate is entered (step 2), the document 50 (see FIG. 7) is scanned (step 3), and the image data read by the CCD sensor 6 is stored in the main memory 73 (step 4).

When scanning is complete, as illustrated in FIG. 7(a), the unit graphics detecting section in the image transformer section 71 detects whether the image data of the document 50 contains units of graphics having the above-mentioned positional relation (i.e., block and line), (step 21). If the corresponding unit graphics is not detected from the image data, the operation proceeds to step 9, and copying is performed. On the other hand, if a corresponding unit graphic 54 is detected from the image data, the image processing CPU 74 recognizes the size of the units of graphics (hereinafter referred to as the character), (step 6).

Subsequently, the size of a reduced character 55 is calculated from the size of the character 54 and the reduction rate (step 7). Then, whether the size of the reduced character 55 is larger than a predetermined reducible threshold value 61 is compared (step 8). As illustrated in FIG. 7(b), if the reduced character 55 is larger than or equal to the threshold value, the copying operation is executed (steps 9 and 10) and the reduction mode comes to an end. Meanwhile, as illustrated in FIG. 7(c), when the size of the reduced character 55 is smaller than the threshold value, a warning message "reduction processing is unavailable" is displayed (step 11), and the copying operation is stopped.

As described above, the digital copying machine having this structure terminates the copying operation when the reduced characters become too small or defaced, and unreadable. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

As described above, the image processor of the present invention incorporates: input means for reading the image on a document; setting means for freely selecting a reduction rate of the document; storage means for storing the image data of the document read by the input means; character detecting means for detecting character data from the image data stored in the storage means; calculating means for recognizing the size of characters from the character data detected by the character detecting means and for calculating the size of characters reduced at a reduction rate set by the setting means; judging means for judging whether the size of the reduced characters calculated by the calculating means is smaller than a predetermined minimum readable size; and warning means for giving a warning that the reduced image of the document is unreadable when the judging means judges that the size of the reduced characters is smaller than the predetermined size.

With this structure, the character detecting means detects the character data from the image data, and the calculating means recognizes the size of characters from the character data and calculates the size of characters after being reduced at a reduction rate selected by the setting means. The judging means judges whether the size of reduced characters is smaller than a predetermined minimum readable size. When the size of the reduced characters is judged to be smaller than the minimum readable size, the warning means warns that the reduced image of the document becomes unreadable. It is thus possible to prevent reduced image of a virtually useless size from being formed.

Since the formation of the reduced image of a virtually useless size is prevented, the digital copying machine is handled more easily and its value is increased. For example, when outputting the reduced image onto a sheet, only the reduced image of a practically usable size is output, thereby preventing the waste of sheets.

EMBODIMENT 4

Figure 8:
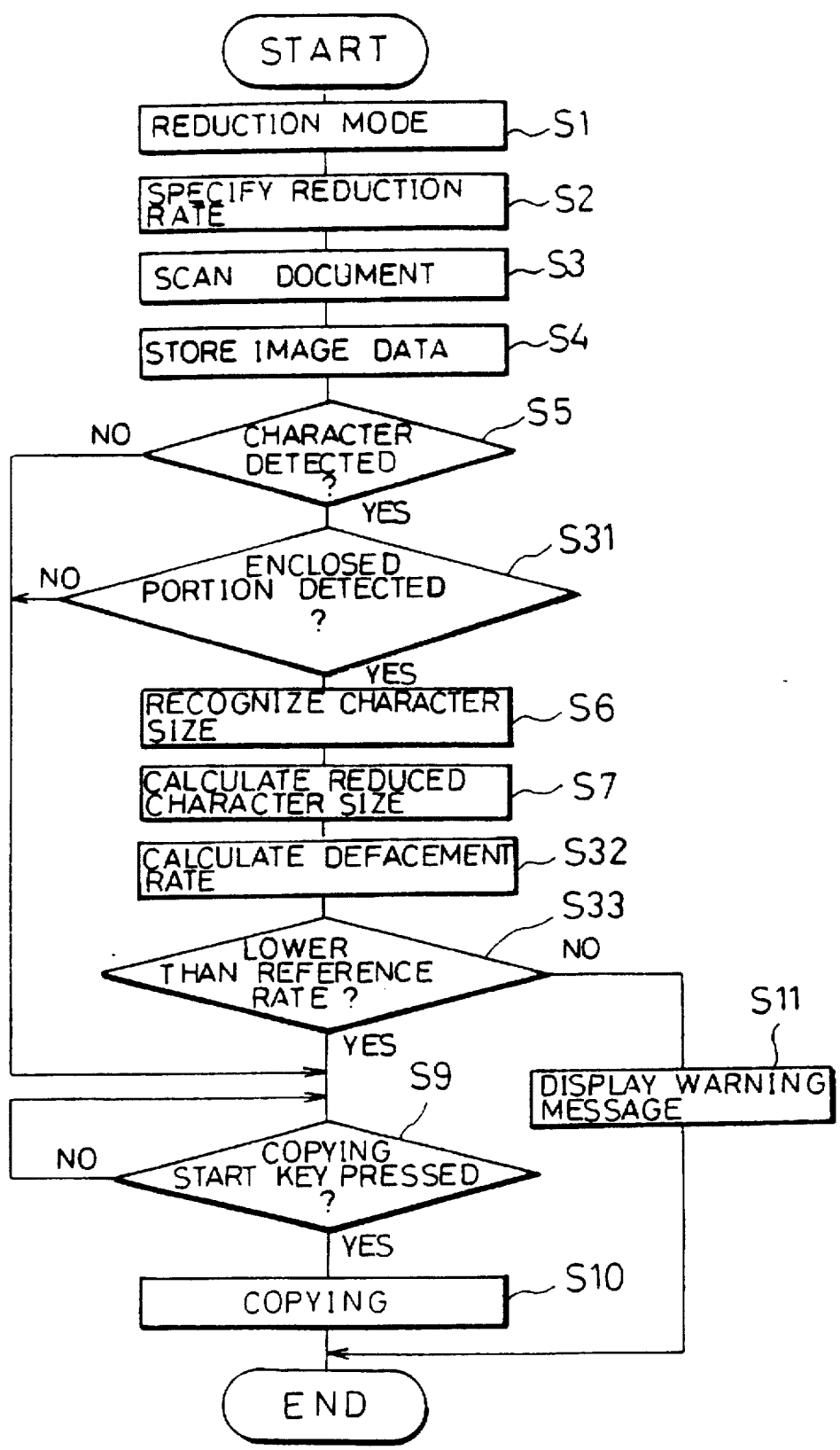
FIG. 8 is a flowchart showing the arrangement of the steps in a reduction process performed by a digital copying machine as an image processor according to still another embodiment of the present invention.
Figure 9:
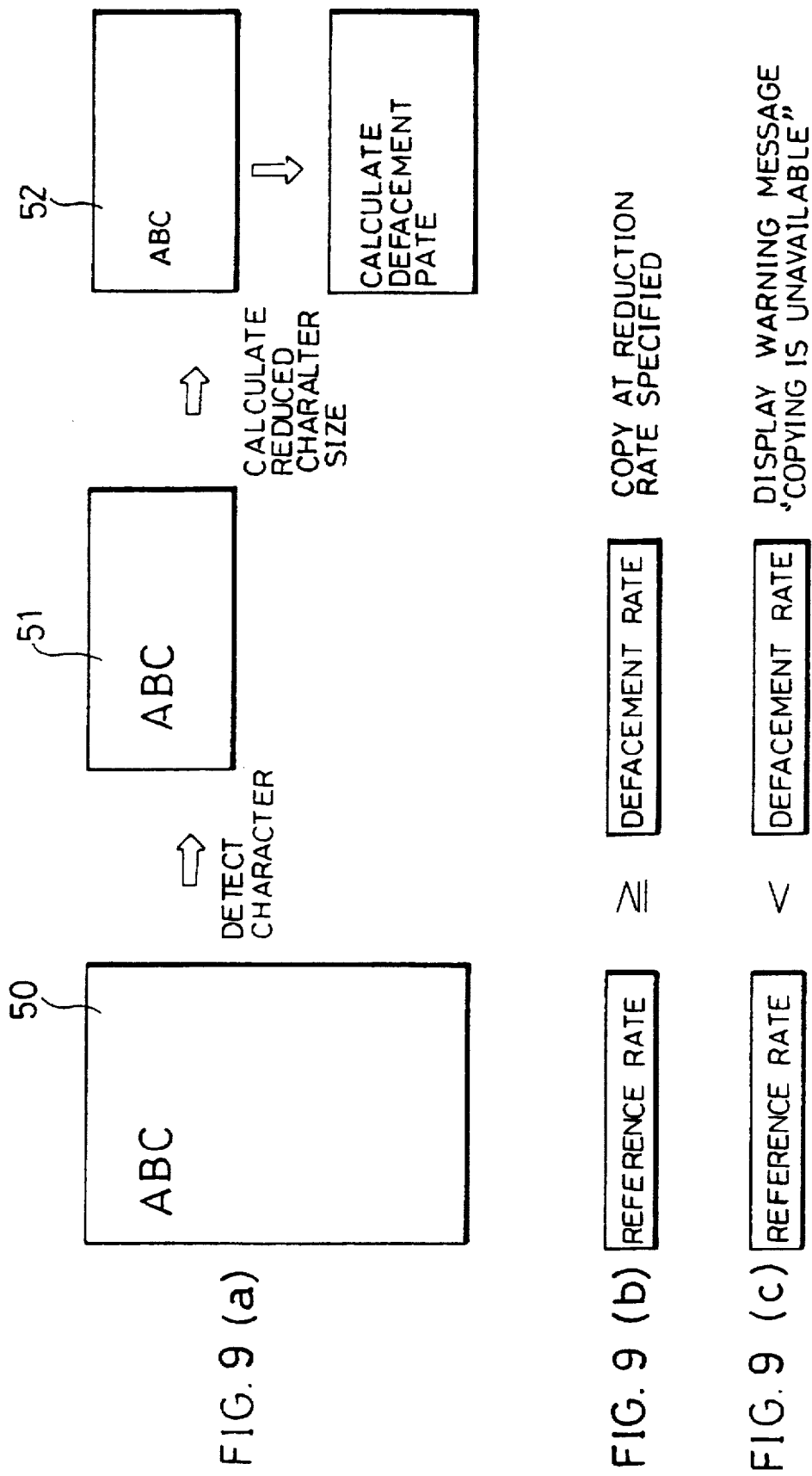
FIG. 9 is an explanatory view of the arrangement of the steps shown in FIG. 8.

The following description discusses another embodiment of the present invention with reference to FIGS. 8 and 9. The means having the same function as that in EMBODIMENT 1 will be designated by the same code and their description will be omitted.

A digital copying machine as an image processor of this embodiment incorporates a first character detecting section, not shown, instead of the character detecting section 71i of EMBODIMENT 1, and a defacement rate calculating means, not shown, in the image processing CPU 74. In the first character detecting section (character detecting means), input image data is stored in a memory in the first character detecting section. When the reduction mode is selected, character data is extracted from the image data read by the scanner unit 22 in a manner similar to that performed by the character detecting section 71i of EMBODIMENT 1, and enclosed portions of characters are extracted/detected from the detected character data by the feature extraction method described in EMBODIMENT 2, and sent to the image processing section 71f and the image processing CPU 74.

The defacement rate calculating means (second calculating means) calculates a percentage of characters having enclosed portions which become too small or defaced after reduction processing. The percentage of defaced characters (defacement rate) is calculated as follows.

$$\text{defacement rate } (\%) = (B/A) \times 100$$

where A is the number of enclosed portions of characters, and B is the number of enclosed portions which are recognized as too small or defaced after the reduction processing by, for example, the resolution of the digital copying machine.

Moreover, the image processing CPU (first calculating means and incidence judging means) 74 judges whether the defacement rate is lower than a predetermined reference rate. The reference rate is determined so that, even when enclosed portions of characters are defaced to some degrees, the characters are surely read. For instance, it is set to a value not higher than 50% depending on the performance, for example, the resolution of the digital copying machine, and stored in the main memory 73. Except for this difference, the structure of the digital copying machine of this embodiment is the same as that of the digital copying machine of EMBODIMENT 1.

Next, how the digital copying machine of this embodiment performs reduction processing is explained with reference to the flowchart of FIG. 8 and FIG. 9.

First, like the digital copying machine of EMBODIMENT 1, a sheet size and the reduction mode are selected (step 1). When a reduction rate is entered (step 2), the document 50 shown in FIG. 9 is scanned (step 3), and the image data read by the CCD sensor 6 is stored in the main memory 73 (step 4).

When scanning is complete, as illustrated in FIG. 9(a), whether character data is contained in the image data of the document 50 is detected by the first character detecting section of the image transformer section 71 (step 5). If the image data does not contain character data, the operation proceeds to step 9, and copying is performed. On the other hand, if the character data, i.e., characters 51 are detected from the image data, whether the characters 51 have enclosed portions or not are detected (step 31). If no enclosed portions are detected, the operation moves to step 9 and the copying operation is performed. Whereas, if enclosed portions are detected, the image processing CPU 74 recognizes the size of the characters 51 (step 6).

Subsequently, the size of reduced characters 52 is calculated from the size of the characters 51 and the reduction rate (step 7). Also, the defacement rate is calculated from the size of the characters 51 and the reduction rate (step 32). Then, whether the defacement rate is lower than the predetermined reference rate or not is compared (step 33). As illustrated in FIG. 9(b), if the defacement rate is lower than or equal to the reference rate, when a reduced copy is produced at the reduction rate specified in step 2, the reduced characters 52 are readable. Therefore, the copying operation is executed (steps 9 and 10), and the reduction mode comes to an end. On the other hand, as illustrated in FIG. 9(c), when the

17 defacement rate is higher than the reference rate, if a reduced copy is produced at the reduction rate specified in step 2, the reduced characters 52 become too small or defaced, resulting unreadable characters. Then, a warning message "reduction processing is unavailable" is displayed (step 11), and the copying operation is stopped.

As described above, the digital copying machine having this structure terminates the copying operation when enclosed portions of the reduced characters become too small or defaced, and unreadable. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

EMBODIMENT 5

Figure 10:
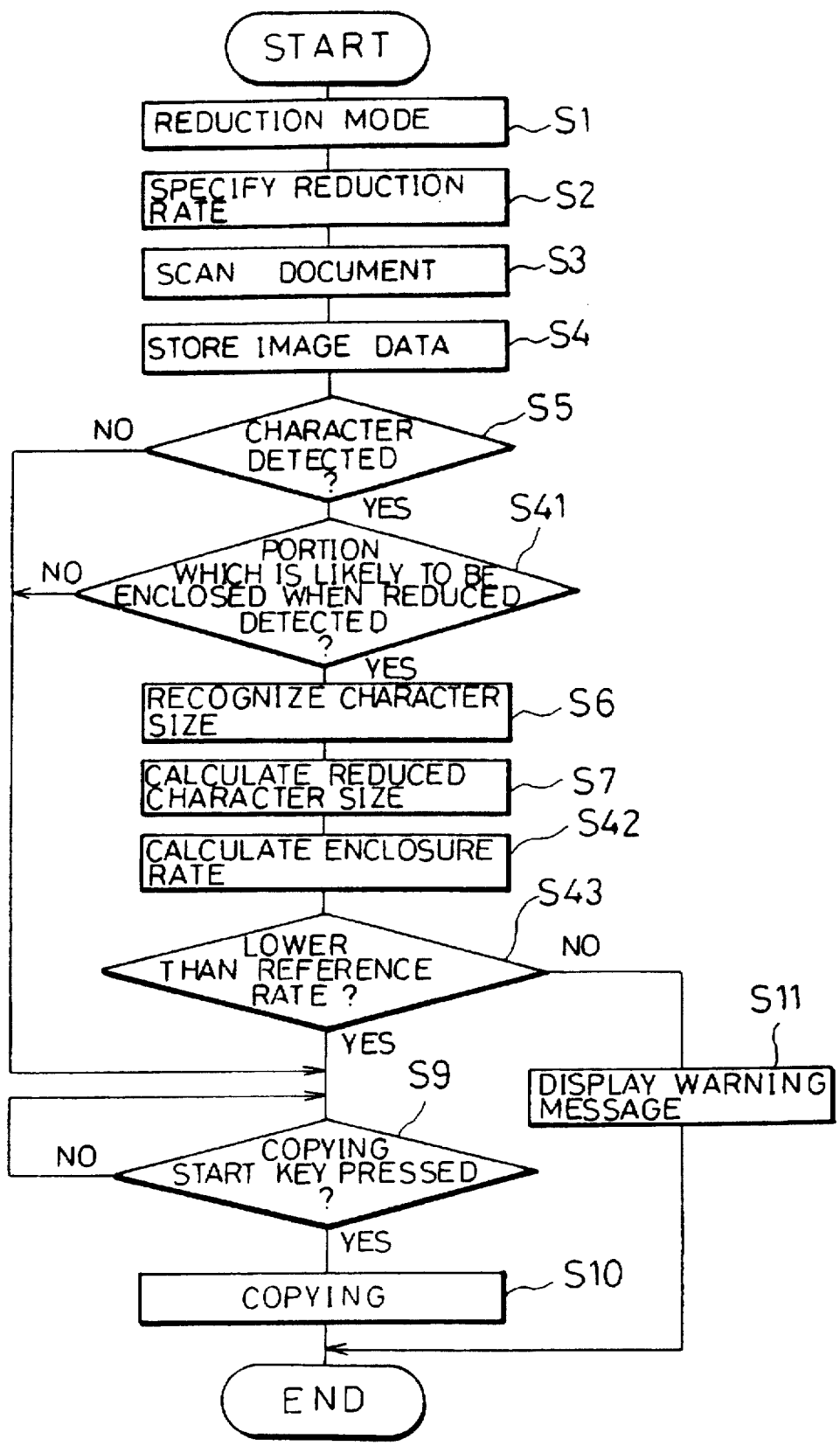
FIG. 10 is a flowchart showing the arrangement of the steps in a reduction process performed by a digital copying machine as an image processor according to still another embodiment of the present invention.
Figure 11:
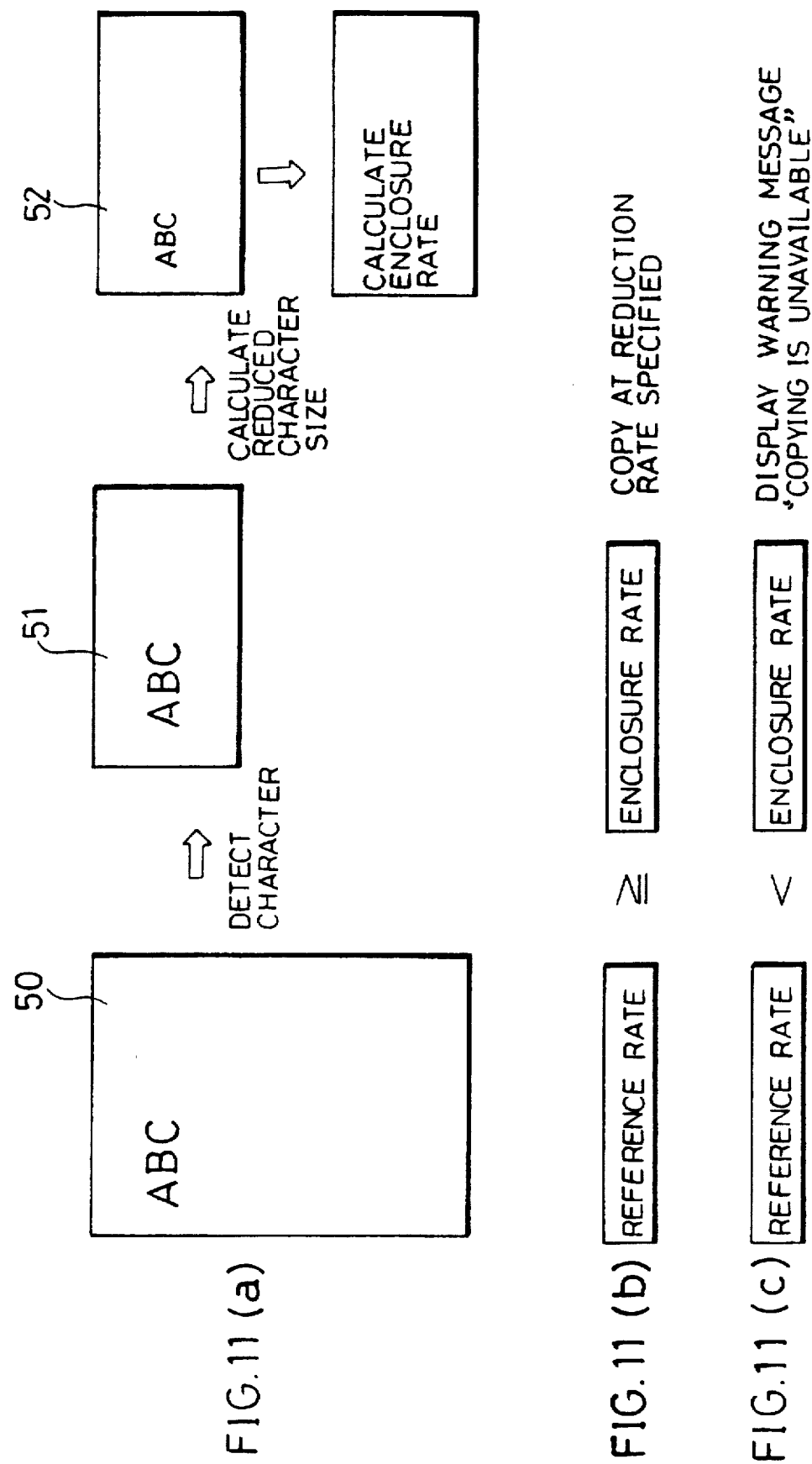
FIG. 11 is an explanatory view of the arrangement of the steps shown in FIG. 10.

The following description discusses yet another embodiment of the present invention with reference to FIGS. 10 and 11. The means having the same function as that in EMBODIMENT 1 will be designated by the same code and their description will be omitted.

A digital copying machine as an image processor of this embodiment incorporates a second character detecting section, not shown, instead of the character detecting section 71$i$ of EMBODIMENT 1, and enclosure rate calculating means in the image processing CPU 74. The second character detecting section (character detecting means) has a memory in which input image data is stored. When the reduction mode is selected, character data is extracted from the image data in the memory read by the scanner unit 22 in a manner similar to that performed by the character detecting section 71$i$ of EMBODIMENT 1, and portions of characters, for example, "c" and "f", which are nearly enclosed by a plurality of short lines and curved lines and which are likely to be defaced after the reduction processing are extracted/detected by the feature extraction method described in detail in EMBODIMENT 2, and sent to the image processing section 71$f$ and the image processing CPU 74.

An enclosure rate calculating means (second calculating means) calculates a probability (hereinafter referred to as the enclosure rate) that the portions which are nearly enclosed are completely enclosed after reduction processing due to defacement. The enclosure rate is determined according to, for example, the resolution of a digital copying machine, and calculated as follows.

enclosure rate (%)=(D/C)×100 where C is the number of portions of characters which are nearly enclosed and D is the number of portions which are likely to be completely enclosed after the reduction processing due to defacement.

In addition, the image processing CPU (first calculating means, and incidence judging means) 74 judges whether the enclosure rate is lower than a predetermined reference rate. The reference rate is determined so that, even when portions of characters, which are nearly enclosed, are enclosed to a degree, they are surely read. The rate is set to, for example, not higher than 50% according to the performance, for example, the resolution of a digital copying machine, and stored in the main memory 73. Except for this difference the digital copying machine of this embodiment has the same structure as that of the digital copying machine of EMBODIMENT 1.

18

Next, how the digital copying machine of this embodiment performs reduction processing is explained with reference to the flowchart of FIG. 10 and FIG. 11.

First, like the digital copying machine of EMBODIMENT 1, a sheet size and the reduction mode are selected (step 1). When a reduction rate is entered (step 2), the document 50 shown in FIG. 11 is scanned (step 3), and the image data read by the CCD sensor 6 is stored in the main memory 73 (step 4).

When scanning is complete, as illustrated in FIG. 11($a$), whether character data is contained in the image data of the document 50 or not is detected by the second character detecting section of the image transformer section 71 (step 5). If the image data does not contain character data, the operation proceeds to step 9, and copying is performed. On the other hand, if the character data, i.e., characters 51 are detected from the image data, whether the characters have portions which are nearly enclosed or not are detected (step 41). If such portions are not detected, the operation moves to step 9 and the copying operation is performed. Whereas, if such portions are detected, the image processing CPU 74 recognizes the size of the characters 51 (step 6).

Subsequently, the size of reduced characters 52 is calculated from the size of the characters 51 and the reduction rate (step 7). Also, the enclosure rate is calculated from the size of the characters 51 and the reduction rate (step 42). Then, whether the enclosure rate is lower than a predetermined reference rate or not is compared (step 43). As illustrated in FIG. 11($b$), if the enclosure rate is lower than or equal to the reference rate, the copying operation is executed (steps 9 and 10), and the reduction mode comes to an end. On the other hand, as illustrated in FIG. 11($c$), when the enclosure rate is higher than the reference rate, a warning message "reduction processing is unavailable" is displayed (step 11), and the copying operation is stopped.

As described above, the digital copying machine having this structure terminates the copying operation when the portions of characters which are nearly enclosed become completely enclosed and unreadable after reduction processing due to defacement. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

As described above, the image processor of the present invention incorporates: input means for reading the image on a document; setting means for freely selecting a reduction rate of the document; storage means for storing the image data of the document read by the input means; character detecting means for detecting character data from the image data stored in the storage means; first calculating means for recognizing the size of characters from the character data detected by the character detecting means and for calculating the size of characters after being reduced at a reduction rate specified by the setting means; second calculating means for calculating a percentage of characters to be unreadable from the size of reduced characters calculated by the first calculating means; incidence judging means for judging whether the percentage calculated by the second calculating means is higher than a predetermined percentage; and warning means for giving a warning that the reduced image of the document becomes unreadable when the incidence judging means judges that the percentage calculated by the second calculating means is higher than the predetermined percentage.

With this structure, the character detecting means detects the character data from the image data, and the first calculating means recognizes the size of characters from the character data and calculates the size of characters after being reduced at the reduction rate specified by the setting means. The second calculating means calculates a percentage of characters to be unreadable from the size of the reduced characters. The incidence judging means judges whether the percentage is higher than the predetermined percentage. When the percentage is judged to be higher than the predetermined percentage, the warning means warns that the reduced image of the document becomes unreadable. It is thus possible to prevent reduced image of a virtually useless size from being formed.

Since the formation of the reduced image of a virtually useless size is prevented, the digital copying machine is handled more easily and its value is increased. For example, when outputting the reduced image onto a sheet, only the reduced image of a practically usable size is output, thereby preventing the waste of sheets.

EMBODIMENT 6

Figure 12:
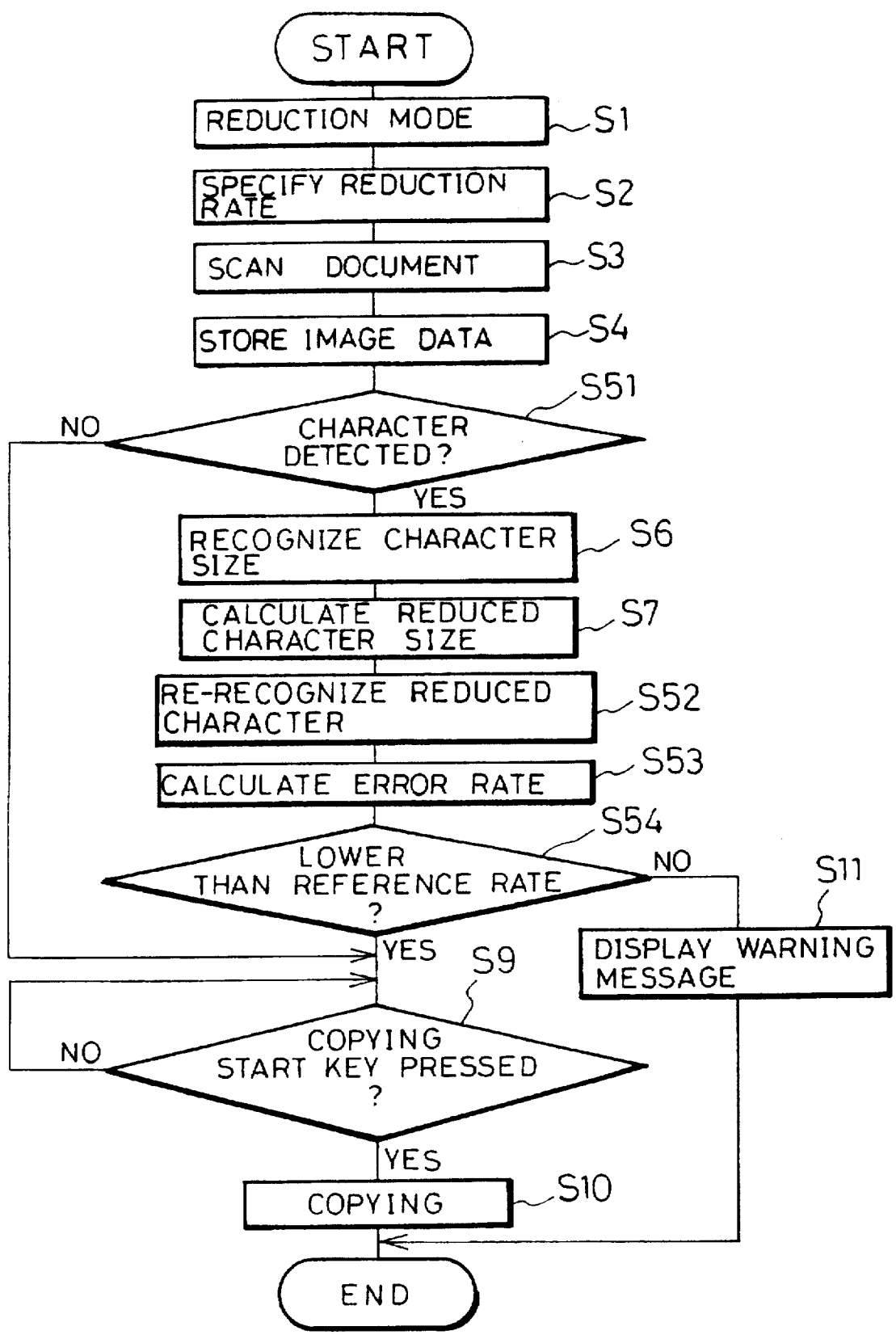
FIG. 12 is a flowchart showing the arrangement of the steps in a reduction process performed by a digital copying machine as an image processor according to still another embodiment of the present invention.
Figure 13:
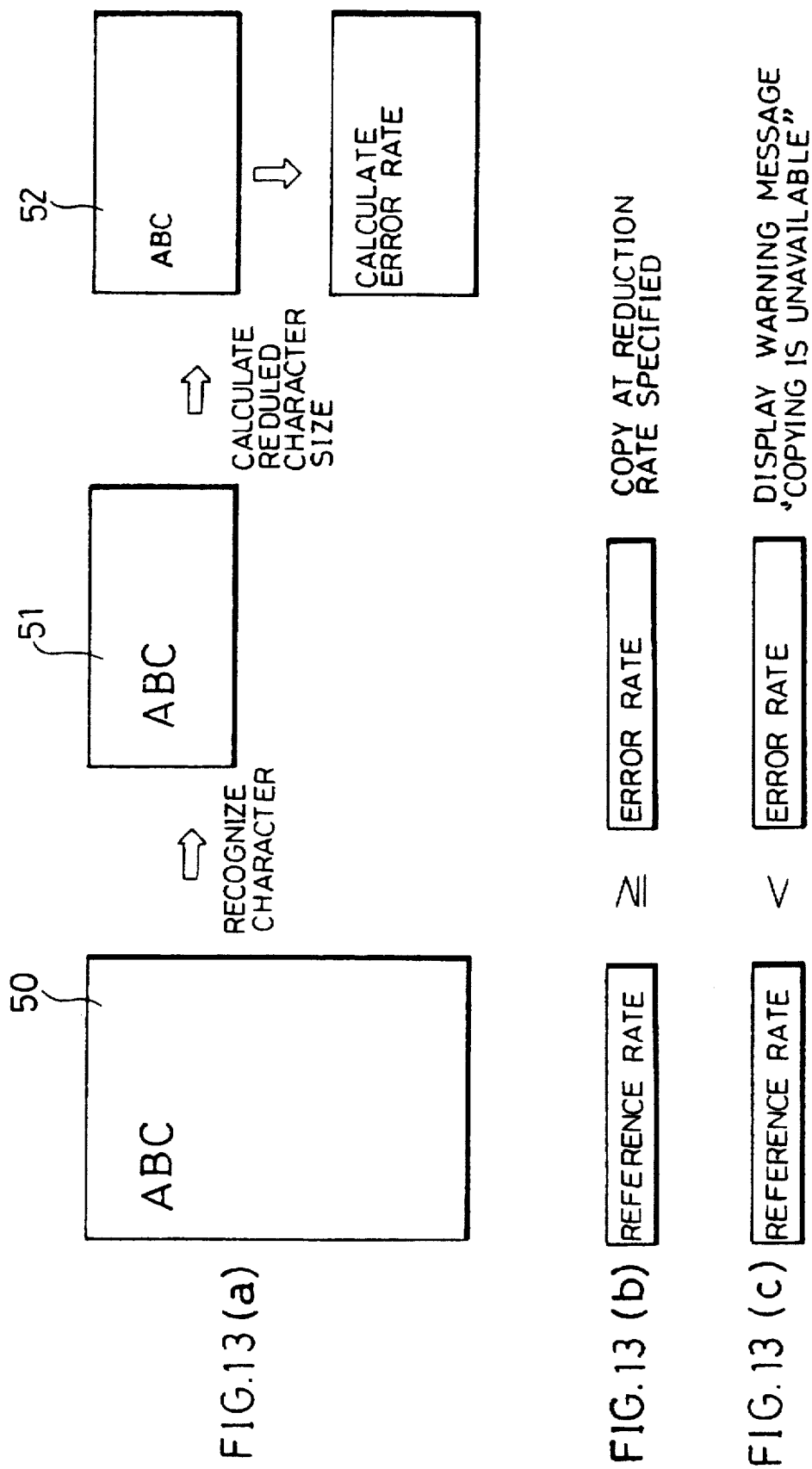
FIG. 13 is an explanatory view of the arrangement of the steps shown in FIG. 12.

The following description discusses yet another embodiment of the present invention with reference to FIGS. 12 and 13. The means having the same function as that in EMBODIMENT 1 will be designated by the same code and their description will be omitted.

A digital copying machine as an image processor of this embodiment incorporates a character recognizing section (not shown) instead of the character detecting section 71$i$ of EMBODIMENT 1, and error rate calculating means in the image processing CPU 74, both of them are not shown. Input image data is stored in a memory in the character recognizing section (character recognizing means). When the reduction mode is selected, character data is detected from the image data read by the scanner unit 22, and characters are recognized from the detected character data by the superimposing method, feature extraction method, or structural analysis method, described in detail in EMBODIMENT 2. Similarly, the character recognizing section recognizes reduced characters from the image data on which reduction processing has been performed. The image processing CPU (character judging means and incidence judging means) 74 judges whether a character before reduction processing and the character after reduction processing are read as the same character or not, i.e., whether the reduced character is re-recognized after the reduction processing.

The error rate calculating means calculates a percentage of characters to be too small or defaced, and unreadable after reduction processing. The error rate is calculated from, for example, the resolution of the digital copying machine as follows.

error rate (%)=($F/E$)×100 where E is the number of characters, and F is the number of reduced characters which become too small or defaced, and unrecognizable after the reduction processing.

The image processing CPU 74 judges whether the error rate is lower than a predetermined reference rate. The reference rate means a rate at which reduced characters are recognized even when part of the characters is unrecognizable, i.e., the highest allowable error rate. The error rate is set to not higher than, for example, 20 to 30% depending on the performance, for example, the resolution of the digital copying machine, and stored in the main memory 73. The magnifying section 71$e$ in the image transformer section 71 forms character reducing means. Except for this difference, the digital copying machine of this embodiment has the same structure as that of the digital copying machine of EMBODIMENT 1.

Next, how the digital copying machine of this embodiment performs reduction processing is explained with reference to the flowchart of FIG. 12 and FIG. 13.

First, like the digital copying machine of EMBODIMENT 1, a sheet size and the reduction mode are selected (step 1). When a reduction rate is entered (step 2), the document 50 shown in FIG. 13 is scanned (step 3), and the image data read by the CCD sensor 6 is stored in the main memory 73 (step 4).

When scanning is complete, as illustrated in FIG. 13($a$), whether character data is contained in the image data of the document 50 is detected by the character recognizing means of the image transformer section 71 (step 51). If the image data does not contain character data, the operation proceeds to step 9, and copying is performed. On the other hand, if the character data, i.e., characters 51 in the image data are recognized, the image processing CPU 74 recognizes the size of the characters 51 (step 6).

Subsequently, the size of reduced characters 52 is calculated from the size of the characters 51 and the reduction rate (step 7), and the reduced characters 52 are re-recognized (step 52). Then, an error rate is calculated from the number of unrecognizable reduced characters 52 (step 53). Next, whether the error rate is lower than a predetermined reference rate or not is compared (step 54). As illustrated in FIG. 13($b$), if the error rate is lower than or equal to the reference rate, the copying operation is executed (steps 9 and 10), and the reduction mode comes to an end. On the other hand, as illustrated in FIG. 13($c$), when the error rate is higher than the reference rate, a warning message "reduction processing is unavailable" is displayed (step 11), and the copying operation is stopped.

As described above, the digital copying machine having this structure terminates the copying operation when the characters become too small or defaced, and unreadable after the reduction processing. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

As described above, the image processor of the present invention incorporates: input means for reading the image on a document; setting means for freely specifying a reduction rate of the document; storage means for storing the image data of the document read by the input means; character recognizing means for detecting character data from the image data stored in the storage means and recognizing characters from the detected character data; character reducing means for reducing the character data detected by the character recognizing means at a reduction rate set by setting means; character judging means for re-recognizing characters from the character data reduced by the character reducing means and judging whether the re-recognized characters are identical to the characters before reduced; incidence judging means for judging whether a percentage of the re-recognized characters which are not identical to the characters before reduced is higher than a predetermined percentage; and warning means for giving a warning that the reduced image of the document becomes unreadable when the incidence rate judging means judges that the percentage of the re-recognized characters which are not identical to the characters before reduced is higher than the predetermined percentage.

With this structure, the character recognizing means detects the character data from the image data, and recognizes characters from the detected character data. The character reducing means reduces the character data at a reduction rate set by the setting means. The character judging means re-recognizes characters from the character data reduced by the character reducing means, and judges whether the re-recognized characters are identical to the characters before reduced. The incidence judging means judges whether a percentage of the re-recognized characters which are not identical to the characters before reduced is higher than a predetermined percentage. The warning means warns that the reduced image of the document becomes unreadable when the percentage of the re-recognized characters which are not identical to the characters before reduced is higher than the predetermined percentage. It is thus possible to prevent reduced image of a virtually useless size from being formed.

Since the formation of the reduced image of a virtually useless size is prevented, the digital copying machine is handled more easily and its value is increased. For example, when outputting the reduced image onto a sheet, only the reduced image of a practically usable size is output, thereby preventing the waste of sheets.

EMBODIMENT 7

Figure 14:
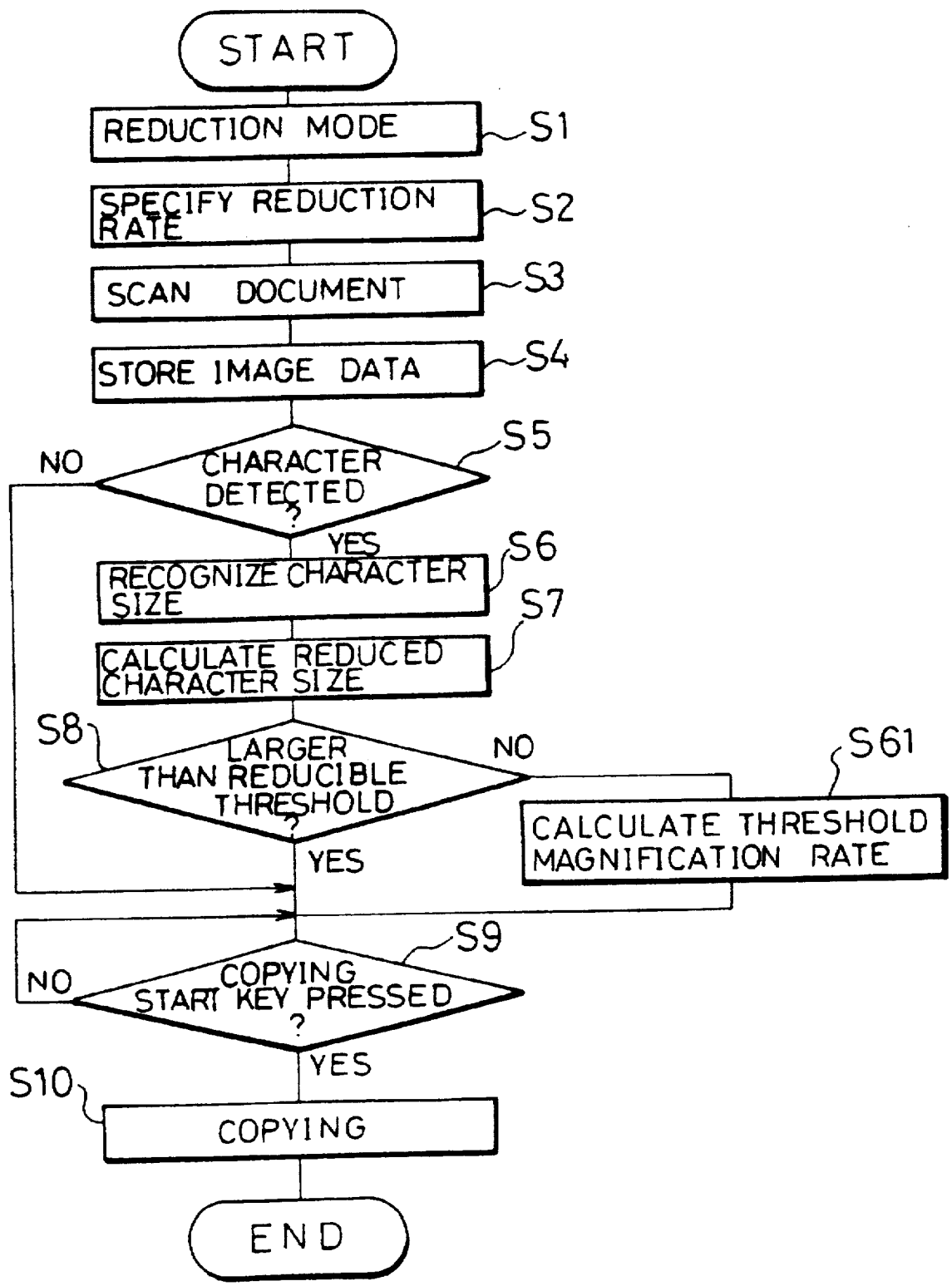
FIG. 14 is a flowchart showing the arrangement of the steps in a reduction process performed by a digital copying machine as an image processor according to still another embodiment of the present invention.
Figure 15:
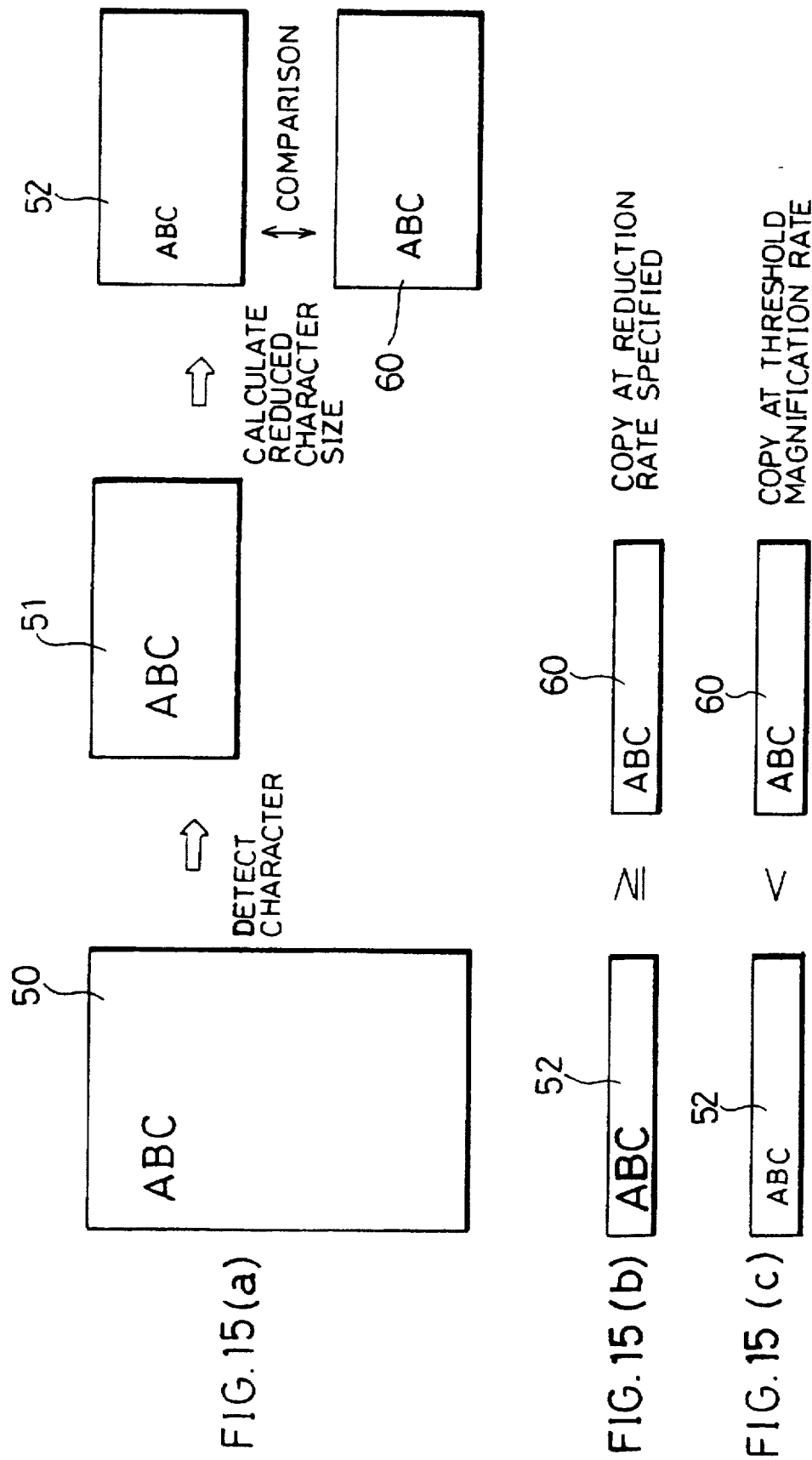
FIG. 15 is an explanatory view of the arrangement of the steps shown in FIG. 14.

The following description discusses yet another embodiment of the present invention with reference to FIGS. 14 and 15. The means having the same function as that in EMBODIMENT 1 will be designated by the same code and their description will be omitted.

A digital copying machine as an image processor of this embodiment includes threshold magnification rate calculating means, not shown, in the image processing CPU 74. The threshold magnification rate calculating means (calculating means) judges whether the size of reduced characters is larger than the reducible threshold value described in EMBODIMENT 1. When the size of reduced characters is smaller than the threshold value, the machine calculates a reduction rate which makes the size of characters in the image data to be equal to the reducible threshold value (hereinafter referred to as the threshold magnification rate). The magnifying section 71e in the image transformer section 71 functions as reducing means. Except for this difference, the structure of the digital copying machine of this embodiment is the same as that of the digital copying machine of EMBODIMENT 1.

Next, how the digital copying machine of this embodiment performs reduction processing is explained with reference to the flowchart of FIG. 14 and FIG. 15.

First, like the digital copying machine of EMBODIMENT 1, a sheet size and the reduction mode are selected (step 1). When a reduction rate is entered (step 2), the document 50 shown in FIG. 15 is scanned (step 3), and the image data read by the CCD sensor 6 is stored in the main memory 73 (step 4). When scanning is complete, as illustrated in FIG. 15(a), whether character data is contained in the image data of the document 50 is detected (step 5). If the image data does not contain character data, the operation proceeds to step 9, and copying is performed. On the other hand, if the character data, i.e., characters 51 are detected from the image data, the image processing CPU 74 recognizes the size of the characters 51 (step 6).

Subsequently, the size of reduced characters 52 is calculated (step 7), and whether the size of the reduced characters 52 is larger than a predetermined reducible threshold value 60 or not is compared (step 8). As illustrated in FIG. 15(b), if the size of the reduced characters 52 is larger than or equal to the reducible threshold value 60, the copying operation is executed (steps 9 and 10), and the reduction mode comes to an end. On the other hand, as illustrated in FIG. 15(c), when the size of the reduced characters 52 is smaller than the reducible threshold value 60, the threshold magnification rate calculating means in the image processing CPU 74 calculates a threshold magnification rate (step 61). Then, copying is performed at the threshold magnification rate (steps 9 and 10), and the reduction mode comes to an end.

As described above, if reduced characters become too small or defaced, and unreadable when a copy is produced at an entered reduction rate, the digital copying machine having this structure performs copying at a threshold magnification rate which produces easily readable reduced characters. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

As described above, the image processor of the present invention incorporates: input means for reading the image on a document; setting means for freely specifying a reduction rate of the document; storage means for storing the image data of the document read by the input means; character detecting means for detecting character data from the image data stored in the storage means; calculating means for recognizing the size of the characters from the character data detected by the character detecting means, and calculating the size of characters after being reduced at a reduction rate set by the setting means; judging means for judging whether the size of reduced characters calculated by the calculating means is smaller than a predetermined minimum readable size; reducing means for reducing the image data to the predetermined readable size when the judging means judges that the size of the reduced characters is smaller than the predetermined size; and output means for converting the image data reduced by the reducing means into visible form and outputting it.

With this structure, the character detecting means detects the character data from the image data, and the calculating means recognizes the size of characters from the character data and calculates the size of characters after being reduced at a reduction rate set by the setting means. The judging means judges whether the size of the reduced characters is smaller than a predetermined minimum readable size, and the reducing means reduces the image data to the predetermined readable size when the size of the reduced characters is judged to be smaller than the predetermined size. Thus, characters in the reduced image of the document output by the output means are easily read.

Since the output means outputs the reduced image of the document in a size wherein characters are easily readable, the image processor is handled more easily and its value is further increased. For example, when outputting the reduced image onto a sheet, only the reduced image of a practically usable size is output, thereby preventing the waste of sheets.

EMBODIMENT 8

Figure 16:
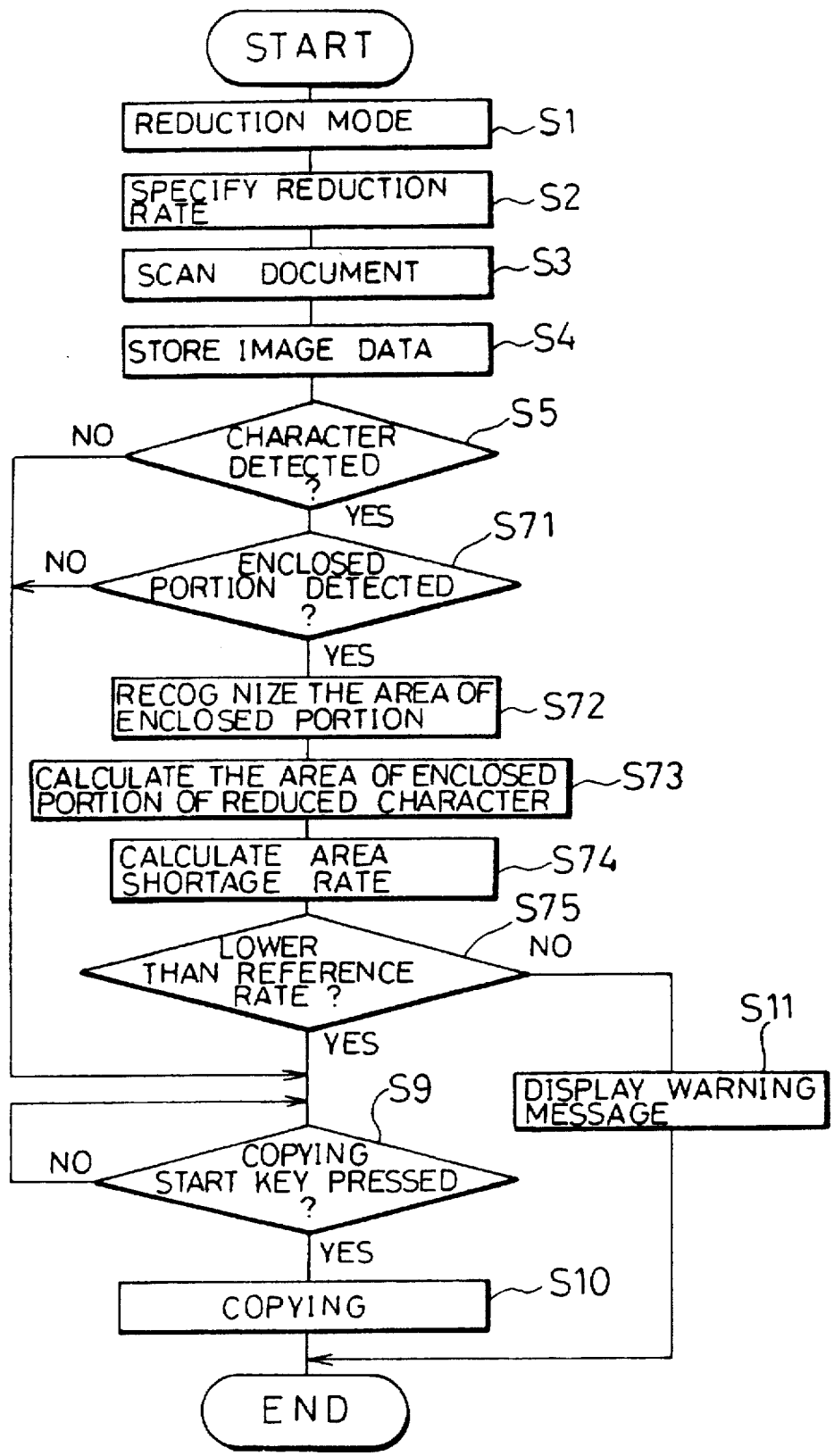
FIG. 16 is a flowchart showing the arrangement of the steps in a reduction process performed by a digital copying machine as an image processor according to still another embodiment of the present invention.
Figure 17:
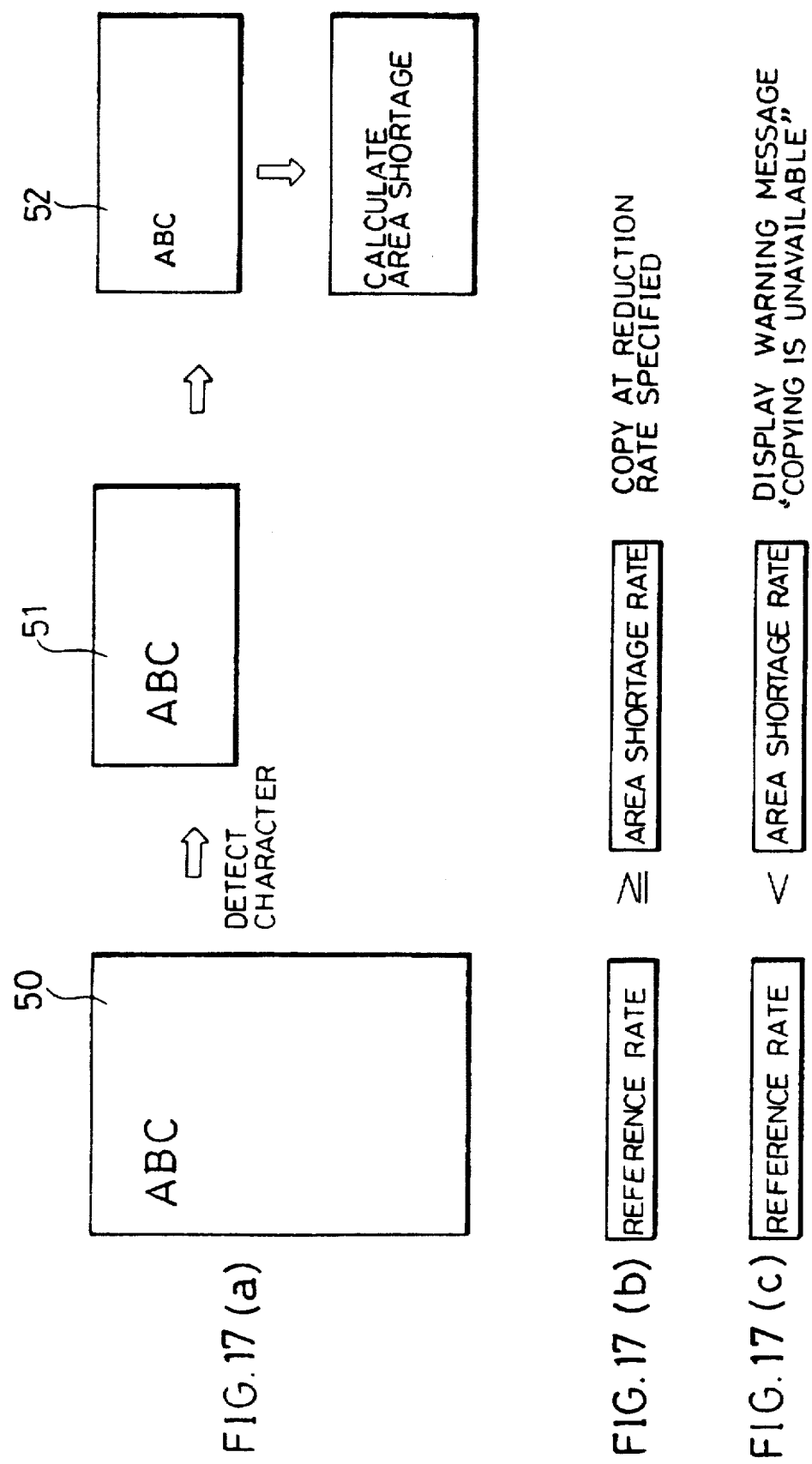
FIG. 17 is an explanatory view of the arrangement of the steps shown in FIG. 16.

The following description discusses yet another embodiment of the present invention with reference to FIGS. 16 and 17. The means having the same function as that in EMBODIMENT 1 will be designated by the same code and their description will be omitted.

A digital copying machine as an image processor of this embodiment includes the first character detecting means (enclosed portion detecting means), not shown, described in detail in EMBODIMENT 4, instead of the character detecting section 71i of EMBODIMENT 1, and area shortage rate calculating means (not shown) in the image processing CPU 74. The area shortage rate detecting means (enclosed portion calculating means and enclosed portion judging means) calculates a percentage (area shortage rate) of the area of an enclosed portion of a character to be smaller than a predetermined threshold value, for example. The area shortage rate is obtained as follows.

$$\text{area shortage rate } (\%) = (H/G) \times 100$$

where G is the number of enclosed portions of characters whose area is larger than the threshold value, for example, and H is the number of enclosed portions whose area becomes smaller than the threshold value after reduction processing.

The image processing CPU (enclosed portion judging means) 74 judges whether the area shortage rate is smaller than a predetermined reference rate. The reference rate is a rate at which, for example, even when the area of an enclosed portion of a character becomes smaller and defaced to a degree, the character is surely read. The reference rate is set to not higher than 50%, for example, depending on the performance, such as the resolution of the digital copying machine, and stored in the main memory 73. Except for this difference, the structure of the digital copying machine of this embodiment is the same as that of the digital copying machine of EMBODIMENT 1.

Next, how the digital copying machine of this embodiment performs reduction processing is explained with reference to the flowchart of FIG. 16 and FIG. 17.

First, like the digital copying machine of EMBODIMENT 1, a sheet size and the reduction mode are selected (step 1). When a reduction rate is entered (step 2), the document 50 shown in FIG. 17 is scanned (step 3), and the image data read by the CCD sensor 6 is stored in the main memory 73 (step 4).

When scanning is complete, as illustrated in FIG. 17(a), whether character data is contained in the image data of the document 50 is detected (step 5). If the image data does not contain character data, the operation proceeds to step 9, and copying is performed. On the other hand, if the character data, i.e., characters 51 are detected from the image data, whether the characters have enclosed portions or not are detected (step 71). If no enclosed portions are detected, the operation moves to step 9 and the copying operation is performed. Whereas, if enclosed portions are detected, the image processing CPU 74 recognizes the area of an enclosed portion of the character 51 (step 72).

Subsequently, the area of an enclosed portion of the reduced characters 52 is calculated from the area of the enclosed portion of the characters 51 and the reduction rate (step 73), and the area shortage rate is calculated (step 74). Next, whether the area shortage rate is lower than a predetermined reference rate or not is compared (step 75). As illustrated in FIG. 17(b), if the area shortage rate is lower than or equal to the reference rate, the copying operation is executed (steps 9 and 10), and the reduction mode comes to an end. On the other hand, as illustrated in FIG. 17(c), when the area shortage rate is higher than the reference rate, a warning message "reduction processing is unavailable" is displayed (step 11), and the copying operation is stopped.

As described above, the digital copying machine having this structure terminates the copying operation when the area of an enclosed portion of the reduced characters becomes too small or defaced, and unreadable. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

EMBODIMENT 9

Figure 18:
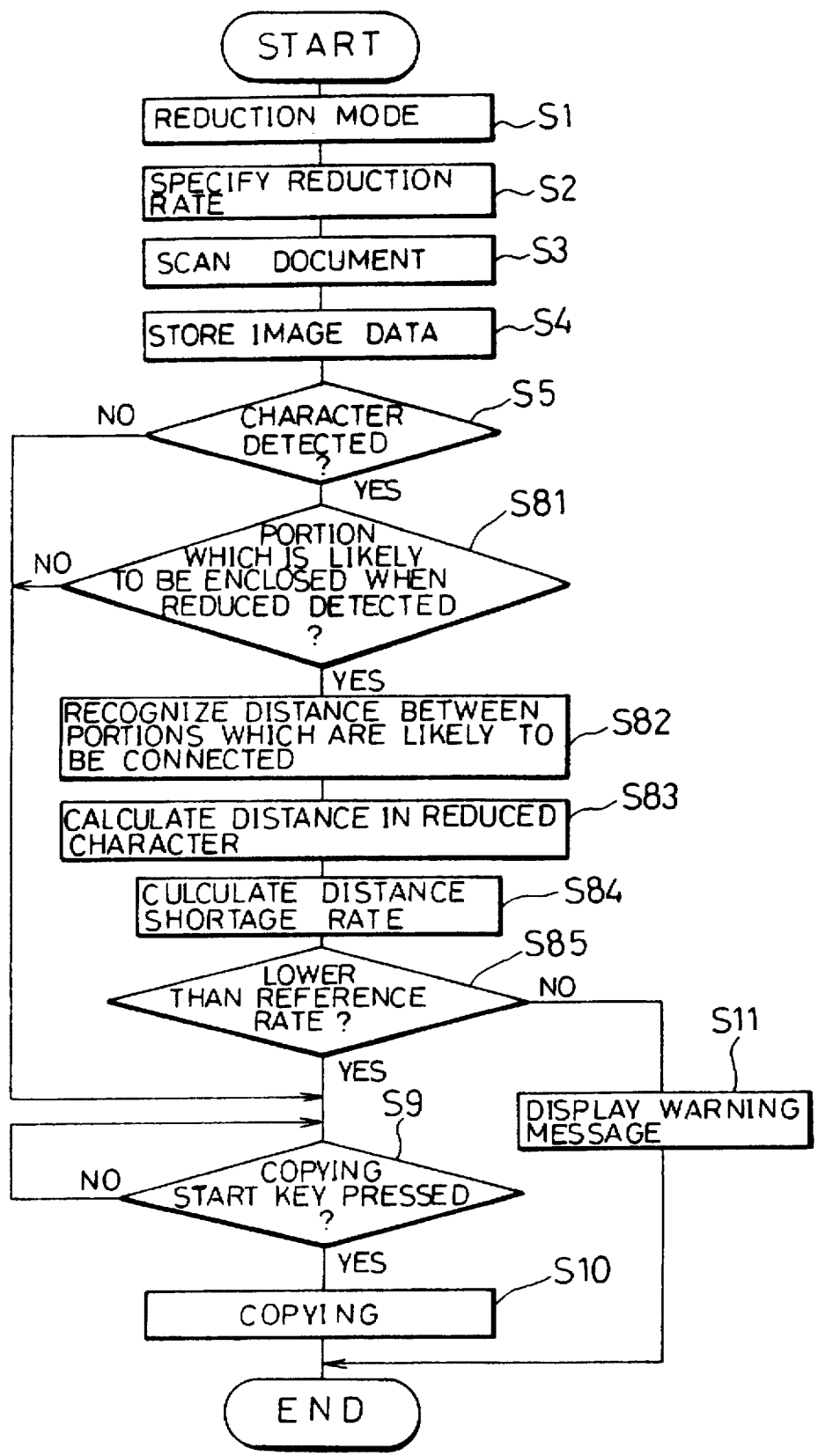
FIG. 18 is a flowchart showing the arrangement of the steps in a reduction process performed by a digital copying machine as an image processor according to still another embodiment of the present invention.
Figure 19:
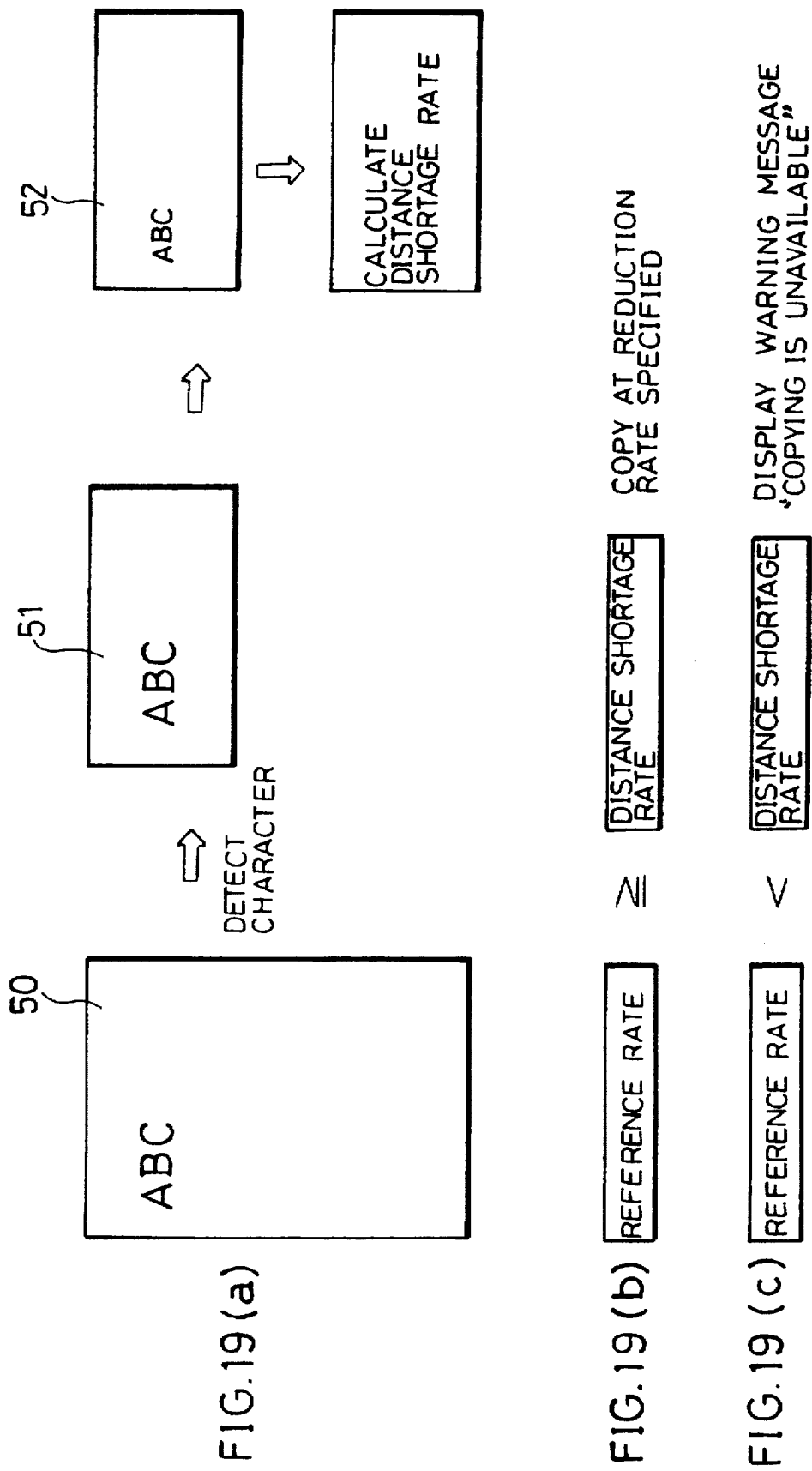
FIG. 19 is an explanatory view of the arrangement of the steps shown in FIG. 18.

The following description discusses yet another embodiment of the present invention with reference to FIGS. 18 and 19. The means having the same function as that in EMBODIMENT 1 will be designated by the same code and their description will be omitted.

A digital copying machine as an image processor of this embodiment incorporates the second character detecting section (enclosed portion detecting means), not shown and described in detail in EMBODIMENT 5, instead of the character detecting section 71i of EMBODIMENT 1, and distance shortage rate calculating means, not shown, in the image processing CPU 74. The distance shortage rate calculating means (enclosed portion calculating means) calculates from, for example, character data a percentage of the distance between two lines (or curved lines) of a portion which is likely to be enclosed by the lines when they come into contact with each other after reduction processing to be shorter than a predetermined threshold value. The distance shortage rate is obtained as follows.

$$\text{distance shortage rate } (\%) = (J/I) \times 100$$

where I is the number of portions of characters which are likely to be enclosed and have a distance longer than the threshold value, and J is the number of portions having a distance shorter than the threshold value after the reduction processing.

In addition, the image processing CPU (enclosed portion judging means) 74 judges whether the distance shortage rate is lower than a predetermined reference rate. The reference rate is a rate at which, for example, even when the distance of such portions of characters becomes shorter and even when the portions are enclosed to a degree, the characters are surely read. For example, the reference rate is set to not higher then 50% according to the performance, for example, the resolution of a digital copying machine, and stored in the main memory 73. Except for this difference, the digital copying machine of this embodiment has the same structure as that of the digital copying machine of EMBODIMENT 1.

Next, how the digital copying machine of this embodiment performs reduction processing is explained below with reference to the flowchart of FIG. 18 and FIG. 19.

First, like the digital copying machine of EMBODIMENT 1, a sheet size and the reduction mode are selected (step 1). When a reduction rate is entered (step 2), the document 50 shown in FIG. 19 is scanned (step 3), and the image data read by the CCD sensor 6 is stored in the main memory 73 (step 4).

When scanning is complete, as illustrated in FIG. 19(a), whether character data is contained in the image data of the document 50 is detected (step 5). If the image data does not contain character data, the operation proceeds to step 9, and copying is performed. On the other hand, if the character data, i.e., characters 51 are detected from the image data, whether the characters have portions which are likely to be enclosed or not are detected (step 81). If such portions are not detected, the operation moves to step 9 and the copying operation is performed. Whereas, if such portions are detected, the image processing CPU 74 recognizes the distance in the portions of the characters 51 (step 82).

Subsequently, a distance in the corresponding portions of reduced characters 52 is calculated from the distance in the portions of the characters 51 and the reduction rate (step 83). Also, the distance shortage rate is calculated from the distance in the portions of the characters 51 and the reduction rate (step 84). Then, whether the distance shortage rate is lower than a predetermined reference rate or not is compared (step 85). As illustrated in FIG. 19(b), if the distance shortage rate is lower than or equal to the reference rate, the copying operation is executed (steps 9 and 10), and the reduction mode comes to an end. On the other hand, as illustrated in FIG. 19(c), when the distance shortage rate is higher than the reference rate, a warning message "reduction processing is unavailable" is displayed (step 11), and the copying operation is stopped.

As described above, the digital copying machine having this structure terminates the copying operation when the distance of portions of reduced characters which are likely to be enclosed becomes shorter and when the reduced characters become unreadable. It is therefore possible to prevent a reduced image of a virtually useless size from being formed, i.e., a worthless reduced copy from being produced. Thus, the digital copying machine is handled more easily, its value is increased, and the waste of sheets is prevented. Additionally, since the copying operation is executable only when the reduced characters are in readable condition, a satisfactory image is obtained.

As described above, the image processor of the present invention incorporates: input means for reading the image on a document; setting means for freely selecting a reduction rate of the document; storage means for storing the image data of the document read by the input means; enclosed portion detecting means for detecting character data from the image data stored in the storage means and detects a portion of a character which is substantially enclosed by lines; enclosed portion calculating means for recognizing the size of the enclosed portion detected by the enclosed portion detecting means and for calculating the size of the enclosed portion after being reduced at the reduction rate specified by the setting means; enclosed portion judging means for judging whether the size of the reduced enclosed portion calculated by the enclosed portion calculating means is smaller than a predetermined size; and warning means for giving a warning that the reduced image of the document becomes unreadable when the enclosed portion judging means judges that the size of the reduced enclosed portion is smaller than the predetermined size.

With this structure, the enclosed portion detecting means detects the character data from the image data and a portion of a character which is substantially enclosed by lines. The enclosed portion calculating means recognizes the size of the enclosed portion and calculates the size of the enclosed portion after being reduced at the reduction rate specified by the setting means. The enclosed portion judging means judges whether the size of the enclosed portion after reduced is smaller than the predetermined size. The warning means warns that the reduced image of the document becomes unreadable when the enclosed portion judging means judges that the size of the enclosed portion after reduced is smaller than the predetermined size. It is thus possible to prevent reduced image of a virtually useless size from being formed.

Since the formation of the reduced image of a virtually useless size is prevented, the digital copying machine is handled more easily and its value is increased. Moreover, for example, when outputting the reduced image onto a sheet, only the reduced image of a practically usable size is output, thereby preventing the waste of sheets.

EMBODIMENT 10

Figure 20:
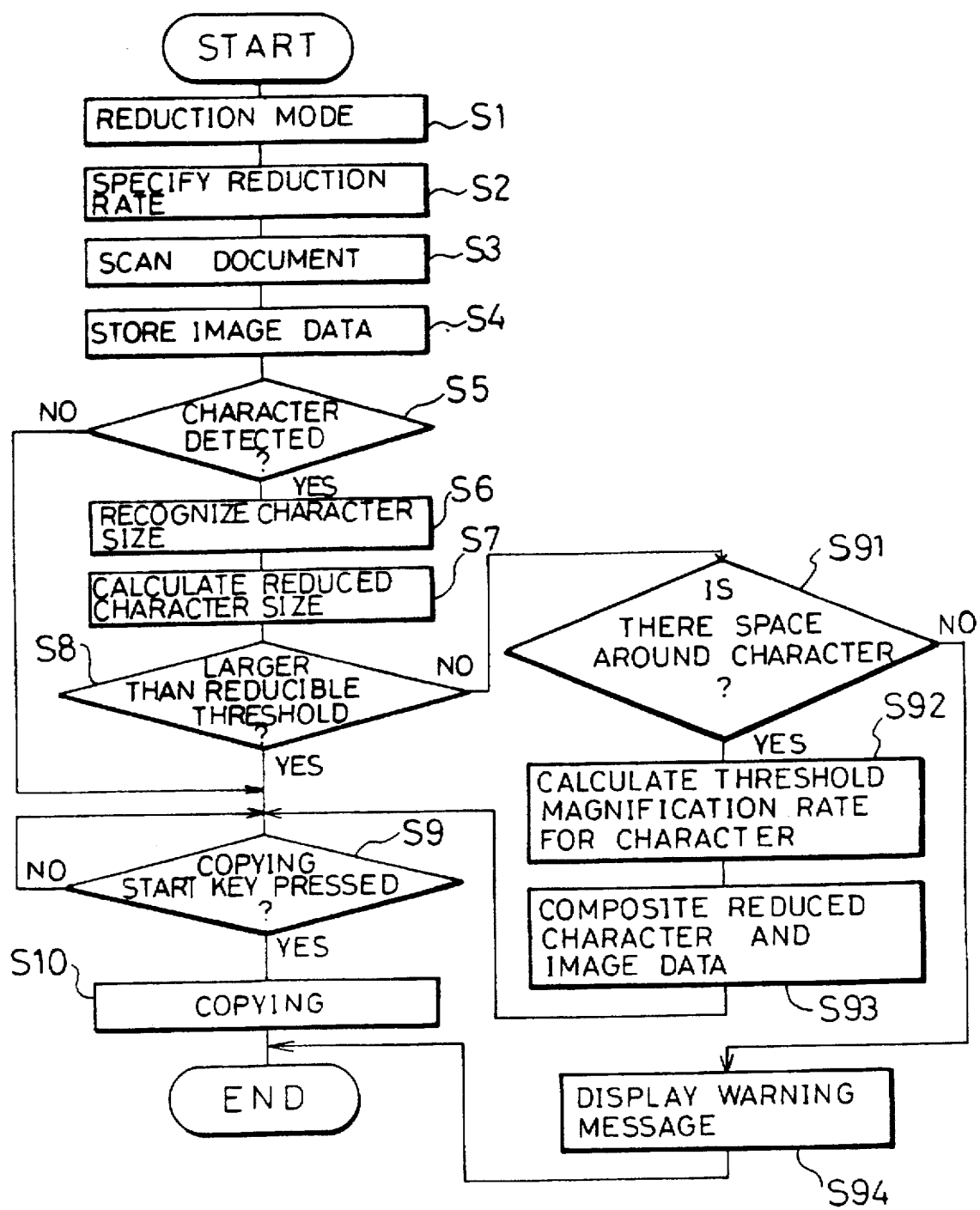
FIG. 20 is a flowchart showing the arrangement of the steps in a reduction process performed by a digital copying machine as an image processor according to still another embodiment of the present invention.

The following description discusses yet another embodiment of the present invention with reference to FIGS. 20 and 21. The members having the same function as that in EMBODIMENT 1 will be designated by the same code and their description will be omitted.

A digital copying machine as an image processor of this embodiment incorporates space detecting means (not shown) in the character detecting section 71i of EMBODIMENT 1, and the threshold magnification rate calculating means (not shown, described in detail in EMBODIMENT 7) in the image processing CPU 74. The space detecting means detects whether there is another image data around character data in image data, i.e., there is space of a predetermined width (to be described later) around a character. The image processing CPU (compositing means) 74 composites the character data of reduced characters and the image data of the image excluding the characters. Except for this difference, the structure of the digital copying machine of this embodiment is the same as that of the digital copying machine of EMBODIMENT 1.

Referring now to the flowchart of FIG. 20 and FIG. 21, how the digital copying machine of this embodiment performs reduction processing is explained below.

First, like the digital copying machine of EMBODIMENT 1, a sheet size and the reduction mode are selected (step 1). When a reduction rate is entered (step 2), the document 50 shown in FIG. 21 is scanned (step 3), and the image data read by the CCD sensor 6 is stored in the main memory 73 (step 4). When scanning is complete, as illustrated in FIG. 21(a), whether character data is contained in the image data of the document 50 or not is detected (step 5). If the image data does not contain character data, the operation proceeds to step 9, and copying is performed. On the other hand, if the character data, i.e., a character 51 is detected from the image data, the size of character 51 is recognized (step 6).

Subsequently, the size of a reduced character 52 is calculated (step 7), and whether the size of the reduced character 52 is larger than a predetermined reduction threshold value 60 is checked (step 8). As illustrated in FIG. 21(b), if the size of the reduced character 52 is larger than or equal to the threshold value 60, the copying operation is executed (steps 9 and 10), and the reduction mode comes to an end. On the other hand, as illustrated in FIG. 21(c), when the size of the reduced character 52 is smaller than the threshold value 60, the space detecting means in the character detecting section 71i detects whether there is space of a predetermined width around the character 52 (step 91). The predetermined width is determined so that when the size of character is reduced to the reduction threshold value 60 and when images other than characters are reduced at a specified reduction rate, the space of the predetermined width prevents the character and the images from being superimposed.

If the space is not detected around the character, a warning message "reduction processing is unavailable" is displayed (step 94), and the copying operation is stopped. On the other hand, if space is detected around the character, the threshold magnification rate calculating means calculates a threshold magnification rate, i.e., a magnification rate for reducing only the size of characters to the threshold value 60 (step 92). Then, the character data of the characters reduced at the threshold magnification rate and the image data of the image excluding the characters which has been reduced at the reduction rate specified in step 2 are composited (step 93). Then, the copying operation is executed (steps 9 and 10), and the reduction mode comes to an end.

As described above, if the characters become too small or defaced and unreadable when they are reduced at the entered reduction rate, the digital copying machine having this structure performs the copying operation after compositing the character data of the characters reduced at the threshold magnification rate set for producing easily readable characters and the image data of the image excluding the characters which has been reduced at the entered reduction rate. It is therefore possible to prevent a reduced image of a virtually useless size from being formed, i.e., a worthless reduced copy from being produced. Thus, the digital copying machine is handled more easily, its value is increased, and the waste of sheets is avoided. Additionally, since the copying operation is executed so that reduced characters are readable, a satisfactory image is obtained.

As described above, the image processor of the present invention incorporates: input means for reading the image on a document; setting means for freely selecting a reduction rate of the document; storage means for storing the image data of the document read by the input means; character detecting means for detecting character data from the image data stored in the storage means; calculating means for recognizing the size of a character from the character data detected by the character detecting means and calculating the size of the character after being reduced at the reduction rate specified by the setting means; judging means for judging whether the size of the reduced character is smaller than a predetermined readable threshold; reducing means for reducing the character data to the predetermined readable threshold and reducing image data other than the character data at the reduction rate specified by the setting means when the judging means judges that the size of the reduced character is smaller than the predetermined readable threshold; compositing means for compositing the character data reduced by the reducing means and the image data; and output means for visualizing and outputting the image data including the character data, composited by the compositing means.

With this structure, the character detecting means detects the character data from the image data, and the calculating means recognizes the size of a character from the character data and calculates the size of the character after being reduced at the reduction rate specified by the setting means. When the judging means judges that the size of the reduced character is smaller than the predetermined readable threshold, the reducing means reduces the character data to the predetermined readable size and the image data other than the character data at the reduction rate specified by the setting means. The compositing means composites the character data reduced by the reducing means and the image data. Therefore, the reduced image of the document output from the output means includes characters of an easily readable size.

Since the reduced image of the document output from the output means has characters of an easily readable size, the digital copying machine is handled more easily and its value is increased. For example, when outputting the reduced image onto a sheet, only the reduced image of a practically usable size is output, thereby preventing the waste of sheets.

EMBODIMENT 11

Figures 23A, 23B, 23C:
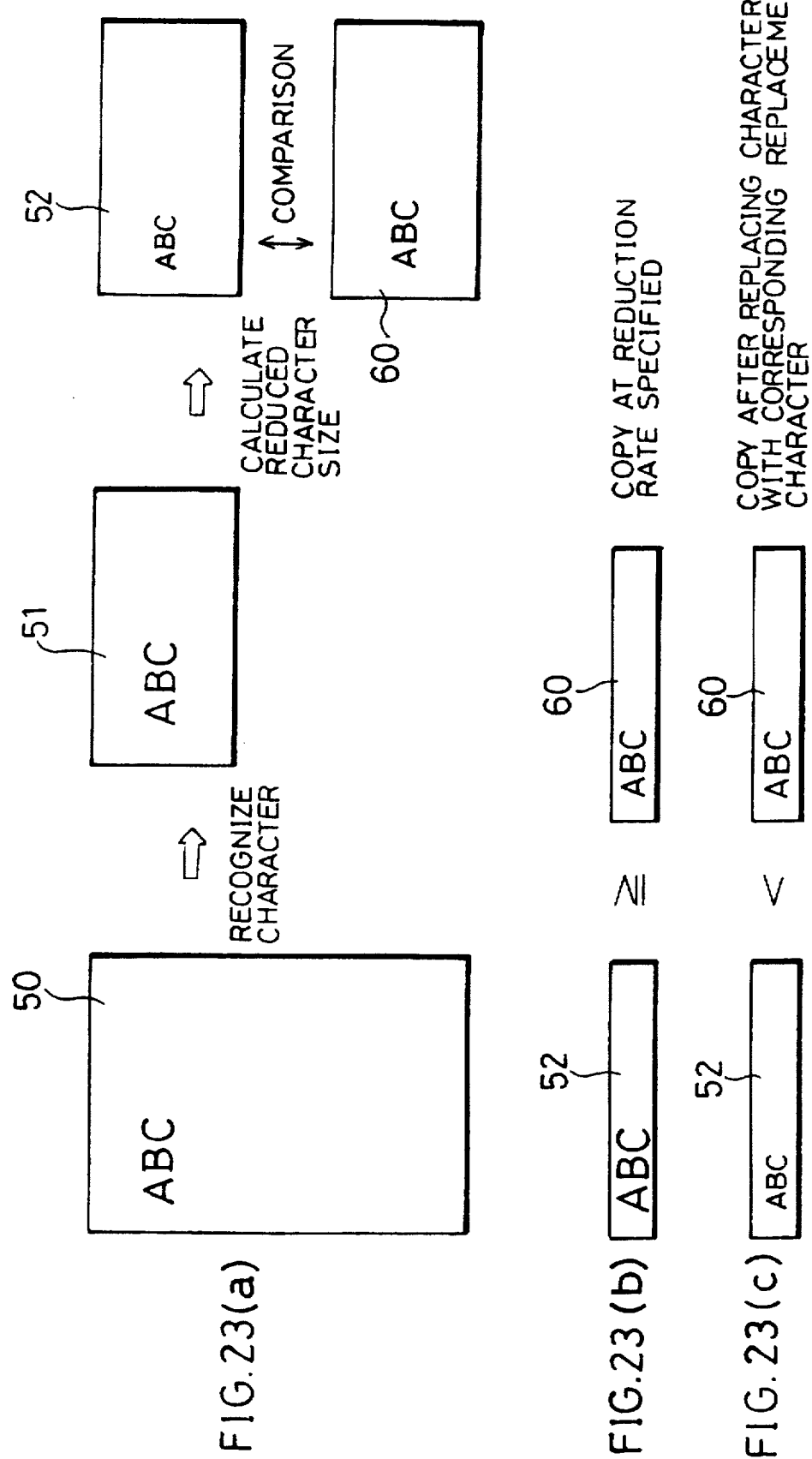
FIG. 23 is an explanatory view of the arrangement of the steps shown in FIG. 22.

The following description discusses yet another embodiment of the present invention with reference to FIGS. 22 and 23. The members having the same function as that in EMBODIMENT 1 will be designated by the same code and their description will be omitted.

A digital copying machine as an image processor of this embodiment incorporates the character recognizing section (not shown, described in detail in EMBODIMENT 6) instead of the character detecting section 71$i$ of EMBODIMENT 1, and character replacing means (not shown) in the image processing CPU 74. The character recognizing section has therein the space detecting means, not shown, described in detail in EMBODIMENT 10. When replacing a character with a replacement character as to be described hereinbelow, the space detecting means detects whether there is a sufficient space around a character to be replaced for replacing the character with a replacement character. The character data of replacement characters with a font size equal to the reduction threshold is stored as a dictionary in the main memory 73.

The character replacing means (reducing and character replacing means) converts a character recognized in the character recognizing section into a predetermined code, retrieves a replacement character corresponding to the recognized character using the code, and replaces the recognized character with the replacement character. The image processing CPU 74 is capable of compositing the character data of the replacement character and the image data of the image excluding the characters. The main memory 73 forms first storage means and second storage means. Except for this difference, the structure of the digital copying machine of this embodiment is the same as that of the digital copying machine of EMBODIMENT 1.

Referring now to the flowchart of FIG. 22 and FIG. 23, how the digital copying machine of this embodiment performs reduction processing is explained below.

First, like the digital copying machine of EMBODIMENT 1, a sheet size and the reduction mode are selected (step 1). When a reduction rate is entered (step 2), the document 50 shown in FIG. 23 is scanned (step 3), and the image data read by the CCD sensor 6 is stored in the main memory 73 (step 4). When scanning is complete, as illustrated in FIG. 23($a$), whether character data is contained in the image data or not is detected (step 101). If the image data does not contain character data, the operation proceeds to step 9, and copying is performed. On the other hand, if the character data, i.e., a character 51 is detected from the image data, the size of the character 51 is recognized (step 6).

Subsequently, the size of a reduced character 52 is calculated (step 7), and whether the size of the reduced character 52 is larger than the predetermined reduction threshold value 60 is checked (step 8). As illustrated in FIG. 23($b$), if the size of the reduced character 52 is larger than or equal to the threshold value 60, the copying operation is executed (steps 9 and 10), and the reduction mode comes to an end. On the other hand, as illustrated in FIG. 23($c$), when the size of the reduced characters 52 is smaller than the threshold value 60, the space detecting means in the character detecting section 71$i$ detects whether there is space around each character (step 102). If the space is not detected around the respective characters, a warning message "reduction processing is unavailable" is displayed (step 105), and the copying operation is stopped. On the other hand, if space is detected around each character, the character replacing means replaces a character with a corresponding replacement character (step 103), composites the character data of the replacement character with the image data of the image excluding the characters which has been reduced at the reduction rate entered in step 2 (step 104). Then, the copying operation is executed (steps 9 and 10), and the reduction mode comes to an end.

As described above, when characters are reduced at the entered reduction rate, if the characters become too small or defaced and unreadable, the digital copying machine having this structure replaces the characters with replacement characters of a font size equal to a threshold value set for producing easily readable characters, composites the character data of the replacement characters and the image data of the image excluding the characters which has been reduced at the entered reduction rate, and performs copying. It is therefore possible to prevent a reduced image of a virtually useless size from being formed, i.e., a worthless reduced copy from being made. Thus, the digital copying machine is handled more easily, its value is increased, and the waste of sheets is avoided. Additionally, since the copying operation is executed so that reduced characters are readable, a satisfactory image is obtained.

As described above, the image processor of the present invention incorporates: input means for reading the image on a document; setting means for freely selecting a reduction rate of the document; first storage means for storing the image data of the document read by the input means; second storage means for storing data of replacement characters of a predetermined readable font size; character detecting means for detecting character data from the image data stored in the first storage means; calculating means for recognizing the size of a character from the character data detected by the character detecting means and calculating the size of the character after being reduced by the reduction rate specified by the setting means; judging means for judging whether the size of the reduced character is smaller than a predetermined readable threshold; reducing and character replacing means for replacing the character data of a character with the replacement character data stored in the second storage means when the judging means judges that the size of the reduced character is smaller than the predetermined size, and for reducing the image data of the image excluding the characters at the reduction rate specified by the setting means; and output means for visualizing and outputting the image data including the character data sent from the reducing and character replacing means.

With this structure, the character detecting means detects the character data from the image data, and the calculating means recognizes the size of a character from the character data and calculates the size of the character after being reduced at the reduction rate specified by the setting means. When the judging means judges that the size of the reduced character is smaller than the predetermined readable threshold, the reducing and character replacing means replaces the character data with the data of the replacement character of a readable predetermined font size, and reduces the image data of images other than the character data at the reduction rate set by the setting means. Therefore, the reduced image of the document output from the output means includes characters of an easily readable size.

Since characters in the reduced image of the document output from the output means have an easily readable size, the digital copying machine is handled more easily and its value is increased. For example, when outputting the reduced image onto a sheet, only the reduced image of a practically usable size is output, thereby preventing the waste of sheets.

EMBODIMENT 12

The following description discusses yet another embodiment of the present invention with reference to FIGS. 24 and 25. The means having the same function as that in EMBODIMENT 1 will be designated by the same code and their description will be omitted.

A digital copying machine as an image processor of this embodiment incorporates a recognizing section (not shown) for recognizing characters from character data in the character detecting section 71$i$ of EMBODIMENT 1, and recognition rate calculating means and recognition rate judging means (both of them are not shown) in the image processing CPU 74.

When the correction mode is selected, the recognizing section (recognizing means) recognizes characters from the character data by the superimposing method, feature extraction method or structural analysis method, described in detail in EMBODIMENT 2. The recognition rate calculating means calculates a recognition rate which is a proportion of the amount of character data recognized as characters by the recognizing section to the amount of whole character data detected by the character detecting section 71$i$. The recognition rate is calculated as follows.

$$\text{recognition rate } (\%) = (L/K) \times 100$$

where K is the amount of whole character data, and L is the amount of character data recognized as characters.

The recognition rate judging means judges whether the recognition rate is higher than a predetermined reference rate. The reference rate means a rate at which even when part of character data is not recognized as characters, the character data is readable as text. For example, the reference rate is set to a value, for example, not smaller than 70 to 80% according to the performance, for example, the resolution of the digital copying machine, and stored in the main memory 73. Except for this difference, the digital copying machine of this embodiment has the structure similar to that of the digital copying machine of EMBODIMENT 1.

Referring now to the flowchart of FIG. 24 and FIG. 25, how the digital copying machine of this embodiment performs correction processing is explained below.

First, similar to the digital copying machine of EMBODIMENT 1, a sheet size and a correction mode are selected (step 110). When a document 80 shown in FIG. 25 is scanned (step 111), the image data is stored in the main memory 73 (step 112). When scanning is complete, whether character data is contained in the image data or not is detected (step 113). If the image data does not contain character data, the operation proceeds to step 117, and copying is performed. On the other hand, if character data is detected from the image data, characters 81 are recognized from the character data (step 114).

Subsequently, a recognition rate is calculated (step 115), and whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, a warning message "reproduced image is unreadable" is displayed (step 119), and the copying operation is stopped.

As described above, if there is a possibility that characters to be appearing in a copy of the document are defaced and unreadable, the digital copying machine having this structure terminates the copying operation. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executed so that reduced characters are readable, a satisfactory image is obtained.

As described above, the image processor of the present invention incorporates: input means for reading the image on a document; storage means for storing the image data of the document read by the input means; character detecting means for detecting character data from the image data stored in the storage means; recognizing means for recognizing characters from the character data; recognition rate calculating means for calculating a recognition rate that is a proportion of the amount of the character data recognized as characters by the recognizing means to the amount of the whole character data detected by the character detecting means; recognition rate judging means for judging whether the recognition rate calculated by the recognition rate calculating means is lower than a reference rate predetermined for readable characters; and warning means for giving a warning that the reproduced image of the document becomes unreadable.

With this structure, the character detecting means detects character data from the image data, and the recognizing means recognizes characters from the character data. The recognition rate calculating means calculates a recognition rate that is a proportion of the amount of the character data recognized as characters by the recognizing means to the amount of the whole character data detected by the character detecting means. The recognition rate judging means judges whether the recognition rate is lower than a predetermined rate. When the recognition rate is judged to be lower than the predetermined rate, the warning means warns that the reproduced image of the document becomes unreadable. It is thus possible to prevent a virtually useless reproduced image from being formed.

Since a virtually useless reproduced image is not formed, the image processor is handled more easily and its value is increased. For example, when outputting the reproduced image of a document onto a sheet, only a practically usable reproduced image is output, thereby preventing the waste of sheets.

EMBODIMENT 13

Figure 26:
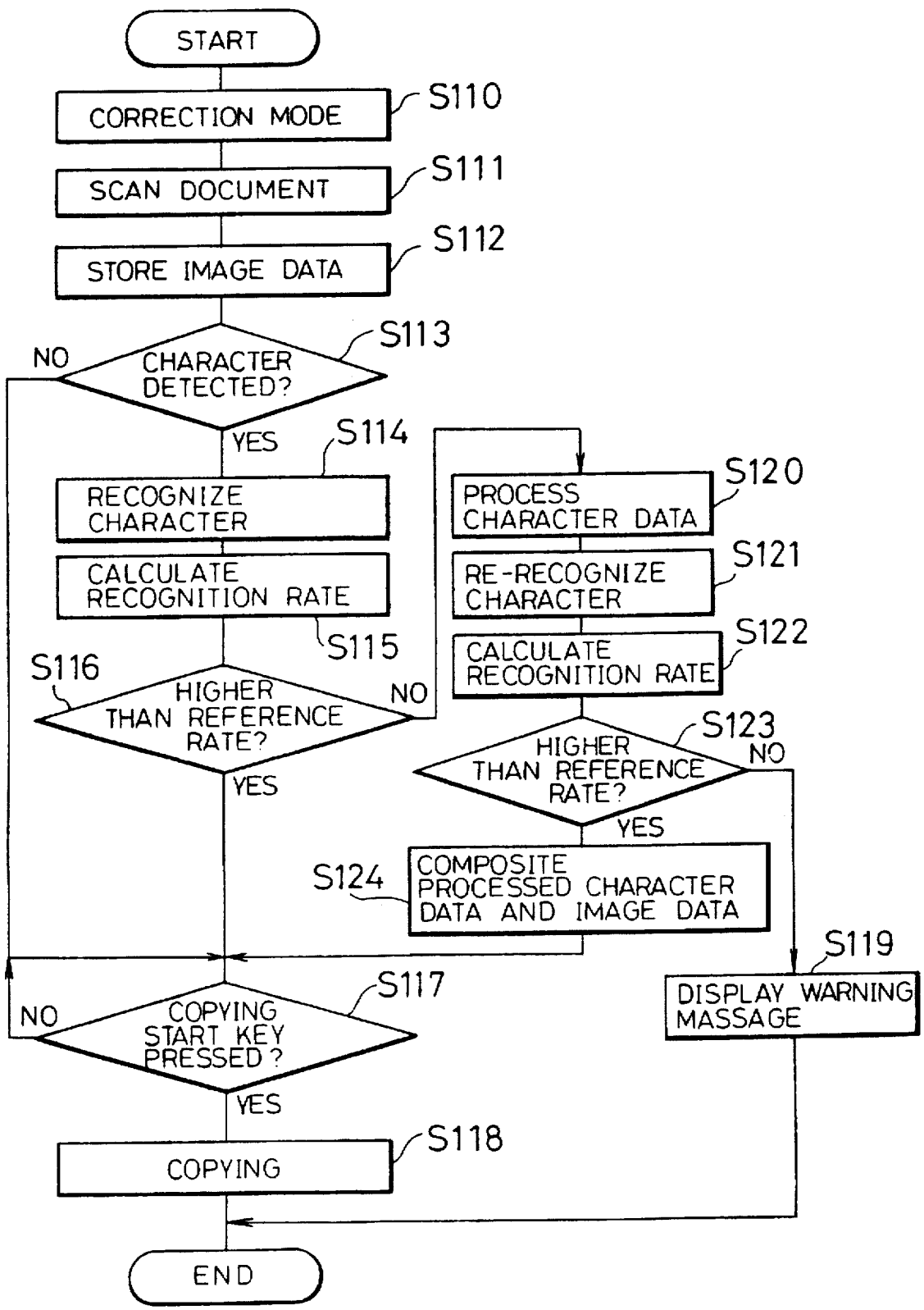
FIG. 26 is a flowchart showing the arrangement of the steps in a correction process performed by a digital copying machine as an image processor according to still another embodiment of the present invention.
Figure 27:
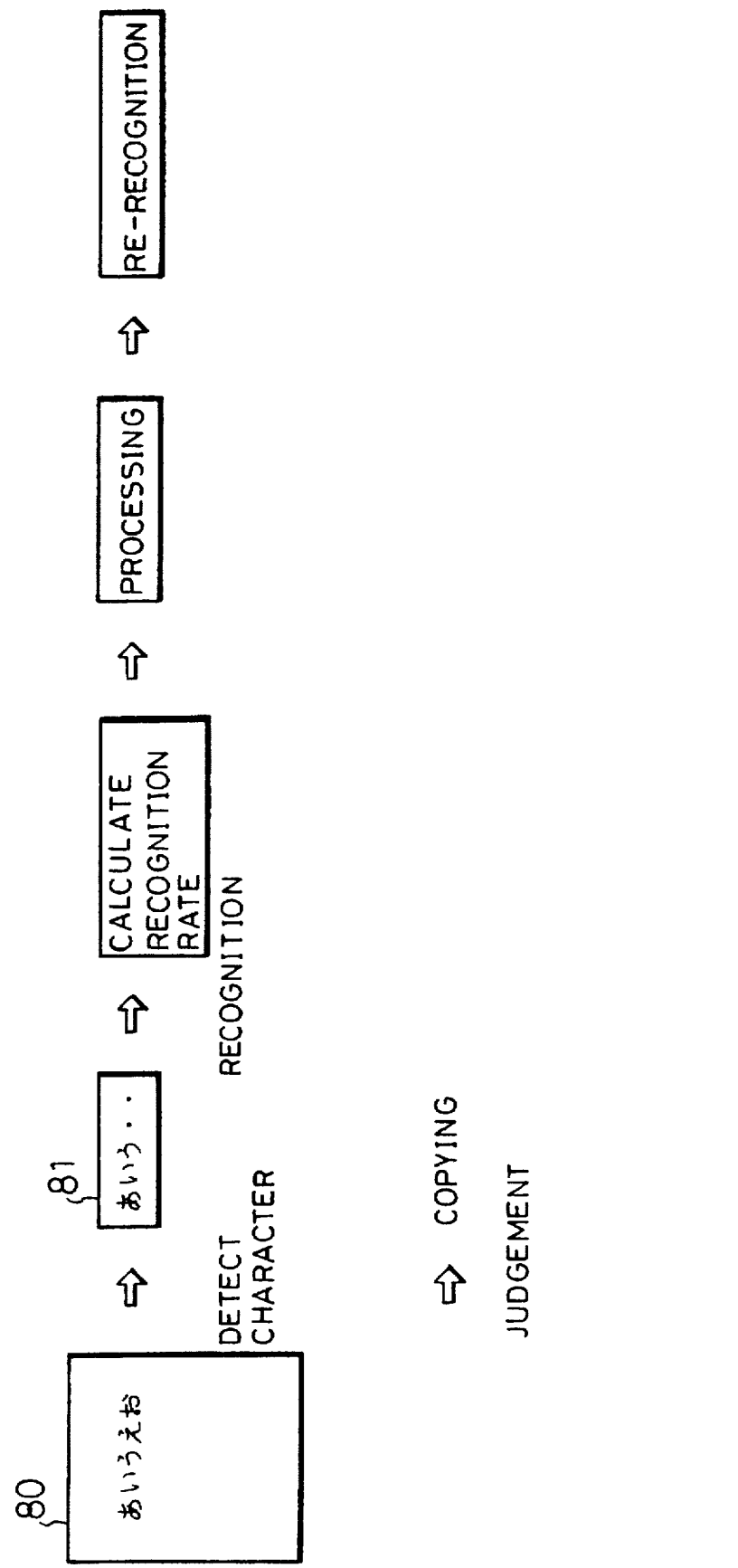
FIG. 27 is an explanatory view of the arrangement of the steps shown in FIG. 26.

The following description discusses yet another embodiment of the present invention with reference to FIGS. 26 and 27. The means having the same function as that of the means shown in the drawings of EMBODIMENT 12 will be designated by the same code and their description will be omitted.

A digital copying machine as an image processor of this embodiment further includes the processing means and compositing means (both of them are not shown) in the image processing CPU 74 of EMBODIMENT 12. When the recognition rate judging means judges that the recognition rate is lower than a predetermined reference rate, the processing means processes character data, which is not recognized as characters by the recognizing section, in a predetermined manner so that the image data is recognized as characters. For instance, the processing means extracts short lines and curved lines which are the features of characters from the character data, performs various processing, for example, makes these lines thicker or the outlines clearer. The compositing means composites the character data processed by the processing means and the image data. Except for this difference, the structure of the digital copying machine of this embodiment is the same as that of the digital copying machine of EMBODIMENT 12.

Referring now to the flowchart of FIG. 26 and FIG. 27, how the digital copying machine of this embodiment performs correction processing is explained below.

First, similar to the digital copying machine of EMBODIMENT 12, the predetermined operations are carried out and the recognition rate is calculated (steps 110 to 115). Then, whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, the processing means processes the character data in the predetermined manner (step 120). Then, characters 81 are re-recognized from the processed character data (step 121), the recognition rate is again calculated (step 122), and whether the recognition rate is higher than the predetermined reference rate or not is judged (step 123). If the recognition rate is higher than or equal to the reference rate, the processed character data and the image data of the image excluding the characters, stored in step 112, are composited (step 124), and copying is performed (steps 117 and 118). On the other hand, if the recognition rate is lower than the reference rate, a warning message "reproduced image is unreadable" is displayed (step 119), and the copying operation is stooped.

As described above, if there is a possibility that characters to be appearing in a copy of the document become defaced and unreadable, the digital copying machine having this structure performs processing so that the characters are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the reduced characters are in readable condition, a satisfactory image is obtained.

EMBODIMENT 14

Figure 28:
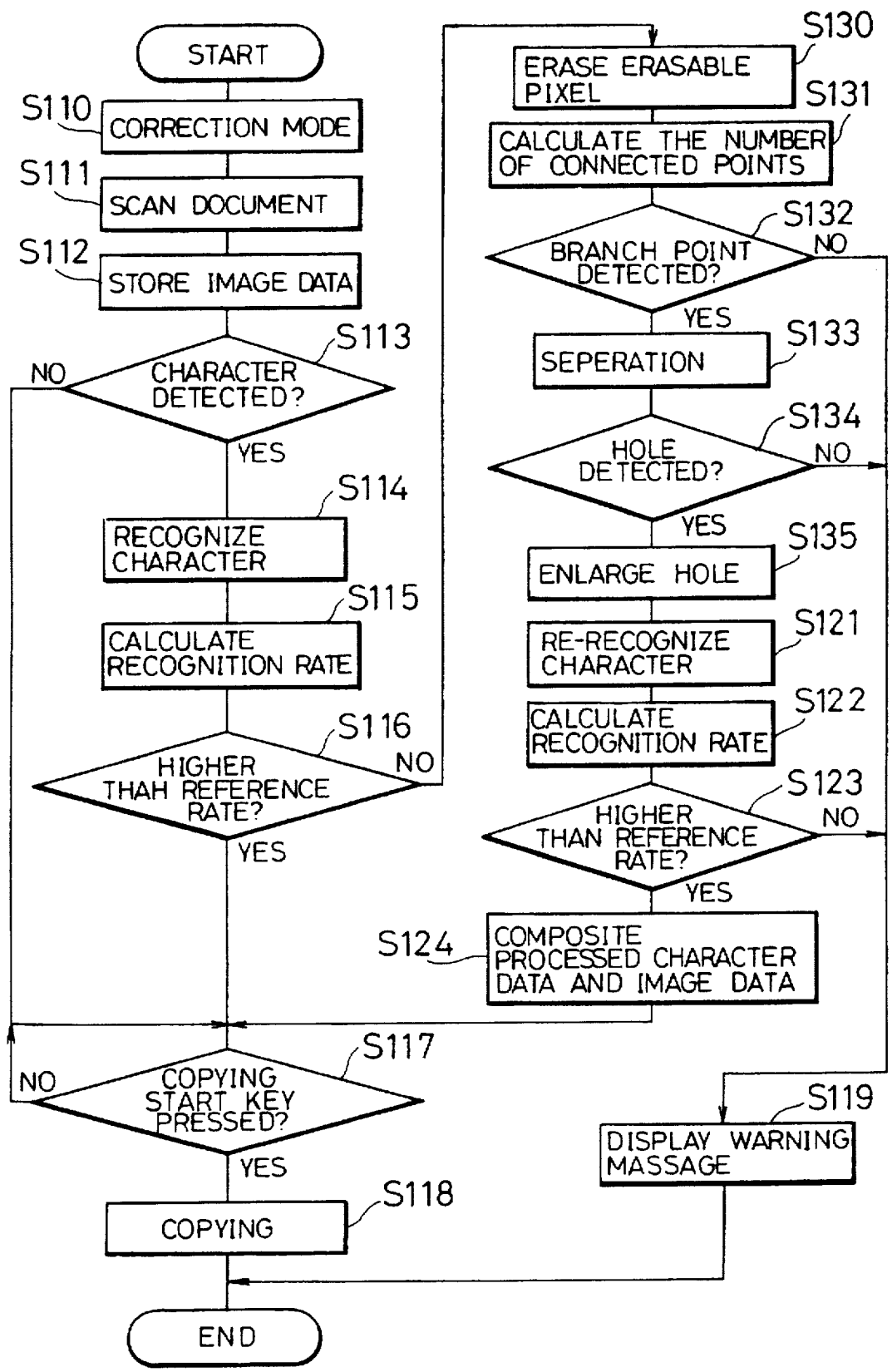
FIG. 28 is a flowchart showing the arrangement of the steps in a correction process performed by a digital copying machine as an image processor according to still another embodiment of the present invention.
Figure 29:
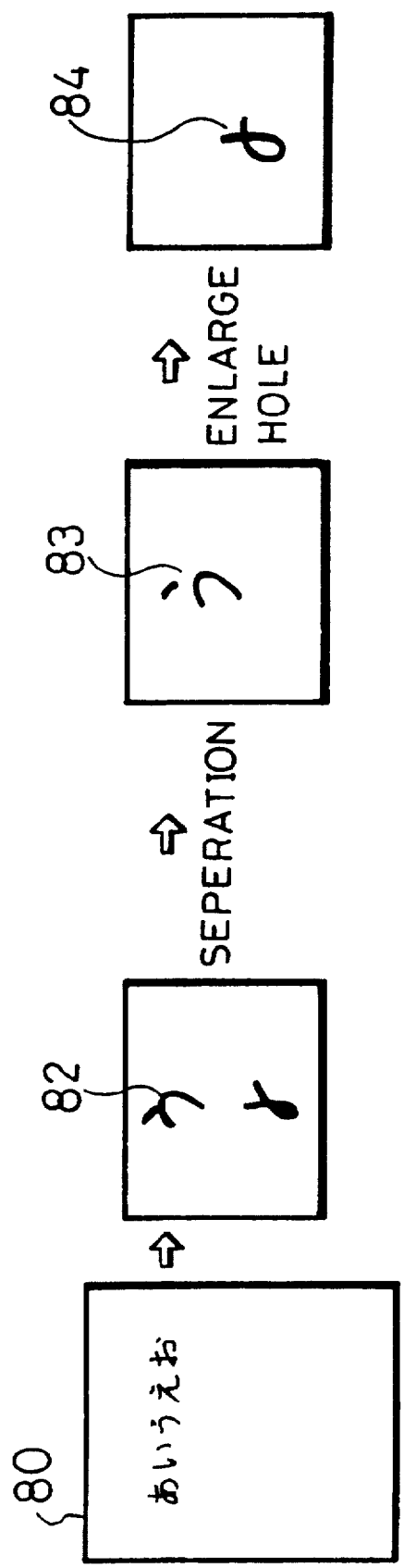
FIG. 29 is an explanatory view of the arrangement of the steps shown in FIG. 28.

The following description discusses yet another embodiment of the present invention with reference to FIGS. 28 and 29. The means having the same function as that of the means shown in the drawings of EMBODIMENT 13 will be designated by the same code and their description will be omitted.

A digital copying machine as an image processor of this embodiment includes the processing means in the image processing CPU 74 of EMBODIMENT 13. The processing means performs the following image processing on character data. Namely, when the recognition rate judging means judges that the recognition rate is lower than a predetermined reference rate, the processing means performs binary image processing on character data, which is not recognized as characters by the recognizing section, so that the character data is recognized as characters. For example, as commonly used in binary image processing, the connection between the neighboring and adjacent pixels of the character data is examined, erasable pixels are erased, the number of connected points is calculated to detect a branch point, and the character data is separated. A portion enclosed by lines or curved lines (hereinafter referred to as hole) is detected from the connection between the pixels, and erasable pixels around the hole are erased to enlarge the size of the hole.

Except for this difference, the structure of the digital copying machine of this embodiment is the same as that of the digital copying machine of EMBODIMENT 13.

Referring now to the flowchart of FIG. 28 and FIG. 29, how the digital copying machine of this embodiment performs correction processing is explained below.

First, similar to the digital copying machine of EMBODIMENT 13, the predetermined operations are carried out and the recognition rate is calculated (steps 110 to 115). Then, whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, the processing means performs binary image processing and erases the erasable pixels from the character data 82 (step 130). Then, the number of connected points of the respective pixels is calculated (step 131) and a branch point is detected (step 132). If there is no branch point, a warning message "reproduced image is unreadable" is displayed (step 119), and the copying operation is stopped. On the other hand, if there is a branch point, the character data 82 is separated to obtain character data 83 (step 133). Subsequently, a hole is detected from the connected points of the pixels (step 134). If there is no holes, a warning message is displayed (step 119), and the copying operation is stopped. On the other hand, if a hole is detected, the hole is enlarged, and character data 84 is obtained (step 135).

Next, like the digital copying machine of EMBODIMENT 13, characters 81 (FIG. 27) are re-recognized from the character data 83 and 84, and the recognition rate is again calculated. Then, whether the recognition rate is higher than the reference rate or not is judged. If the recognition rate is higher than or equal to the reference rate, the processed character data and the image data of the image excluding the characters are composited, and copying is performed (steps 121 to 124, 117 and 118). On the other hand, if the recognition rate is lower than the reference rate, a warning message is displayed (step 119) and copying is stopped.

As described above, if there is a possibility that characters to be appearing in a copy of the document become defaced and unreadable, the digital copying machine having this structure performs processing so that the characters are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when reduced characters are in readable condition, a satisfactory image is obtained.

EMBODIMENT 15

Figure 30:
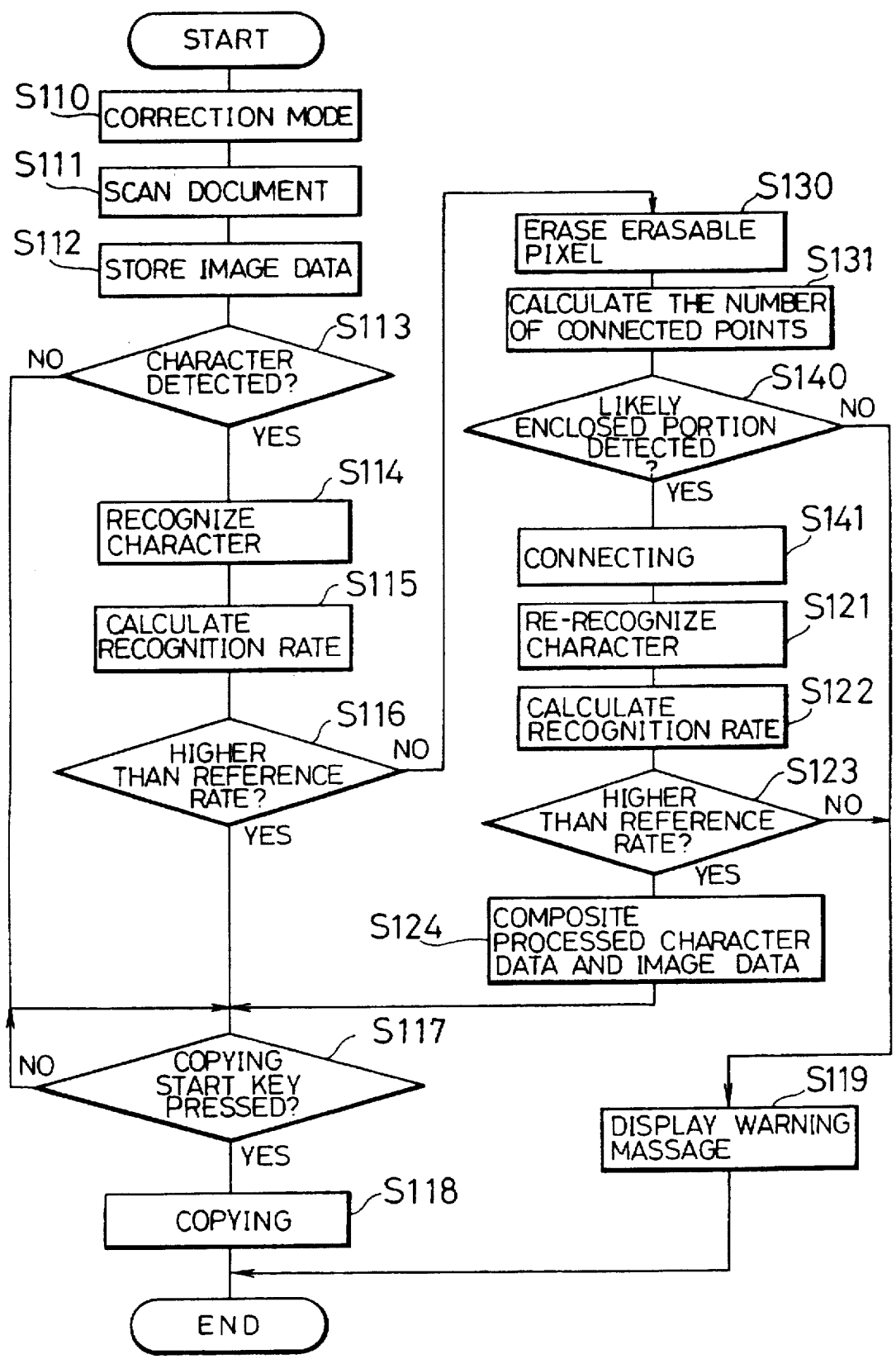
FIG. 30 is a flowchart showing the arrangement of the steps in a correction process performed by a digital copying machine as an image processor according to still another embodiment of the present invention.
Figure 31:
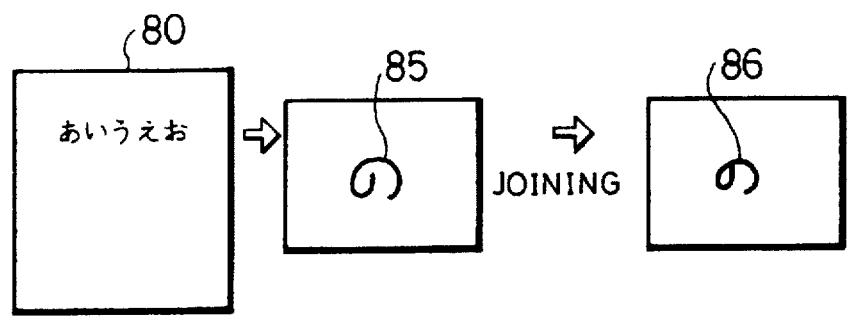
FIG. 31 is an explanatory view of the arrangement of the steps shown in FIG. 30.

The following description discusses yet another embodiment of the present invention with reference to FIGS. 30 and 31. The means having the same function as that of the means shown in the drawings of EMBODIMENT 14 will be designated by the same code and their description will be omitted.

A digital copying machine as an image processor of this embodiment includes the processing means in the image processing CPU 74. The processing means performs the following image processing on character data. For example, as commonly used in binary image processing, the processing means examines the connection between the neighboring and adjacent pixels of character data, erases erasable pixels, calculates the number of connected points of the respective pixels to detect end points, and detects a portion which is nearly enclosed by lines or curved lines. Next, the line or curved line is extended from an end point along an imaginary extended line so as to connect the end point with other pixel. The connecting processing changes the portion into an enclosed portion or a hole. Except for this difference, the structure of the digital copying machine of this embodiment is the same as that of the digital copying machine of EMBODIMENT 14.

Referring now to the flowchart of FIG. 30 and FIG. 31, how the digital copying machine of this embodiment performs correction processing is explained below.

First, similar to the digital copying machine of EMBODIMENT 14, the predetermined operations are carried out and the recognition rate is calculated.(steps 110 to 115). Then, whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, the processing means performs binary image processing and erases erasable pixels from the character data (step 130). Then, the number of connected points of the pixels is calculated (step 131) and an end point is detected to detect a nearly enclosed portion in the character data 85 (step 140). If there is no such a portion, a warning message is displayed (step 119), and the copying operation is stopped. On the other hand, if there is a nearly enclosed portion, connecting processing is performed to obtain character data 86 (step 141).

Subsequently, like the digital copying machine of EMBODIMENT 14, characters 81 (FIG. 27) are re-recognized from the processed character data 86, and the recognition rate is again calculated. Then, whether the recognition rate is higher than the reference rate or not is judged. If the recognition rate is higher than or equal to the reference rate, the processed character data and the image data of the image excluding the characters are composited, and copying is performed (steps 121 to 124, 117 and 118). On the other hand, if the recognition rate is lower than the reference rate, a warning message is displayed (step 119) and copying is stopped.

As described above, if characters to be appearing in a copy of the document become defaced and unreadable, the digital copying machine having this structure performs processing so that the characters are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when reduced characters are in readable condition, a satisfactory image is obtained.

EMBODIMENT 16

Figure 33:
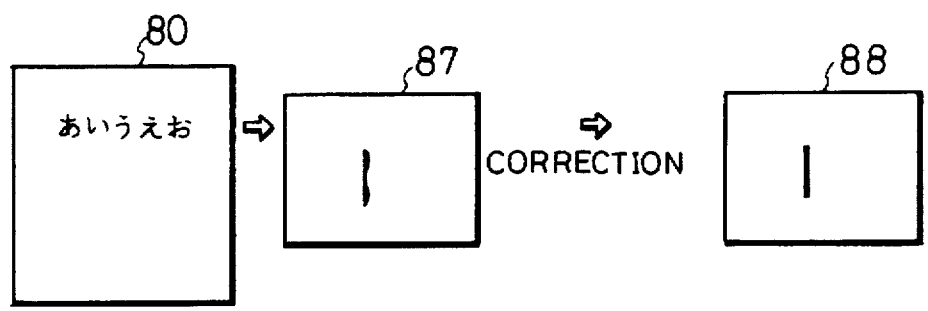
FIG. 33 is an explanatory view of the arrangement of the steps shown in FIG. 32.
Figure 32:
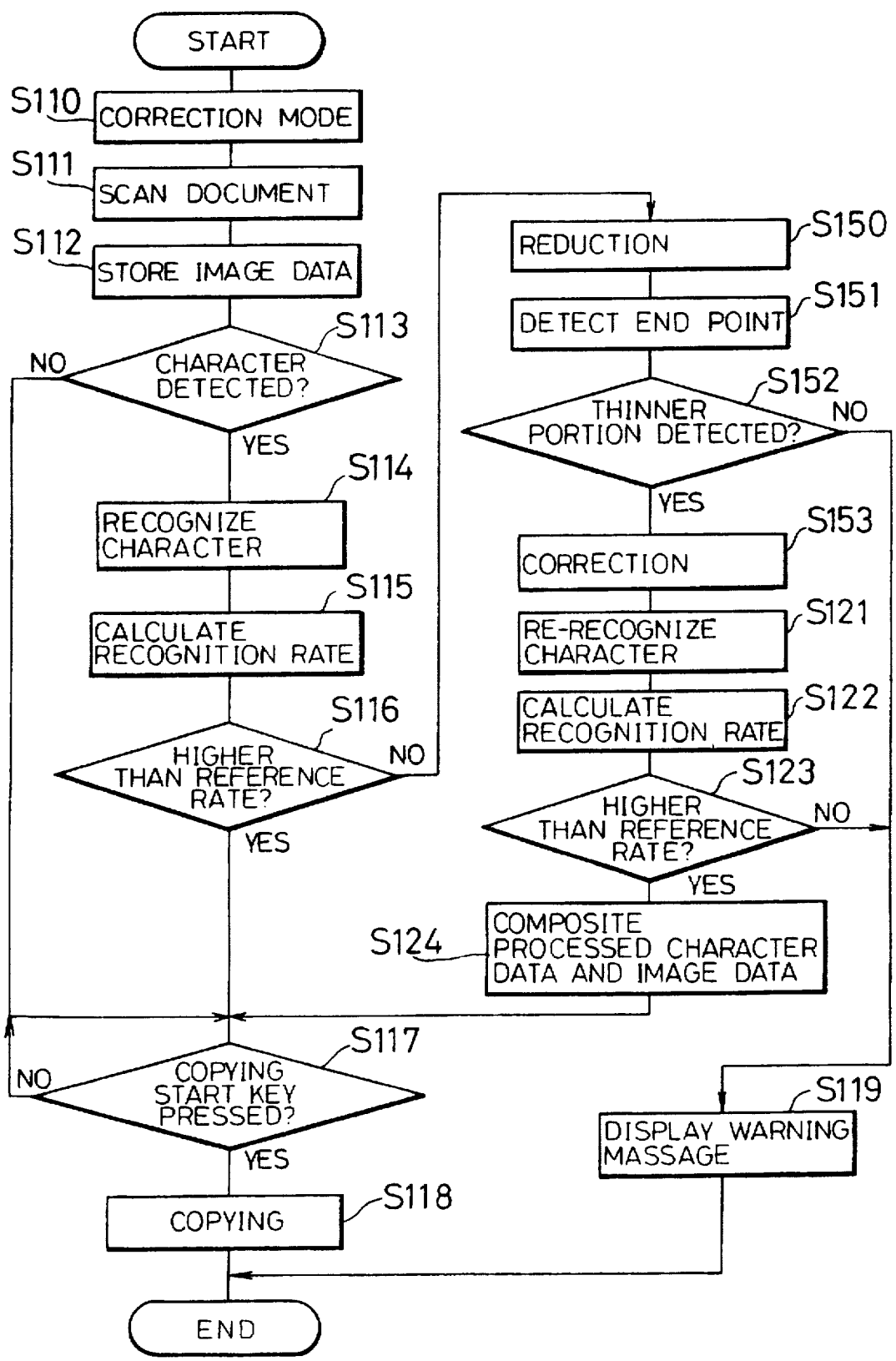
FIG. 32 is a flowchart showing the arrangement of the steps in a correction process performed by a digital copying machine as an image processor according to still another embodiment of the present invention.

The following description discusses yet another embodiment of the present invention with reference to FIGS. 32 and 33. The means having the same function as that of the means shown in the drawings of EMBODIMENT 14 will be designated by the same code and their description will be omitted.

A digital copying machine as an image processor of this embodiment includes the processing means in the image processing CPU 74. The processing means performs the following binary image processing on character data. For example, as commonly used in binary image processing, the processing means reduces character data by an amount equivalent to two to three layers by contracting the pixels of the character data, calculates the number of connected points of the pixels to detect an end point, and detects portions of lines and curved lines which are extremely thinner than other portions. Next, correction processing is performed for making the line widths of the lines and curved lines substantially uniform by expanding the extremely thin portions and transforming the character data to a large degree. Except for this difference, the structure of the digital copying machine of this embodiment is the same as that of the digital copying machine of EMBODIMENT 14.

Referring now to the flowchart of FIG. 32 and FIG. 33, how the digital copying machine of this embodiment performs correction processing is explained below.

First, similar to the digital copying machine of EMBODIMENT 14, the predetermined operations are carried out and the recognition rate is calculated (steps 110 to 115). Then, whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, the processing means performs binary image processing and contracts the pixels of the character data (step 150). Then, the number of connected points of the respective pixels is calculated and an end point is detected (step 151) to detect thinner portions of the character data 87 (step 152). If there is no such a portion, a warning message is displayed (step 119), and the copying operation is stopped. On the other hand, if there is a thinner portion, correction processing is performed to obtain character data 88 (step 153).

Subsequently, like the digital copying machine of EMBODIMENT 14, characters 81 (FIG. 27) are re-recognized from the processed character data 88, and the recognition rate is again calculated. Then, whether the recognition rate is higher than the reference rate or not is judged. If the recognition rate is higher than or equal to the reference rate, the processed character data and the image data of the image excluding the characters are composited, and copying is performed (steps 121 to 124, 117 and 118). On the other hand, if the recognition rate is lower than the reference rate, a warning message is displayed (step 119) and copying is stopped.

As described above, if there is a possibility that characters to be appearing in a copy of the document become defaced and unreadable, the digital copying machine having this structure performs processing so that the characters are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when reduced characters are in readable condition, a satisfactory image is obtained.

As described above, the image processor of the present invention incorporates: input means for reading the image on a document; storage means for storing the image data of the document read by the input means; character detecting means for detecting character data from the image data stored in the storage means; recognizing means for recognizing characters from the character data detected by the character detecting means and from the character data processed by the processing means; recognition rate calculating means for calculating a recognition rate that is a proportion of the amount of character data recognized as characters by the recognizing means to the amount of the whole character data detected by the character detecting means; recognition rate judging means for judging whether the recognition rate calculated by the recognition rate calculating means is lower than a predetermined rate permitting a readable reproduced image of the document; processing means for processing character data among the character data detected by the character detecting means, which is not recognized as characters by the recognizing means, so that the character data is recognized as characters when the recognition rate judging means judges that the recognition rate is lower than the predetermined rate; compositing means for compositing the character data which has been processed by the processing means and is recognized as characters by the recognizing means and the image data; and output means for visualizing and outputting the image data composited by the compositing means.

With this structure, the character detecting means detects character data from the image data, and the recognizing means recognizes characters from the character data. The recognition rate calculating means calculates a recognition rate that is a proportion of the amount of character data recognized as characters by the recognizing means to the amount of the whole character data detected by the character detecting means. The recognition rate judging means judges whether the recognition rate is lower than a predetermined rate. When the recognition rate judging means judges that the recognition rate is lower than the predetermined rate, character data which is not recognized as characters by the recognizing means is processed so that the character data is recognized as characters. Then, the recognizing means again recognizes characters from the character data processed by the processing means. The compositing means composites the character data which has been processed by the processing means and is recognized as characters by the recognizing means and image data. Characters in a reproduced image of the document output by the output means are thus easily read.

Since the characters in a reproduced image of the document output by the output means are easily read, the digital copying machine is handled more easily and its value is increased. For example, when outputting the reproduced image of the document onto a sheet, only a virtually usable reproduced image is output, thereby preventing the waste of sheets.

EMBODIMENT 17

Figure 35:
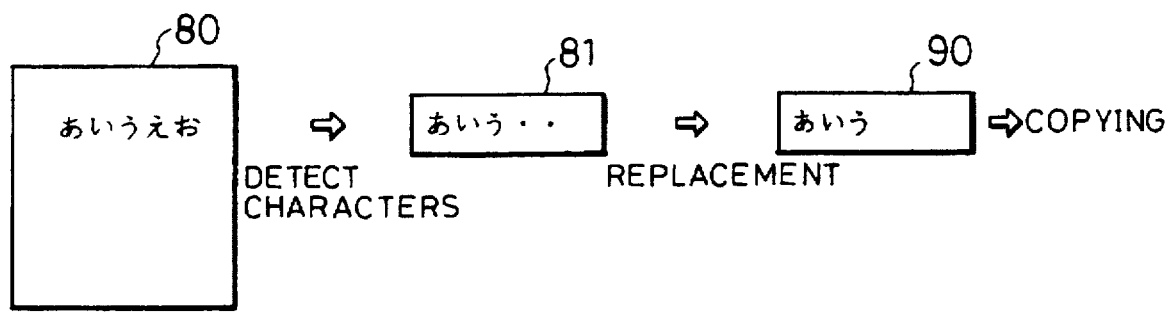
FIG. 35 is an explanatory view of the arrangement of the steps shown in FIG. 34.
Figure 34:
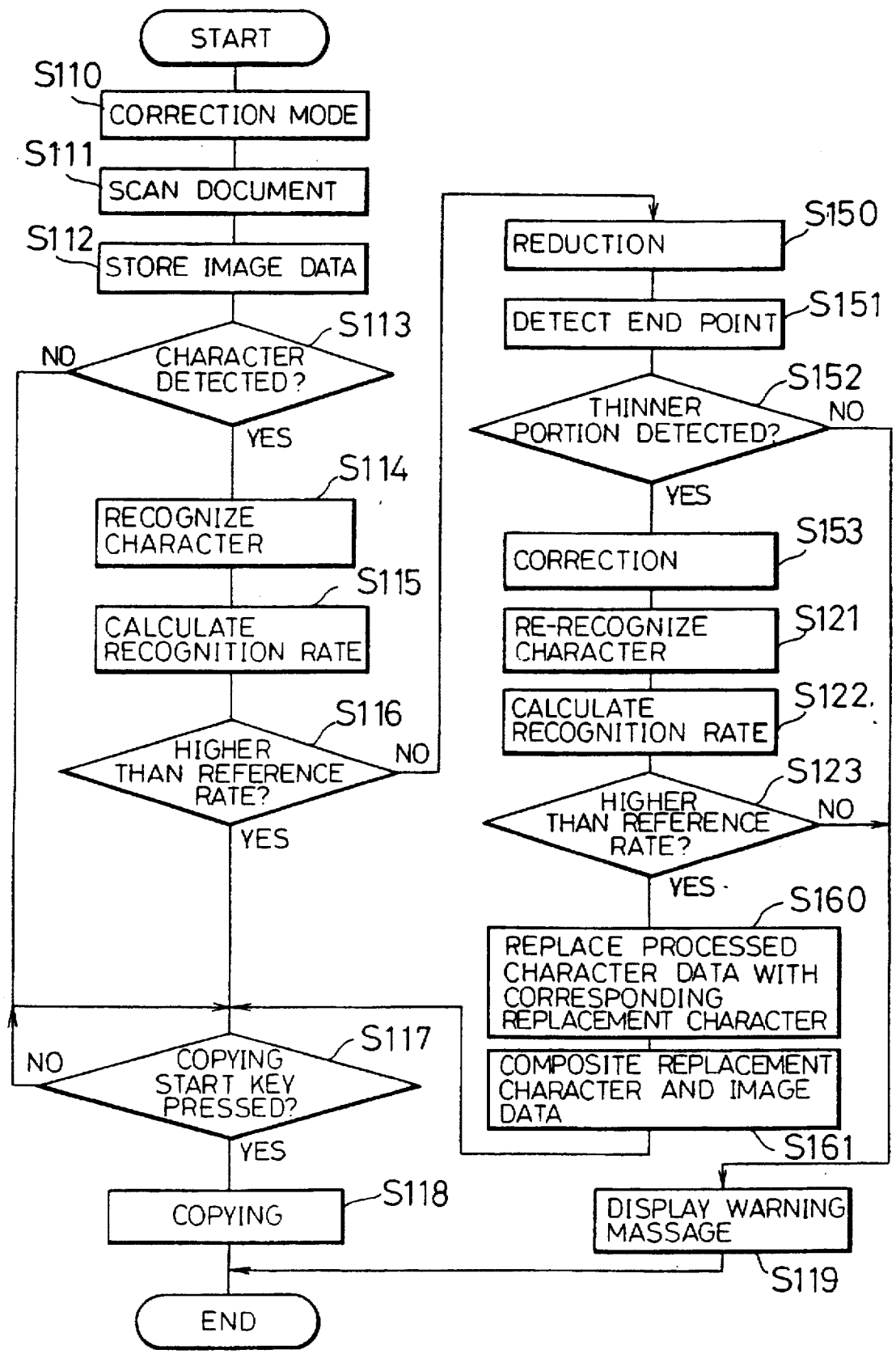
FIG. 34 is a flowchart showing the arrangement of the steps in a correction process performed by a digital copying machine as an image processor according to still another embodiment of the present invention.

The following description discusses yet another embodiment of the present invention with reference to FIGS. 34 and 35. The means having the same function as that of the means shown in the drawings of EMBODIMENT 13 will be designated by the same code and their description will be omitted.

A digital copying machine as an image processor of this embodiment further includes replacing means (not shown) in the image processing CPU 74 of EMBODIMENT 13. The replacing means converts a character re-recognized from the character data processed by the processing means into a predetermined code, retrieves a replacement character stored in the main memory 73 corresponding to the character using the code, replaces the character with the replacement character, and composites the character data of the replacement character and the image data. Except for this difference, the structure of the digital copying machine of this embodiment is the same as that of the digital copying machine of EMBODIMENT 13.

Referring now to the flowchart of FIG. 34 and FIG. 35, how the digital copying machine of this embodiment performs correction processing is explained below.

First, similar to the digital copying machine of EMBODIMENT 13, the predetermined operations are carried out and the recognition rate is calculated (steps 110 to 115). Then, whether the recognition rate is higher than a predetermined reference rate or not is judged (step 116). If the recognition rate is higher than or equal to the reference rate, the copying operation is executed (steps 117 and 118), and the correction mode comes to an end. On the other hand, when the recognition rate is lower than the reference rate, the processing means processes the character data in the predetermined manner. Then, characters 81 are re-recognized from the processed character data, the recognition rate is again calculated, and whether the recognition rate is higher than the predetermined reference rate or not is judged (steps 150 to 153, and 121 to 123). If the recognition rate is higher than or equal to the reference rate, the replacing means replaces the characters re-recognized from the processed character data with corresponding replacement characters 90 (step 160). Subsequently, the character data of the replacement characters 90 and the image data of the image excluding the characters are composited (step 161), and copying is performed (steps 117 and 118). On the other hand, if the recognition rate is lower than the reference rate, a warning message "reproduced image is unreadable" is displayed (step 119), and the copying operation is stopped.

As described above, if characters to be appearing in a copy of the document become defaced and unreadable, the digital copying machine having this structure performs processing so that the characters are easily read. It is therefore possible to prevent a virtually useless reproduced image from being formed, i.e., a-worthless copy from being produced. Accordingly, the digital copying machine is handled more easily, its value is increased, and the waste of sheets is avoided. Additionally, since the copying operation is executable only when characters are in readable condition, a satisfactory image is obtained.

In this embodiment, characters processed in the processes shown in FIGS. 32 and 33 are replaced with the replacement characters 90. However, it is also possible to replace characters processed in the processes shown in FIGS. 28 and 29, or 30 and 31 with the replacement characters 90.

As described above, the image processor of the present invention incorporates: input means for reading the image on a document; storage means for storing the image data of the document read by the input means; character detecting means for detecting character data from the image data stored in the storage means; recognizing means for recognizing characters from the character data detected by the character detecting means and from the character data processed by the processing means; recognition rate calculating means for calculating a recognition rate that is a proportion of the amount of character data recognized as characters by the recognizing means to the amount of the whole character-data detected by the character detecting means; recognition rate judging means for judging whether the recognition rate calculated by the recognition rate calculating means is lower than a predetermined rate permitting a readable reproduced image of the document; processing means for processing character data among the character data detected by the character detecting means, which is not recognized as characters by the recognizing means, so that the character data is recognized as characters when the recognition rate judging means judges that the recognition rate is lower than the predetermined rate; replacing means for replacing the character data which has been processed by the processing means and is recognized as characters by the recognizing means with replacement character data stored in the storage means and compositing the replacement character data and the image data; and output means for visualizing and outputting the image data composited by the replacing means.

With this structure, the character detecting means detects character data from the image data, and the recognizing means recognizes characters from the character data. The recognition rate calculating means calculates a recognition rate that is a proportion of the amount of character data recognized as characters by the recognizing means to the amount of the whole character-data detected by the character detecting means. The recognition rate judging means judges whether the recognition rate is lower than a predetermined rate. When the recognition rate judging means judges that the recognition rate is lower than a predetermined rate, the character data-which is not recognized as characters by the recognizing means is processed so that the character data is recognized as characters. Then, the recognizing means again recognizes characters from the character data processed by the processing means. The replacing means replaces the character data which has been processed by the processing means and is recognized by the recognizing means with the replacement character data stored in the storage means, and composites the replacement character data and the image data. Characters in a reproduced image of the document output by the output means are thus easily read.

Since the characters in a reproduced image of the document output by the output means are easily read, the digital copying machine is handled more easily and its value is increased. For example, when outputting the reproduced image of the document onto a sheet, only a virtually usable reproduced image is output, thereby preventing the waste of sheets.

EMBODIMENT 18

Figure 37:
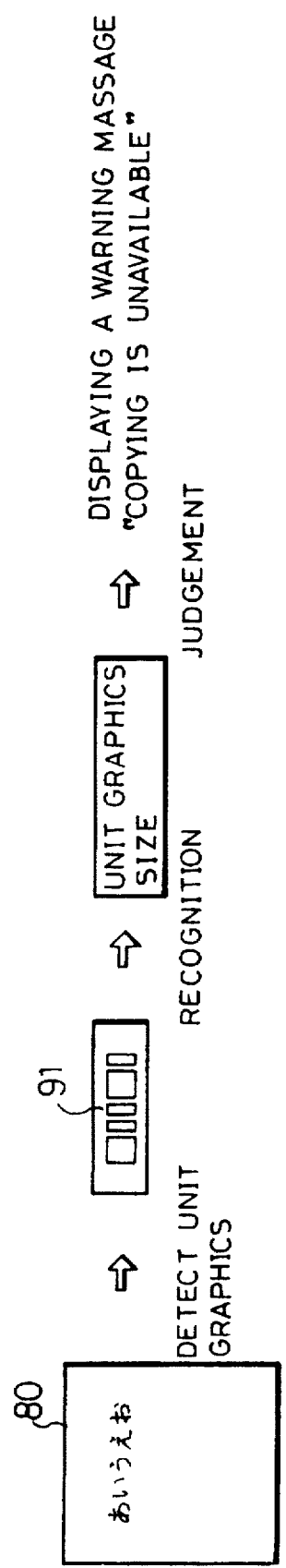
FIG. 37 is an explanatory view of the arrangement of the steps shown in FIG. 36.

The following description discusses yet another embodiment of the present invention with reference to FIGS. 36 and 37. The means having the same function as that of the means shown in the drawings of EMBODIMENT 12 will be designated by the same code and their description will be omitted.

A digital copying machine as an image processor of this embodiment includes unit graphics detecting section (described in detail in EMBODIMENT 3) instead of the character detecting section 71*i*. The recognition rate judging means of this embodiment judges whether the size (area) of a unit of graphics is larger than a predetermined threshold value. The threshold value means a value indicating a minimum readable area of a character which can be copied without being defaced. Therefore, if a unit of graphics is smaller than the threshold value, the unit of graphics, i.e., a character is defaced and becomes unreadable. For example, the threshold value is determined according to the performance, for example, resolution of the digital copying machine, and, for instance, set to $(1.5)^2 = 2.25 \text{ mm}^2$ when the resolution is 400 dpi and stored in the main memory 73. Except for this difference, the structure of the digital copying machine of this embodiment is the same as that of the digital copying machine of EMBODIMENT 12.

Referring now to the flowchart of FIG. 36 and FIG. 37, how the digital copying machine of this embodiment performs correction processing is explained below.

First, similar to the digital copying machine of EMBODIMENT 12, the predetermined operations are carried out (steps 110 to 112). Then, whether the image data of the document 80 contains a unit of graphics or not is detected (step 170). If no unit of graphics is detected from the image data, the operation proceeds to step 117, and copying is performed. On the other hand, when a unit of graphics 91 is detected from the image data, the size of the unit of graphics 91 is recognized (step 171).

Subsequently, whether the size of the unit of graphics 91 is larger than a predetermined threshold value or not is judged (step 172). If the size of the unit of graphics 91 is larger than or equal to the threshold value, copying is performed (steps 117 and 118), and the correction mode comes to an end. On the other hand, if the size of the unit of graphics 91 is smaller than the threshold value, a warning message is displayed (step 119), and the copying operation is stopped.

As described above, if characters to be appearing in a copy of the document become defaced and unreadable, the digital copying machine having this structure stops copying. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 19

Figure 38:
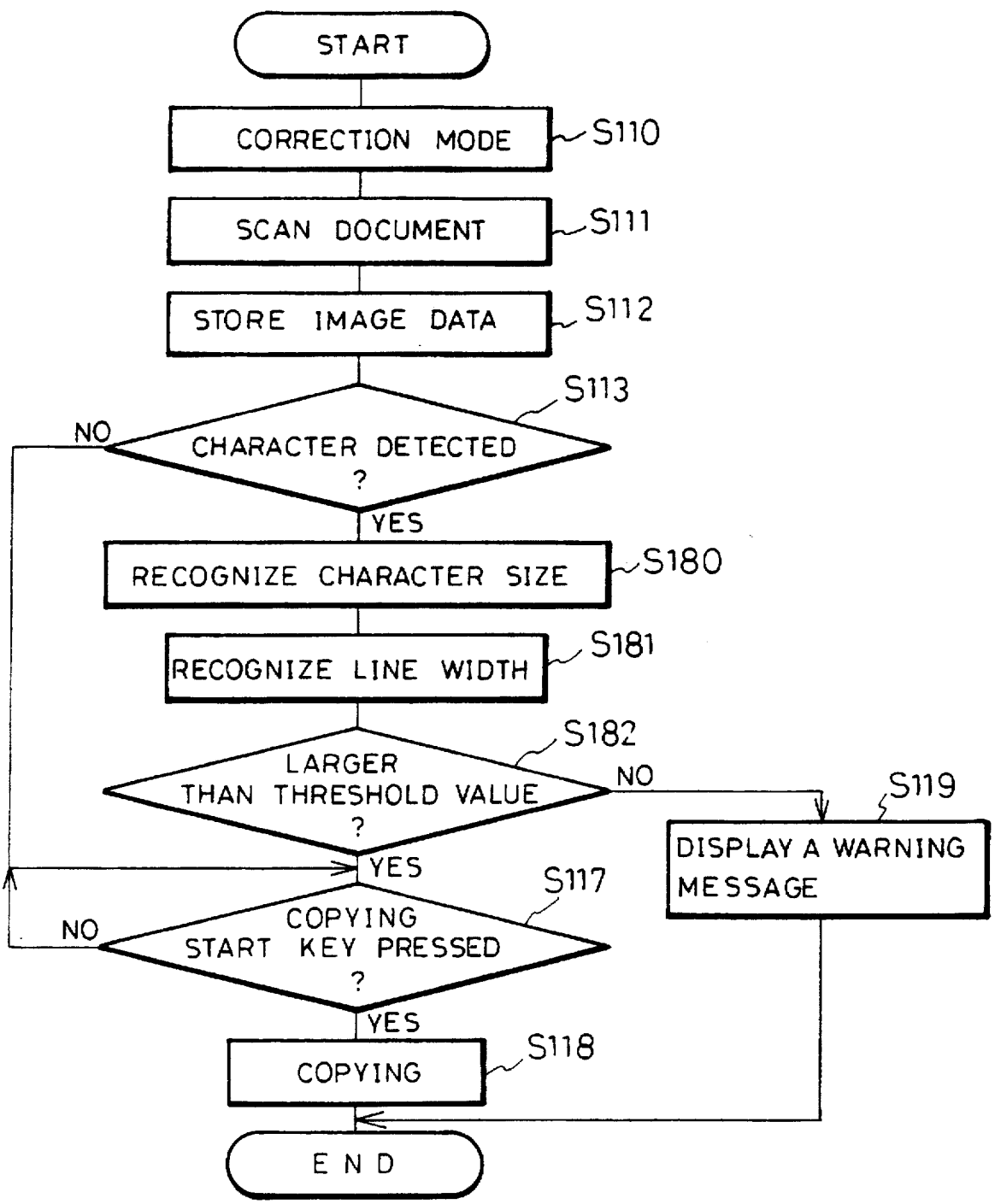
FIG. 38 is a flowchart showing the arrangement of the steps in a correction process performed by a digital copying machine as an image processor according to still another embodiment of the present invention.
Figure 39:
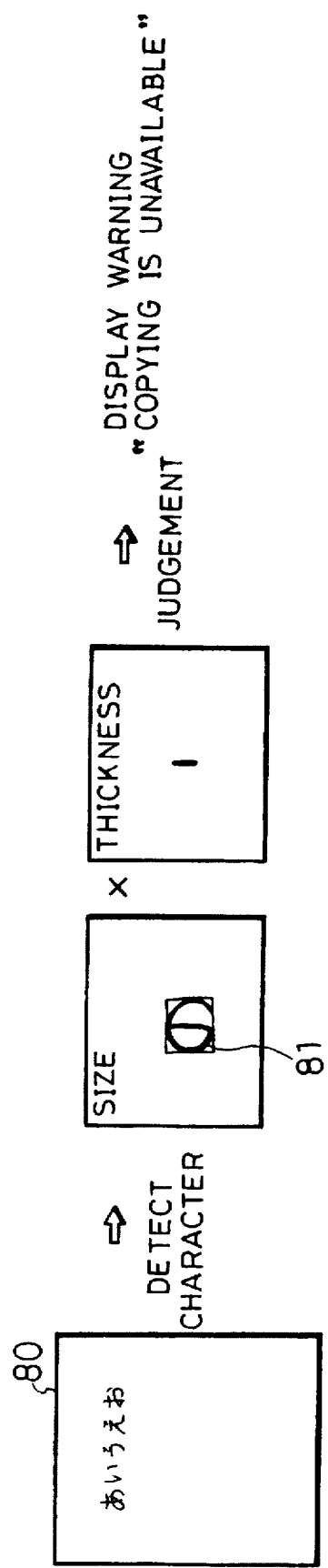
FIG. 39 is an explanatory view of the arrangement of the steps shown in FIG. 38.

The following description discusses yet another embodiment of the present invention with reference to FIGS. 38 and 39. The means having the same function as that of the means shown in the drawings of EMBODIMENT 12 will be designated by the same code and their description will be omitted.

A digital copying machine as an image processor of this embodiment includes a line width detecting section (character detecting means) instead of the character detecting section 71i. For example, as commonly used in binary image processing, the size of a character is recognized by detecting the number of connected points and end points of the pixels, and portions of lines or curved lines of the character which are extremely thinner than other portions are detected. The recognition rate judging means judges whether the size and the line width (thickness) of the character are larger (thicker) than predetermined threshold values. The threshold values indicate the minimum readable size (thickness) of a character which can be clearly copied without having a scratched portion. Therefore, if the size and the line width of the character become smaller than the threshold value, the character becomes scratched and unreadable. For example, the threshold value is determined according to the performance, for example, resolution of the digital copying machine, and stored in the main memory 73. Except for this difference, the structure of the digital copying machine of this embodiment is the same as that of the digital copying machine of EMBODIMENT 12.

Referring now to the flowchart of FIG. 38 and FIG. 39, how the digital copying machine of this embodiment performs correction processing is explained below.

First, similar to the digital copying machine of EMBODIMENT 12, the predetermined operations are carried out to detect a character 81 (steps 110 to 113). Then, the size and line width of the character 81 are recognized (steps 180 and 181). Subsequently, whether the size and line width of the character 81 are larger (thicker) than predetermined threshold values or not are detected (step 182). If the size and line width of the character 81 are larger than or equal to the predetermined threshold values, copying is performed (steps 117 and 118), and the correction mode comes to an end. On the other hand, if the size and line width of the character 81 are smaller than the threshold values, a warning message is displayed (step 119), and the copying operation is stopped.

As described above, if characters to be appearing in a copy of the document become scratched and unreadable, the digital copying machine having this structure stops the copying operation. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 20

Figure 40:
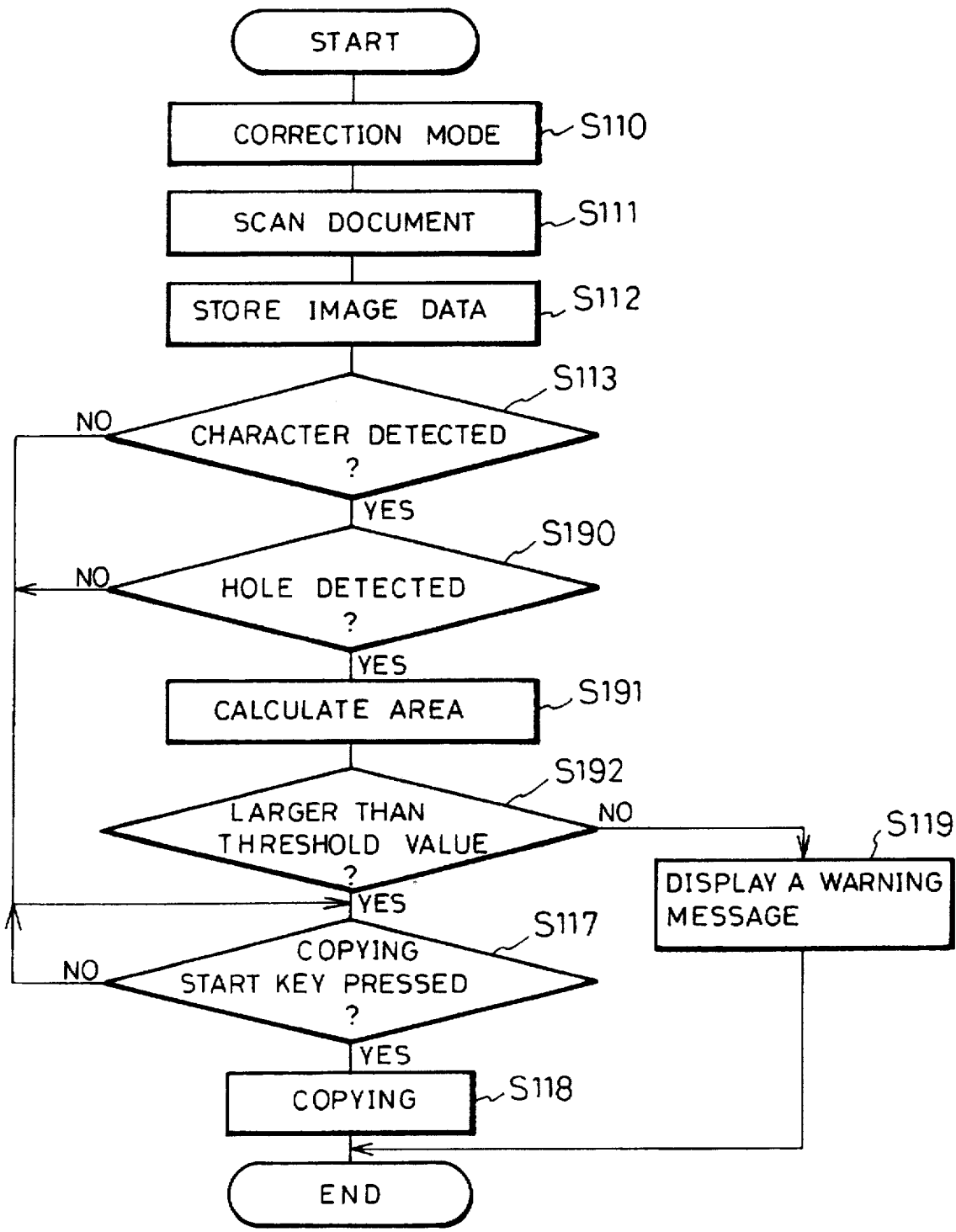
FIG. 40 is a flowchart showing the arrangement of the steps in a correction process performed by a digital copying machine as an image processor according to still another embodiment of the present invention.
Figure 41:
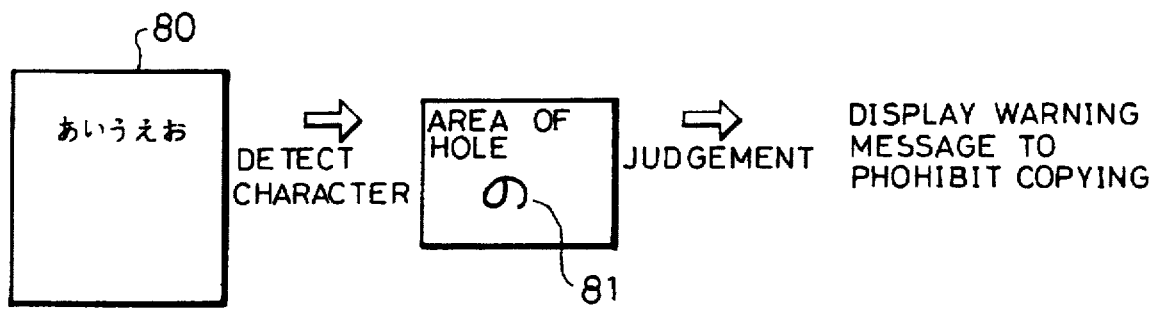
FIG. 41 is an explanatory view of the arrangement of the steps shown in FIG. 40.

The following description discusses yet another embodiment of the present invention with reference to FIGS. 40 and 41. The means having the same function as that of the means shown in the drawings of EMBODIMENT 12 will be designated by the same code and their description will be omitted.

A digital copying machine as an image processor of this embodiment includes a hole detecting section (character detecting means) instead of the character detecting section 71i. The hole detecting section detects a hole (i.e., an enclosed portion) of a character from the detected character data by the feature extraction method described in detail in EMBODIMENT 2. The recognition rate judging means judges whether the area of the hole is larger than a predetermined threshold value, i.e., a minimum area permitting a character to be copied without being defaced. Therefore, if the area of the hole is smaller than the threshold value, the character becomes defaced and unreadable. The threshold value is determined according to the performance, for example, the resolution of the digital copying machine, and, for instance, set to $(0.25)^2 = 0.0625$ mm$^2$ when the resolution is 400 dpi and stored in the main memory 73. Except for this difference, the structure of the digital copying machine of this embodiment is the same as that of the digital copying machine of EMBODIMENT 12.

Referring now to the flowchart of FIG. 40 and FIG. 41, how the digital copying machine of this embodiment performs correction processing is explained below.

First, similar to the digital copying machine of EMBODIMENT 12, the predetermined operations are carried out to detect a character 81 (steps 110 to 113). Then, whether the character 81 has a hole or not is detected (step 190). When no hole is detected, the operation moves to step 117 and copying is performed. On the other hand, if a hole is detected, the area of the hole is calculated (step 191). Subsequently, whether the area of the hole is larger than the predetermined threshold value or not is detected (step 192). If the area of the hole is larger than or equal to the threshold value, copying is performed (steps 117 and 118), and the correction mode comes to an end. On the other hand, if the area of the hole is smaller than the threshold value, a warning message is displayed (step 119), and the copying operation is stopped.

As described above, if characters to be appearing in a copy of the document become defaced and unreadable, the digital copying machine having this structure stops the copying operation. It is therefore possible to prevent a virtually useless copied image from being formed, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 21

Figure 43:
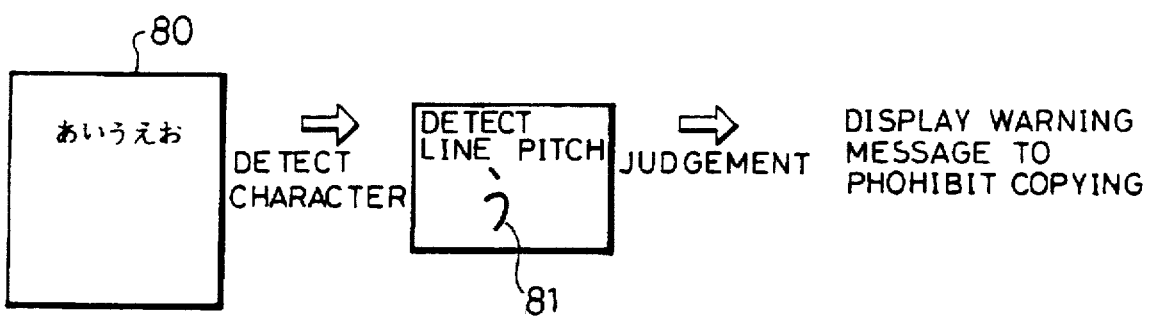
FIG. 43 is an explanatory view of the arrangement of the steps shown in FIG. 42.

The following description discusses yet another embodiment of the present invention with reference to FIGS. 42 and 43. The means having the same function as that of the means shown in the drawings of EMBODIMENT 12 will be designated by the same code and their description will be omitted.

A digital copying machine as an image processor of this embodiment includes a line pitch detecting section (character detecting means) instead of the character detecting section 71$i$. As commonly and often used in binary image processing, for example, the line pitch detecting section expands character data by an amount equivalent to two to three layers by expanding the pixels of the character data, detects end points of the pixels by calculating the number of connected points of the pixels, and calculates the distance (i.e., line pitch) between two end points by extracting end points which disappear by the expansion. The recognition rate judging means judges whether the line pitch is larger than a predetermined threshold value which shows a minimum size for permitting a character to be copied in readable condition without being defaced. Therefore, if the line pitch is smaller than the threshold value, the character becomes defaced and unreadable. The threshold value is determined according to the performance, for example, the resolution of the digital copying machine, and stored in the main memory 73. Except for this difference, the structure of the digital copying machine of this embodiment is the same as that of the digital copying machine of EMBODIMENT 12.

Referring now to the flowchart of FIG. 42 and FIG. 43, how the digital copying machine of this embodiment performs correction processing is explained below.

First, similar to the digital copying machine of EMBODIMENT 12, the predetermined operations are carried out to detect a character 81 (steps 110 to 113). Then, the line pitch detecting section performs binary image processing to expand the pixels of the character data (200). Next, end points are detected by calculating the number of connected points of the pixels (step 201), and the line pitch is calculated by extracting end points which disappear by the expansion (step 202). Subsequently, whether the line pitch is larger than a predetermined threshold value or not is detected (step 203). If the line pitch is larger than or equal to the threshold value, copying is performed (steps 117 and 118), and the correction mode comes to an end. On the other hand, if the line pitch is smaller than the threshold value, a warning message is displayed (step 119), and the copying operation is stopped.

As described above, if characters to be appearing in a copy of the document become defaced and unreadable, the digital copying machine having this structure stops the copying operation. It is therefore possible to prevent a virtually useless copied image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

EMBODIMENT 22

Figure 45:
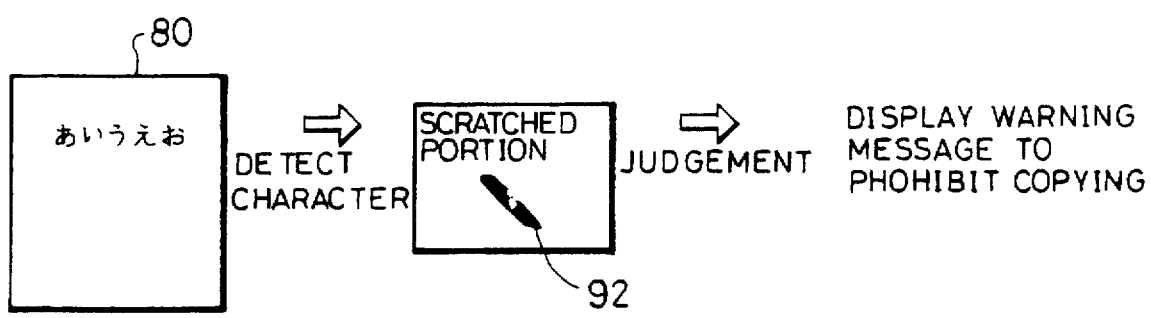
FIG. 45 is an explanatory view of the arrangement of the steps shown in FIG. 44.

The following description discusses yet another embodiment of the present invention with reference to FIGS. 44 and 45. The means having the same function as that of the means shown in the drawings of EMBODIMENT 12 will be designated by the same code and their description will be omitted.

A digital copying machine as an image processor of this embodiment includes a scratched portion detecting section (character detecting means) instead of the character detecting section 71$i$. The scratched portion detecting section detects, for example, lines and curved lines, and detects a missing pixel, i.e., a scratched portion. The recognition rate judging means judges whether the number of scratched portions is larger than a predetermined threshold value. The threshold value indicates a maximum value permitting a character to be copied in a readable condition without being scratched. Namely, if the number of scratched portions is larger than the threshold value, the character becomes scratched and unreadable. The threshold value is determined according to the performance, for example, the resolution of the digital copying machine, and stored in the main memory 73. Except for this difference, the structure of the digital copying machine of this embodiment is the same as that of the digital copying machine of EMBODIMENT 12.

Referring now to the flowchart of FIG. 44 and FIG. 45, how the digital copying machine of this embodiment performs correction processing is explained below.

First, similar to the digital copying machine of EMBODIMENT 12, the predetermined operations are carried out to detect a character 81 (steps 110 to 113). Then, the scratched portion detecting section detects scratched portions 92 (step 210). Next, whether the number of scratched portions 92 is larger than predetermined threshold value or not is detected (step 211). If the number of scratched portions 92 is smaller than or equal to the threshold value, copying is performed (steps 117 and 118), and the correction mode comes to an end. On the other hand, if the number of scratched portions 92 is larger than the threshold value, a warning message is displayed (step 119), and the copying operation is stopped.

As described above, if characters to be appearing in a copy of the document become scratched and unreadable, the digital copying machine having this structure stops the copying operation. It is therefore possible to prevent a virtually useless copied image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

EMBODIMENT 23

Figure 47:
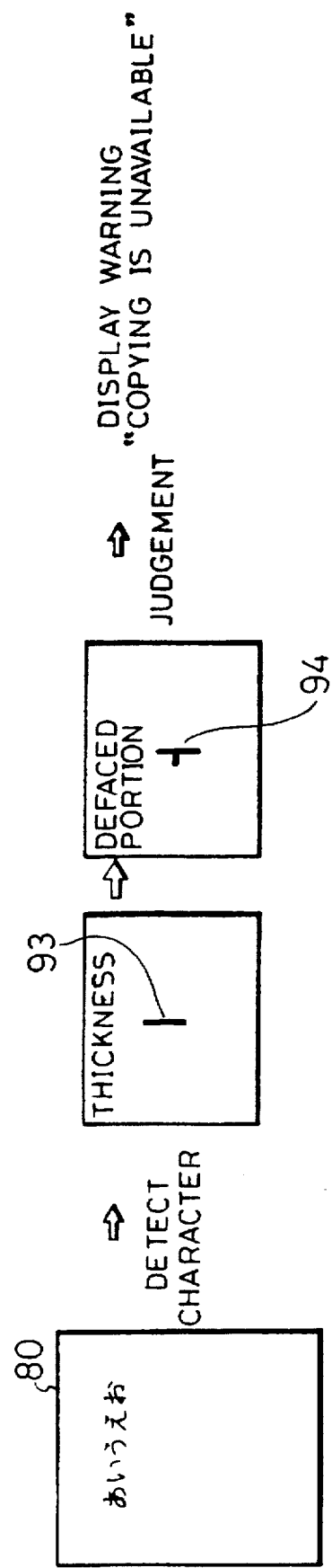
FIG. 47 is an explanatory view of the arrangement of the steps shown in FIG. 46.

The following description discusses yet another embodiment of the present invention with reference to FIGS. 46 and 47. The means having the same function as that of the means shown in the drawings of EMBODIMENT 12 will be designated by the same code and their description will be omitted.

A digital copying machine as an image processor of this embodiment includes a defaced portion detecting section (character detecting means) instead of the character detecting section 71*i*. The defaced portion detecting section detects, for example, lines and curved lines, and detects portions (i.e., defaced portions) of these lines whose line width becomes thicker by an amount more than a predetermined rate. The recognition rate judging means judges whether the number of defaced portions is larger than a predetermined threshold value. The threshold value indicates a maximum number of defaced portions which permits a character to be copied in a readable condition. Namely, if the number of defaced portions is larger than the threshold value, the character becomes defaced and unreadable. The threshold value is determined according to the performance, for example, the resolution of the digital copying machine, and stored in the main memory 73. Except for this difference, the structure of the digital copying machine of this embodiment is the same as that of the digital copying machine of EMBODIMENT 12.

Referring now to the flowchart of FIG. 46 and FIG. 47, how the digital copying machine of this embodiment performs correction processing is explained below.

First, similar to the digital copying machine of EMBODIMENT 12, the predetermined operations are carried out to detect a character 93 (steps 110 to 113). Then, the defaced portion detecting section detects a defaced portion 94 (step 220). Next, whether the number of defaced portions 94 is smaller than predetermined threshold value or not is detected (step 221). If the number of defaced portions 94 is smaller than or equal to the threshold value, copying is performed (steps 117 and 118), and the correction mode comes to an end. On the other hand, if the number of the defaced portions 94 is larger than the threshold value, a warning message is displayed (step 119), and the copying operation is stopped.

As described above, if characters to be appearing in a copy of the document become defaced and unreadable, the digital copying machine having this structure stops the copying operation. It is therefore possible to prevent a virtually useless copied image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

EMBODIMENT 24

Figure 48:
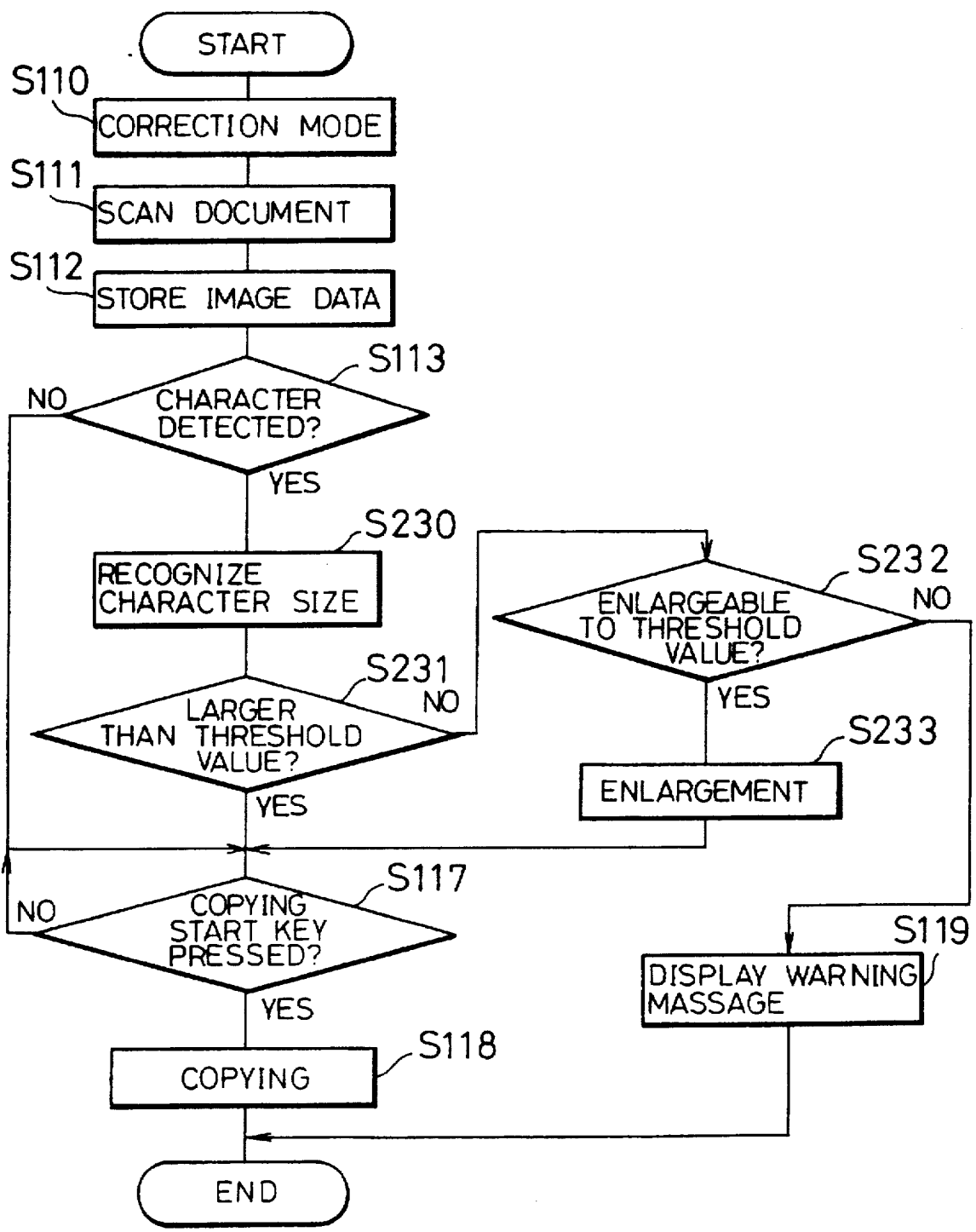
FIG. 48 is a flowchart showing the arrangement of the steps in a correction process performed by a digital copying machine as an image processor according to still another embodiment of the present invention.
Figure 49:
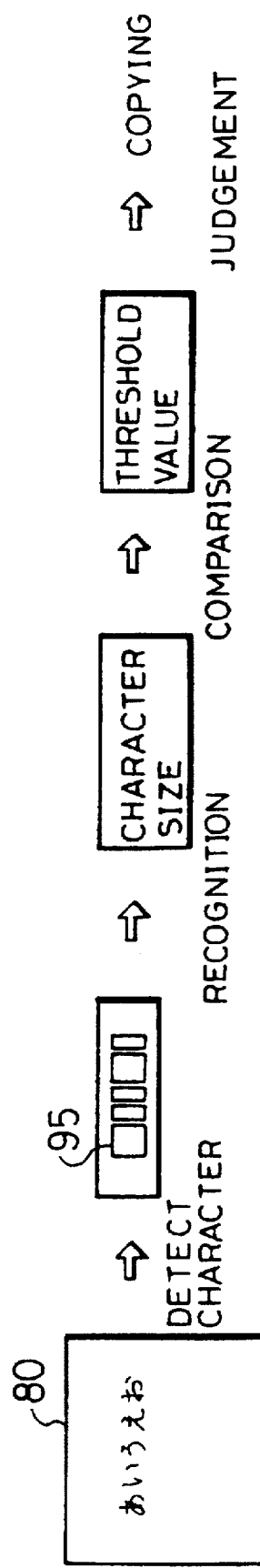
FIG. 49 is an explanatory view of the arrangement of the steps shown in FIG. 48.

The following description discusses yet another embodiment of the present invention with reference to FIGS. 48 and 49. The means having the same function as that of the means shown in the drawings of EMBODIMENT 1 will be designated by the same code and their description will be omitted.

A digital copying machine as an image processor of this embodiment further includes size recognizing means, size judging means and compositing means (none of them are shown) in the image processing CPU 74 of EMBODIMENT 1. More specifically, the image processing CPU 74 recognizes the size of a character from the image data based on the output from the character detecting section 71*i* and judges whether the size of the character is larger than a predetermined minimum readable size, i.e., a threshold value.

The threshold value indicates a minimum size which permits a character to be copied in readable condition without being defaced. Therefore, if the size of a character becomes smaller than the threshold value, the character becomes defaced and unreadable. The threshold value is determined according to the performance, for example, the resolution of the digital copying machine, and stored in the main memory 73.

When the size judging means judges that the size of a character is smaller than the threshold value, the magnifying section (enlarging means) 71*e* enlarges the character data at a predetermined enlargement rate so that the character has a predetermined readable size, i.e. becomes larger than the threshold value. Except for this difference, the structure of the digital copying machine of this embodiment is the same as that of the digital copying machine of EMBODIMENT 1.

Referring now to the flowchart of FIG. 48 and FIG. 49, how the digital copying machine of this embodiment performs correction processing is explained below.

First, similar to the digital copying machine of EMBODIMENT 1, the predetermined operations are carried out to detect a character 95 (steps 110 to 113). Then, the size recognizing means recognizes the size of the character 95 (step 230) in the manner described above. Next, the size judging means judges whether the size of the character 95 is larger than a predetermined threshold value (step 231). If the size of the character 95 is larger than or equal to the threshold value, copying is performed (steps 117 and 118), and the correction mode comes to an end. On the other hand, if the size of the character 95 is smaller than the threshold value, whether the size of the character 95 is enlargeable to a size larger than the threshold value or not is judged (step 232) by comparing the sheet size and the size of the image after being enlarged. If the character 95 is enlargeable, the enlarging means enlarges the image data (step 233), and copying is performed (steps 117 and 118). On the contrary, if the character 95 is not enlargeable, a warning message is displayed (step 119), and the copying operation is stopped.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

As described above, the image processor of the present invention incorporates: input means for reading the image on a document; storage means for storing the image data of the document read by the input means; character detecting means for detecting character data from the image data stored in the storage means; size recognizing means for recognizing the size of a character from the character data detected by the character detecting means; size judging means for judging whether the size of the characters recognized by the size recognizing means is smaller than a predetermined size; enlarging means for enlarging image data to the predetermined size so that the character becomes readable when the size judging means judges that the size of the character is smaller than the predetermined size; and output means for visualizing and outputting the image data enlarged by the enlarging means.

With this structure, the character detecting means detects character data from the image data, and the size recognizing means recognizes the size of a character from the character data. The size judging means judges whether the size of the character is smaller than a predetermined size. When the size judging means judges that the size of the character is smaller than the predetermined size, the enlarging means enlarges the character data to the predetermined size so that the character becomes readable. Consequently, characters in the reproduced image of the document output through the output means are easily read.

Since the characters in the reproduced image of the document output from the output means are easily read, the digital copying machine is handled more easily and its value is increased. For example, when outputting the reproduced image onto a sheet, only the reproduced image of a practically usable size is output, thereby preventing the waste of sheets.

EMBODIMENT 25

Figure 50:
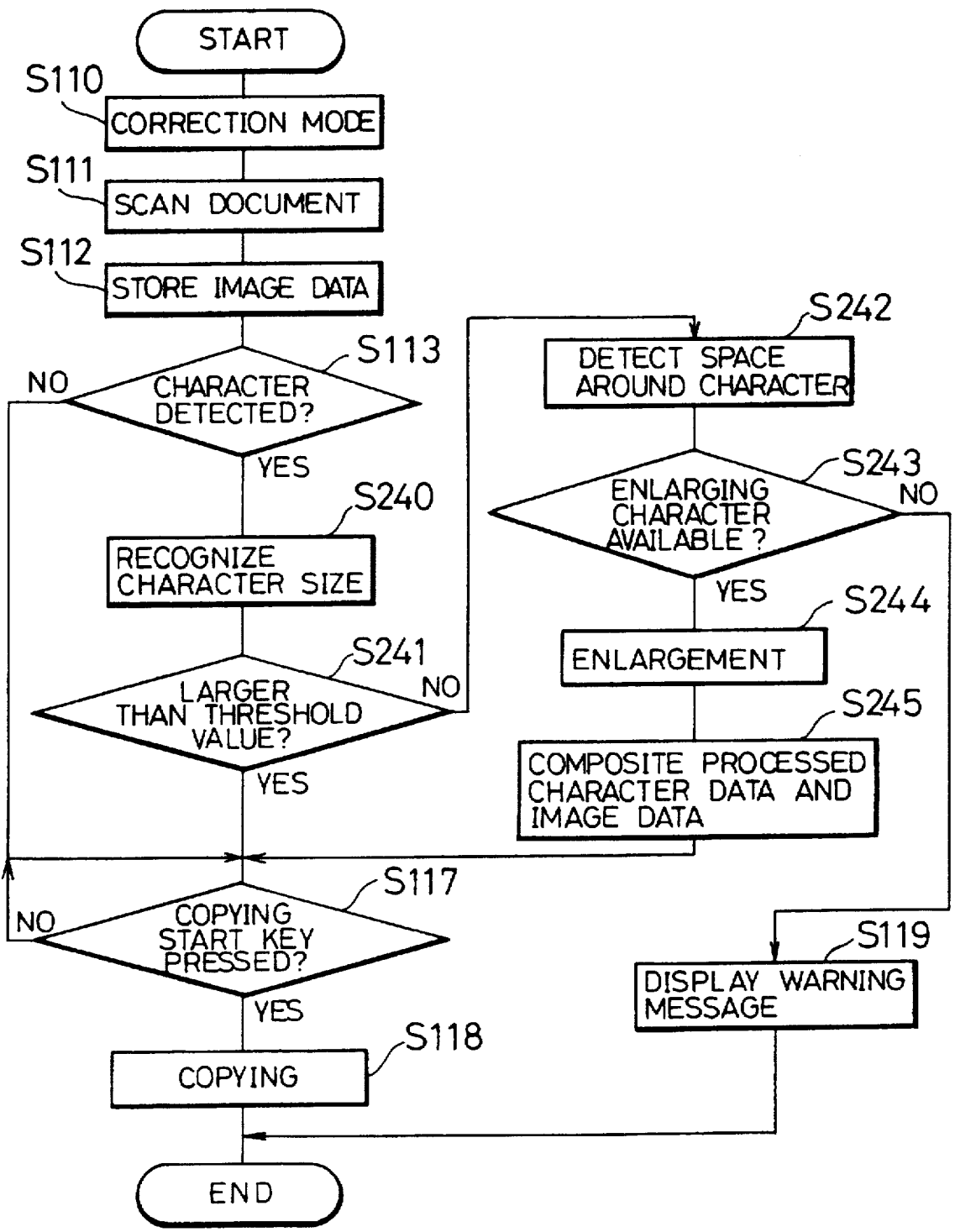
FIG. 50 is a flowchart showing the arrangement of the steps in a correction process performed by a digital copying machine as an image processor according to still another embodiment of the present invention.
Figure 51:
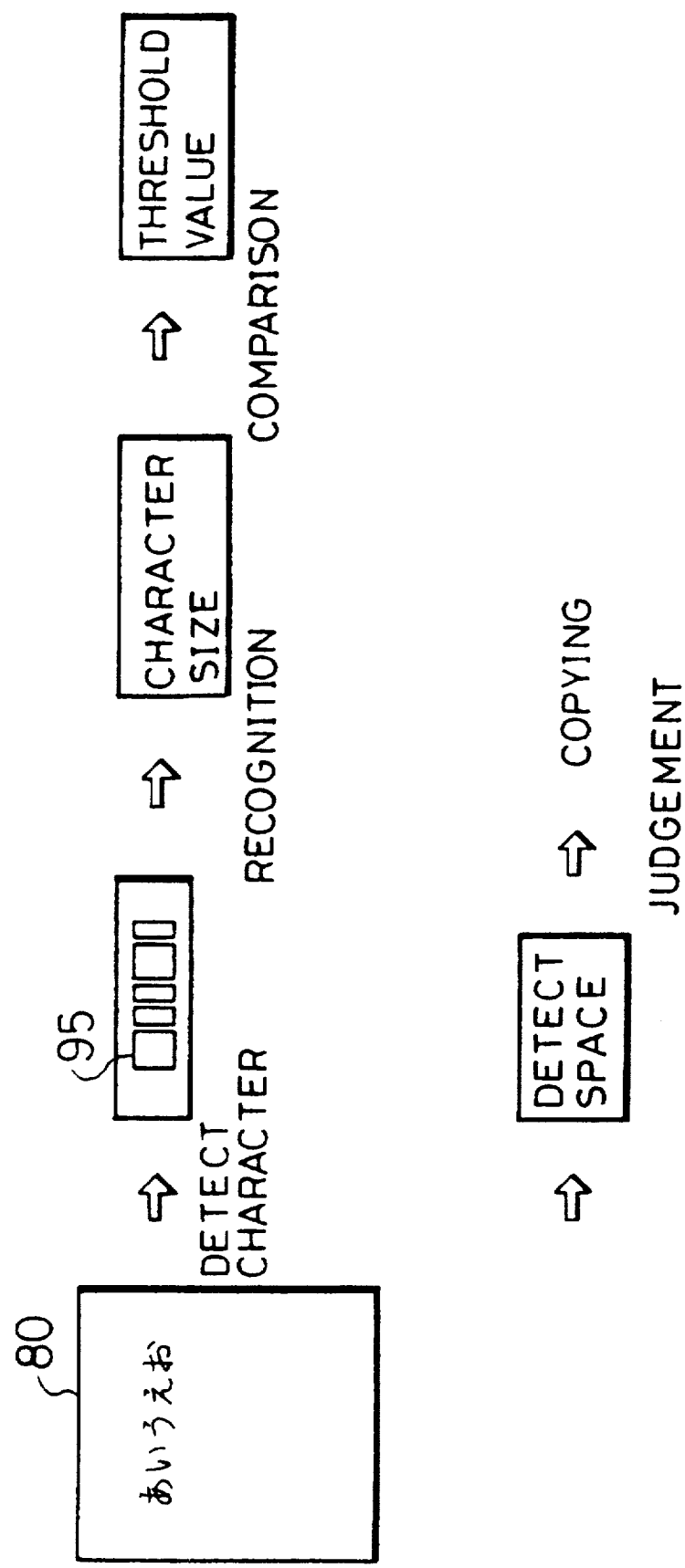
FIG. 51 is an explanatory view of the arrangement of the steps shown in FIG. 50.

The following description discusses yet another embodiment of the present invention with reference to FIGS. 50 and 51. The means having the same function as the means shown in the drawing of EMBODIMENT 24 will be designated by the same code and their description will be omitted.

A digital copying machine as an image processor of this embodiment includes the space detecting means (described in detail in EMBODIMENT 10) in the character detecting section 71i of EMBODIMENT 24, and the image processing CPU (compositing means) 74 capable of compositing enlarged character data and the image data of the image excluding the characters. Except for this difference, the structure of the digital copying machine of this embodiment is the same as that of the digital copying machine of EMBODIMENT 24.

Referring now to the flowchart of FIG. 50 and FIG. 51, how the digital copying machine of this embodiment performs correction processing is explained below.

First, similar to the digital copying machine of EMBODIMENT 24, the predetermined operations are carried out to detect a character 95 (steps 110 to 113). Then, the size recognizing means recognizes the size of the character 95 (step 240) in the manner described above. Next, whether the size of the character 95 is larger than a predetermined threshold value or not is judged. If the size of the character 95 is larger than or equal to the threshold value, copying is performed (steps 240, 241, 117 and 118), and the correction mode comes to an end. On the other hand, if the size of the character 95 is smaller than the threshold value, space around the character 95 is detected (step 242) and whether the size of the character 95 is enlargeable to a size larger than the threshold value or not is judged (step 243). If it is enlargeable, the enlarging means enlarges the character data (step 244), composites the processed character data and the image data of the image excluding the characters, stored in step 112, (step 245), and copying is performed (steps 117 and 118). On the contrary, if the character 95 is not enlargeable, a warning message is displayed (step 119), and the copying operation is stopped. The space has a width which prevents the character and an image other than characters from overlapping when the character is enlarged to a readable size.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

As described above, the image processor of the present invention incorporates: input means for reading the image on a document; storage means for storing the image data of the document read by the input means; character detecting means for detecting character data from the image data stored in the storage means; size recognizing means for recognizing the size of a character from the character data detected by the character detecting means; size judging means for judging whether the size of the character recognized by the size recognizing means is smaller than a predetermined minimum readable size; enlarging means for enlarging image data to the predetermined readable size when the size judging means judges that the size of the character is smaller than the predetermined readable size; compositing means for compositing the character data enlarged by the enlarging means and the image data excluding the character data; and output means for visualizing and outputting the image data and the character data composited by the compositing means.

With this structure, the character detecting means detects character data from the image data, and the size recognizing means recognizes the size of a character from the character data. The size judging means judges whether the size of the character is smaller than a predetermined size. When the size judging means judges that the size of the character is smaller than the predetermined size, the enlarging means enlarges the character data to the predetermined readable size. Next, the compositing means composites the character data enlarged by the enlarging means and the image data excluding the character data. Therefore, characters in the reproduced image of the document output through the output means are easily read.

Since the characters in the reproduced image of the document output from the output means are easily read, the digital copying machine is handled more easily and its value is increased. For example, when outputting the reduced image onto a sheet, only the reduced image of a practically usable size is output, thereby preventing the waste of sheets.

EMBODIMENT 26

Figure 52:
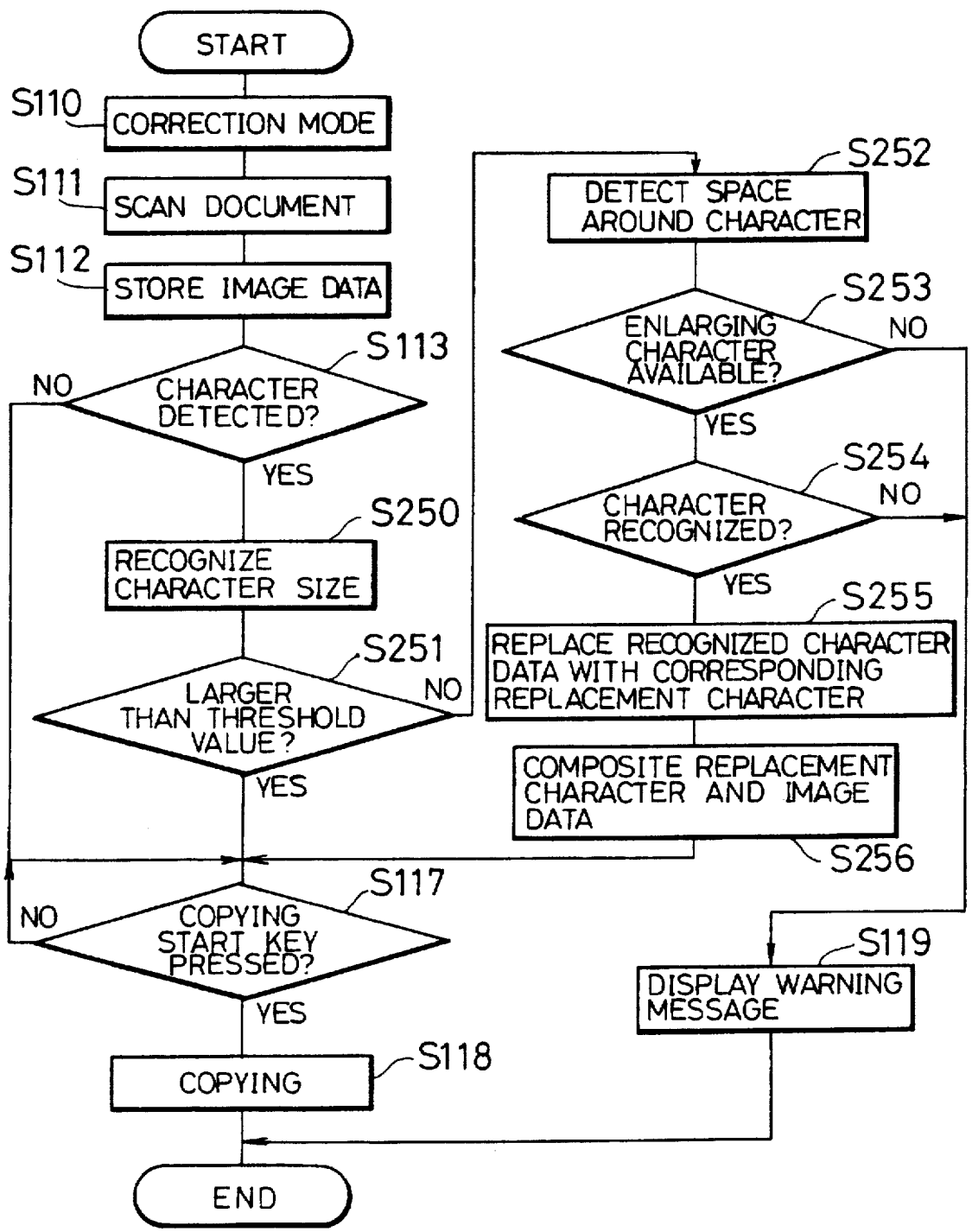
FIG. 52 is a flowchart showing the arrangement of the steps in a correction process performed by a digital copying machine as an image processor according to still another embodiment of the present invention.
Figure 53:
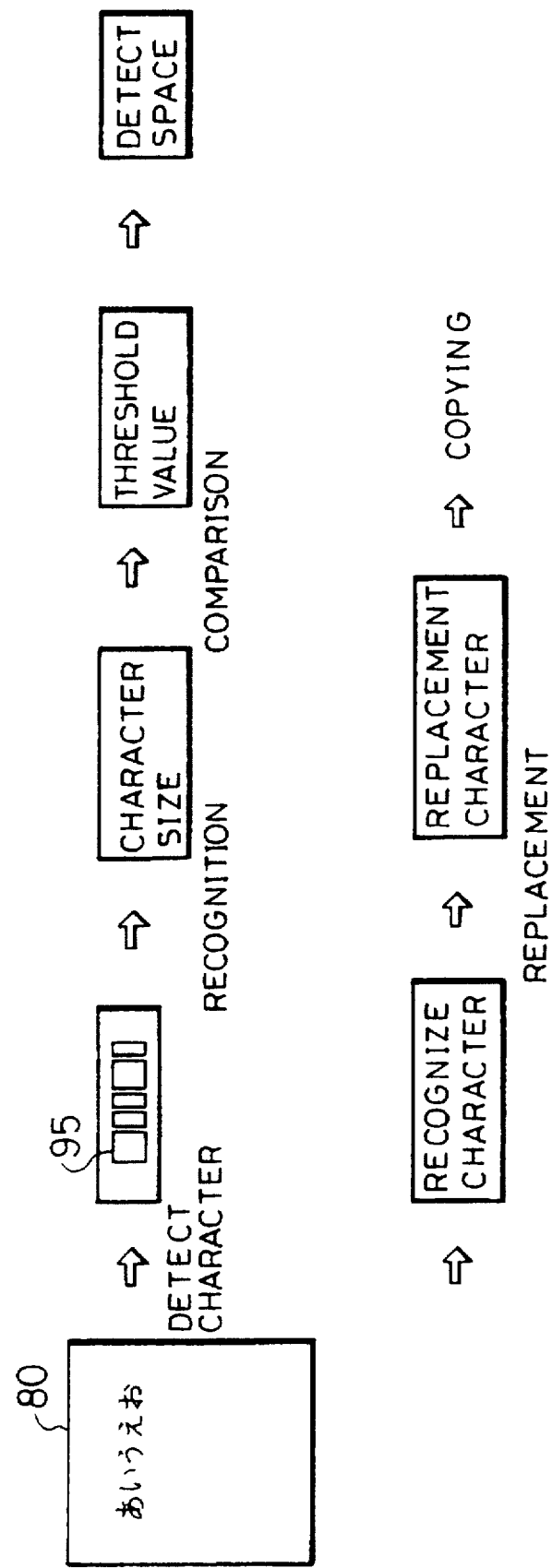
FIG. 53 is an explanatory view of the arrangement of the steps shown in FIG. 52.

The following description discusses yet another embodiment of the present invention with reference to FIGS. 52 and 53. The means having the same function as the means shown in the drawing of EMBODIMENT 25 will be designated by the same code and their description will be omitted.

A digital copying machine as an image processor of this embodiment includes character replacing means (not shown) in the image processing CPU 74 of EMBODIMENT 25. The character replacing means converts a character re-recognized from the enlarged character data into a predetermined code, retrieves a replacement character corresponding to the character from the main memory 73 using the code, replaces the character with the replacement character, and composites the character data of the replacement character and the image data. Except for this difference, the structure of the digital copying machine of this embodiment is the same as that of the digital copying machine of EMBODIMENT 25.

Referring now to the flowchart of FIG. 52 and FIG. 53, how the digital copying machine of this embodiment performs correction processing is explained below.

First, similar to the digital copying machine of EMBODIMENT 25, the predetermined operations are carried out to detect a character 95 (steps 110 to 113). Then, the size recognizing means recognizes the size of the character 95, and whether the size of the character 95 is larger than a predetermined threshold value or not is judged. If the size of the character 95 is larger than or equal to the threshold value, copying is performed (steps 250, 251, 117 and 118), and the correction mode comes to an end. On the other hand, if the size of the character 95 is smaller than the threshold value, space around the character 95 is detected (step 252) and whether the size of the character 95 is enlargeable to a size larger than the threshold value or not is judged (step 253). If it is enlargeable, the enlarging means enlarges the character data and re-recognizes the character from the enlarged character data (step 254). Then, the re-recognized character is replaced with a corresponding replacement character (step 255), the character data of the replacement character and the image data of the image excluding the character (step 256) are composited, and copying is performed (steps 117 and 118). On the contrary, if the character 95 is not enlargeable or re-recognized, a warning message is displayed (step 119), and the copying operation is stopped. Detection of space is performed by space detecting means. When replacing a character with a replacement character, the space detecting means detects whether there is sufficient space around the character for replacing the character with the replacement character.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

As described above, the image processor of the present invention incorporates: input means for reading the image on a document; first storage means for storing the image data of the document read by the input means; second storage means for storing replacement character data having a font of a predetermined readable size; character detecting means for detecting character data from the image data stored in the first storage means; size recognizing means for recognizing the size of a character from the character data detected by the character detecting means; size judging means for judging whether the size of the character recognized by the size recognizing means is smaller than a predetermined readable size; character replacing means for replacing the character data with the replacement character data stored in the second storage means when the character is judged to be smaller than the predetermined size by the size judging means and for compositing the replacement character data and the image data; and output means for visualizing and outputting the image data composited by the character replacing means.

With this structure, the character detecting means detects character data from image data, and the size recognizing means recognizes the size of a character from the character data. The size judging means judges whether the size of the character is smaller than a predetermined size. When the size judging means judges that the size of the character is smaller than the predetermined size, the character replacing means replaces the character data with replacement character data stored in the second storage means and composites the replacement character data and the image data. Thus, characters in the reproduced image of the document output through the output means are easily read.

Since the characters in the reproduced image of the document output from the output means are easily read, the digital copying machine is handled more easily and its value is increased. For example, when outputting the reproduced image onto a sheet, only a reproduced image of a practically usable size is output, thereby preventing the waste of sheets.

EMBODIMENT 27

Figure 54:
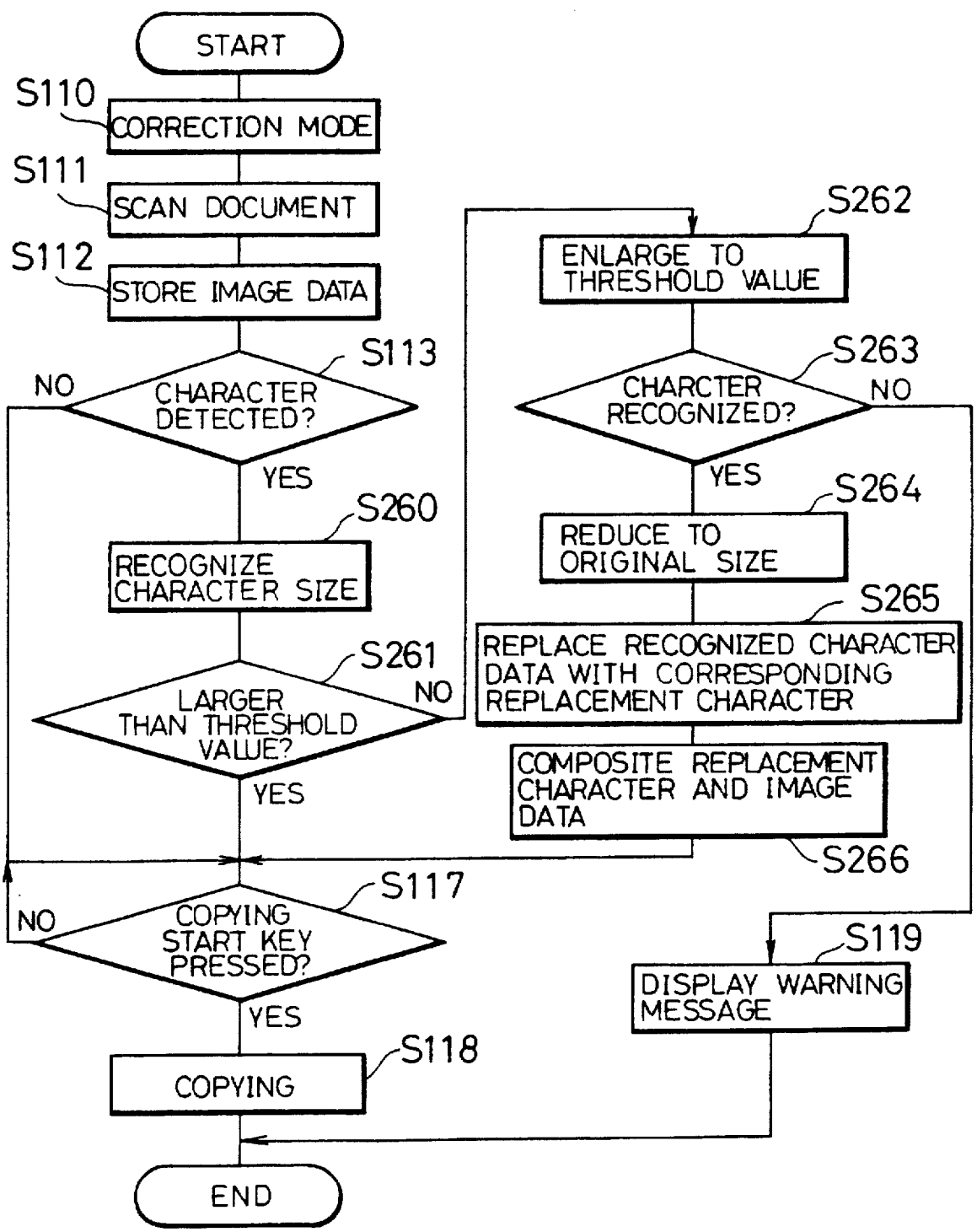
FIG. 54 is a flowchart showing the arrangement of the steps in a correction process performed by a digital copying machine as an image processor according to still another embodiment of the present invention.
Figure 55:
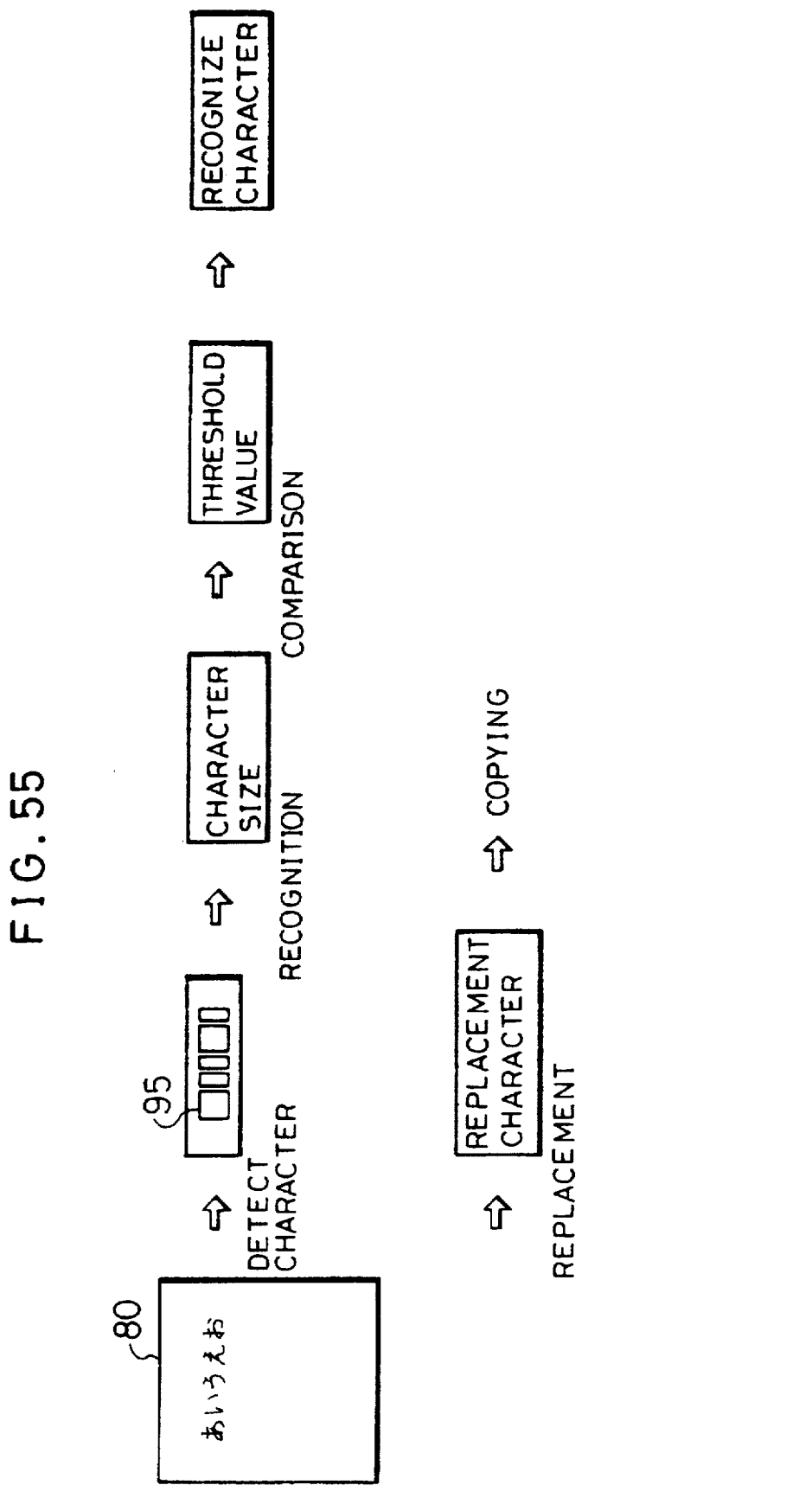
FIG. 55 is an explanatory view of the arrangement of the steps shown in FIG. 54.

The following description discusses yet another embodiment of the present invention with reference to FIGS. 54 and 55. The means having the same function as the means shown in the drawing of EMBODIMENT 26 will be designated by the same code and their description will be omitted.

In a digital copying machine as an image processor of this embodiment, when the size judging means judges that the size of a character is smaller than a threshold value, the magnifying section (character enlarging means) 71e enlarges character data at a predetermined enlargement rate so that the size of the character becomes a predetermined readable size, i.e., equal to the threshold value. Except for this difference, the structure of the digital copying machine of this embodiment is the same as that of the digital copying machine of EMBODIMENT 26.

Referring now to the flowchart of FIG. 54 and FIG. 55, how the digital copying machine of this embodiment performs correction processing is explained below.

First, similar to the digital copying machine of EMBODIMENT 26, the predetermined operations are carried out to detect a character 95 (steps 110 to 113). Then, the size recognizing means recognizes the size of the character 95, and whether the size of the character 95 is larger than a predetermined threshold value or not is judged. If the size of the character 95 is larger than or equal to the threshold value, copying is performed (steps 260, 261, 117 and 118), and the correction mode comes to an end. On the other hand, if the size of the character 95 is smaller than the threshold value, the size of the character is enlarged to be equal to the threshold value (step 262). The character is then re-recognized from the enlarged character data (step 263), and the re-recognized character is reduced to the original size (step 264). Subsequently, the re-recognized character is replaced with a corresponding replacement character (step 265), the character data of the replacement character and the image data of the image excluding the characters are composited (step 266), and copying is performed (steps 117 and 118). On the contrary, if the character 95 is not re-recognized, a warning message is displayed (step 119), and the copying operation is stopped.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

As described above, the image processor of the present invention incorporates: input means for reading the image on a document; first storage means for storing the image data of the document read by the input means; second storage means for storing replacement character data having a font of a predetermined readable size; character detecting means for detecting character data from the image data stored in the first storage means; recognizing means for recognizing a character from the character data; size recognizing means for recognizing the size of the character from the character data detected by the character detecting means; size judging means for judging whether the size of the character recognized by the size recognizing means is smaller than a predetermined readable size; enlarging means for enlarging the character data at a predetermined enlargement rate to a predetermined readable size so that the character is recognized as the predetermined character by the recognizing means; character replacing means for replacing the character data before enlarged with the replacement character data stored in the second storage means when the character data which has been enlarged by the enlarging means is recognized as the predetermined character and for compositing the replacement character data and the image data; and output means for visualizing and outputting the image data composted by the character replacing means.

With this structure, the character detecting means detects character data from the image data, the recognizing means recognizes a character from the character data, and the size recognizing means recognizes the size of the character from the character data. The size judging means judges whether the size of the character is smaller than a predetermined size. When the size judging means judges that the size of the character is smaller than the predetermined size, the character data is enlarged at a predetermined enlargement rate to a predetermined readable size so that the character data is recognized as the predetermined character by the recognizing means. When the enlarged character data is recognized as the predetermined character, the character replacing means replaces the character data before enlarged with the replacement character data stored in the second storage means and composites the replacement character data and the image data. Thus, characters in the reproduced image of the document output through the output means are easily read.

Since the characters in the reproduced image of the document output from the output means are easily read, the digital copying machine is handled more easily and its value is increased. For example, when outputting the reproduced image onto a sheet, only a reproduced image of a practically usable size is output, thereby preventing the waste of sheets.

EMBODIMENT 28

Figure 56:
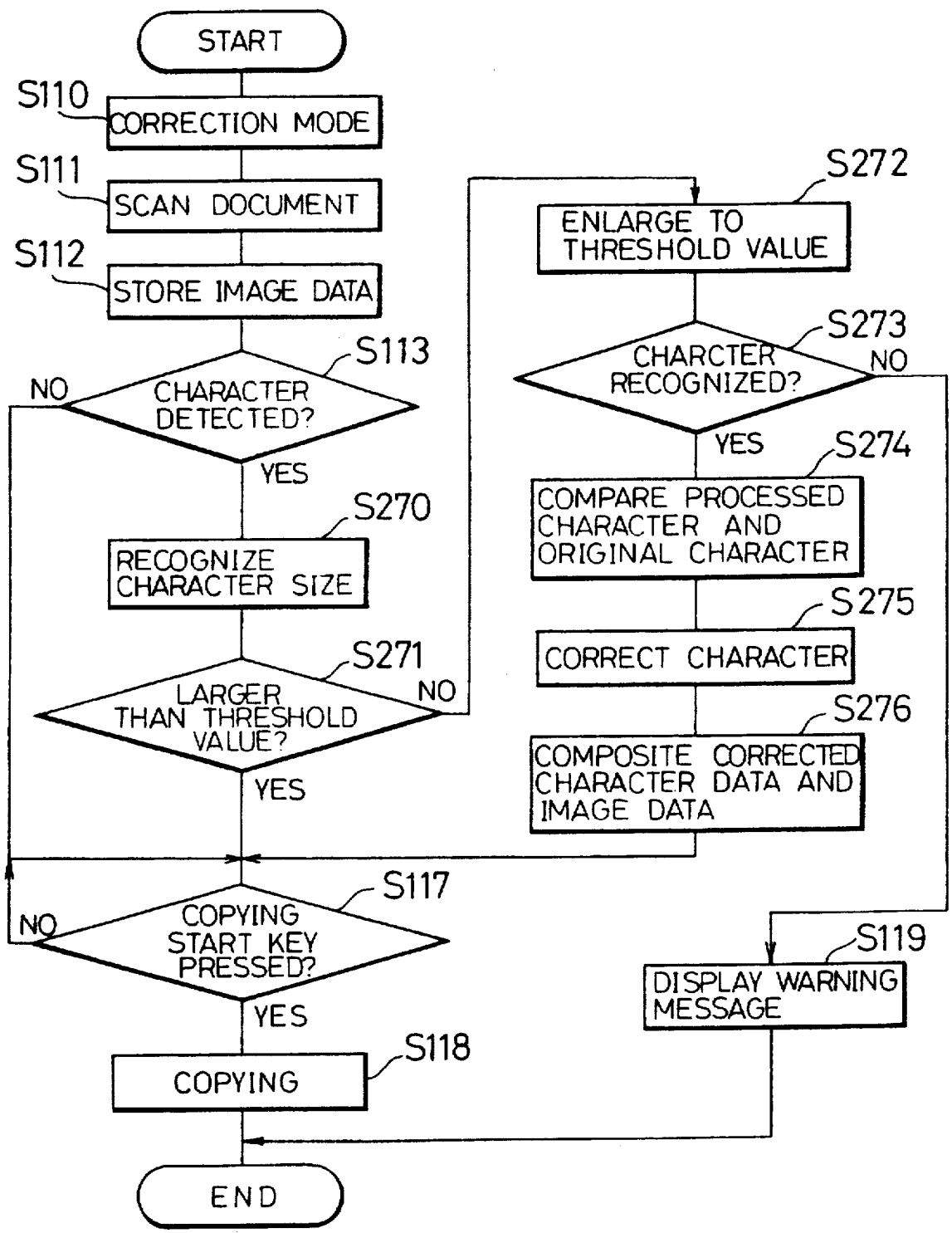
FIG. 56 is a flowchart showing the arrangement of the steps in a correction process performed by a digital copying machine as an image processor according to still another embodiment of the present invention.
Figure 57:
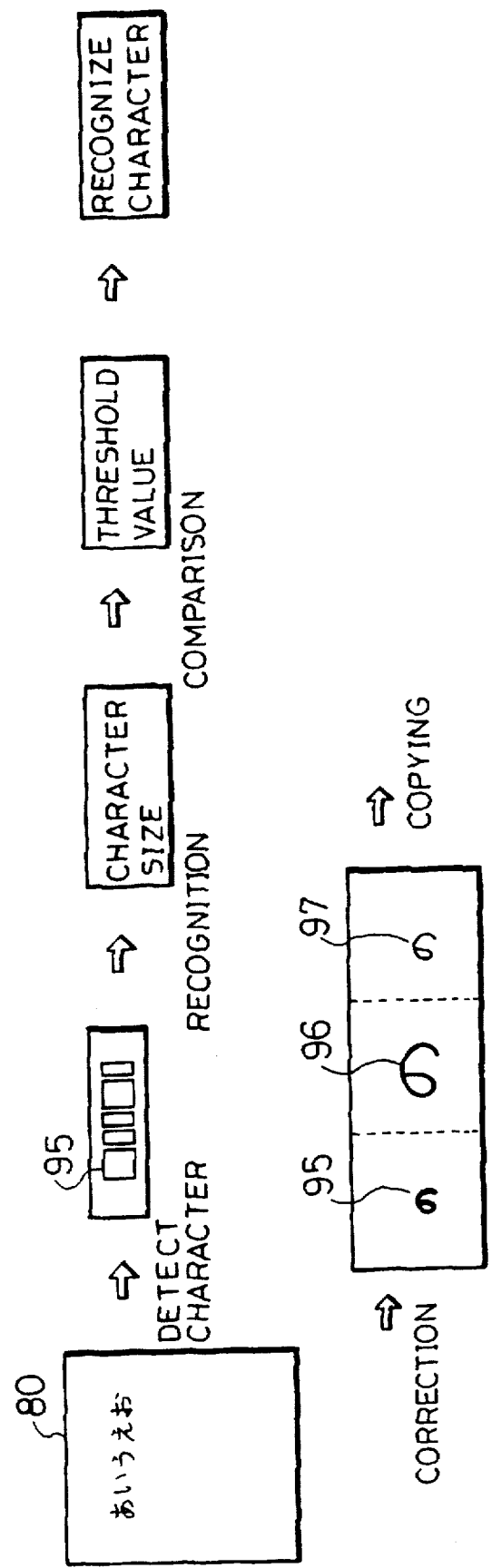
FIG. 57 is an explanatory view of the arrangement of the steps shown in FIG. 56.

The following description discusses yet another embodiment of the present invention with reference to FIGS. 56 and 57. The means having the same function as the means shown in the drawing of EMBODIMENT 27 will be designated by the same code and their description will be omitted.

In a digital copying machine as an image processor of this embodiment includes character processing means (not shown) in the image processing CPU 74 of EMBODIMENT 27. When a character which has been enlarged by the enlarging means is recognized as a predetermined character, the character processing means processes the original character data in a predetermined manner so that the character data before enlarged is recognized, i.e., read as the predetermined character by the recognizing section. For example, short lines and curved lines which are the features of the character are extracted from the enlarged character data and the original character data, respectively, compared with each other, and various processing is performed. For example, the lines and curved lines of the original character data are corrected to have features similar to the features of the lines and curved lines of the enlarged character data. Except for this difference, the structure of the digital copying machine of this embodiment is the same as that of the digital copying machine of EMBODIMENT 27.

Referring now to the flowchart of FIG. 56 and FIG. 57, how the digital copying machine of this embodiment performs correction processing is explained below.

First, similar to the digital copying machine of EMBODIMENT 27, the predetermined operations are carried out to detect a character 95 (steps 110 to 113). Then, the size recognizing means recognizes the size of the character 95, and whether the size of the character 95 is larger than a predetermined threshold value or not is judged. If the size of the character 95 is larger than or equal to the threshold value, copying is performed (steps 270, 271, 117 and 118), and the correction mode comes to an end. On the other hand, if the size of the character 95 is smaller than the threshold value, the size of the character is enlarged to be equal to the threshold value, and a character 96 is re-recognized from the enlarged character data (steps 272 and 273). Next, the re-recognized character 96 and the character 95 before enlarged are compared with each other in the manner described above (step 274). Subsequently, the original character 95 is corrected to become similar to the re-recognized character 96 (step 275). Then, the character data of a corrected character 97 and the image data of the image excluding the character data are composited (step 276), and copying is performed (steps 117 and 118). On the contrary, if the character 95 is not re-recognized, a warning message is displayed (step 119), and the copying operation is stopped.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

EMBODIMENT 29

Figure 58:
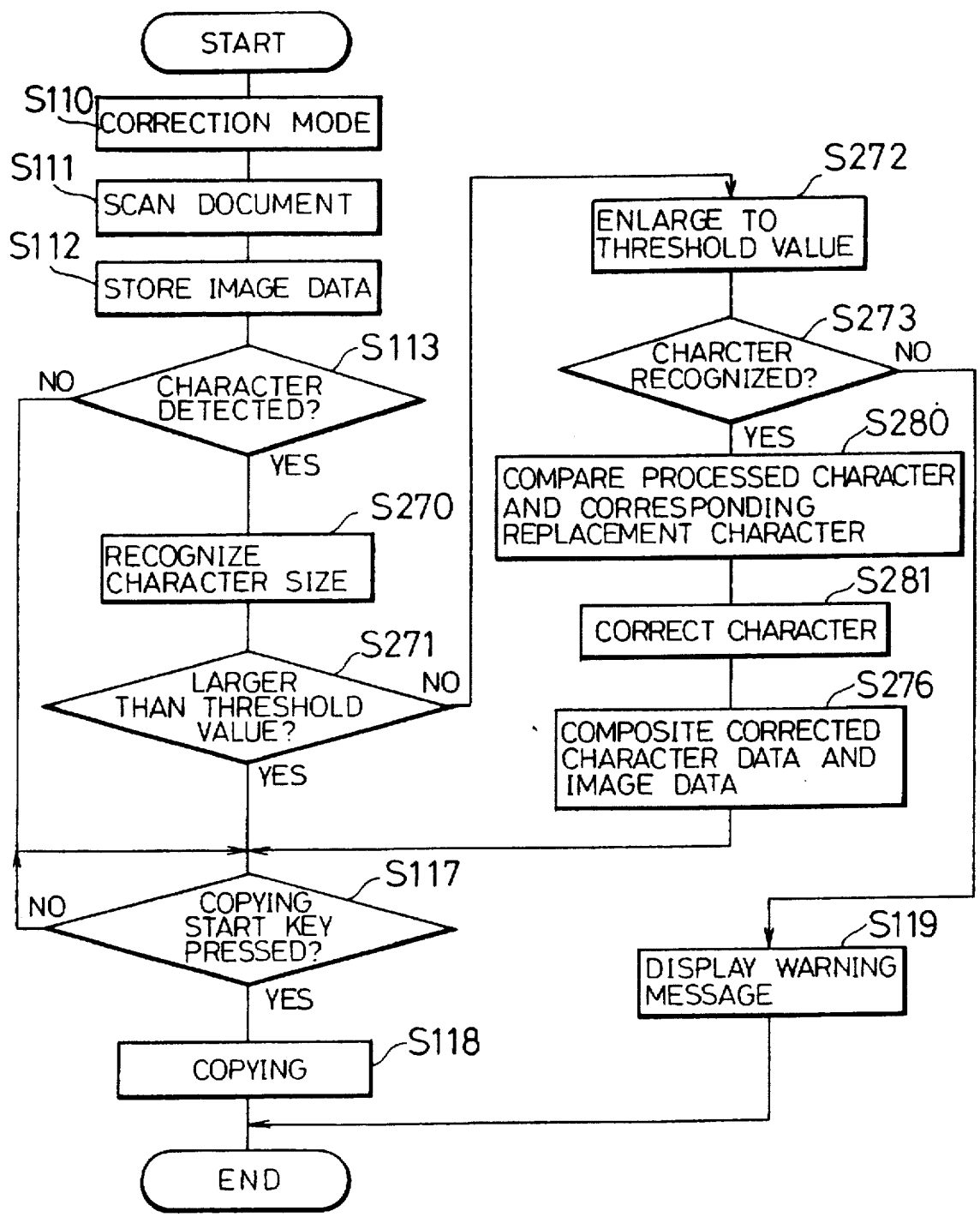
FIG. 58 is a flowchart showing the arrangement of the steps in a correction process performed by a digital copying machine as an image processor according to still another embodiment of the present invention.
Figure 59:
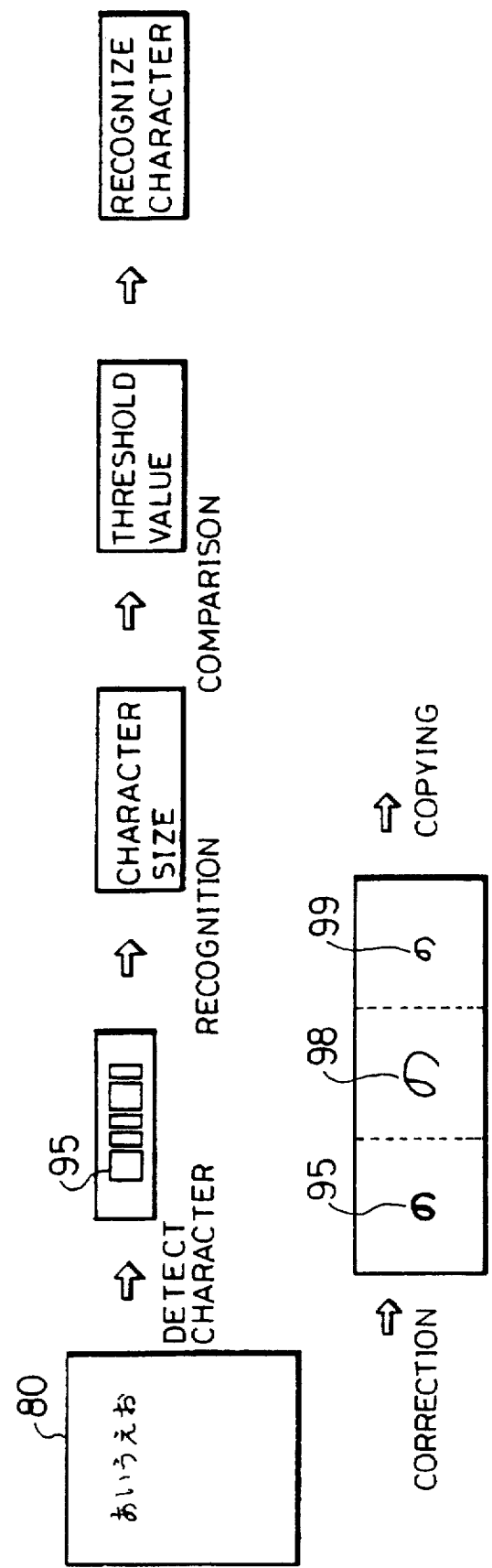
FIG. 59 is an explanatory view of the arrangement of the steps shown in FIG. 58.

The following description discusses yet another embodiment of the present invention with reference to FIGS. 58 and 59. The means having the same function as the means shown in the drawing of EMBODIMENT 28 will be designated by the same code and their description will be omitted.

In a digital copying machine as an image processor of this embodiment, when the character data enlarged by the enlarging means is recognized as a character, the character processing means in the image processing CPU 74 of EMBODIMENT 28 performs the following processing so that the character data before enlarged is recognized as the character by the recognizing section. More specifically, for example, short lines and curved lines which are the features of the character are extracted from the original character data, respectively, compared with the short lines and curved lines in the character data of a replacement character corresponding to the enlarged character data so as to cause the lines and curved lines of the original character data to have features similar to the features of the lines and curved lines of the character data of the replacement character. Except for this difference, the structure of the digital copying machine of this embodiment is the same as that of the digital copying machine of EMBODIMENT 28.

Referring now to the flowchart of FIG. 58 and FIG. 59, how the digital copying machine of this embodiment performs correction processing is explained below.

First, similar to the digital copying machine of EMBODIMENT 28, the predetermined operations are carried out to detect a character 95 (steps 110 to 113). Then, the size recognizing means recognizes the size of the character 95, and whether the size of the character 95 is larger than a predetermined threshold value or not is judged. If the size of the character 95 is larger than or equal to the threshold value, copying is performed (steps 270, 271, 117 and 118), and the correction mode comes to an end. On the other hand, if the size of the character 95 is smaller than the threshold value, the size of the character is enlarged to be equal to the threshold value, and the character is re-recognized from the enlarged character data (steps 272 and 273). Next, a replacement character 93 corresponding to the re-recognized character and the character 95 before enlarged are compared with each other in the manner described above (step 280). Subsequently, the original character 95 is corrected to become similar to the replacement character 98 (step 281). Then, the character data of a corrected character 99 and the image data of the image excluding the character data are composited (step 276), and copying is performed (steps 117 and 118). On the contrary, if the character is not re-recognized, a warning message is displayed (step 119), and the copying operation is stopped.

As described above, if characters to be appearing in a copy of the document become defaced and unreadable, the digital copying machine having this structure processes the characters so that they are easily read. It is therefore possible to prevent a virtually useless reproduced image from being formed, i.e., a worthless copy from being produced. Accordingly, the digital copying machine is handled more easily, its value is increased, and the waste of sheets is avoided. Additionally, since the copying operation is executable only when the characters are in readable condition, a satisfactory image is obtained.

As described above, the image processor of the present invention incorporates: input means for reading the image on a document; storage means for storing the image data of the document read by the input means; character detecting means for detecting character data from the image data stored in the storage means; recognizing means for recognizing a character from the character data; size recognizing means for recognizing the size of the character from the character data detected by the character detecting means; size judging means for judging whether the size of the character recognized by the size recognizing means is smaller than a predetermined readable size; enlarging means for enlarging character data at a predetermined enlargement rate to the predetermined readable size when the size judging means judges that the size of the character is smaller than the predetermined readable size; character processing means for correcting the character data before enlarged so that the character data is read as a predetermined character when the character data enlarged by the enlarging means is recognized as the predetermined character; compositing means for compositing the character data enlarged by the enlarging means and the image data; and output means for visualizing and outputting the image data composited by the compositing means.

With this structure, the character detecting means detects character data from the image data, the recognizing means recognizes a character from the character data, and the size recognizing means recognizes the size of the character from the character data. The size judging means judges whether the size of the character is smaller than a predetermined readable size. When the size of the character is smaller than the predetermined readable size, the enlarging means enlarges the character data at a predetermined enlargement rate to the predetermined readable size. When the enlarged character is recognized as the predetermined character, the character processing means corrects the character data before enlarged so that the character data is read as the predetermined character. The compositing means composites the processed character data and the image data. Thus, characters in the reproduced image of the document output through the output means are easily read.

Since the characters in the reproduced image of the document output from the output means are easily read, the digital copying machine is handled more easily and its value is increased. For example, when outputting the reproduced image onto a sheet, only a reproduced image of a practically usable size is output, thereby preventing the waste of sheets.

EMBODIMENT 30

The following description discusses yet another embodiment of the present invention with reference to FIGS. 3, 4, 5, and 60 to 63. The means having the same function as the means shown in the above-mentioned embodiments will be designated by the same code and their description will be omitted.

Figure 60:
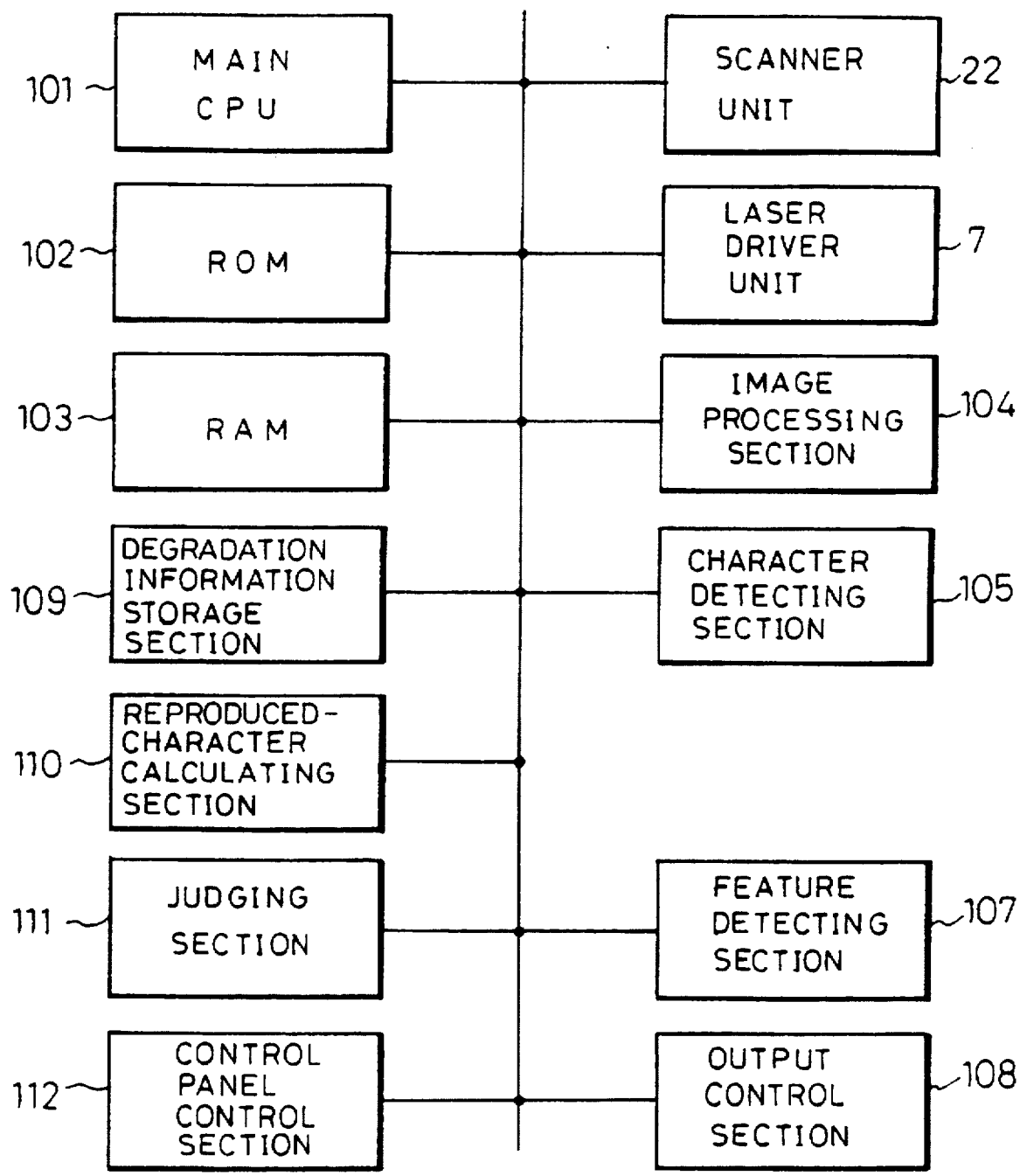
FIG. 60 is a block diagram showing the structure of a control circuit in a digital copying machine according to still another embodiment of the present invention.

A digital copying machine as an image processor of this embodiment has the structure shown in FIG. 3, the control panel 39 shown in FIG. 4, and a control circuit shown in FIG. 60. The control circuit includes a main CPU 101, ROM 102, RAM 103, image processing section 104, character detecting section 105 as character detecting means, feature detecting section 107, output control section 108, degradation information storage section 109 as degradation information storage means, reproduced-character-image calculating section 110 as reproduced-character-image calculating means, judging section 111 as judging means, and control-panel controlling section 112. These sections are respectively connected to the main CPU 101 by a bus. The output control section 108 forms output control means together with the main CPU 101.

The main CPU 101 controls the scanner unit 22 as input means, the laser driver unit 7 and other means connected thereto. The ROM 102 stores the control program for the main CPU 101. The RAM 103 stores various parameters peculiar to the present copying machine and is used as a work area when the program is executed. The image processing section 104 processes the image data of a document obtained from the scanner unit 22 and, for example, includes the image data input Section 70, image processing section 71 without the character detecting section 71i, image data output section 72, main memory 73 and image processing CPU 74 shown in FIG. 5. The image data processed in the image processing section 104 is sent to the laser driver unit 7, and a reproduced image is output in the manner described above.

The character detecting section 105 detects character data, i.e., characters in the image data, which has been input by the scanner unit 22 and is stored in the main memory 73 by, for example, the isolated graphics separating method or stroke extraction method explained in EMBODIMENT 1. The character data includes the character data of Japanese characters, Chinese characters and Roman characters in the image of the document, and data representing numerals and symbols. The feature extracting section 107 detects the feature of a character, such as the mark ".", "''" or "," a short line and curved line, or a portion enclosed by the line as is seen in the character "a" or "b", for example. The output control section 108 controls the image forming operation performed by the application of laser light from the laser driver unit 7, i.e., formation of a reproduced image on a sheet according to an instruction from the main CPU 101.

When copying is performed by the present copying machine, the degradation information storage section 109 stores the state of the reproduced image which is degraded compared with the original document image as degradation information. The reproduced-character-image calculating section 110 calculates a degraded state in respect of the features of reproduced characters corresponding to the characters detected by the feature detecting section 107 based on the degradation information, and -provides reproduced character images showing the state of the reproduced characters. Namely, the reproduced character images represent characters which are presumed to be output when copying is performed by the present digital copying machine. The judging section 111 judges whether the reproduced character images are read as predetermined characters or not. The control-panel controlling section 112 controls the display of a liquid crystal display panel 41 as warning means, for example, in the control panel section 39 according to an instruction from the main CPU 101.

Referring now to the flowchart of FIG. 61, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104.

When the scanning is complete, the character data in the image data of the document is detected by the character detecting section 105 (step 304). At this time, if the character data is not detected, the operation proceeds to step 309, the correction mode is cancelled, and copying is performed (steps 310 and 311).

On the other hand, if the character data, i.e., characters are detected from the image data in step 304, the feature detecting section 107 detects features of the characters (step 305). Then, the reproduced character image calculating section 110 calls the degradation information stored in the degradation information storage section 109 (step 306), calculates a degraded state in respect of the features of reproduced characters corresponding to the characters detected by the feature detecting section 107 based on the degradation information and copying conditions, such as enlargement, reduction and density, so as to obtain reproduced character images showing the degraded state (step 307). For example, the reproduced character images are stored in the main memory 73.

Next, the judging section 111 judges whether the reproduced character images are readable or not (step 308). A judgement is made by, for example, detecting changes in the characteristic portions of the reproduced character images, i.e., defaced, scratched, missing or touched portions, and detecting whether a proportion of the reproduced character images having changed portions after being processed by the reproduced-character-image calculating section 110 to the total number of characters processed by the calculated-character calculating section 110 is larger than a reference rate predetermined as an allowable rate. The changed portions in the reproduced character images are detected by the feature detecting section 107.

When the reproduced character images are judged to be readable in step 308, copying is performed (steps 309 to 311). On the other hand, if the reproduced character images are judged to be unreadable in step 308, outputting is controlled according to the correction mode (step 312). More specifically, a warning message is displayed under the control of the control-panel controlling section 112 to indicate that displaying a reproduced image on the liquid crystal display panel 41 of the control panel section 39 is infeasible, and outputting the image is prohibited under the control of the output control section 108.

As described above, the present digital copying machine calculates the state of characters to be appearing in a copy of the document, and gives a warning to prohibit copying when the characters are judged to be unreadable. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

Figure 62:
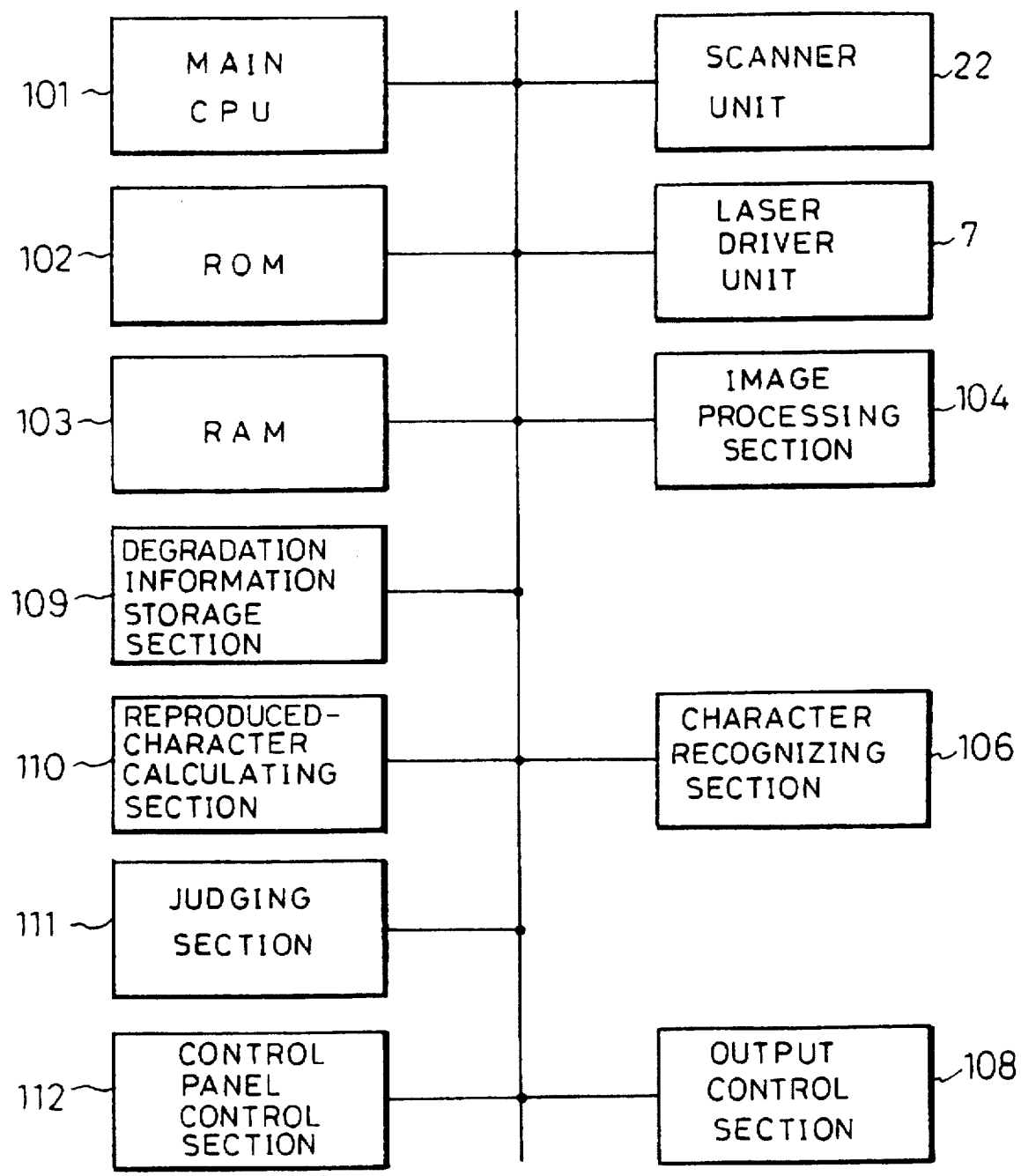
FIG. 62 is a block diagram showing another structure of a control circuit in the digital copying machine.

For instance, as illustrated in FIG. 62, it is also possible to provide a character recognizing section 106 as character detecting means instead of the character detecting section 105 and the feature detecting section 107. For example, the character recognizing section 106 detects character data from image data and recognizes the character data as predetermined characters by the superimposing method, feature extraction method or structure analysis method described in EMBODIMENT 2. A character recognizing device using optical character recognition system may be used as the character recognizing section 106.

Figure 61:
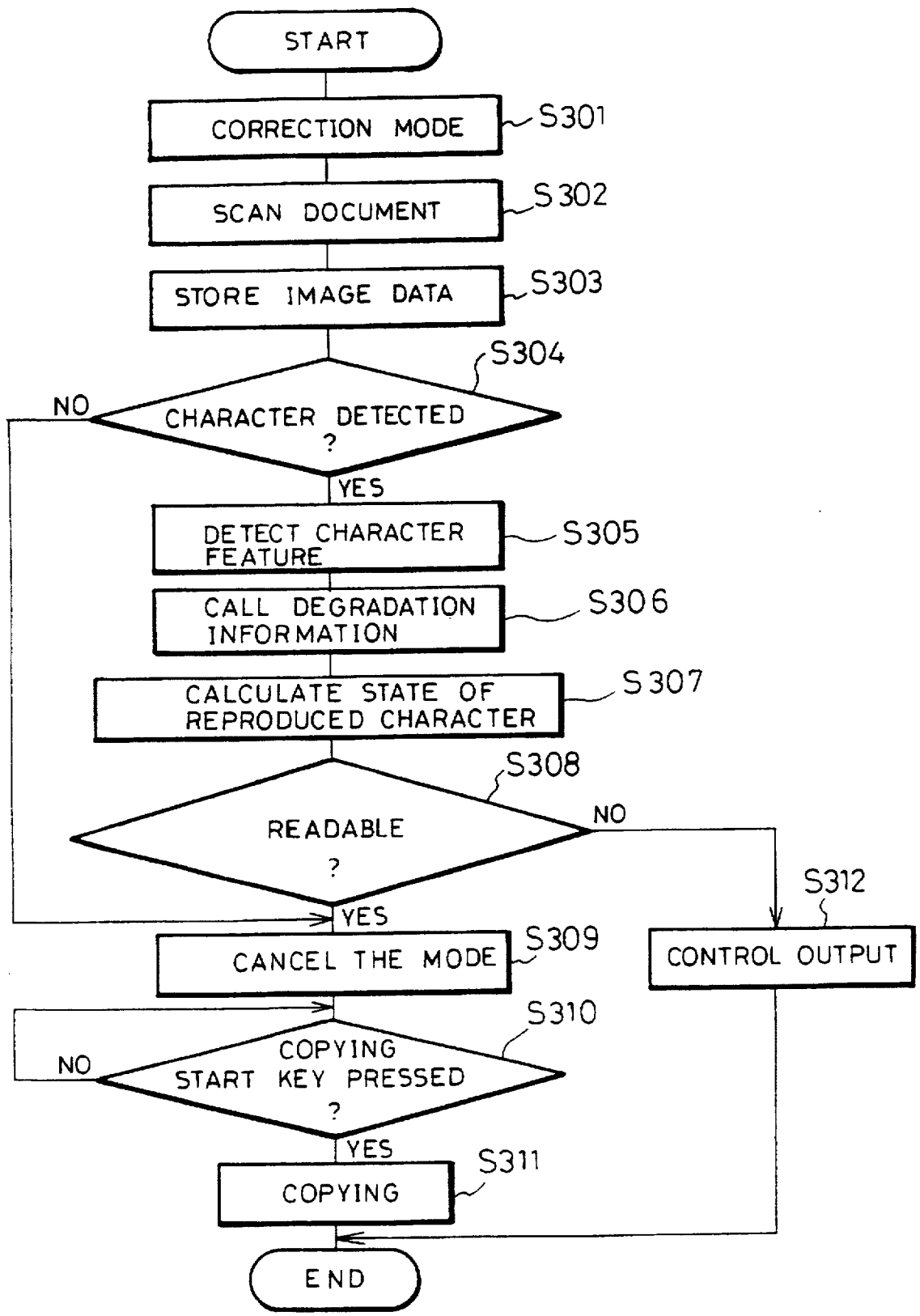
FIG. 61 is a flowchart showing the arrangement of the steps in a correction process performed by the digital copying machine having the control circuit of FIG. 60.
Figure 63:
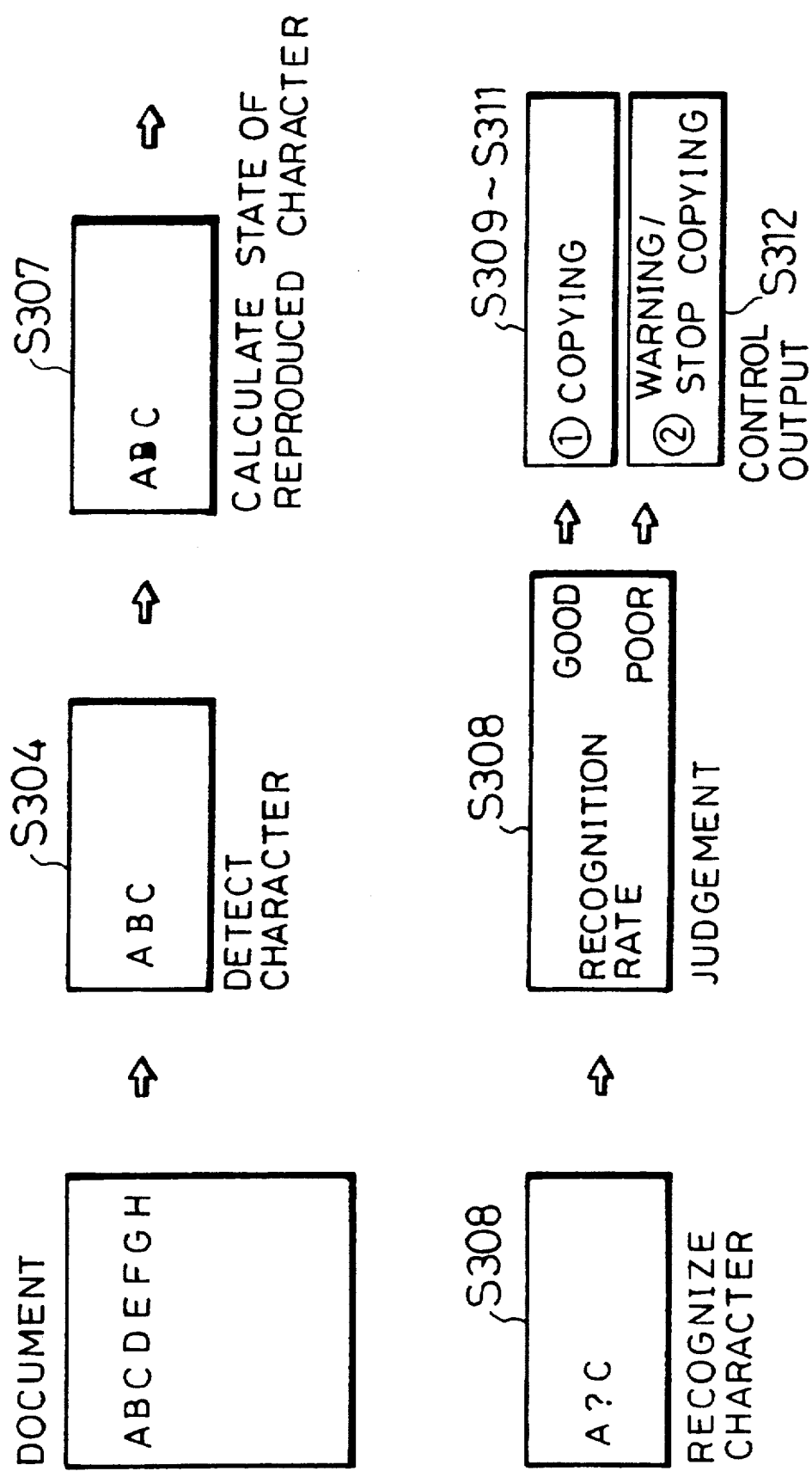
FIG. 63 is an explanatory view showing the arrangement of the steps in a correction process performed by the digital copying machine having the control circuit of FIG. 62.

With this structure, as shown in FIG. 61, the operation of step 304 judges whether there is any characters recognized by the character recognizing section 106, and therefore step 305 becomes unnecessary. Moreover, the judging section 111 judges whether the rate of character data recognized as characters by the character recognizing section 106 is high or low, for instance, whether the recognition rate is higher than a reference rate predetermined as an allowable recognition rate is judged in step 308. In this case, the process shown by the flowchart of FIG. 63 is used instead of the process shown by the flowchart of FIG. 61.

EMBODIMENT 31

Figure 64:
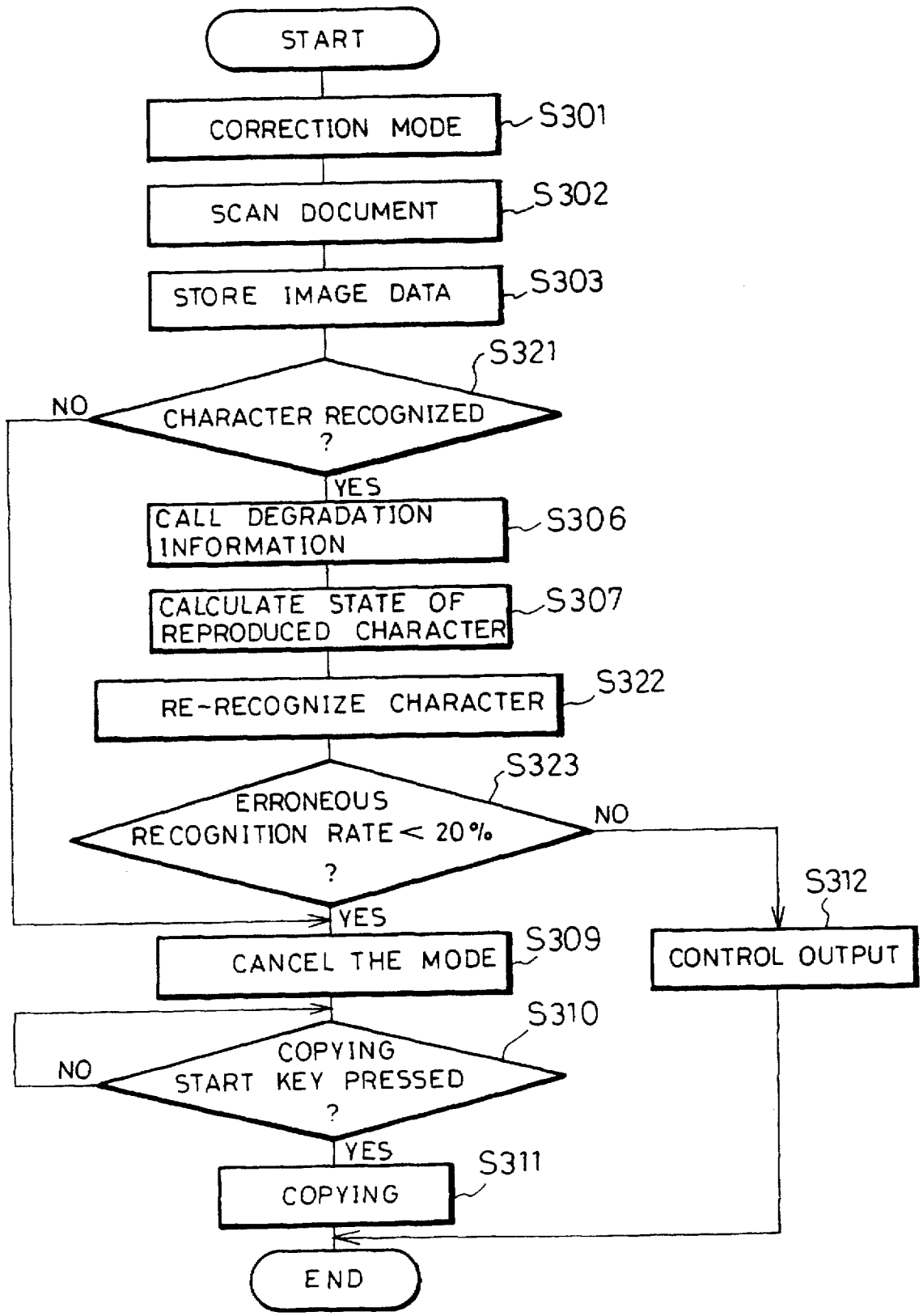
FIG. 64 is a flowchart showing the arrangement of the steps in a correction process performed by a digital copying machine as an image processor according to still another embodiment of the present invention.
Figure 65:
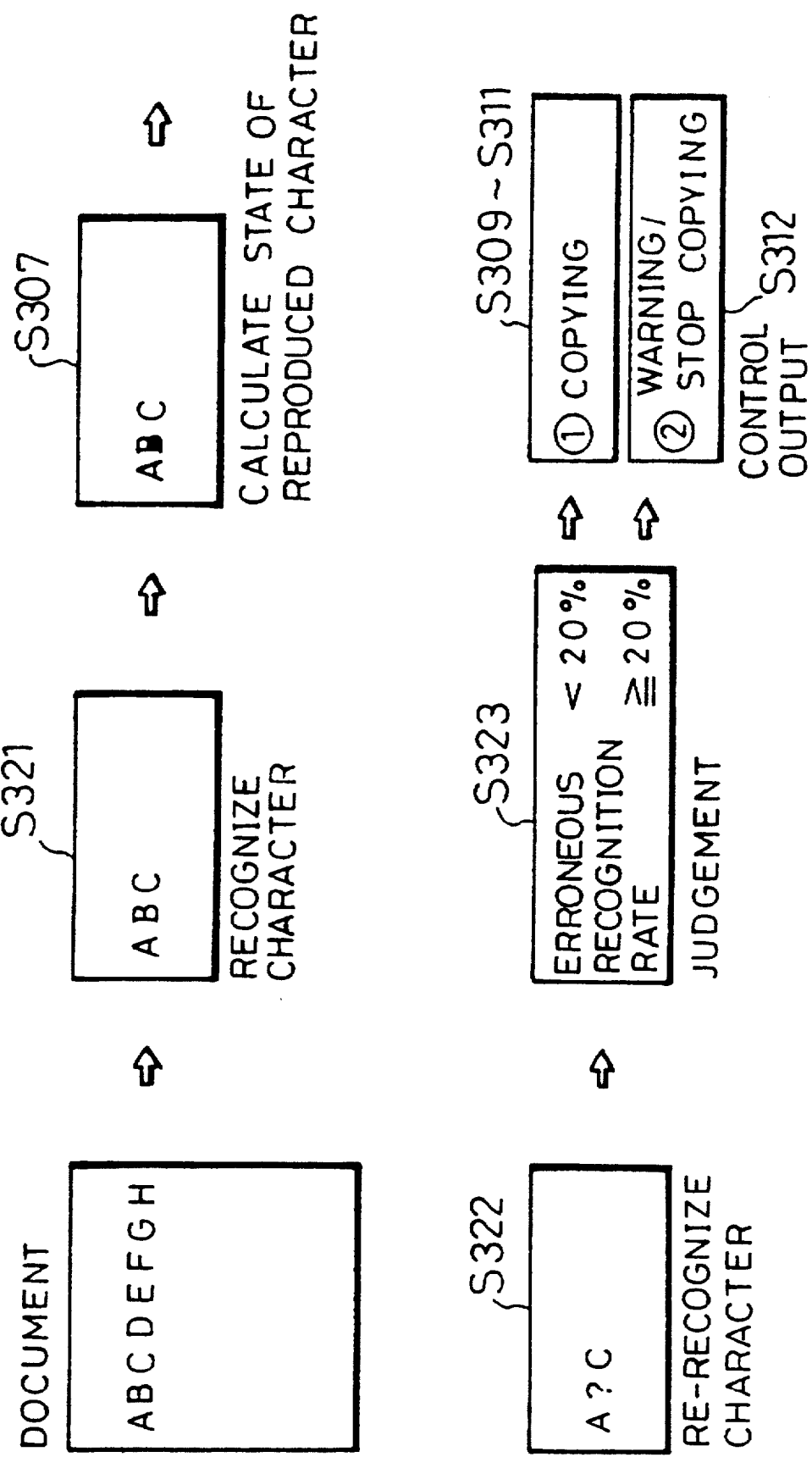
FIG. 65 is an explanatory view of the arrangement of the steps shown in FIG. 64.

The following description discusses yet another embodiment of the present invention with reference to FIGS. 62, 64 and 65. The means having the same function as the means shown in the above-mentioned embodiments will be designated by the same code and their description will be omitted.

A digital copying machine as an image processor of this embodiment has the structure shown in FIG. 62, and performs the operations shown in FIGS. 64 and 65.

Referring now to the flowchart of FIG. 64 and FIG. 65, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, recognition of the character data, i.e., characters in the image data of the document is performed by the character recognizing section 106 (step 321). At this time, if no characters are recognized, the operation proceeds to step 309, the correction mode is cancelled, and copying is performed (steps 310 and 311).

On the other hand, if characters are recognized in step 321, the number of characters recognized is stored.

Subsequently, the reproduced character image calculating section 110 calls the degradation information stored in the degradation information storage section 109 (step 306), calculates a degraded state of reproduced characters so as to obtain reproduced character images showing the degraded state (step 307).

Then, the character recognizing section 106 re-recognizes characters from the reproduced character images (step 322) and calculates the erroneous recognition rate. The erroneous recognition rate E1 is obtained as follows.

$$E1=100 \times (N1-M1)/N1$$

where N1 is the number of characters recognized in the operation of step 321 and M1 is the number of characters re-recognized in the operation of step 322.

The judging section 111 judges whether the erroneous recognition rate E1 is smaller than a predetermined value which causes characters in the reproduced image to be unreadable (step 323). In this embodiment, the predetermined value is set to 20%. If the recognition rate is lower than 20%, characters in the reproduced image of the original document are readable, and therefore copying is performed (steps 309 to 311). On the other hand, if the erroneous recognition rate is higher than or equal to 20%, characters in the reproduced image of the document are unreadable. Thus, a warning message is displayed on the liquid crystal display panel 41, and output of the image is prohibited (step 312).

As described above, the present digital copying machine recognizes characters in the image of a document, calculates reproduced character images showing the state of characters to be appearing in a copy of the document, re-recognizes characters from the reproduced character images, and gives a warning to prohibit copying if the erroneous recognition rate in recognizing the original characters from the reproduced character images is higher than a predetermined value. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 32

Figure 66:
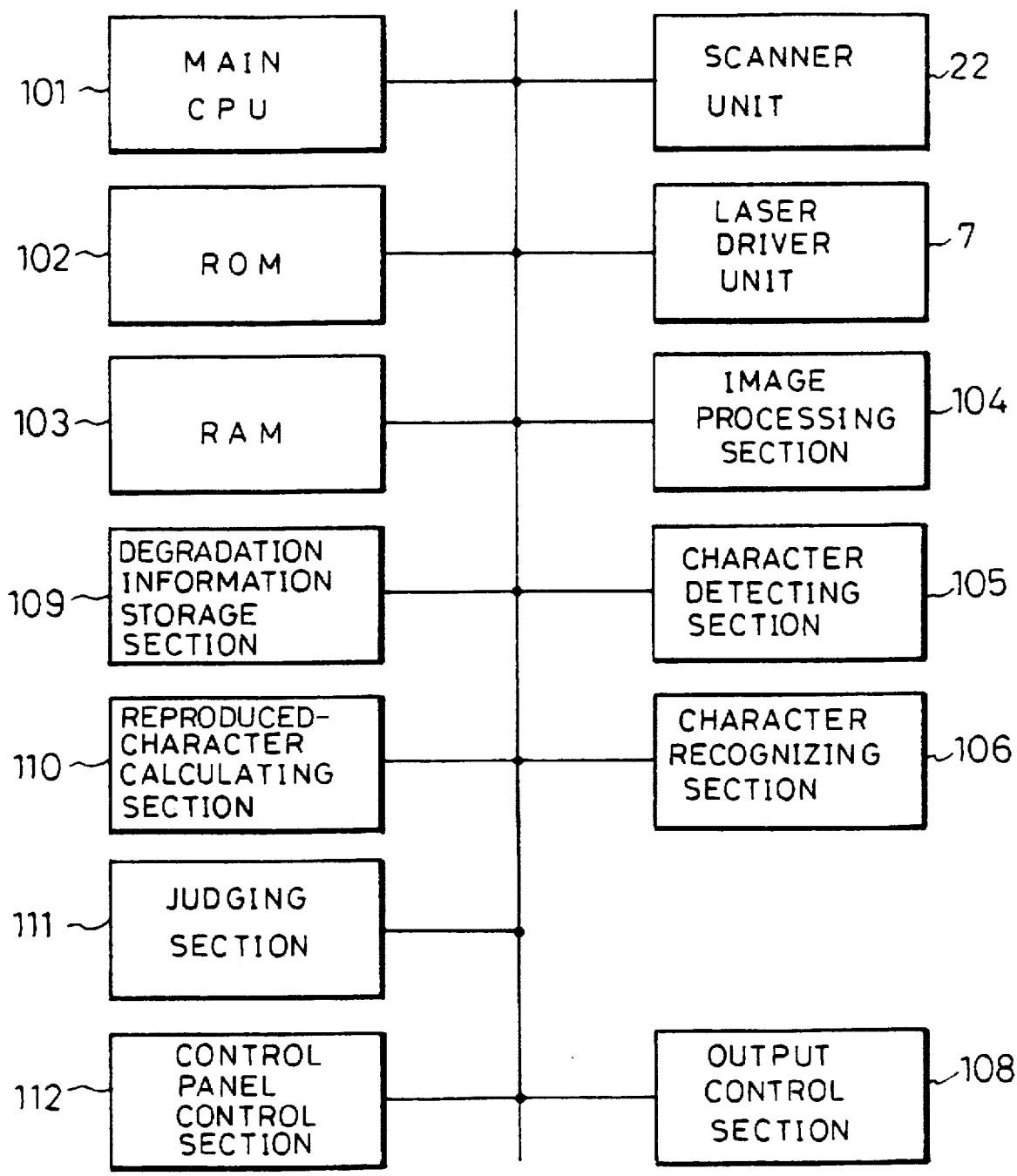
FIG. 66 is a block diagram showing the structure of a control circuit in a digital copying machine according to still another embodiment of the present invention.
Figure 67:
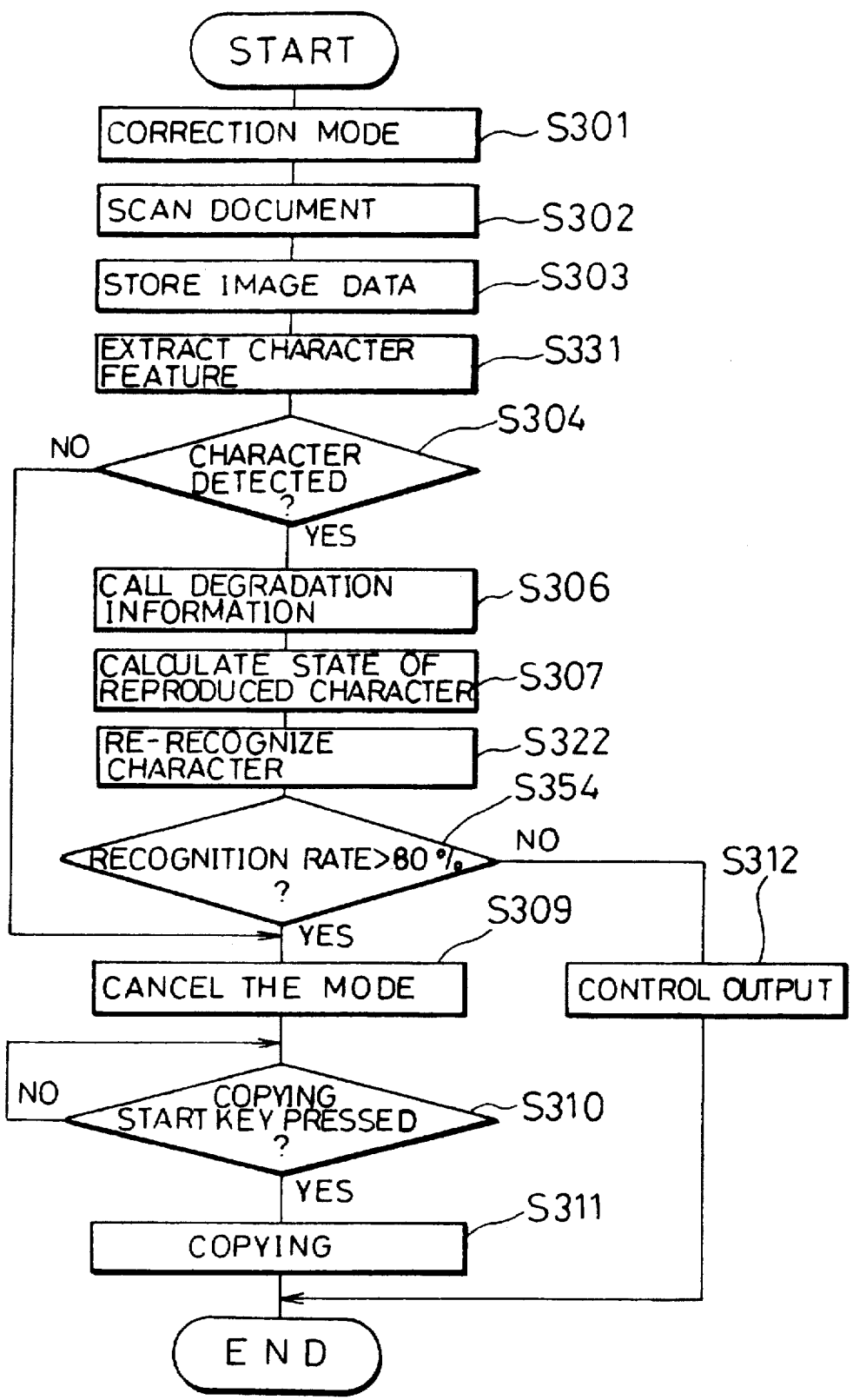
FIG. 67 is a flowchart showing the arrangement of the steps in a correction process performed by the digital copying machine of FIG. 66.
Figure 68:
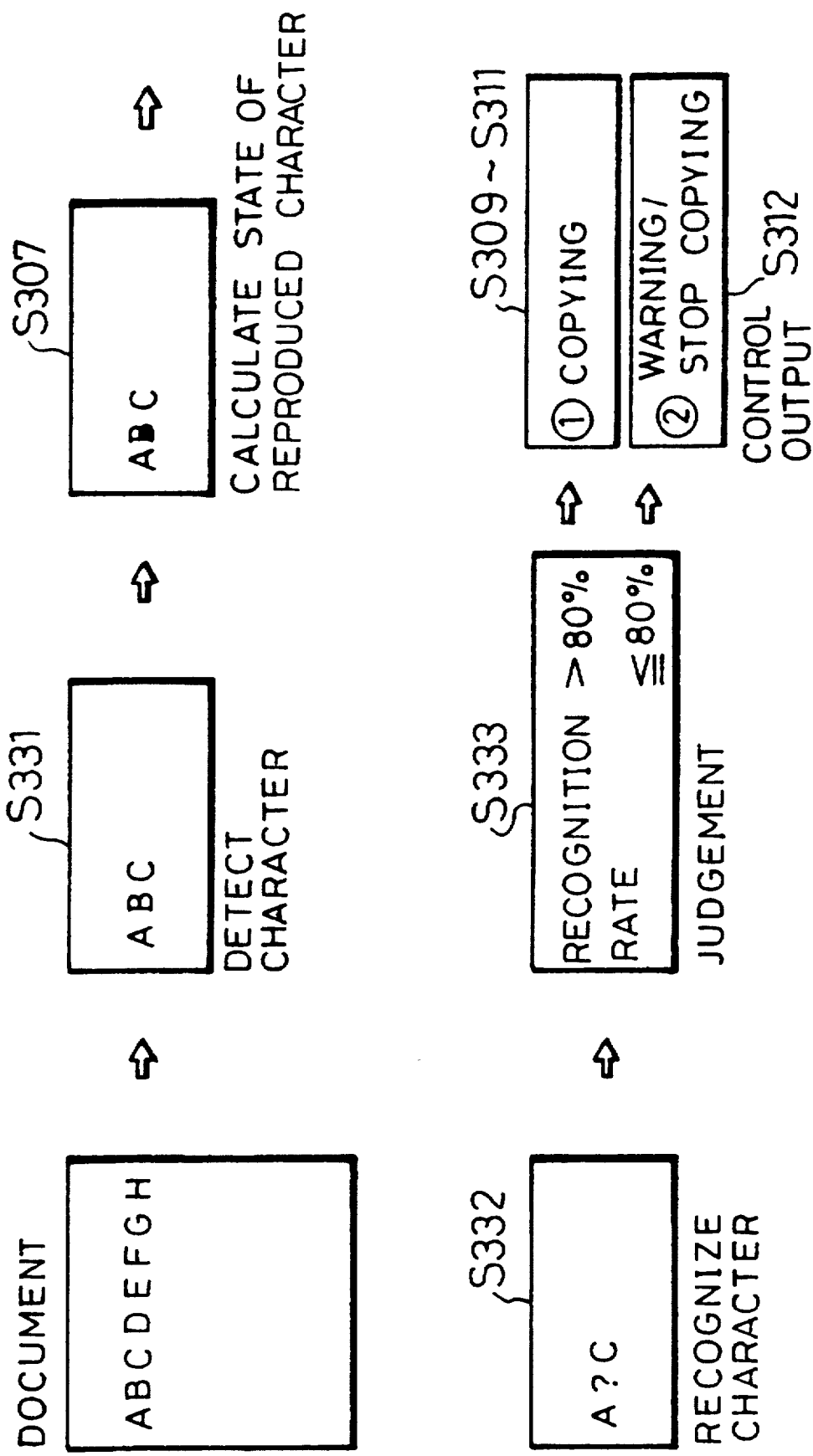
FIG. 68 is an explanatory view of the arrangement of the steps shown in FIG. 67.

The following description discusses yet another embodiment of the present invention with reference to FIGS. 66, 67 and 68. The means having the same function as the means shown in the above-mentioned embodiments will be designated by the same code and their description will be omitted.

A digital copying machine as an image processor of this embodiment has the structure shown in FIG. 66, and performs the operations shown in FIGS. 67 and 68. In this embodiment, the character detecting section 105 shown in FIG. 66 detects characters by extracting the features of the characters. More specifically, the character detecting section 105 detects characters by separating the image data into units of connected graphics based on the features of characters as being small, isolated, or arranged in a predetermined state, and judging whether the size of a rectangle circumscribing a unit of graphics coincides with the character size. The character recognizing section 106 recognizes characters from the reproduced character images.

Referring now to the flowchart of FIG. 67 and FIG. 68, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character detecting section 105 detects character data, i.e., characters in the image data of the document by extracting the features of the characters (step 331). At this time, if characters are not detected, copying is performed (steps 309 to 311).

On the other hand, if characters are detected in step 304, the number of characters detected is stored. Next, the reproduced character image calculating section 110 calls the degradation information stored in the degradation information storage section 109 (step 306), calculates a degraded state of characters to be appearing in a copy of the document so as to form reproduced character images showing the degraded state (step 307).

Then, the character recognizing section 106 recognizes characters from the reproduced character images (step 332), and calculates the recognition rate. The recognition rate E2 is obtained as follows.

$$E2=100 \times M2/N2$$

where N2 is the number of characters detected in step 331 and M2 is the number of characters recognized in step 332.

Then, the judging section 11 judges whether the recognition rate E2 is larger than a predetermined value which causes characters in the reproduced image to be unreadable (step 333). In this embodiment, the predetermined value is set to 80%. If the recognition rate is higher than 80%, characters in the reproduced image of the document are readable, and therefore copying is performed (steps 309 to 311). On the other hand, if the recognition rate is lower than or equal to 80%, characters in the reproduced image of the document are unreadable. Thus, a warning message is displayed on the liquid crystal display panel 41, and outputting the image is prohibited (step 312).

As described above, the present copying machine detects characters in the image of a document, calculates reproduced character images showing the state of characters to be appearing in a copy of the document, recognizes characters from the reproduced character images, and gives a warning to prohibit copying when the ratio of the number of characters recognized from the reproduced character images to the total number of the recognized characters, i.e., the recognition rate becomes lower than a predetermined value. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 33

Figure 69:
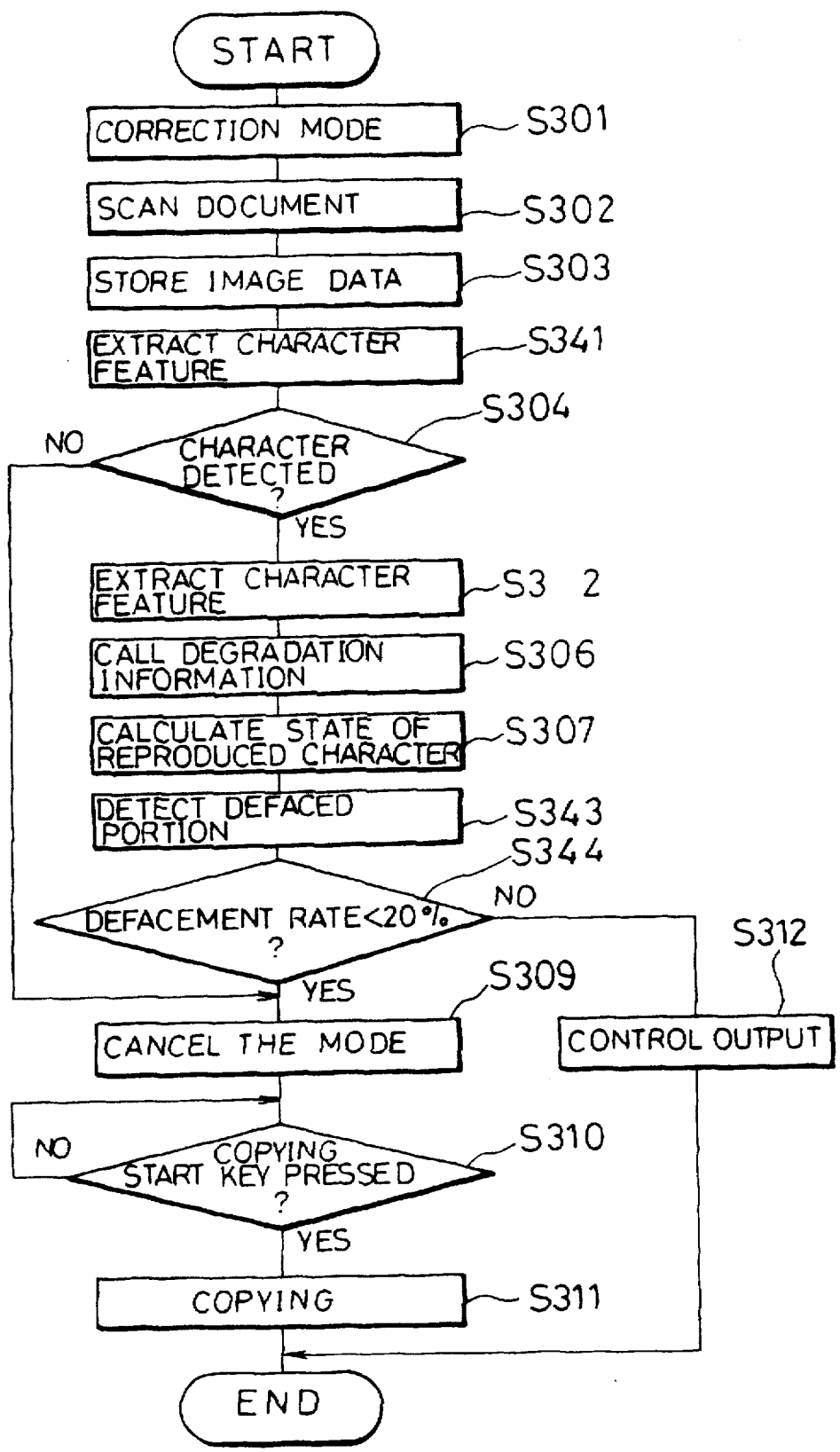
FIG. 69 is a flowchart showing the arrangement of the steps in a correction process performed by a digital copying machine as an image processor according to still another embodiment of the present invention.
Figure 70:
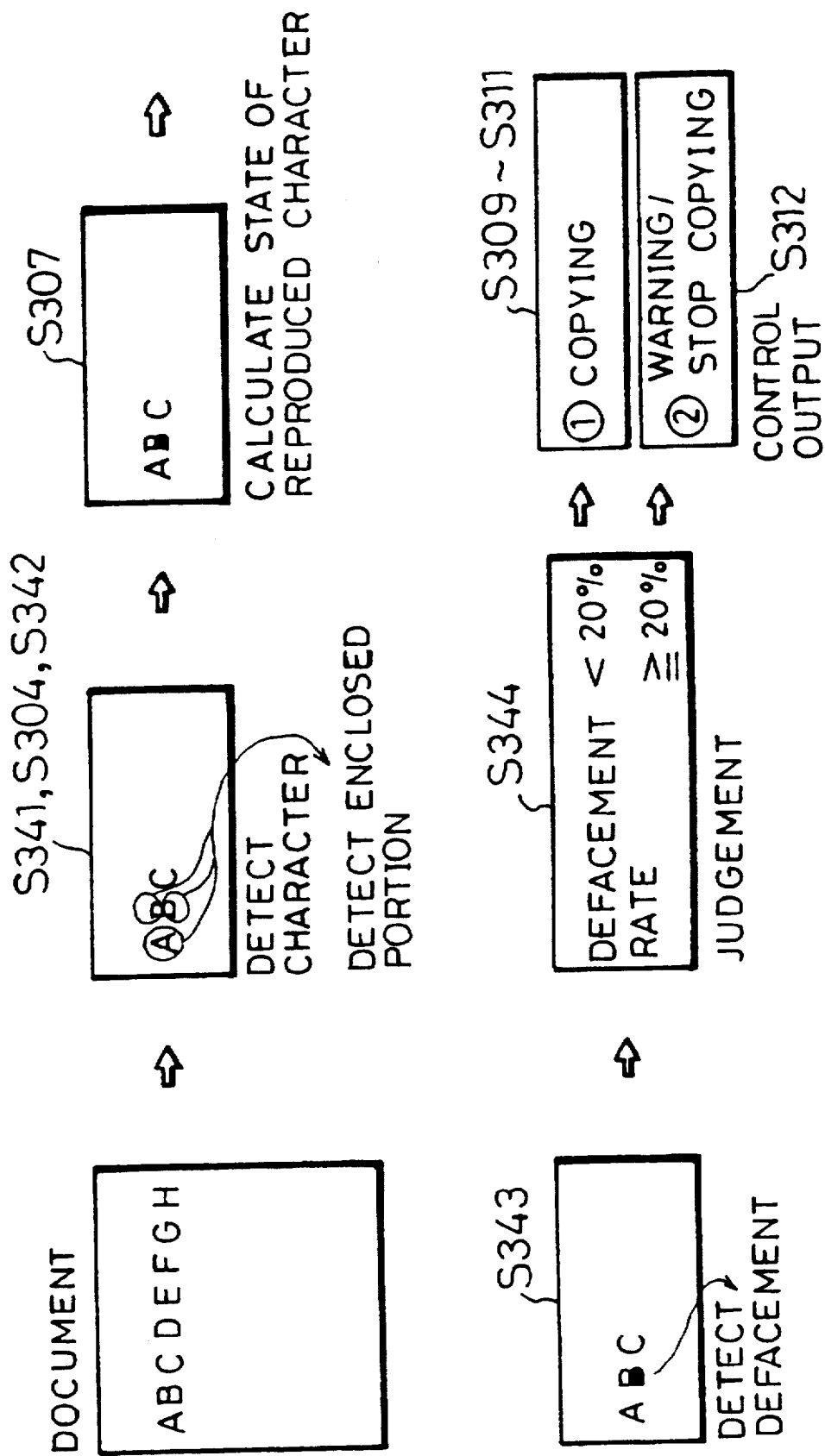
FIG. 70 is an explanatory view of the arrangement of the steps shown in FIG. 69.

The following description discusses yet another embodiment of the present invention with reference to FIGS. 60, 69 and 70. The means having the same function as the means shown in the above-mentioned embodiments will be designated by the same code and their description will be omitted.

A digital copying machine as an image processor of this embodiment has the structure shown in FIG. 60, and performs the processes shown in FIGS. 69 and 70. In this embodiment, the character detecting section 105 shown in FIG. 60 detects characters by extracting the features of characters. More specifically, the character detecting section 105 detects characters by separating the image data into units of connected graphics based on, for example, the features of characters as being small, isolated, or arranged in a predetermined state, and judging whether the size of a rectangle which is provided to circumscribe a unit of graphics coincides with the character size. The feature detecting section 107 as enclosed-portion detecting means detects an empty portion enclosed by the outline of the character, i.e., a feature of the character, for example, an upper portion of the character "A", upper and lower portions of the character Referring now to the flowchart of FIG. 69 and FIG. 70, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character detecting section 105 detects character data, i.e., characters in the image data of the document by extracting the features of the characters (step 341). At this time, if characters are not detected, copying is performed (steps 309 to 311).

On the other hand, if characters are detected in step 304, the feature detecting section 107 detects a portion enclosed by the outline of the character (step 342). Next, the reproduced character image calculating section 110 calls the degradation information stored in the degradation information storage section 109 (step 306), calculates a degraded state of the reproduced characters in respect of the portions enclosed by the outline of the characters, detected by the feature detecting section 107, based on the degradation information and set copying conditions, such as enlargement, reduction and density, so as to form reproduced character images showing the degraded state (step 307). For example, the reproduced character images are stored in the main memory 73.

Then, the feature detecting section 107 detects defacement of the portion enclosed by the outline in the reproduced character image (step 343). The defacement means a state where, for example, empty space enclosed by the outline of the character "B" shown in FIG. 70 disappears.

Next, the judging section 111 calculates a defacement rate in respect of reproduced character images, and judges whether the defacement rate is lower than a predetermined value of 20%, which causes characters in the reproduced image to be unreadable (step 344). The defacement rate E3 is obtained as follows.

$$E3 = 100 \times M3/N3$$

where N3 is the number of enclosed portions detected in step 342 and M3 is the number of defaced portions detected in step 343. The operations in steps 343 and 344 are performed by the feature detecting section 107 and the judging section 111 functioning as judging means.

If the defacement rate is lower than 20%, characters to be appearing in a copy of the document are readable, and therefore copying is performed (steps 309 to 311). On the other hand, if the defacement rate is higher than or equal to 20%, characters to be appearing in the copy of the original document are unreadable. Thus, a warning message is displayed on the liquid crystal display panel 41 and outputting the image is prohibited (step 312).

As described above, the present copying machine detects portions enclosed by the outline of characters in the image of a document, calculates a defacement rate in respect of the enclosed portions in a reproduced image of the document, and gives a warning to prohibit copying when the defacement rate becomes higher than a predetermined value. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 34

Figure 71:
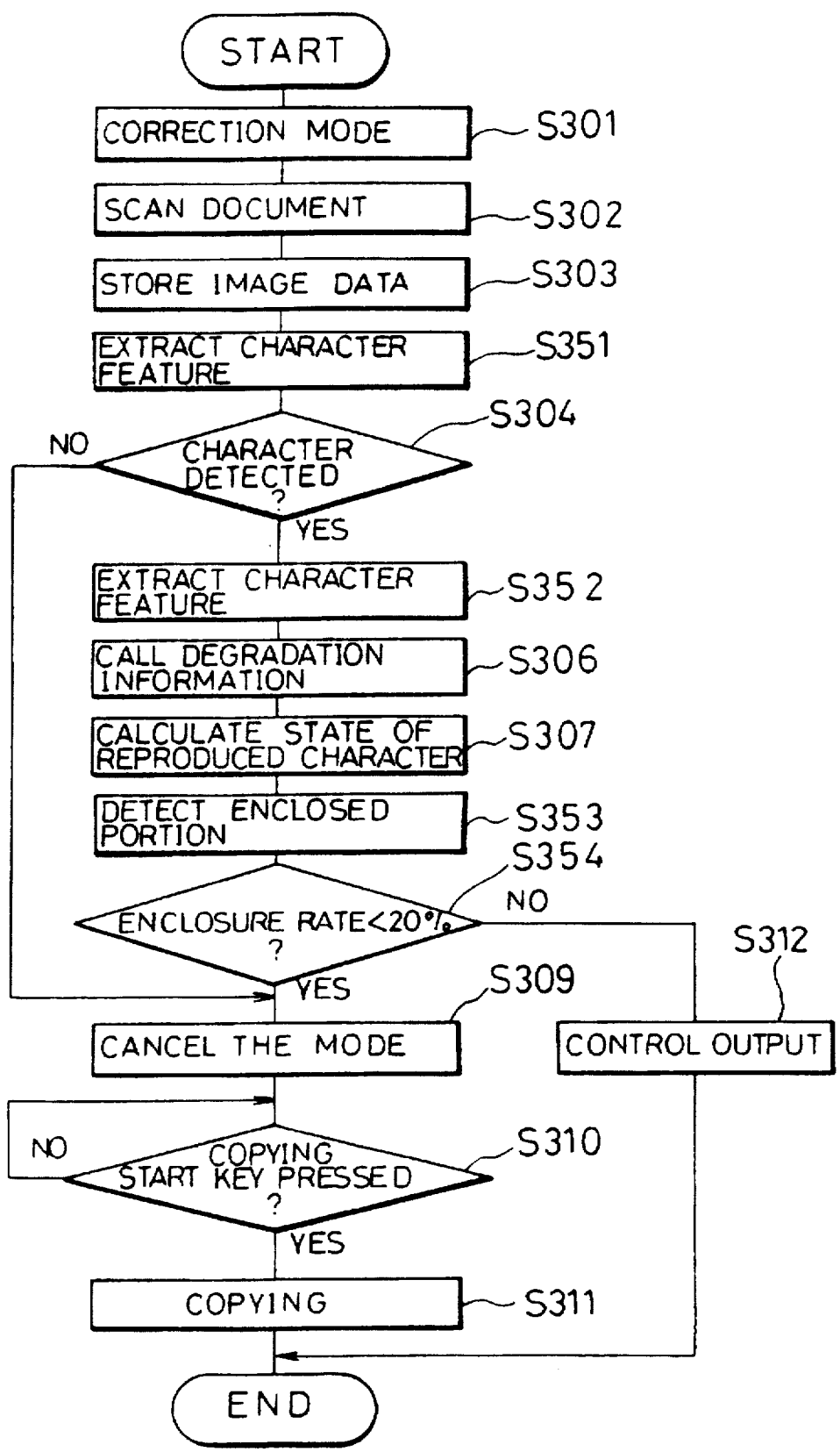
FIG. 71 is a flowchart showing the arrangement of the steps in a correction process performed by a digital copying machine as an image processor according to still another embodiment of the present invention.
Figure 72:
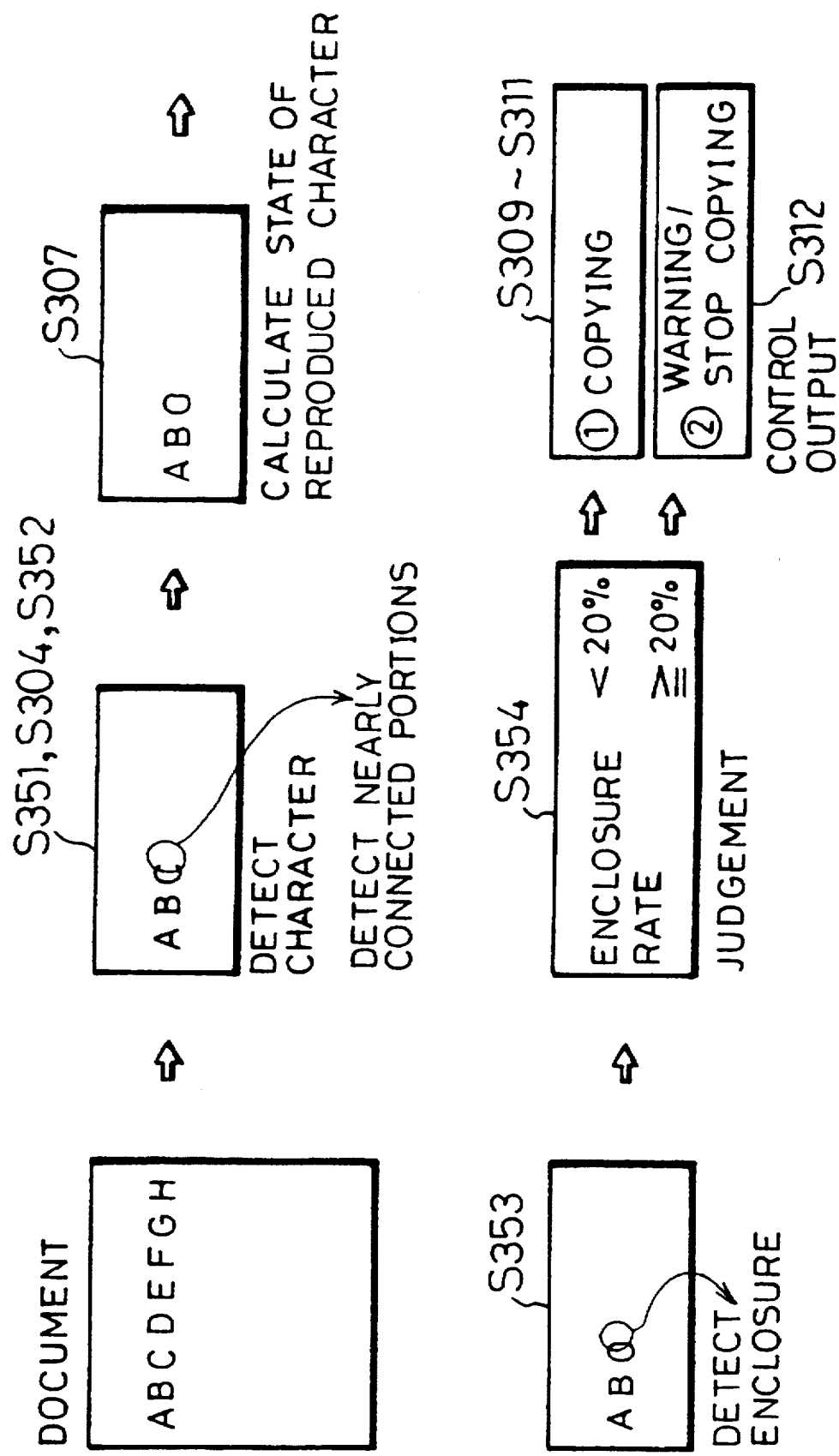
FIG. 72 is an explanatory view of the arrangement of the steps shown in FIG. 71.

The following description discusses yet another embodiment of the present invention with reference to FIGS. 60, 71 and 72. The means having the same function as the means shown in the above-mentioned embodiments will be designated by the same code and their description will be omitted.

A digital copying machine as an image processor of this embodiment has the structure shown in FIG. 60, and performs the operations shown in FIGS. 71 and 72. In this embodiment, a character detecting section 105 shown in FIG. 60 detects characters by extracting the features of characters. Moreover, the feature detecting section 107 similar to the character detecting section shown in EMBODIMENT 33 detects a feature of a character, i.e., a portion which is likely to be enclosed by closely located lines as the outline of the character when a copy is produced. For example, the character C has such a likely enclosed portion.

Referring now to the flowchart of FIG. 71 and FIG. 72, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character detecting section 105 detects character data, i.e., characters in the image data of the document by extracting the features of the characters (step 351). At this time, if characters are not detected (step 304), copying is performed (steps 309 to 311).

On the other hand, if characters are detected in step 304, the feature detecting section 107 detects the likely enclosed portions of the characters (step 352). Next, the reproduced character image calculating section 110 calls the degradation information stored in the degradation information storage section 109 (step 306), calculates a degraded state in respect of the likely enclosed portions of reproduced character to be appearing in a copy of the of the document based on the degradation information and set copying conditions such as enlargement, reduction or density so as to form reproduced character images showing the degraded state (step 307).

Subsequently, the feature detecting section 107 detects a portion enclosed by closely located lines among the likely enclosed portions (step 353).

Then, the judging section 111 calculates the enclosure rate in the reproduced character images, and judges whether the enclosure rate is lower than a predetermined value of 20%, which causes characters in the reproduced image of the document to be unreadable (step 354). The enclosure rate E4 is obtained as follows.

$$E4 = 100 \times M4/N4$$

where N4 is the number of likely enclosed portions detected in step 352 and M4 is the number of enclosed portions detected in step 353. The operations of steps 353 and 354 are performed by the feature detecting section 107 and judging section 111 functioning as judging means.

If the enclosure rate is lower than 20%, characters to be appearing in a copy of the document are readable, and therefore copying is performed (steps 309 to 311). On the other hand, if the enclosure rate is higher than or equal to 20%, characters to be appearing in the copy of the document are unreadable. Then, a warning message is displayed on the liquid crystal display panel 41, and outputting the image is prohibited (step 312).

As described above, the present digital copying machine detects portions of characters in the image of a document, which are likely to be enclosed by closely located lines when a copy of the document is produced, calculates the enclosure rate indicating the rate of the likely enclosed portions to be enclosed in the copy, and gives a warning to prohibit copying when the enclosure rate is higher than a predetermined value. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 35

Figure 73:
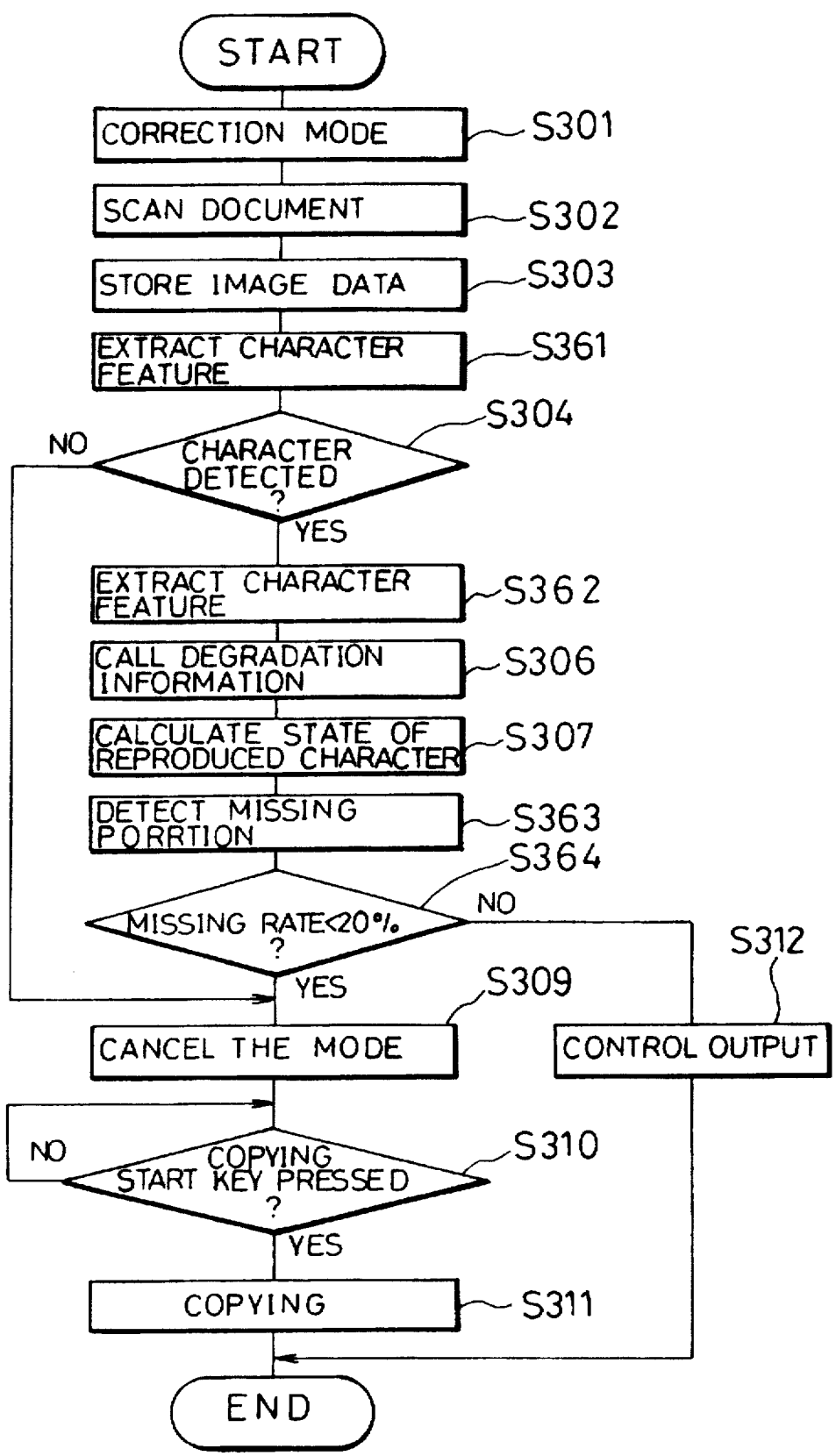
FIG. 73 is a flowchart showing the arrangement of the steps in a correction process performed by a digital copying machine as an image processor according to still another embodiment of the present invention.
Figure 74:
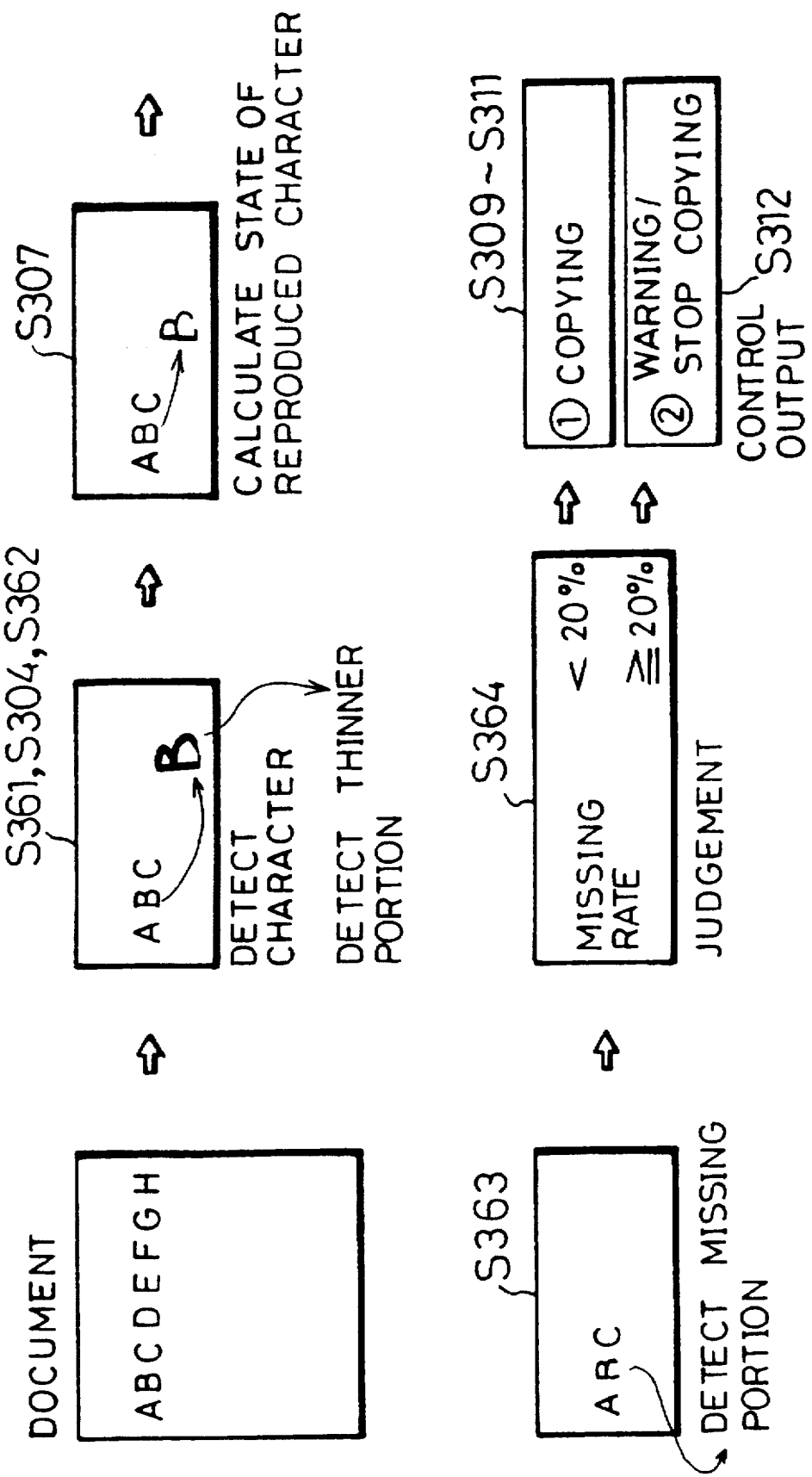
FIG. 74 is an explanatory view of the arrangement of the steps shown in FIG. 73.

The following description discusses yet another embodiment of the present invention with reference to FIGS. 60, 73 and 74. The means having the same function as the means shown in the above-mentioned embodiments will be designated by the same code and their description will be omitted.

A digital copying machine as an image processor of this embodiment has the structure shown in FIG. 60, and performs the operations shown in FIGS. 73 and 74. In this embodiment, like the character detecting section 105 described in EMBODIMENT 33, the character detecting section 105 shown in FIG. 60 detects characters by extracting the features of characters. The feature detecting section 107 detects likely missing portions as the features of characters, i.e., thinner portions in the outline of characters which may appear missing in a copy of the document.

Referring now to the flowchart of FIG. 73 and FIG. 74, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character detecting section 105 detects character data, i.e., characters in the image data of the document by extracting the features of the characters (step 361). At this time, if characters are not detected (step 304), copying is performed (steps 309 to 311).

On the other hand, if characters are detected in step 304, the feature detecting section 107 detects likely missing portions of characters (step 362). Subsequently, the reproduced character image calculating section 110 calls the degradation information stored in the degradation information storage section 109 (step 306), calculates a degraded state of the likely missing portions of characters after copied based on the degradation information and set copying conditions, such as enlargement, reduction and density, so as to form reproduced character images showing the degraded state (step 307).

Then, the feature detecting section 107 detects interrupted portions of lines, i.e., missing portions from the likely missing portions of the reproduced character images (step 363).

The judging section 111 calculates the missing rate in the reproduced character images, and judges whether the missing rate is lower than a predetermined value of 20%, which causes characters in the reproduced image to be unreadable (step 364). The missing rate E5 is obtained as follows.

$$E5=100 \times M5/N5$$

where N5 is the number of likely missing portions detected in step 362 and M5 is the number of missing portions detected in step 363. The operations in steps 363 and 364 are performed by the feature detecting section 107 and the judging section 111 functioning as judging means.

If the missing rate is lower than 20%, characters to be appearing in the copy of the document are readable, and therefore copying is performed (steps 309 to 311). On the other hand, if the missing rate is higher than or equal to 20%, characters to be appearing in the copy of the document are unreadable. Then, a warning message is displayed on the liquid crystal display panel 41, and outputting the image is prohibited (step 312).

As described above, the present digital copying machine detects portions where the line becomes thinner and is likely to be missing in a reproduced image of the document, calculates the missing rate, i.e., a rate of portions to disappear in the reproduced image, and gives a warning to prohibit copying when the missing rate is higher than a predetermined value. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 36

Figure 75:
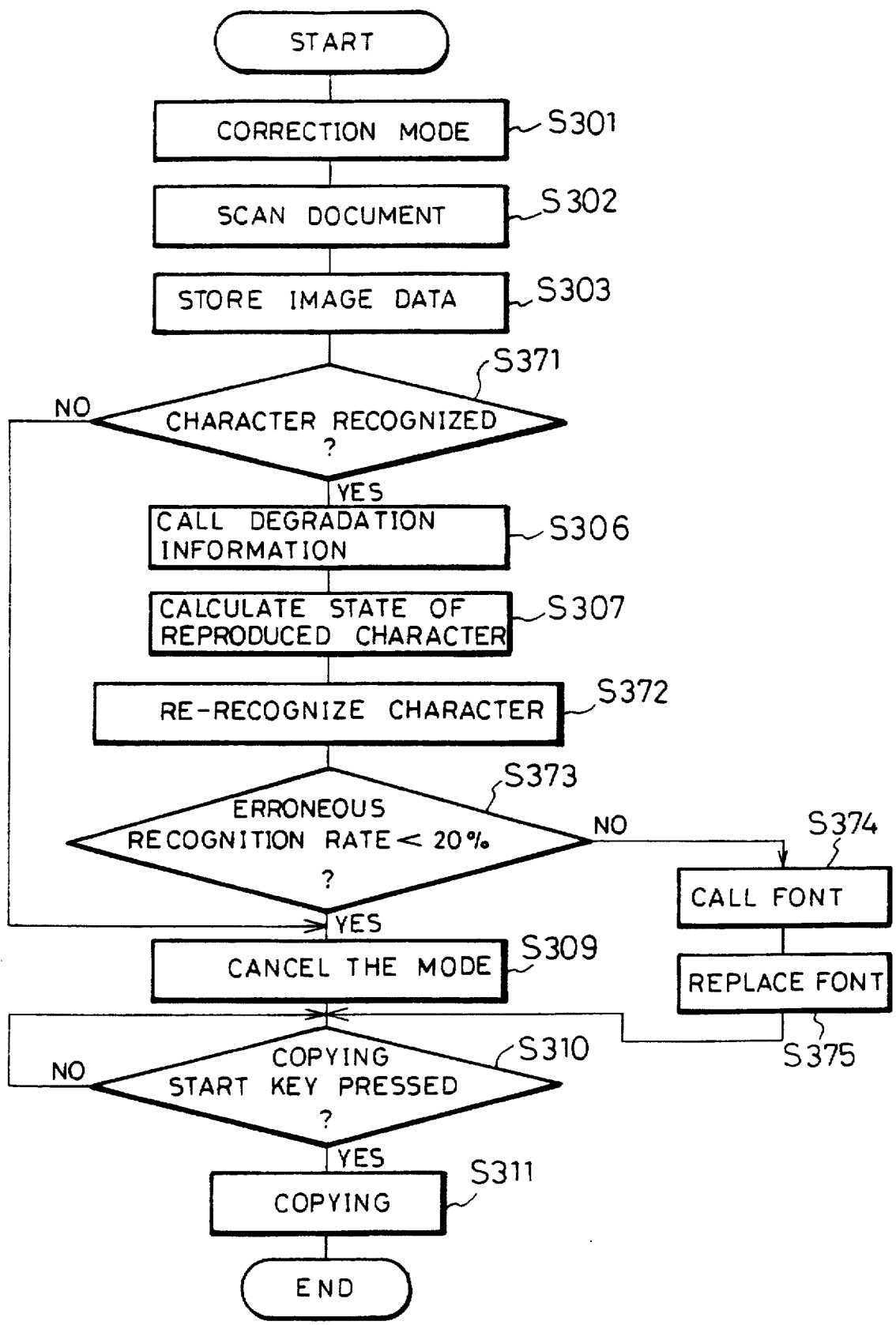
FIG. 75 is a flowchart showing the arrangement of the steps in a correction process performed by a digital copying machine as an image processor according to still another embodiment of the present invention.
Figure 76:
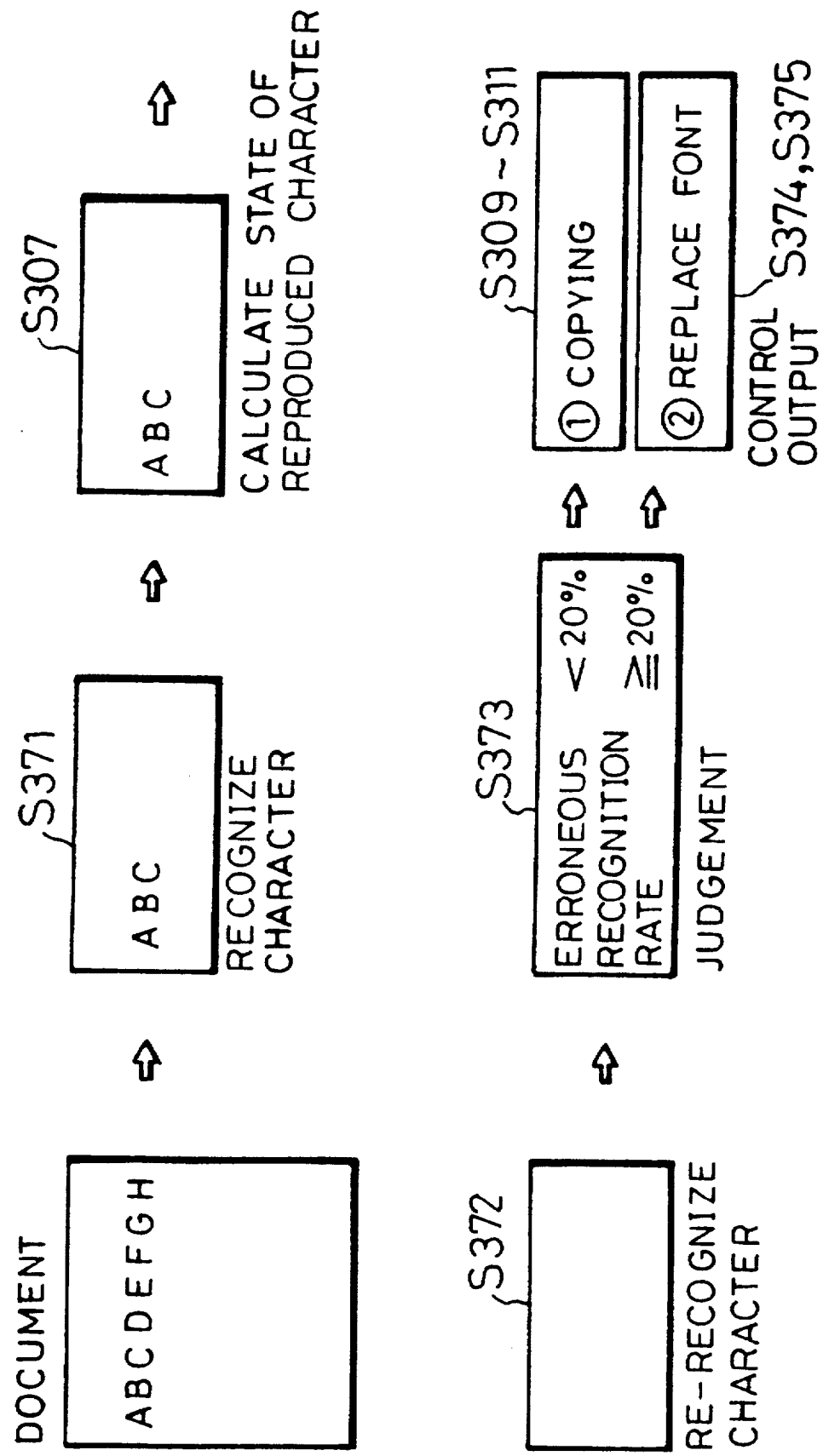
FIG. 76 is an explanatory view of the arrangement of the steps shown in FIG. 75.

The following description discusses yet another embodiment of the present invention with reference to FIGS. 62, 75 and 76. The means having the same function as the means shown in the above-mentioned embodiments will be designated by the same code and their description will be omitted.

A digital copying machine as an image processor of this embodiment has the structure shown in FIG. 62, and performs the operations shown in FIGS. 75 and 76. In this embodiment, the main memory 73 as replacement character storage means in the image processing section 104 shown in FIG. 62 stores data of fonts of various sizes as replacement characters corresponding to characters.

Referring now to the flowchart of FIG. 75 and FIG. 76, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character recognizing section 106 recognizes character data, i.e., characters in the image data of the document (step 371). At this time, if characters are not recognized, copying is performed (steps 309 to 311).

On the other hand, if characters are recognized, the number of characters recognized are stored. Next, the reproduced-character-image calculating section 110 calls the degradation information stored in the degradation information storage section 109 (step 306), calculates a degraded state of the characters after copying so as to form reproduced character images showing the degraded state (step 307).

Then, the character recognizing section 106 re-recognizes characters from the reproduced character images (step 372), and calculates the erroneous recognition rate. The erroneous recognition rate E1 is obtained in the manner explained in EMBODIMENT 31.

$$E1=100\times(N1-M1)/N1$$

where N1 is the number of characters recognized in step 371 and M1 is the number of characters re-recognized in step 372.

The judging section 111 judges whether the erroneous recognition rate E1 is lower than a predetermined value of 20% (step 373). If the erroneous recognition rate E1 is lower than 20%, characters to be appearing in a copy of the document are readable, and therefore copying is performed (steps 309 to 311).

On the other hand, if the erroneous recognition rate is higher than or equal to 20%, characters to be appearing in the copy of the document become hard to read. Then, a font of a size equal to the size of characters recognized in step 371 is called (step 374) to replace the characters with the font (step 375), and copying is then performed (steps 310 and 311). The operation in step 375 is the same as that of the character replacing means in the image processing CPU of the image processing section 104.

As described above, the present digital copying machine recognizes characters in the image of a document, calculates reproduced character images showing the state of characters to be appearing in a copy of the document, re-recognizes characters from the reproduced character images, replaces the characters with a font of a size equal to the character size when the erroneous recognition rate in recognizing characters from the reproduced character images becomes higher than a predetermined value compared to previous recognition of characters. It is therefore possible to prevent a virtually useless reproduced image from being output, i.e., a worthless copy from being produced. Accordingly, the digital copying machine is handled more easily, its value is increased, and the waste of sheets is avoided. Additionally, since the copying operation is executable only when characters are in readable condition, a satisfactory image is obtained.

EMBODIMENT 37

The following description discusses yet another embodiment of the present invention with reference to FIGS. 77 to 80. The means having the same function as the means shown in the above-mentioned embodiments will be designated by the same code and their description will be omitted.

Figure 77:
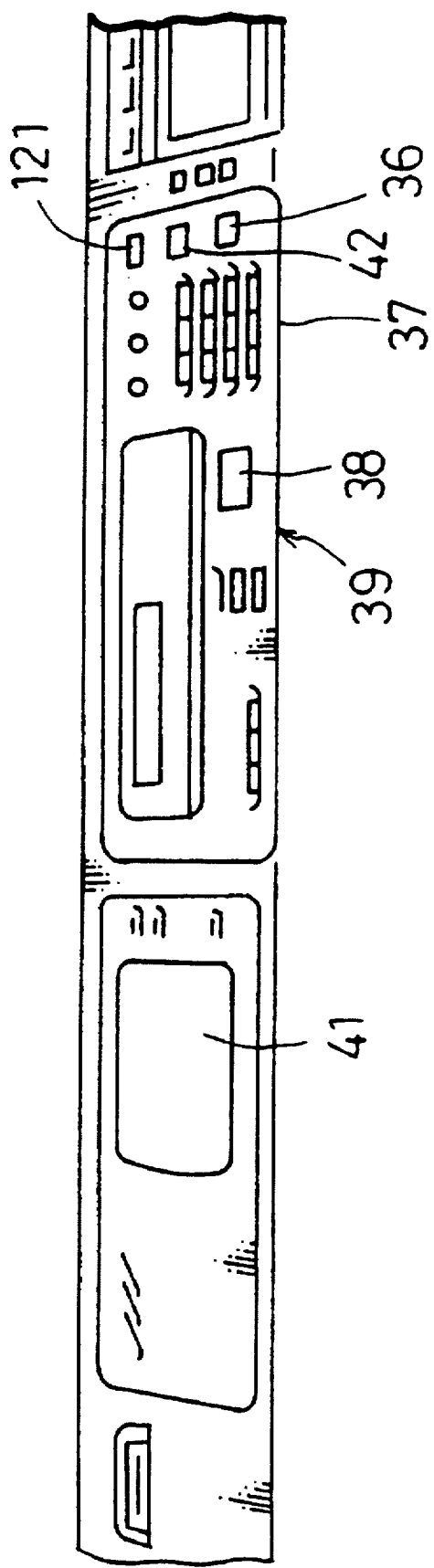
FIG. 77 is a perspective view showing a control panel section in a digital copying machine according to still another embodiment of the present invention.
Figure 78:
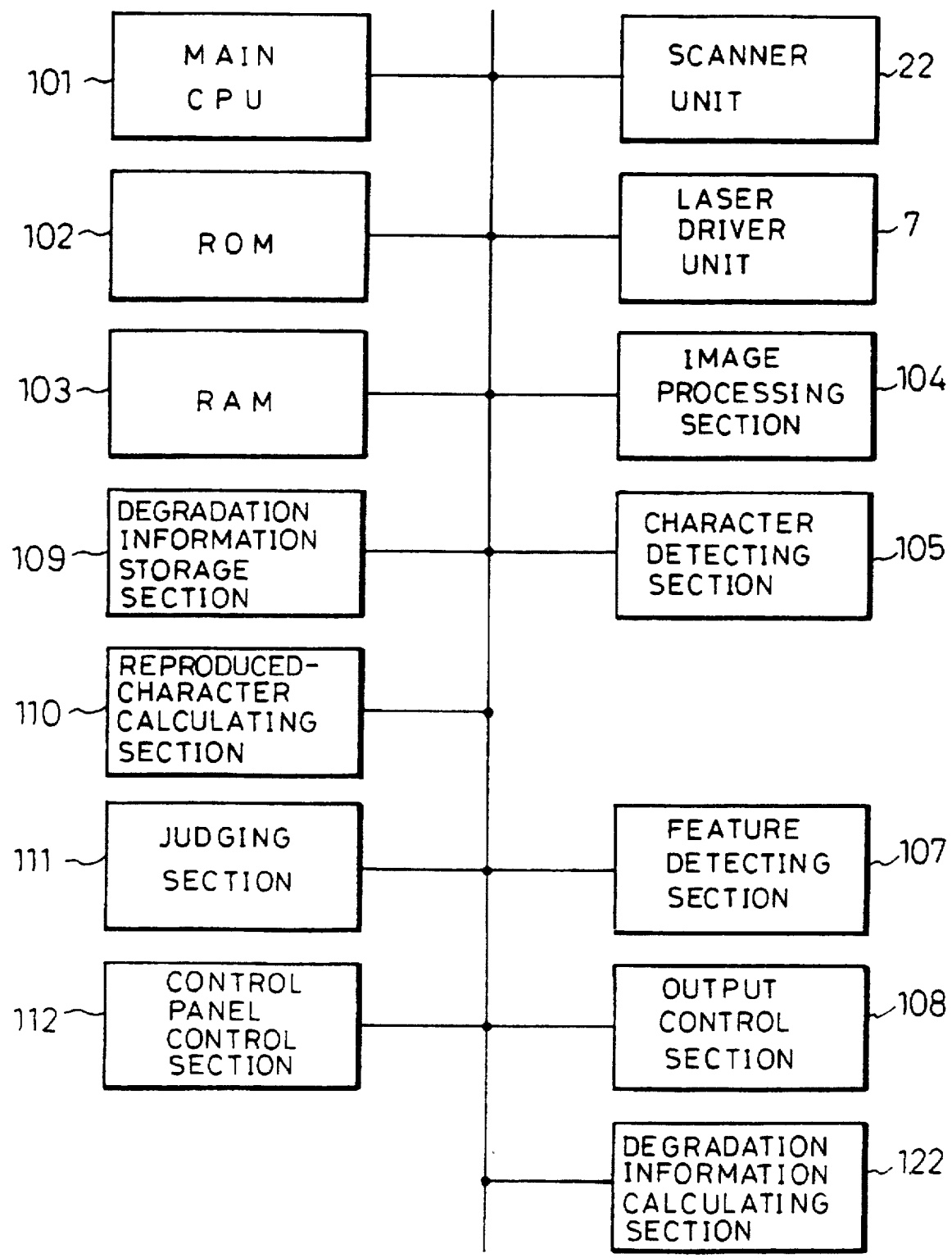
FIG. 78 is a block diagram showing the structure of a control circuit in the digital copying machine.

As illustrated in FIG. 77, the digital copying machine as an image processor of this embodiment has a degradation information input mode key 121 in the control panel section 39 shown in FIG. 4, instead of the reduction mode key 40. The present digital copying machine has the structure shown in FIG. 78, and performs the operations shown in FIGS. 79 and 80 for inputting the degradation information when the degradation information input mode key 121 is pressed. The degradation information in the digital copying machine is obtained by producing a copy of a document and comparing the document image and a reproduced image formed by copying. The degradation information is calculated by a degradation information calculating section 122 shown in FIG. 78 in a manner described hereinbelow.

Figure 79:
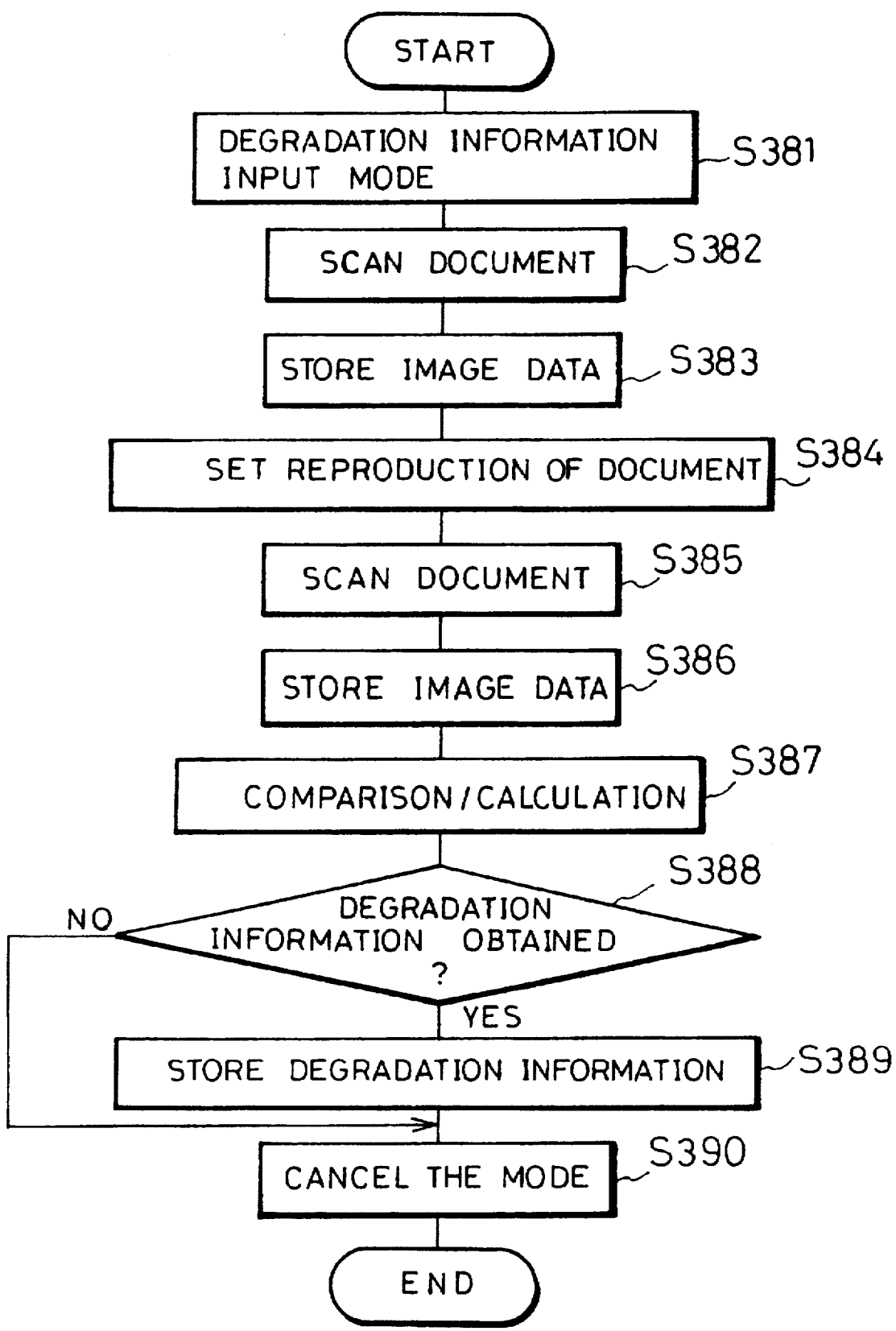
FIG. 79 is a flowchart showing the arrangement of the steps in a degradation information input process performed by the digital copying machine.
Figure 80:
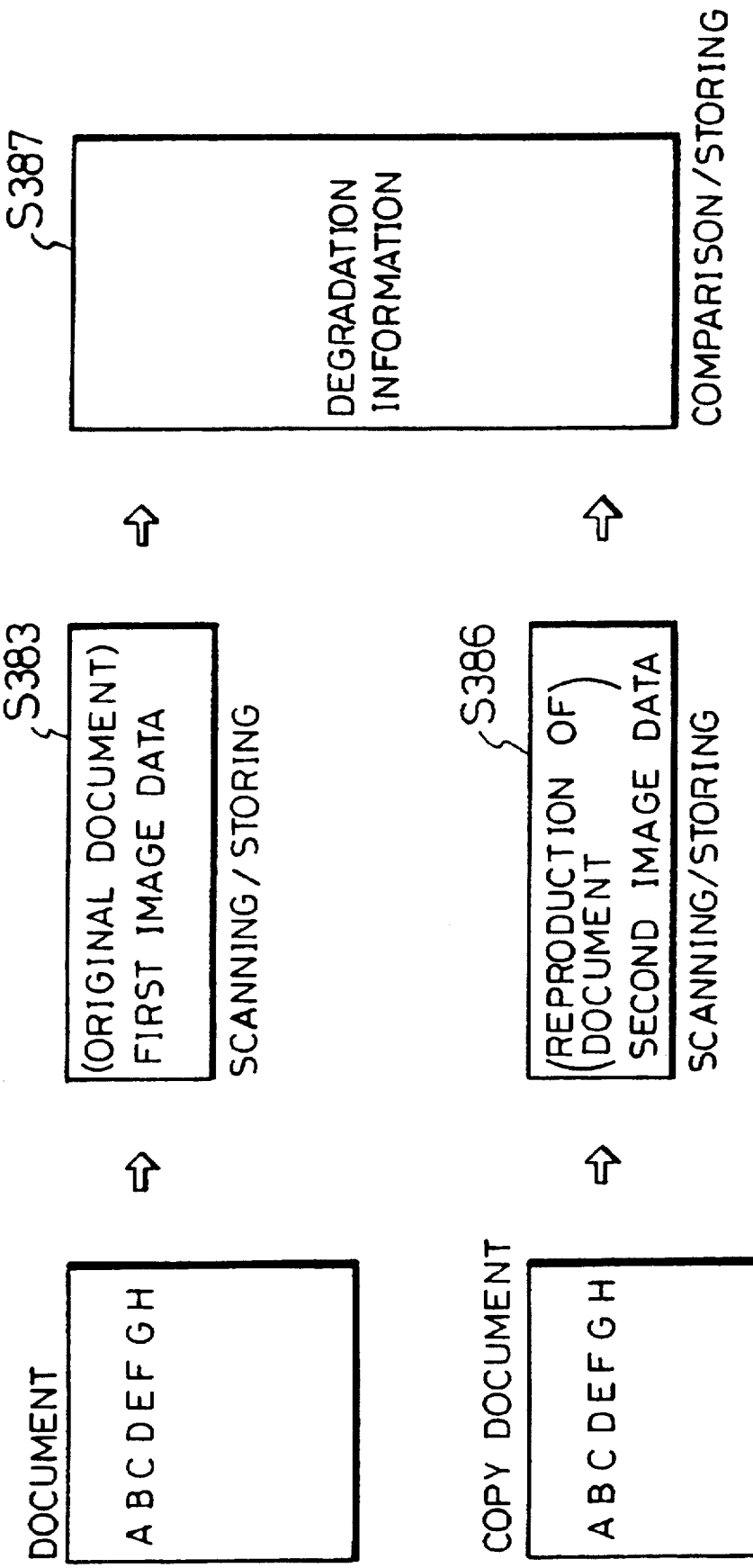
FIG. 80 is an explanatory view of the arrangement of the steps shown in FIG. 79.

Referring now to the flowchart of FIG. 79 and FIG. 80, how the digital copying machine of this embodiment inputs degradation information is explained below.

When the degradation information input key 121 is pressed while the document is placed on the document platen 27 for obtaining degradation information, the digital copying machine turns into the degradation information input mode under the control of the main CPU 101 (step 381). Then, the document is scanned by the scanner unit 22 (step 382), the image data (first image data) of the document is stored in the main memory 73 of the image processing section 104 (step 383), and copying of the document is performed.

When a copy of the document produced by the copying operation is placed (step 384) as a document on the document platen 27, the scanner unit 22 scans the copy of the document (step 385) and stores the image data (second image data) of the copy of the document in the main memory 73 of the image processing section 104 (step 386).

Scanning of the original in step 382 and scanning of the reproduction start, for example, when a document sensor detects the original or the reproduction placed on a predetermined position on the document platen 27. During scanning in step 385, the document set on the document platen 27 can be detected as a copy of the original by outputting a mark for distinguishing a reproduction of the document from the original together with the document image when making a copy from the original and judging whether there is the mark in the document to be scanned. The above-mentioned scanning operations may be started by pressing the copying start key 38.

Next, the character detecting section 105 detects character data from the image data of the original document and from the image data of the copy of the document, respectively. The degradation information calculating section 122 compares these character data to detect changes in the characters in the character data, for example, changes in the line widths of the characters, the straightness of the outline and the sharpness of the edge portions, unevenness in the density, variations in the density, scratched portions or smudges. Moreover, the degradation information calculating section 122 calculates the degradation information from the rate of changes (step 387).

If the degradation information is not obtained from the operation in step 387 (step 388), the degradation information input mode is cancelled (step 390), and the operation comes to an end. On the other hand, if the degradation information is obtained, the degradation information is stored in the degradation information storage section 109 (step 389), the degradation information input mode is cancelled (step 390), and the operation comes to an end.

The degradation information thus obtained is used in the same way as the degradation information stored in the degradation information storage section 109 of EMBODIMENTS 30 to 36.

As described above, the digital copying machine having the structure of this embodiment produces a copy of a document, and compares the original and the copy to obtain degradation information. It is therefore possible to obtain accurate degradation information. With the use of the degradation information, whether copying is available or not is correctly judged, and thereby certainly preventing outputting of a virtually useless reproduced image.

EMBODIMENT 38

The following description discusses yet another embodiment of the present invention with reference to FIGS. 81 to 85. The means having the same function as the means shown in the above-mentioned embodiments will be designated by the same code and their description will be omitted.

Figure 81:
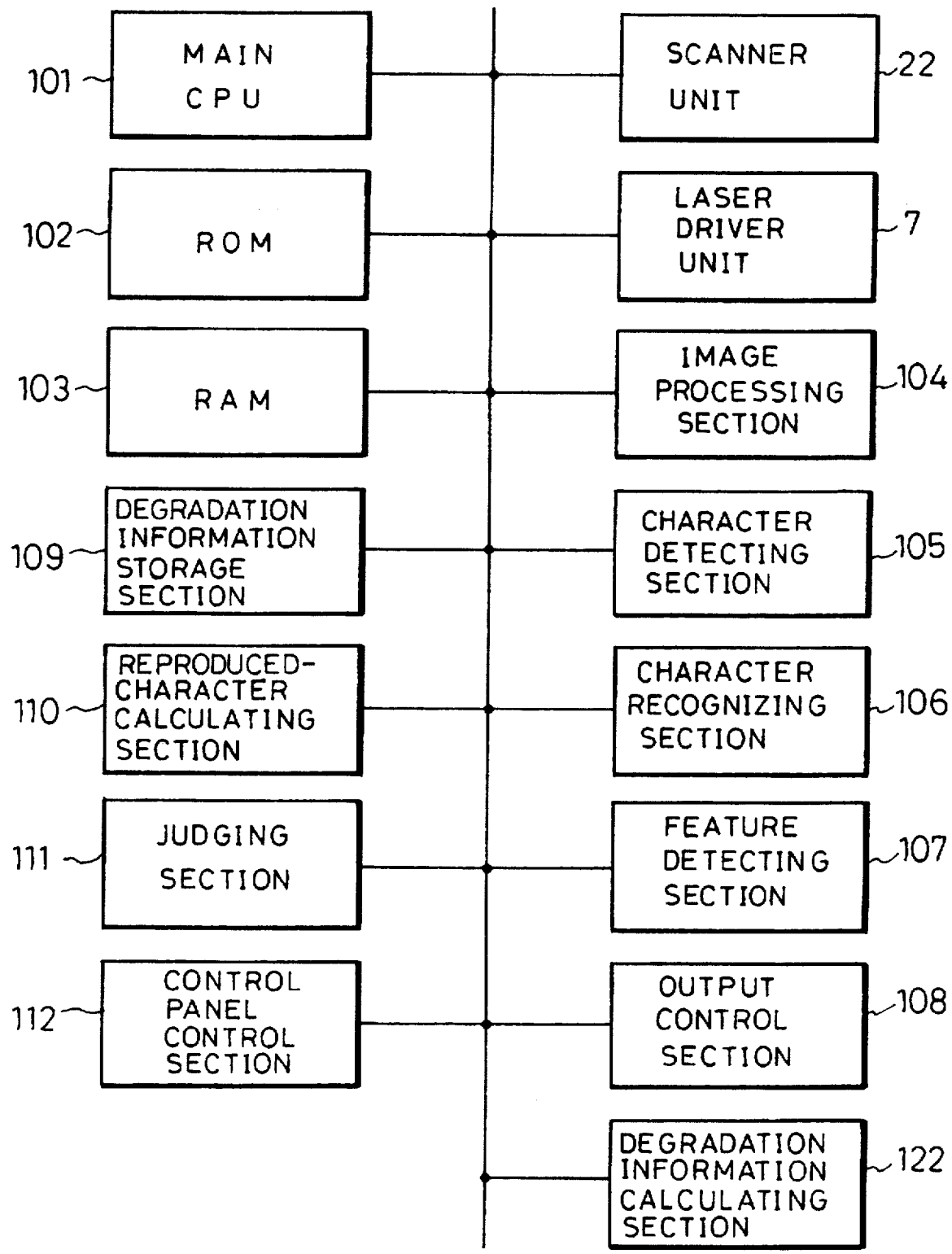
FIG. 81 is a block diagram showing the structure of a control circuit in a digital copying machine according to still another embodiment of the present invention.
Figure 82:
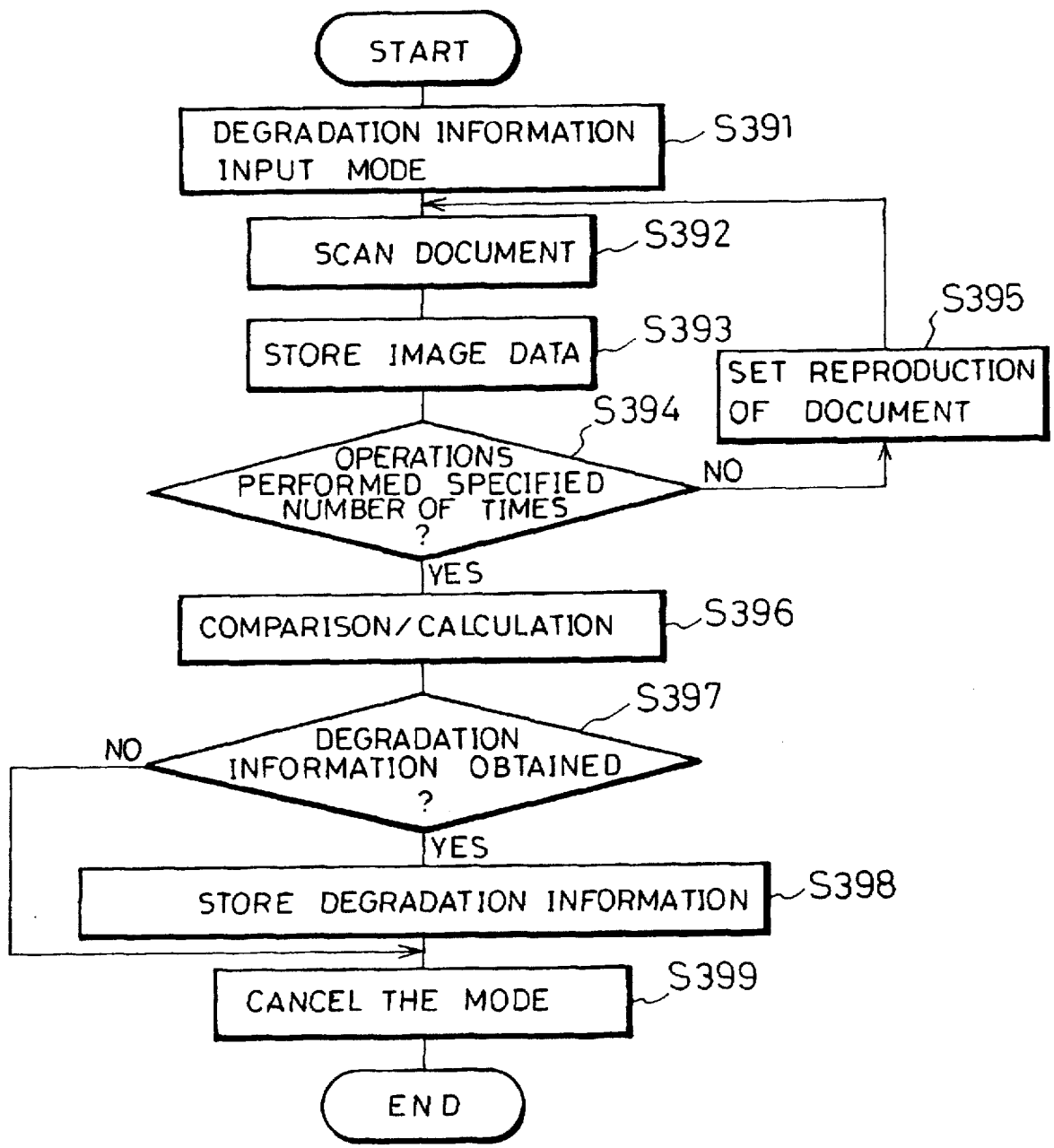
FIG. 82 is a flowchart showing the arrangement of the steps in a degradation information input process performed by the digital copying machine.
Figure 83:
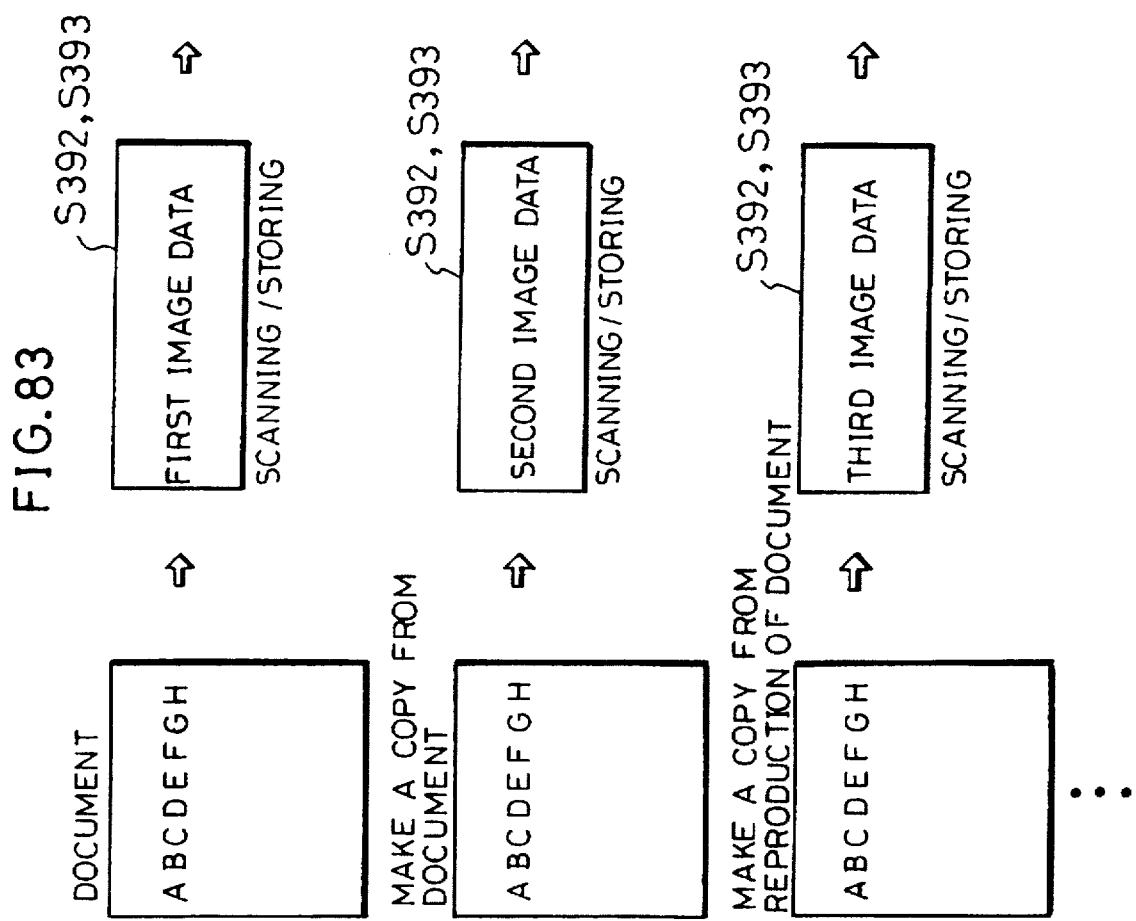
FIG. 83 is an explanatory view of the arrangement of the steps shown in FIG. 82.

The digital copying machine as an image processor of this embodiment has the structure shown in FIG. 81, and performs the degradation information input operation in the manner shown in FIGS. 82 and 83 by pressing the degradation information input mode key 121. Like the digital copying machine of EMBODIMENT 37, this operation is performed to obtain degradation information in the digital copying machine of this embodiment by producing a copy of a document and comparing the original document image and the reproduced image on the copy. Moreover, assuming that the original document image is a first image, the image on a copy of the first image is a second image and that the image on a copy of the second image is a third image, degradation information with respect to each of the second, third and nth images are respectively arranged for producing copies from these images. The main memory 73 in the image processing section 104 of FIG. 81 stores the data of fonts of various sizes corresponding to the respective characters.

Referring now to the flowchart of FIG. 82 and FIG. 83, how the digital copying machine of this embodiment inputs degradation information is explained below.

When the degradation information input key 121 is pressed while the original document is placed on the document platen 27 for obtaining degradation information, the digital copying machine turns into the degradation information input mode under the control of the main CPU 101 (step 391). In this state, when the number of degradation information to be obtained is entered using the ten-key 37, the original document is scanned by the scanner unit 22 (step 392), the first image data (i.e., image data of the original document) is stored in the main memory 73 of the image processing section 104 (step 393), and copying of the original document is performed. In the case when obtaining the degradation information up to the nth image, the number of degradation information to be obtained is n−1. In this case, scanning is performed n times, and outputting of reproduced images is performed n−1 times.

The above-mentioned operations are performed a specified number of times. More specifically, when the process of returning an output reproduced image to the document platen 27 as a copy of the document (step 395) is performed every time scanning and outputting the reproduced image are complete, the operations of steps 392 and 393 are repeatedly performed the specified number of times (step 394). With these operations, the image data of the first to the nth images are stored in the main memory 73 of the image processing section 104. The start of scanning is controlled in the manner explained in

EMBODIMENT 37.

Then, the character detecting section 105 detects character data from the first and second image data respectively, the degradation information calculating section 122 compares these character data to detect changes in the characters in the character data, for example, changes in the line widths of the characters, the straightness of the outline and the sharpness of the edge portions, the unevenness of the density, variations in the density, scratched portions, or smudges. Furthermore, the degradation information calculating section 122 calculates the degradation information from the rate of changes. This degradation information corresponds to the second image, and degradation information corresponding to the third to nth images is also calculated in the same manner (step 396).

If the degradation information is not obtained from the operation in step 396 (step 397), the degradation information input mode is cancelled (step 399), and the operation comes to an end. On the other hand, if the degradation information is obtained, the degradation information is stored in the degradation information storage section 109 (step 398), the degradation information input mode is cancelled (step 399), and the operation comes to an end.

Figure 84:
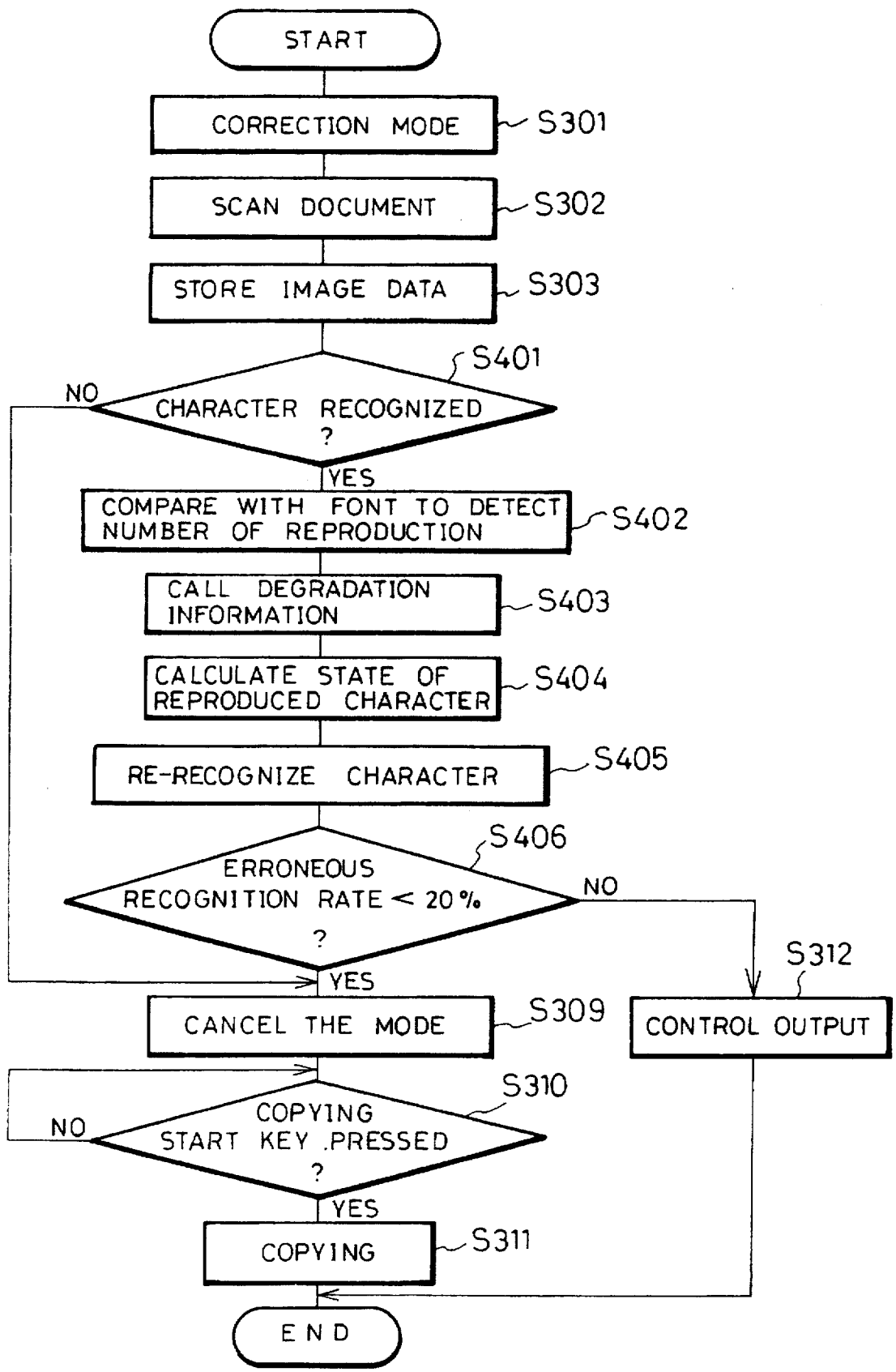
FIG. 84 is a flowchart showing the arrangement of the steps in a correction process performed by the digital copying machine.
Figure 85:
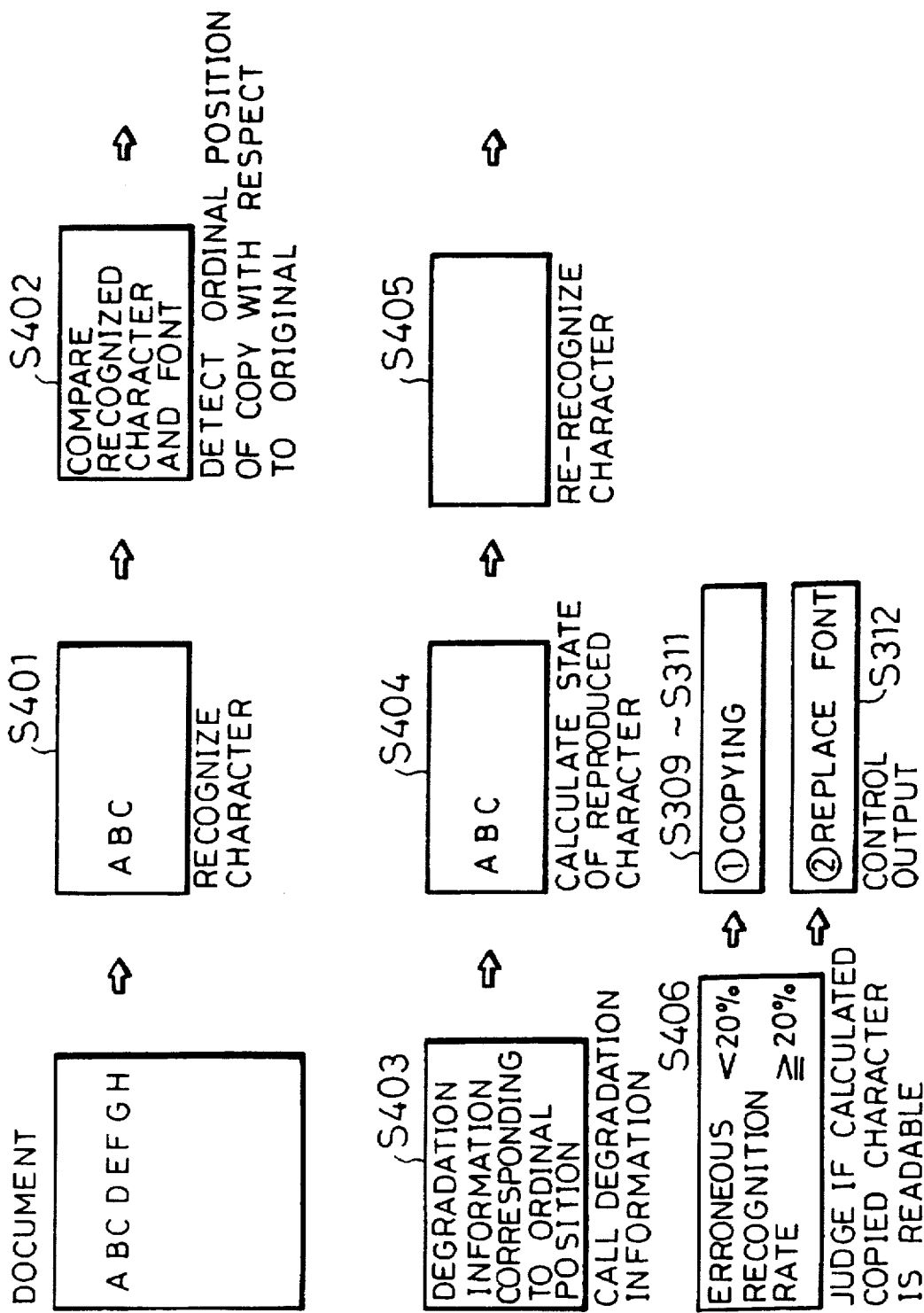
FIG. 85 is an explanatory view of the arrangement of the steps shown in FIG. 84.

Referring now to the flowchart of FIG. 84 and FIG. 85, how the digital copying machine of this embodiment performs correction processing is explained below.

First, similar to the digital copying machine of EMBODIMENT 1, when a sheet size and the correction mode are selected (step 301), a document is scanned by the scanner unit 22 (step 302) and the image data is stored in the main memory 73 of the image processing section 104 (step 303).

When the scanning is complete, the character recognizing section 106 recognizes character data, i.e., characters in the image data of the document (i.e., the character recognizing operation is performed, step 401). At this time, if characters are not recognized, copying is performed (steps 309 to 311).

On the other hand, if characters are recognized in step 401, the number of characters recognized are stored. Next, the state of the recognized characters is compared with the font stored in the main memory 73 to detect how many times the original document has been copied, i.e., the ordinal number of the reproduced image with respect to the original document image as the nth image (step 402) based on the degraded state.

Next, the reproduced character image calculating section 110 calls degradation information corresponding to the number of times the original document has been copied from the degradation information storage section 109. For example, when the image of the original document is the nth image, degradation information corresponding to the n+1th image is called (step 403), a degraded state of characters to be appearing in a copy produced from the nth image is calculated from the degradation information, and reproduced character images showing the degraded state are formed (step 404).

Then, the character recognizing section 106 re-recognizes characters from the reproduced character images (step 405), and calculates the erroneous recognition rate E1 in the manner explained in EMBODIMENT 31.

The judging section 111 judges whether the erroneous recognition rate E1 is lower than a predetermined value of 20% (step 406). If the erroneous recognition rate E1 is lower than 20%, characters to be appearing in the reproduced image of the document are readable, and therefore copying is performed (steps 309 to 311). On the other hand, if the erroneous recognition rate is higher than or equal to 20%, characters to be appearing in the reproduced image of the document become hard to read. Then, a warning message is displayed on the liquid crystal display panel 41, and outputting the image is prohibited (step 312).

As described above, with the structure described in this embodiment, since the degradation information is obtained by making a copy of an original document with the digital copying machine and comparing the original and the copy, accurate degradation information is obtained. The degradation information varies depending on the number of times copying has been performed with respect to the original document, i.e., the relations between parent document and child and grandchild documents. Copying is performed using degradation information corresponding to the relation between a document from which a copy is produced and its parent document. It is thus possible to accurately judge whether the document can be copied or not, and to surely prevent outputting of unusable reproduced images.

The structure of this embodiment is applicable to the structures of EMBODIMENTS 30 to 36 for forming reproduced character images based on degradation information.

Needless to say, the image processor having the functions explained in EMBODIMENTS 1 to 38 is applicable not only to the above-mentioned digital copying machines, but also to digital printers, facsimiles, and scanner printers.

As described above, the image processor of the present invention incorporates: input means for reading the image on a document and converting it into image data; image output means for forming a reproduced image of the document image based on the input image data and outputting the reproduced image; character detecting means for detecting character data from the image data; degradation information storage means for storing a degraded state of the reproduced image compared to the document image as degradation information; reproduced-character-image calculating means for calculating a degraded state of reproductions of the characters represented by the character data detected by the character detecting means based on the degradation information for forming reproduced character images showing the degraded state; judging means for judging whether the reproduced character images are read as predetermined characters or not; and output control means for prohibiting the reproduced character images from being output when the judging means judges that the reproduced character images are not read as the predetermined characters.

With this structure, the character detecting means detects character data from the image data of the original document, and the reproduced-character-image calculating means calculates a degraded state of reproductions of characters represented by the character data based on the degradation information stored in the degradation information storage means for forming reproduced character images showing the degraded state. The judging means judges whether the reproduced character images are readable or not, and the output control means prohibits the reproduced character images from being output when the judging means judges that the reproduced character images are not readable.

Accordingly, the image processor is handled more easily and its value is increased. In addition, when outputting the reproduced image onto a sheet, only a practically useful reproduced image is output, thereby preventing the waste of sheets.

In another image processor of the present invention having the above-mentioned structure, the character detecting means is formed by character recognizing means for performing a first recognition operation for recognizing characters from the character data in the image data and a second recognition operation for recognizing reproduced character images formed by the reproduced-character-image calculating means as characters. The reproduced-character-image calculating means calculates a degraded state of characters in a reproduced image corresponding to the characters recognized from the image data by the character recognizing means based on the degradation information so as to form reproduced character images showing the degraded state. The judging means judges whether characters in the reproduced image are readable or not based on the recognition rate in the second recognition operation with respect to the recognition rate in the first recognition operation.

With this structure, the character recognizing means recognizes characters from the character data in the image data of an original document during the first recognition operation. The reproduced-character-image calculating means calculates a degraded state of corresponding characters which are to be reproduced by copying based on the degradation information so as to form reproduced character images showing the degraded state. Then, the character recognizing means performs the second recognition operation to recognize the reproduced character images as characters, and the judging means judges whether characters in the reproduced image are readable or not based on the recognition rate in the second recognition operation with respect to the recognition rate in the first recognition operation. At this time, when the reproduced character images are judged to be unreadable, the output control means prohibits outputting the reproduced images.

Thus, the image processor is handled more easily and its value is increased. Furthermore, when outputting the reproduced image onto a sheet, only a practically useful reproduced image is output, thereby preventing the waste of sheets.

EMBODIMENT 39

The following description discusses yet another embodiment of the present invention with reference to FIGS. 5, 86 to 95. The means having the same function as the means shown in the above-mentioned embodiments will be designated by the same code and their description will be omitted.

When magnifying a document at an arbitrary magnification rate, an image processor of this embodiment is capable of preventing characters in a magnified document from becoming unreadable. Moreover, when the document is a reproduction of the original, the image processor prevents characters in a copy of the document from becoming unreadable.

An image processing system of this embodiment reproduces colors corresponding to the document, and when the reduction mode is selected, calculates the size of the image. On the other hand, when a magnification mode (to be described later) is selected, the image processing system magnifies and corrects the image. As described above, the image processing system incorporates the image data input section 70, image transformer section 71, image data output section 72, main memory 73 formed by RAM and ROM, and image processing CPU 74 (see FIG. 5).

The image transformer section 71 includes quantizing sections 71a and 71b, a compositing section 71c, a contrast transformation section 71d, a magnifying section (reducing means, magnifying means) 71e, an image processing section 71f, an error diffusing section 71g, a compressing section 71h, and a character detecting section (recognizing means, re-recognizing means, detecting means) 71i.

In the contrast transformation section 71d, the relation between the output density and input density is freely determined according to a predetermined contrast transformation table with respect to the respective digital signals of 256 tones. In the magnifying section 71e, interpolation is performed based on the input data according to a reduction rate or a magnification rate entered through the ten-key 37, or a magnification rate of magnification correcting operation (to be described later) to be performed when the magnification mode is selected by pressing the magnification mode key 42 so as to obtain pixel data (a density level) of target pixels after magnified and magnifies the main scanning after magnifying the sub scanning.

The image processing CPU 74 functions as character judging means, rate judging means, processing means, and compositing means. The image processing CPU 74 judges whether characters re-recognized by the character detecting section 71i (i.e., reduced characters) match characters before reduced (i.e., the previously recognized characters) or not according to the result of detection performed by the character detecting section 71i. The image processing CPU 74 also judges whether the unrecognized character rate, i.e., a proportion of characters which are not re-recognized to the previously recognized characters, is higher than a predetermined reference rate.

The unrecognized character rate is obtained as follows.

$$\text{unrecognized character rate } (\%) = \{(A-B)/A\} \times 100$$

where A is the number of previously recognized characters and B is the number of re-recognized characters.

The reference rate is determined so that, even when characters are defaced to some degrees and when some of the characters are not re-recognized, the characters are surely read. The value (for example, not higher than 10%) is set according to the performance such as resolution of the digital copying machine, for example, and stored in the main memory 73.

When the unrecognized character rate is higher than the reference rate, the image processing CPU 74 processes the character data which are not identical to the previously recognized character data in a predetermined manner so that the characters data are recognized as identical to the characters previously recognized by the character detecting section 71i. More specifically, when the unrecognized character rate is higher than the reference rate, binary image processing is performed on the character data so that the characters are recognized as identical to the previously recognized characters. For example, as commonly used in binary image processing, the connection between the neighboring and adjacent pixels of the character data is examined, and the number of connected points is calculated to detect an isolated point, an inner point, an end point, a branch point, a junction point, and a portion enclosed by lines or curved lines (hereinafter referred to as hole). Subsequently, the unrecognized character data is compared with the previously recognized character data, and corrections are made so that the respective points in the unrecognized character data coincide with the corresponding points in the previously recognized character data.

The image processing CPU 74 then composites the corrected character data and the image data- excluding the characters, stored in the main memory 73.

Figure 86:
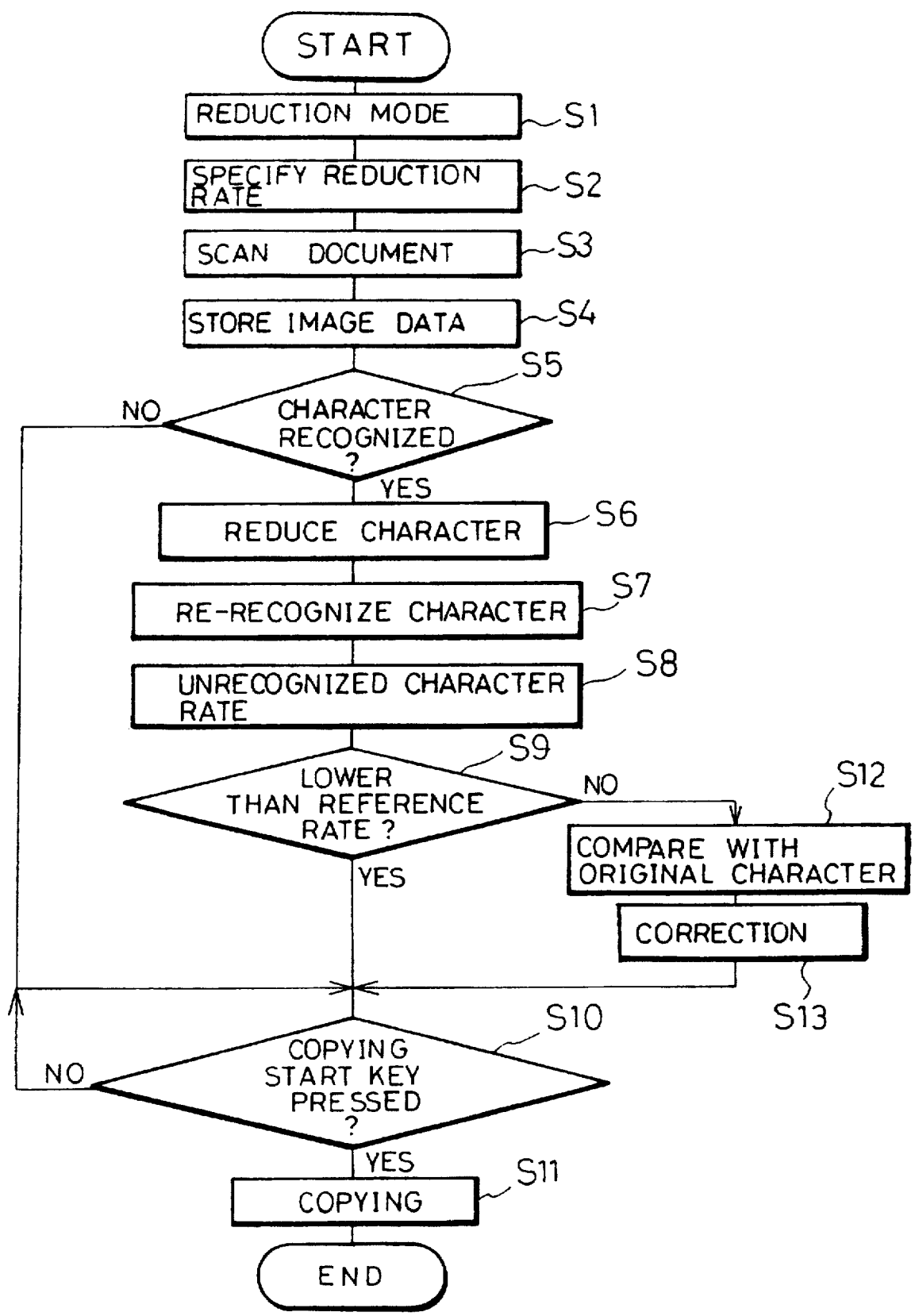
FIG. 86 is a flowchart showing the arrangement of the steps in a reduction process performed by a digital copying machine as an image processor according to one embodiment of the present invention.

Referring now to the flowchart of FIG. 86 and FIG. 87, how the digital copying machine of this embodiment performs reduction processing is explained below.

First, before selecting the reduction mode, a sheet size is specified through the control panel section 39. If the sheet size is not specified, sheets of a size equal to the size of the document is selected. At this time, whether a sheet size is to be freely specified or not is also selected.

After specifying a sheet size, the reduction mode is selected by pressing the reduction mode key 40 in the control panel section 39 (step 1). When a reduction rate is specified using the ten-key 37 (step 2), whether a document 50 (FIG. 87) is set on the document platen 27 or not is checked, and the document 50 is scanned (step 3). The image data read by the CCD sensor 6 is then stored in the main memory 73 (step 4).

When scanning is complete, as illustrated in FIG. 87(a), whether character data is contained in the image data of the document 50 or not is recognized (step 5) by the character detecting section 71i of the image transformer section 71. If the image data does not contain character data, the operation proceeds to step 10 (to be described later), and copying is performed. On the other hand, if the character data, i.e., a character 51 is recognized in the image data, the character 51 is reduced by the image processing CPU 74 (step 6).

Subsequently, the size of a reduced character 52 is re-recognized by the character recognizing section 71i (step 7), and the unrecognized character rate is calculated (step 8). Then, whether the unrecognized character rate is lower than a predetermined reference rate or not is judged (step 9). As illustrated in FIG. 87(b), if the unrecognized character rate is lower than the reference rate, even when the document is copied at the reduction rate specified in step 2, the reduced character 52 is readable. Therefore, when the copying start key 38 is pressed (step 10), the above-mentioned copying operation is performed (step 11) and the reduction mode comes to an end.

On the other hand, as illustrated in FIG. 87(c), if the unrecognized character rate is higher than or equal to the reference rate, when the document is copied at the reduction rate specified in step 2, the reduced character 52 becomes unreadable. Therefore, the previously recognized character 51 is readout from the main memory 73, and compared with the reduced character 52 (step 12). Then, the reduced character 52 is corrected to make unrecognized portions identical to the corresponding portions of the character 51 so as to obtain a corrected character (step 13). Subsequently, copying is performed (steps 10 and 11), and the reduction mode comes to an end.

As described above, when a reduced character becomes unreadable, the digital copying machine having the above-mentioned structure compares the reduced character with the previously recognized character, corrects the reduced character, composites the character data of the corrected character and the image data excluding the character data which has been reduced at a specified reduction rate, and performs copying. It is therefore possible to prevent a reduced image of a virtually useless size from being formed, i.e., a worthless reduced copy from being produced. Thus, the digital copying machine is handled more easily, its value is increased, and the waste of sheets is avoided. Additionally, since the copying operation is performed so as to have reduced characters in readable condition, a satisfactory image is obtained.

EMBODIMENT 40

Figure 88:
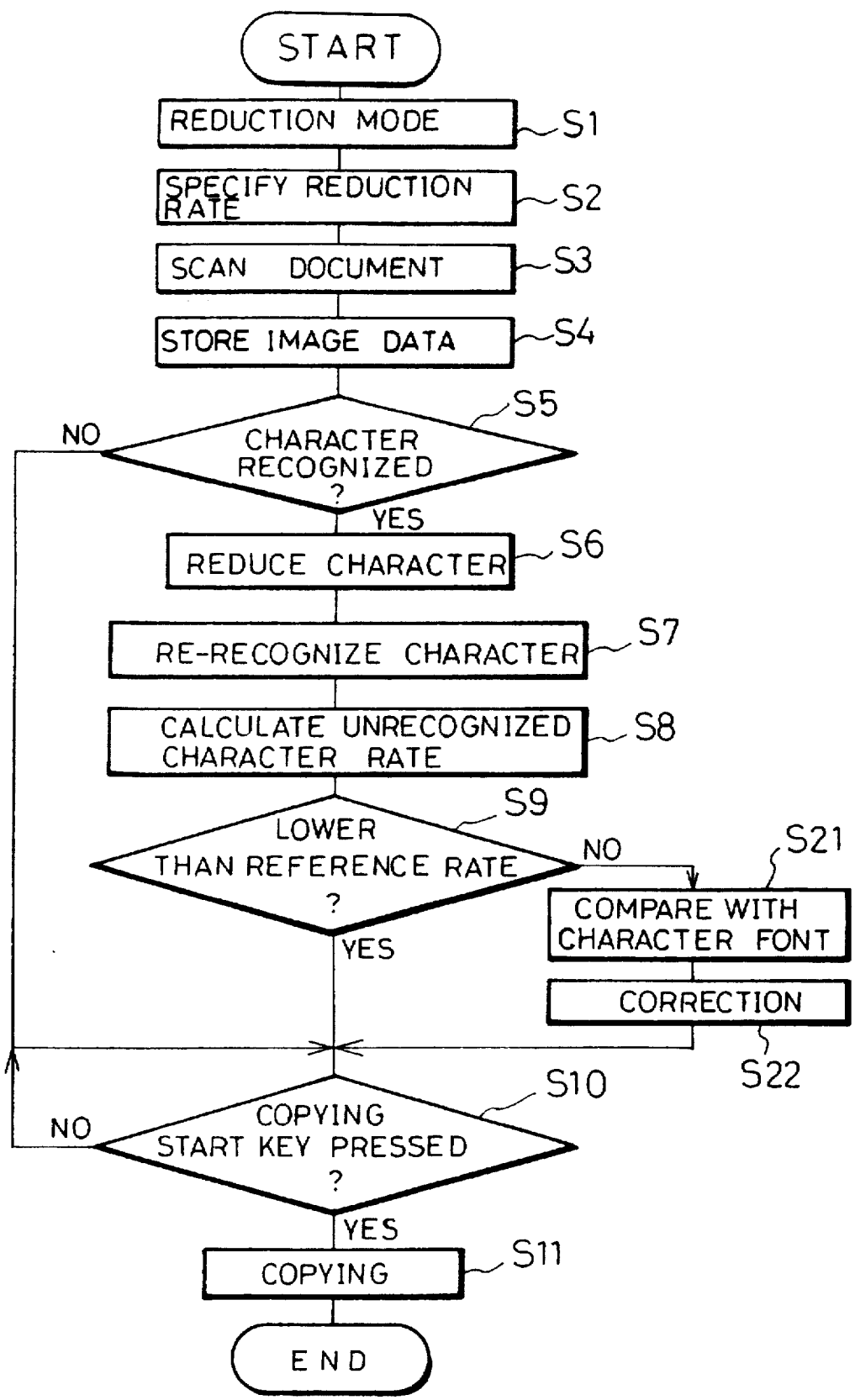
FIG. 88 is a flowchart showing the arrangement of the steps in a reduction process performed by a digital copying machine as an image processor according to another embodiment of the present invention.

The following description discusses yet another embodiment of the present invention with reference to FIGS. 88 to 89. The means having the same function as the means shown in the above-mentioned embodiment 39 will be designated by the same code and their description will be omitted.

A digital copying machine as an image processor of this embodiment has the main memory 73 which stores the character data having a font of a predetermined size as a dictionary. When the unrecognized character rate is judged to be higher than a reference rate, the image processing CPU 74 compares the unrecognized character data with the character data having the predetermined font size, and corrects the unrecognized character data in the manner described above. Except for this difference, the structure of the digital copying machine of this embodiment is the same as that of the digital copying machine of EMBODIMENT 39.

Referring now to the flowchart of FIG. 88 and FIG. 89, how the digital copying machine of this embodiment performs reduction processing is explained below.

First, like the digital copying machine of EMBODIMENT 39, the predetermined operations shown in FIG. 89(a) are carried out to calculate the unrecognized character rate (steps 1 to 8). Then, whether the unrecognized character rate is lower than a predetermined reference rate or not is judged (step 9). As illustrated in FIG. 89(b), if the unrecognized character rate is lower than the reference rate, copying is performed (steps 10 and 11), and the reduction mode comes to an end.

On the other hand, as illustrated in FIG. 89(c), if the unrecognized character rate is higher than or equal to the reference rate, when the document is copied at the reduction rate specified in step 2, the reduced character 52 becomes unreadable. Therefore, a character font 54 stored in the main memory 73 is readout, and the character font 54 and the reduced character 52 are compared (step 21). Then, the reduced character 52 is corrected to make the unrecognized portions identical to the corresponding portions of the character font 54 so as to obtain a corrected character 55 (step 22). Subsequently, copying is performed (steps 10 and 11), and the reduction mode comes to an end.

As described above, when a reduced character becomes unreadable, the digital copying machine having the above-mentioned structure compares the reduced character with the character font, corrects the reduced character to produce a corrected character, composites the character data of the corrected character and the image data excluding the character data which has been reduced at a specified reduction rate, and performs copying. It is therefore possible to prevent a reduced image of a virtually useless size from being formed, i.e., a worthless reduced copy from being produced. Thus, the digital copying machine is handled more easily, its value is increased, and the waste of sheets is avoided. Additionally, since the copying operation is performed so as to have reduced characters in readable condition, a satisfactory image is obtained.

As described above, the image processor of the present invention incorporates: input means for reading the image on a document; setting means for freely selecting a reduction rate of the document; storage means for storing the image data of the document read by the input means; recognizing means for detecting character data from the image data stored in the storage means and recognizing characters from the detected character data; reducing means for reducing the character data detected by the recognizing means at a reduction rate specified by the setting means; re-recognizing means for re-recognizing characters from the character data reduced by the reducing means; character judging means for judging whether the characters re-recognized by the re-recognizing means coincide with the characters before reduced; unrecognized character rate judging means for judging whether a rate of characters which are unrecognized as the characters before reduced is higher than a predetermined rate; processing means for processing the unrecognized character data in a predetermined manner so as to be recognized identical to the characters before reduced by the re-recognizing means; compositing means for compositing the processed character data and the image data; and output means for visualizing and outputting the image data composited by the compositing means.

With this structure, the recognizing means detects the character data from the image data and recognizes characters from the detected character data, the reducing means reduces the characters at a reduction rate set by the setting means, and the re-recognizing means re-recognizes characters from the reduced character data. The character judging means judges whether the re-recognized characters coincide with the characters before reduced, and the unrecognized character rate judging means judges whether a rate of unrecognized characters is higher than a predetermined rate. When the unrecognized character rate is higher than the predetermined rate, the processing means processes the unrecognized character data in a predetermined manner so as to be recognized identical to the characters before reduced by the re-recognizing means. The compositing means composites the processed character data and the image data, and the output means visualizes and outputs the composited image data. Therefore, the reduced image of the document output from the output means contains easily readable characters.

Since the characters in the reduced image of the document are easily read, the digital copying machine is handled more easily and its value is increased. For example, when outputting the reduced image onto a sheet, only the reduced image of a practically usable size is output, thereby preventing the waste of sheets.

EMBODIMENT 41

Figure 90:
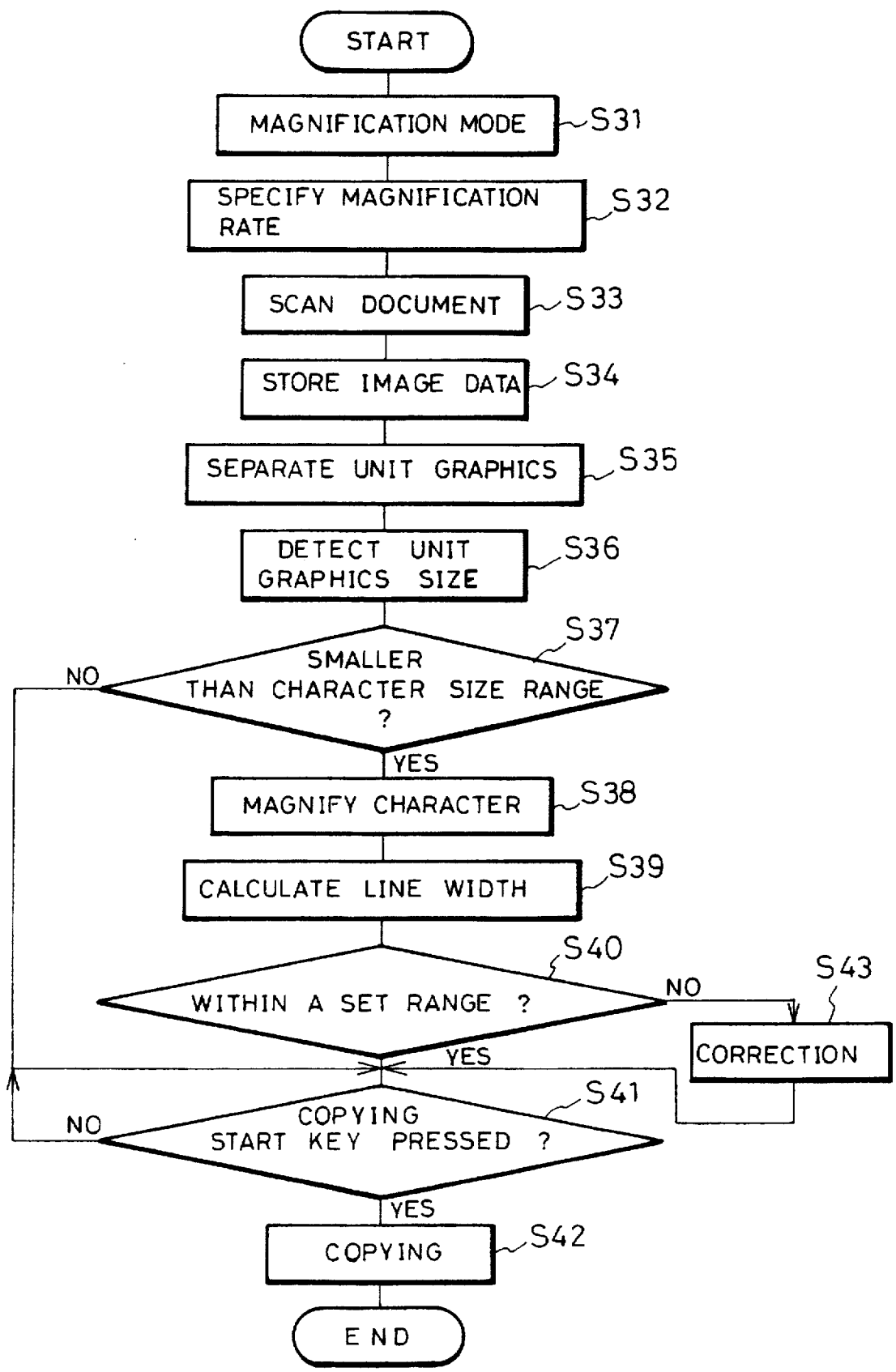
FIG. 90 is a flowchart showing the arrangement of the steps in a magnifying process performed by a digital copying machine as an image processor according to still another embodiment of the present invention.

The following description discusses yet another embodiment of the present invention with reference to FIGS. 90 to 91. The structure which performs the same function as the structure shown in the drawings of EMBODIMENT 39 will be designated by the same code and their description will be omitted.

A digital copying machine as an image processor of this embodiment includes calculating means, judging means and correcting means (none of them are shown) in the image processing CPU 74. For example, the calculating means performs commonly used binary image processing to detect pixels of the character data magnified by the magnifying section 71e, and calculates the line widths of lines and curved lines constructing characters. The judging means judges whether the line widths of the lines and curved lines calculated by the calculating means are within a readable range which is determined according to the sizes of characters, i.e., whether the line width (thickness) of the character is between the predetermined highest and lowest limits.

The highest and lowest limits are given by values showing a range of thickness within which characters are not defaced nor scratched and therefore readable. Accordingly, if the line width of a character is larger than the highest limit, the character is defaced and becomes unreadable. Similarly, if the line width of a character is smaller than the lowest limit, the character is scratched and becomes unreadable. The highest and lowest limits are determined according to, for example, the performance of the digital copying machine, such as resolution, and stored in the main memory 73. For instance, when the resolution is 400 dpi, the highest and lowest limits are set to about 1.5 mm (or 24 dots) and 0.25 mm (or 4 dots), respectively.

When the judging means judges that the line with of a character is out of the predetermined range, the correcting means performs binary image processing on the character data to expand or reduce the pixels of the character data so as to have the line width within the predetermined range. Except for this difference, the structure of the digital copying machine of this embodiment is the same as that of the digital copying machine of EMBODIMENT 39.

Referring now to the flowchart of FIG. 90 and FIG. 91, how the digital copying machine of this embodiment performs magnification processing is explained below.

First, before selecting the magnification mode, a sheet size is specified through the control panel section 39. If the sheet size is not specified, sheets of a size equal to the size of the document is selected. At this time, whether a sheet size is to be freely specified or not is also selected.

After specifying a sheet size, the magnification mode is selected by pressing the magnification mode key 42 in the control panel section 39 (step 31). When a magnification rate is specified using the ten-key 37 (step 32), whether a document 50 (FIG. 91) is set on the document platen 27 or not is checked, and the document 50 is scanned (step 33). The image data read by the CCD sensor 6 is then stored in the main memory 73 (step 34).

After scanning, as illustrated in FIG. 91(a), in order to detect whether character data is contained in the image data of the document 50, the character detecting section 71i of the image transformer section 71 separates units of connected graphics 61 from the image data using the isolated graphics separating method (step 35), and detects the size of the unit of graphics 61 by forming a rectangle circumscribing the unit of graphics 61 (step 36). Then, whether the size of the unit of graphics 61, i.e., the size of the rectangle is smaller than the predetermined range of the character size or not is judged (step 37). If the size of the rectangle is smaller than the predetermined rage of the character size, the unit of graphics 61 is detected as character data, and magnified by the image processing CPU 74 to obtain a magnified character 62 (step 38). On the other hand, if the size of the rectangle is larger than the predetermined range of the character size, the unit of graphics 61 is not detected as character data. Then, the operation proceeds to step 41, and copying is performed.

Subsequently, the line width of a line and curved line constructing the magnified character 62 are calculated (step 39), and whether the line width is within a readable range which is determined according to the size of the magnified character 62 (hereinafter referred to the predetermined range) or not is judged (step 40). As illustrated in FIG. 91(b), if the line width of the magnified character 62 is within the predetermined range, even when a copy is produced at the magnification rate specified in step 32, the magnified character 62 is readable. Thus, when the copying start key 38 is pressed (step 41), copying is performed (step 42) and the magnification mode comes to an end.

On the other hand, as illustrated in FIG. 91(c), when the line width of the magnified character 62 is out of the predetermined range, if a copy is produced at the magnification rate specified in step 32, the magnified character 62 becomes unreadable. Therefore, the line width of the magnified character 62 is corrected to be in the predetermined range by making a thinner portion thicker and a thicker portion thinner so as to obtain a corrected character 63 (step 43). Then, the above-mentioned copying operation is performed (steps 41 and 42) and the magnification mode comes to an end.

As described above, when a magnified character becomes unreadable, the digital copying machine having the above-mentioned structure corrects the lines and curved lines constituting the magnified character 62 to produce a corrected character, composites the character data of the corrected character and the image data excluding the character data which has been magnified at a specified magnification rate, and performs copying. It is therefore possible to prevent a magnified image of a virtually useless size from being formed, i.e., a worthless magnified copy from being produced. Thus, the digital copying machine is handled more easily, its value is increased, and the waste of sheets is avoided. Additionally, since the copying operation is performed so as to have magnified characters in readable condition, a satisfactory image is obtained.

As described above, the image processor of the present invention incorporates: input means for reading the image on a document; magnification rate setting means for freely selecting a magnification rate of the document; storage means for storing the image data of the document read by the input means; detecting means for detecting character data from the image data stored in the storage means; magnifying means for magnifying the character data detected by the detecting means at a magnification rate set by the magnification rate setting means; calculating means for calculating a width of a line constructing a character from the character data magnified by the magnifying means; judging means for judging whether the line width calculated by the calculating means is within a predetermined readable range; correcting means for correcting the line width to be in the predetermined range when the judging means judges that the line width is out of the predetermined range; compositing means for compositing the character data including the line width corrected by the correcting means and the image data; and output means for visualizing and outputting the image data composited by the compositing means.

With this structure, the detecting means detects the character data from the image data, and the magnifying means magnifies the character data at the magnification rate set by the magnification rate setting means. The calculating means calculates a width of a line constructing a character from the character data magnified by the magnifying means. The judging means judges whether the calculated line width is within a predetermined readable range. When the judging means judges that the line width is out of the predetermined range, the correcting means corrects the line width to be in the predetermined range. The compositing means composites the character data having the corrected line width and the image data. The output means visualizes and outputs the composited image data. Therefore, the magnified image of the document output from the output means contains easily readable characters.

Since the characters in the magnified image of the document are easily read, the digital copying machine is handled more easily and its value is increased. For example, when outputting a magnified image onto a sheet, only a practically usable magnified image is output, thereby preventing the waste of sheets.

EMBODIMENT 42

Figure 92:
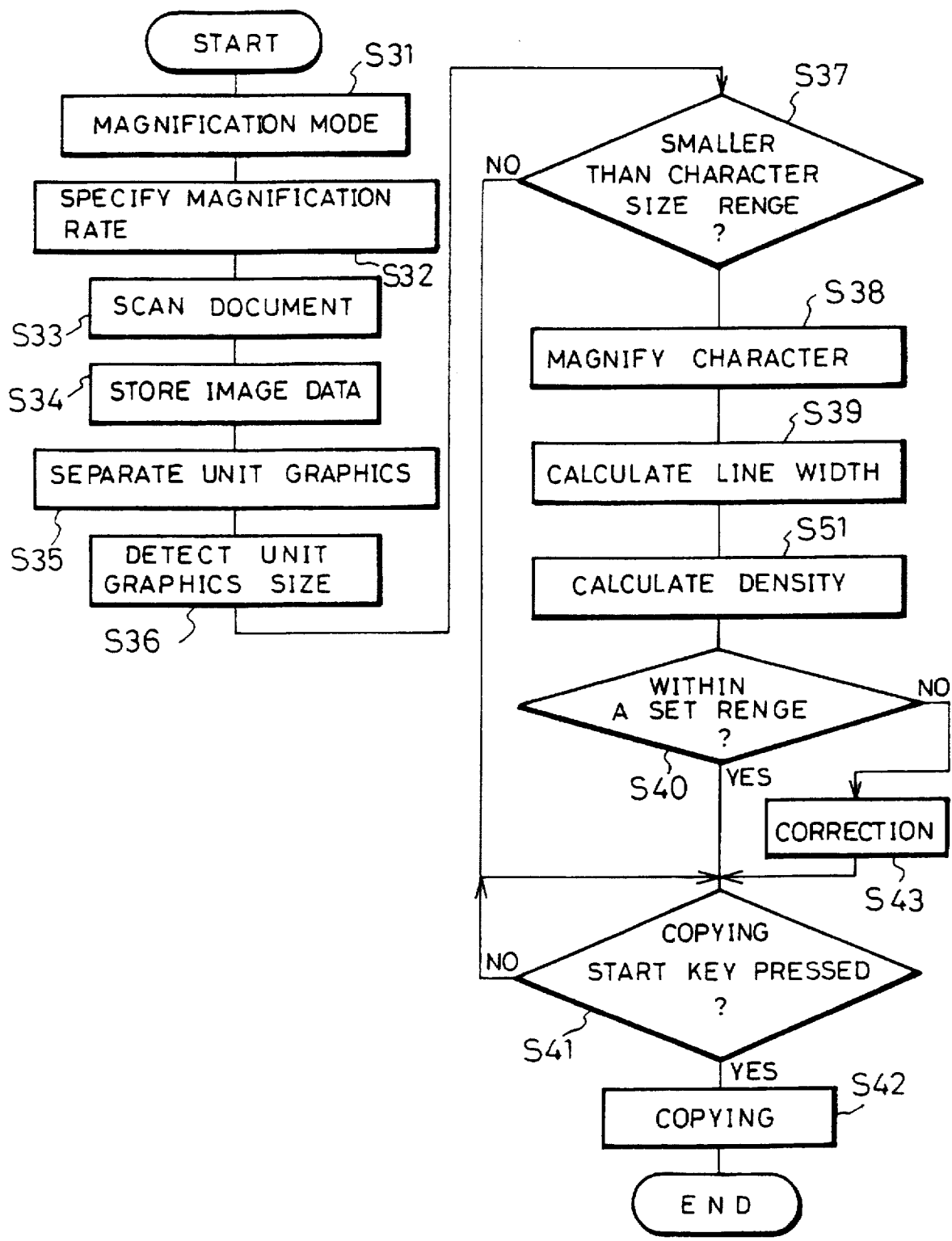
FIG. 92 is a flowchart showing the arrangement of the steps in a magnifying process performed by a digital copying machine as an image processor according to still another embodiment of the present invention.

The following description discusses yet another embodiment of the present invention with reference to FIGS. 92 to 93. The structure performing the same function as the structure shown in the drawings of EMBODIMENT 41 will be designated by the same code and their description will be omitted.

A digital copying machine as an image processor of this embodiment includes density calculating means and density judging means (not shown) in the image processing CPU 74, instead of the calculating means and judging means of EMBODIMENT 41. For example, the density calculating means performs commonly used binary image processing to detect pixels of the character data magnified by the magnifying section 71e, calculates the line width of a line or curved line constructing a character, and calculates the density of the line or curved line, i.e., the density of pixels per character from density data (histogram data) produced by a histogram processing section 70b. The density judging means judges whether a combination of the line width and the density calculated by the density calculating means is in a readable combination range which has been determined according to the sizes of characters. In other words, the density judging means judges whether the line width (thickness) and density of the character are between the predetermined highest and lowest limits.

For example, assuming that the total number of pixels constructing a character (i.e., the total number of black pixels and white pixels in the case of black-and-white copy) is 16 dots×16 dots and that a character is formed by 48 dots (the number of black pixels), the density of pixels per character is given by as follows.

$$\text{density}=48/(16\times16)$$

The highest and lowest limits are given by values showing a range of thickness and darkness within which a character in a copy is not defaced nor scratched and therefore readable. Accordingly, if the line width of a character is thicker or darker (higher in density) than the highest limit, the character is defaced and becomes unreadable. Similarly, if the line width of a character is thinner or lighter (lower in density) than the lowest limit, the character has a scratched portion and becomes unreadable. The highest and lowest limits are determined according to, for example, the performance of the digital copying machine, such as resolution, and stored in the main memory 73. In general, when the density is low, since the ratio of the number of black pixels to the total number of pixels constructing a character is low, the width of the line or curved line constructing the character is made thicker. On the other hand, when the density is high, since the ratio of the number of black pixels to the total number of pixels constructing the character is high, the width of the line or curved line needs to be made thinner. Except for this difference, the structure of the digital copying machine of this embodiment is the same as that of the digital copying machine of EMBODIMENT 41.

Referring now to the flowchart of FIG. 92 and FIG. 93, how the digital copying machine of this embodiment performs magnification processing is explained below.

First, like the digital copying machine of EMBODIMENT 41, the predetermined operations shown in FIG. 93(a) are carried out, and the unit of graphics 61 is magnified to obtain the magnified character 62 (steps 31 to 38). Subsequently, the width of a line or curved line constructing the magnified character 62 is calculated (step 39), and the density of the magnified character 62 is calculated (step 51). Then, whether the line width and density of the magnified character 62 are within a predetermined readable range (hereinafter just referred to as the predetermined range in this embodiment) which has been set depending on the size of the magnified character 62 are judged (step 40). As illustrated in FIG. 93(b), if the line width and density of the magnified character 62 are in the predetermined range, the copying operation is performed (steps 41 and 42), and the magnification mode comes to an end.

On the other hand, as illustrated in FIG. 93(c), when the line width and density of the magnified character 62 are out of the predetermined range, if a copy is produced at the magnification rate specified in step 32, the magnified character 62 becomes unreadable. Therefore, the line width of the magnified character 62 is corrected to be in the predetermined range by making a thinner portion thicker and a thicker portion thinner so as to obtain a corrected character 64 (step 43). Then, the above-mentioned copying operation is performed (steps 41 and 42) and the magnification mode comes to an end.

As described above, when a magnified character becomes unreadable, the digital copying machine having the above-mentioned structure performs correcting processing to obtain a corrected character by correcting the width of a line or curved line constructing the magnified character, composites the character data of the corrected character and the image data excluding the character data which has been magnified at the specified magnification rate, and performs copying. It is therefore possible to prevent a magnified image of a virtually useless size from being formed, i.e., a worthless magnified copy from being produced. Thus, the digital copying machine is handled more easily, its value is increased, and the waste of sheets is avoided. Additionally, since the copying operation is performed so as to have magnified characters in readable condition, a satisfactory image is obtained.

As described above, the image processor of the present invention incorporates: input means for reading the image on a document; magnification rate setting means for freely selecting a magnification rate of the document; storage means for storing the image data of the document read by the input means; detecting means for detecting character data from the image data stored in the storage means; magnifying means for magnifying the character data detected by the detecting means at a magnification rate set by the magnification rate setting means; density calculating means for calculating a width and density-of a line constructing a character from the character data magnified by the magnifying means; density judging means for judging whether a combination of the line width and density calculated by the density calculating means is within a predetermined readable combination range; correcting means for correcting the line width to be in the predetermined range when the density judging means judges that the combination is out of the predetermined range; compositing means for compositing the character data including the line width corrected by the correcting means and the image data; and output means for visualizing and outputting the image data composited by the compositing means.

With this structure, the detecting means detects the character data from the image data, and the magnifying means magnifies the character data at the magnification rate set by the magnification rate setting means. The density calculating means calculates the width and density of a line constructing a character from the character data magnified by the magnifying means. The density judging means judges whether a combination of the calculated line width and density is within a predetermined readable combination range. When the density judging means judges that the combination is out of the predetermined range, the correcting means corrects the line width to be in the predetermined range. The compositing means composites the character data having the corrected line width and the image data. The output means visualizes and outputs the composited image data. Therefore, the magnified image of the document output from the output means contains easily readable characters.

Since the characters in the magnified image of the document are easily read, the digital copying machine is handled more easily and its value is increased. For example, when outputting a magnified image onto a sheet, only a practically usable magnified image is output, thereby preventing the waste of sheets.

EMBODIMENT 43

Figure 94:
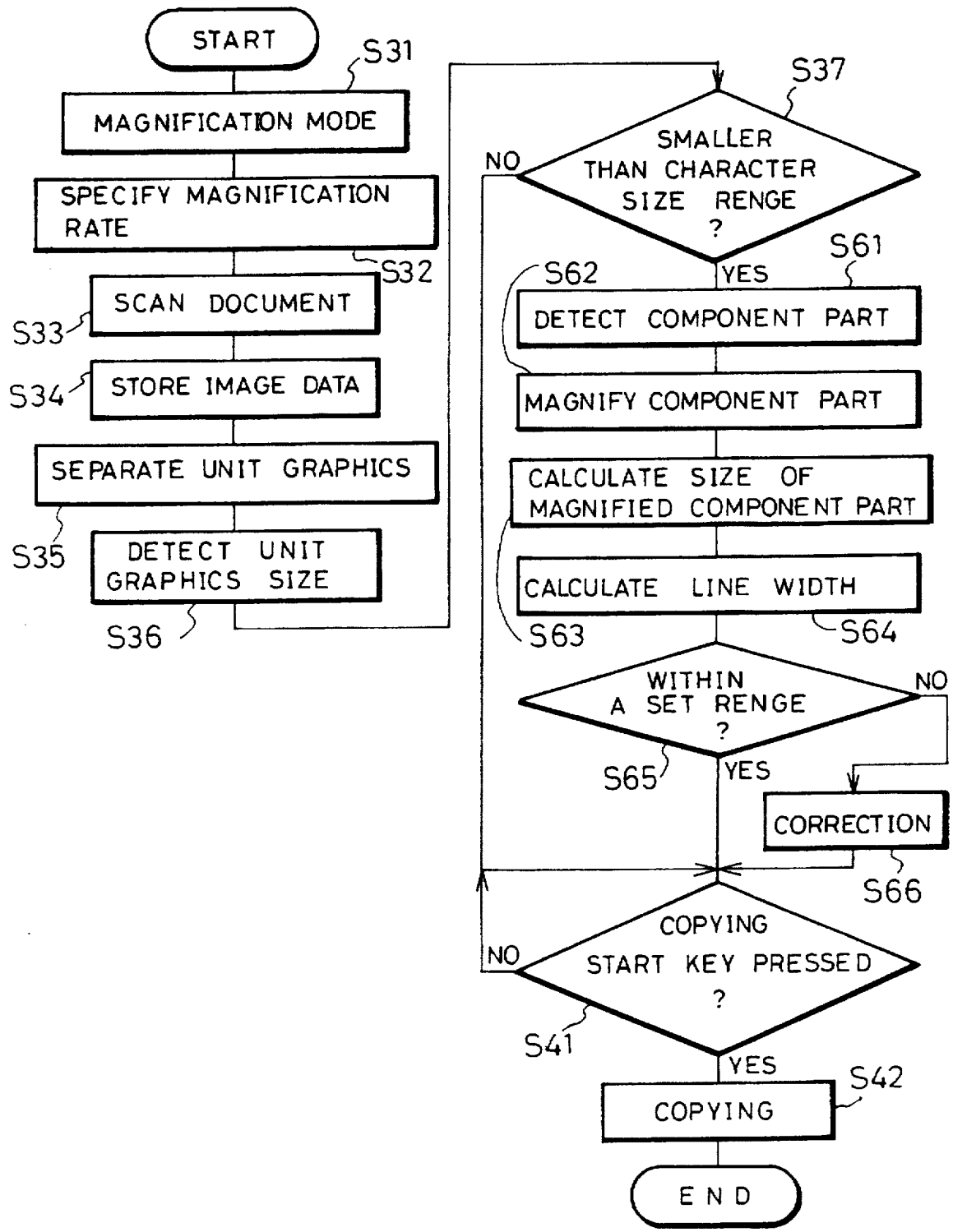
FIG. 94 is a flowchart showing the arrangement of the steps in a magnifying process performed by a digital copying machine as an image processor according to still another embodiment of the present invention.

The following description discusses yet another embodiment of the present invention with reference to FIGS. 94 to 95. The structure which performs the same function as the structure shown in the drawings of EMBODIMENT 41 will be designated by the same code and their description will be omitted.

A digital copying machine as an image processor of this embodiment includes line width calculating means and line width judging means (not shown) in the image processing CPU 74, instead of the calculating means and judging means of EMBODIMENT 41. The image processing CPU 74 and magnifying section 71e form magnification correcting means (not shown) instead of the correcting means of EMBODIMENT 41. Moreover, the character detecting section 71i includes component part recognizing means (not shown). The component part recognizing means divides a character into component parts based on the detected character data to recognize the character. The component parts are, for example, parts of a character, such as left-hand and right-hand radical of a Chinese character. For example, the character "机" is formed by two parts "木" and "几", and the character "化" is formed by two parts "亻" and "匕". Meanwhile, an English word is written using alphabet. Since each alphabetical character can not be divided into component parts, usually one alphabetical character is processed as a single unit. However, each alphabetical character needs to be individually processed for reading one English word, a simplified structure and an improved processing speed can not be achieved. It is therefore desirable to detect the character data of each word and process a word as a single unit. With this structure, a word is shown by evenly arranged characters.

The line width calculating means performs, for example, commonly used binary image processing to detect pixels of the character data magnified by the magnifying section 71e, calculates the size of a component part and the width of a line or curved line forming the component part. The line width judging means judges whether a combination of the calculated size and line width of the component part is included in a readable combination range which has been determined according to the size of the character. In other words, the line width judging means judges whether the size and line width (thickness) of the component part are between the predetermined highest and lowest limits.

The highest and lowest limits are given by values showing a range of size and thickness within which characters in a reproduced image of the document are not defaced and therefore readable. Namely, if the size or line width of a component part is larger or thicker than the highest limit, the character is defaced and becomes unreadable. Similarly, if the size and line width of a component part is smaller or thinner than the lowest limit, the character has a scratched portion and becomes unreadable. The highest and lowest limits are determined according to, for example, the performance of the digital copying machine, such as resolution, and stored in the main memory 73.

When the line width judging means judges that the size and line width of a component part are out of the predetermined range, the magnification correcting means magnifies the component part (for example, the width of the character) at a predetermined rate without changing the size (for example, the height) of the character, and corrects the line width to be in the predetermined range by performing binary processing on the character data and expanding or reducing the pixels of the character data. Except for this difference, the structure of the digital copying machine of this embodiment is the same as that of the digital copying machine of EMBODIMENT 41.

Referring now to the flowchart of FIG. 94 and Fig. 95, how the digital copying machine of this embodiment performs magnification processing is explained below.

First, like the digital copying machine of EMBODIMENT 41, the predetermined operations shown in FIG. 95(a) are carried out, and whether the size of unit of graphics 61 (i.e., a rectangle) is smaller than a predetermined range of a character size (steps 31 to 37). If the size of the rectangle is smaller than a predetermined range of a character size, the unit of graphics 61 is divided into component parts 65, detected (step 61), and magnified by the image processing CPU 74 to obtain magnified component parts 66 (step 62).

Subsequently, the size of each magnified component part 66 is calculated (step 63), and the width of a line or curved line of the magnified component part 66 is calculated (step 64). Then, whether the calculated size and line width are within a predetermined readable range (hereinafter just referred to as the predetermined range in this embodiment) or not are judged (step 65). As illustrated in FIG. 95(b), if the size and line width of the magnified component part 66 are within the predetermined range, the magnified character is judged to be readable and copying operation is performed (steps 41 and 42). Then, the magnification mode comes to an end.

On the other hand, as illustrated in FIG. 95(c), when the size and line width of the magnified component part 66 are out of the predetermined range, if a copy is produced at the magnification rate specified in step 32, the magnified component part 66, i.e., the magnified character becomes unreadable. Therefore, a magnification correcting operation is performed to obtain a corrected character 67 having component parts which are magnified at a corrected magnification rate (step 66). For example, the width of the magnified component part 66 is magnified at the predetermined magnification rate without changing the height, and the line width of the magnified component part 66 is corrected to be within the predetermined range by making a thinner portion thicker and a thicker portion thinner by the magnification correcting operation. Then, the above-mentioned copying operation is performed (steps 41 and 42) and the magnification mode comes to an end.

As described above, when a magnified character becomes unreadable, the digital copying machine having the above-mentioned structure performs magnification correcting processing to obtain a corrected character by magnifying the component parts of the magnified character and correcting the width of a line or curved line of the component parts, composites the character data of the corrected character and the image data excluding the character data which has been magnified at the specified magnification rate, and performs copying. It is therefore possible to prevent a magnified image of a virtually useless size from being formed, i.e., a worthless magnified copy from being produced. Thus, the digital copying machine is handled more easily, its value is increased, and the waste of sheets is avoided. Additionally, since the copying operation is performed so as to have magnified characters in readable condition, a satisfactory image is obtained.

As described above, the image processor of the present invention incorporates: input means for reading the image on a document; magnification rate setting means for freely selecting a magnification rate of the document; storage means for storing the image data of the document read by the input means; component part recognizing means for detecting character data from the image data stored in the storage means and recognizing a character by dividing the character into component parts; magnifying means for magnifying the character data detected by the component part recognizing means at a magnification rate set by the magnification rate setting means; line width calculating means for calculating the size of each of the component parts and the width of a line forming each of the component parts from the character data magnified by the magnifying means; line width judging means for judging whether a combination of the size and line width calculated by the line width calculating means is within a predetermined readable combination range; magnification correcting means for magnifying the component parts at a predetermined magnification rate without changing the size of the character and correcting the line width to be in the predetermined range when the line width judging means judges that the combination is out of the predetermined range; compositing means for compositing the character data including the component parts whose size and line width are magnified at a corrected magnification rate by the magnification correcting means and the image data; and output means for visualizing and outputting the image data composited by the compositing means.

With this structure, the component part recognizing means detects the character data from the image data and recognizes a character from the detected character data by dividing the character into component parts. The magnifying means magnifies the character data at the magnification rate set by the magnification rate setting means, and the line width calculating means calculates the size and width of a line forming the component part from the character data magnified by the magnifying means. The line width judging means judges whether a combination of the calculated size and line width is within a predetermined readable combination range. When the line width judging means judges that the combination is out of the predetermined range, the magnification correcting means magnifies the component part at a predetermined magnification rate without changing the size of the character and corrects the line width to be in the predetermined range. The compositing means composites the character data having the component parts whose size and line width are magnified at a corrected magnification rate and the image data. The output means visualizes and outputs the composited image data. Therefore, the magnified image of the document output from the output means contains easily readable characters.

Since the characters in the magnified image of the document are easily read, the digital copying machine is handled more easily and its value is increased. For example, when outputting a magnified image onto a sheet, only a practically usable magnified image is output, thereby preventing the waste of sheets.

Needless to say, the image processor having the functions explained in EMBODIMENTS 39 to 43 is applicable not only to the above-mentioned digital copying machines, but also to digital printers, facsimiles, and scanner printers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processor comprising:

input means for reading a document;

character detecting means for detecting a character from the document read;

setting means for freely setting a reduction rate of the document;

character reducing means for reducing the detected character at a reduction rate set by said setting means;

character judging means for re-recognizing the character reduced by said character reducing means and judging whether the re-recognized character is identical to the detected character before reduced;

unrecognized character rate judging means for judging whether a percentage of re-recognized characters which are not identical to the detected characters before reduced is higher than a predetermined percentage; and warning means for warning that a reduced document becomes unreadable when said unrecognized character rate judging means judges that the percentage of re-recognized characters which are not identical to the detected characters before reduced is higher than the predetermined percentage.

2. An image processor comprising:

input means for reading a document;

character detecting means for detecting character data from the document read by said input means;

recognizing means for recognizing a character from the detected character data;

recognition rate calculating means for calculating a ratio of the character data recognized as a character by said recognizing means to the whole character data detected by said character detecting means;

recognition rate judging means for judging whether the recognition rate calculated by said recognition rate calculating means is smaller than a predetermined rate as a readable threshold; and warning means for warning that a reproduced image of the document becomes unreadable when said recognition rate judging means judges that the recognition rate is smaller than the predetermined rate.

3. The image processor according to claim 2, wherein said character detecting means specifies a character by separating the read document into units of connected graphics and analyzing positional relations among and geometries of the units of graphics, and said recognition rate judging means judges whether a size of each of the units of graphics is larger than a predetermined size which permits the character to be copied in readable condition without being defaced.

4. The image processor according to claim 2, wherein said character detecting means includes a line width detecting section for detecting a line width of a character, and said recognition rate judging means judges whether the detected line width is larger than a predetermined width which permits the character to be copied in readable condition without being scratched.

5. The image processor according to claim 2, wherein said character detecting means detects an enclosed portion of a character from the detected character data, and said recognition rate judging means judges whether the enclosed portion is larger than a predetermined size which permits the character to be copied in readable condition without being defaced.

6. The image processor according to claim 2, wherein said character detecting means deforms pixels of the character data by expanding the pixels, detects end points of the pixels by calculating the number of connected points of the pixels, and extracts end points which disappear when expanded so as to calculate a line pitch that is a distance between two end points, and said recognition rate judging means judges whether the line pitch is larger than a predetermined pitch which permits the character to be copied in readable condition without being defaced.

7. The image processor according to claim 2, wherein said character detecting means detects scratched portions in a line and a curved line of a character where pixels are missing, and said recognition rate judging means judges whether the number of scratched portions is larger than a predetermined number which permits the character to be copied in readable condition without being defaced.

8. The image processor according to claim 2, wherein said character detecting means detects defaced portions where widths of a line and a curved line of a character become thicker by a rate more than a predetermined rate, and said recognition rate judging means judges whether the number of defaced portions is larger than a predetermined number which permits the character to be copied in readable condition without being defaced.

9. An image processor comprising:

input means for reading a document;

storage means for storing image data of the document read by said input means;

character detecting means for detecting character data from the document stored in said storage means;

recognizing means for recognizing characters from the character data detected by said character detecting means and from character data processed by processing means;

recognition rate calculating means for calculating a recognition rate given by a ratio of the character data detected by said character detecting means and recognized as characters by said recognizing means to the whole character data detected by said character detecting means;

recognition rate judging means for judging whether the recognition rate calculated by said recognition rate calculating means is smaller than a predetermined rate which permits the character data to be read as a reproduced image of the document;

processing means for processing character data among the character data detected by said character detecting means, which is not recognized as characters by said recognizing means, so that the character data is recognized as characters by said recognizing means when said recognition rate judging means judges that the recognition rate is smaller than the predetermined rate;

compositing means for compositing the image data and the character data which has been processed by said processing means and is recognized as characters by said recognizing means; and output means for visualizing and outputting the image data composited by said compositing means.

10. The image processor according to claim 9, wherein said processing means extracts a feature portion of a character in the image data which is not recognized as a character by said recognizing means and processes the extracted feature portion so that it is recognized as a corresponding character.

11. The image processor according to claim 9, further comprising warning means for warning that a reproduced image becomes unreadable when the recognition rate is judged to be smaller than the predetermined rate.

12. The image processor according to claim 9, wherein said processing means performs binary image processing on the character data which is not recognized as characters by said recognizing means when the recognition rate is judged to be smaller than the predetermined rate.

13. The image processor according to claim 9, further comprising second storage means for storing replacement character data of a predetermined readable size, wherein said compositing means replaces the character data recognized as characters with corresponding replacement character data when compositing, and composites the replacement character data and the image data.

14. An image processor having: input means for converting an image on a document into image data; and image output means for forming and outputting a reproduced image of a document image based on the input image data, said processor comprising:

character detecting means for detecting character data from the image data;

degradation information storage means for storing a degraded state of the reproduced image compared to the document image as degradation information;

reproduced character image calculating means for calculating a degraded state of a reproduced character of a character represented by the character data detected by said character detecting means based on the degradation information so as to form a reproduced character image showing the state of the reproduced character;

judging means for judging whether the reproduced character image is read as a predetermined character; and output controlling means for prohibiting outputting the reproduced image when the judging means judges that the reproduced character image is not read as the predetermined character.

15. The image processor according to claim 14, wherein said character detecting means is composed of character recognizing means for performing a first recognition operation for recognizing a character from the character data in the image data and a second recognition operation for recognizing a reproduced character image formed by said reproduced character image calculating means as a character, said reproduced character image calculating means calculates a degraded state of a reproduced character of the character recognized from the image data by said character recognizing means based on the degradation information for forming a reproduced character image showing the state of the reproduced character, and said judging means judges whether a character in the reproduced image is readable or not based on a recognition rate in the second recognition operation with respect to the first recognition operation performed by said character recognizing means.

16. The image processor according to claim 14, further comprising feature detecting means for detecting a portion of a character enclosed by an outline as a feature portion of the character, wherein said character detecting means detects a character by separating the image data into units of connected graphics according to the extracted feature of the character and judging whether a size of a rectangle circumscribing each of the units of graphics coincides with a size of the character, said reproduced character image calculating means calculates a degraded state of the enclosed portion after copying, which has been detected by said feature detecting means, based on the degradation information so as to form a reproduced character image showing the degraded state, and said judging means calculates a rate of the enclosed portion to be defaced after copying based on the reproduced character image formed by said reproduced character image calculating means, and judges whether the reproduced character image is read as a predetermined character according to whether the rate is higher than a predetermined value or not.

17. The image processor according to claim 14, further comprising feature detecting means for detecting a likely enclosed portion which is likely to be enclosed by outlines that are closely located and likely to be connected to each other when copied, wherein said character detecting means separates the image data into units of connected graphics according to the extracted feature of the character and judges whether the units of graphics is the character by detecting whether a size of a rectangle circumscribing the graphics coincides with a size of the character, said reproduced character image calculating means calculates a degraded state of the likely enclosed portion after copying based on the degradation information so as to form a reproduced character image showing the degraded state, and wherein said judging means calculates a rate of the likely enclosed portions to become enclosed portions by the connected lines after copying based on the reproduced character images formed by said reproduced character image calculating means, and judges whether the reproduced character image is read as a predetermined character by judging whether the rate is smaller than a predetermined value which causes characters in a reproduced image to be unreadable.

18. The image processor according to claim 14, further comprising feature detecting means for detecting a likely missing portion where a line forming an outline of a character becomes thinner and is likely to be interrupted when copied, wherein said character detecting means separates the image data into units of connected graphics according to the extracted feature of the character and detects whether the units of graphics is the character by judging whether a size of a rectangle circumscribing the graphics coincides with a size of the character, said reproduced character image calculating means calculates a degraded state of the likely missing portion after copying based on the degradation information so as to form a reproduced character image showing the degraded state, and wherein said judging means calculates a missing rate of the likely missing portions based on the reproduced character image formed by said reproduced character image calculating means, and judges whether the reproduced character image is read as a predetermined character by judging whether the rate is smaller than a predetermined value which causes characters in a reproduced image to be unreadable.

19. The image processor according to claim 14, further comprising degradation information input instructing means for inputting an instruction to start a degradation information input mode, wherein said character detecting means detects first character data and second character data from the image data of the document and image data of a reproduction of the document, respectively, upon the instruction, said image processor further comprising degradation information calculating means for comparing the detected first and second data and calculating degradation information according to a change in a character in the character data detected by comparing the first and second data, the calculated degradation information being stored in said degradation information storage means.

20. An image processor having: input means for converting an image on a document into image data; and image output means for forming and outputting a reproduced image of a document image based on the input image data, said processor comprising:

character detecting means for detecting character data from the image data;

degradation information storage means for storing a degraded state of the reproduced image compared to the document image as degradation information;

reproduced character image calculating means for calculating a degraded state of a reproduced character of a character represented by the character data detected by said character detecting means based on the degradation information so as to form a reproduced character image showing the state of the reproduced character;

means for storing replacement character data having a font of a size equal to a size of the character data detected by said character detecting means; and judging means for judging whether the reproduced character image is read as a predetermined character, wherein said character detecting means is composed of character recognizing means for performing a first recognition operation for recognizing a character from the character data in the image data and a second recognition operation for recognizing the reproduced character image formed by said reproduced character image calculating means as a character, said reproduced character image calculating means calculates a degraded state of a reproduced character of the character recognized from the image data by said character recognizing means based on the degradation information for forming a reproduced character image showing the state of the reproduced character, and said judging means judges whether characters in the reproduced image are readable or not based on a recognition rate in the second recognition operation with respect to the first recognition operation performed by said character recognizing means, said image processor further comprising means for performing a copying operation after replacing the character data with the replacement character data having a font of a size equal to the character data when said judging means judges that recognition rate is lower than a predetermined rate.

21. An image processor comprising:

input means for reading an image on a document;

setting means for freely setting a reduction rate of the document;

storage means for storing image data of the document read by said input means;

recognizing means for detecting character data from the image data stored in said storage means and recognizing a character from the detected character data;

reducing means for reducing the character data recognized by said recognizing means at a reduction rate specified by said setting means;

re-recognizing means for re-recognizing the character from the character data reduced by said reducing means;

character judging means for judging whether the character re-recognized by said re-recognizing means is identical to the character before reduced;

unrecognized character rate judging means for judging whether a percentage of re-recognized characters which are not identical to characters before reduced is higher than a predetermined rate;

processing means for performing predetermined processing on the character data which is not identical to characters before reduced so that the character data is recognized identical to the characters before reduced by said re-recognizing means when said unrecognized character rate judging means judges that the percentage of the re-recognized characters which are not identical to the characters before reduced is higher than the predetermined rate;

compositing means for compositing the character data processed by said processing means and the image data; and output means for visualizing and outputting the image data composited by said compositing means.

22. The image processor according to claim 21, wherein said storage means stores a character font of a predetermined size, and said processing means compares the character font and the character data reduced by said reducing means, and performs the predetermined processing so that the reduced character data becomes identical to the character font.

23. An image processor comprising:

input means for reading an image on a document;

magnification rate setting means for freely setting a magnification rate of the document;

storage means for storing image data of the document read by said input means;

detecting means for detecting character data from the image data stored in said storage means;

magnifying means for magnifying the character data detected by said detecting means at a magnification rate specified by said magnification rate setting means;

calculating means for calculating a width of a line forming a character from the character data magnified by said magnifying means;

judging means for judging whether the width of the line calculated by said calculating means is in a predetermined readable range;

correcting means for correcting the width of the line to be within the predetermined range when said judging means judges that the width of the line is out of the predetermined range;

compositing means for compositing the character data including the line whose line width has been corrected by said correcting means and the image data; and output means for visualizing and outputting the image data composited by said compositing means.

24. The image processor according to claim 23, wherein said correcting means corrects the width of the line to be in the predetermined range by expanding or reducing pixels of the character data.

25. An image processor comprising:

input means for reading an image on a document;

magnification rate setting means for freely setting a magnification rate of the document;

storage means for storing image data of the document read by said input means;

detecting means for detecting character data from the image data stored in said storage means;

magnifying means for magnifying the character data detected by said detecting means at a magnification rate specified by said magnification rate setting means;

density calculating means for calculating a width and density of a line forming a character from the character data magnified by said magnifying means;

density judging means for judging whether a combination of the width and density of the line calculated by said density calculating means is in a predetermined readable combination range;

correcting means for correcting the width of the line to be in the predetermined range when said density judging means judges that the combination is out of the predetermined range;

compositing means for compositing the character data including the line whose line width has been corrected by said correcting means and the image data; and output means for visualizing and outputting the image data composited by said compositing means.

26. An image processor comprising:

input means for reading an image on a document;

magnification rate setting means for freely setting a magnification rate of the document;

storage means for storing image data of the document read by said input means;

component part detecting means for detecting character data from the image data stored in said storage means, and for recognizing a character from the detected character data by dividing the character into component parts;

magnifying means for magnifying the character data detected by said component part detecting means at a magnification rate specified by said magnification rate setting means;

width calculating means for calculating a size of a component part and a width of a line forming the component part from the character data magnified by said magnifying means;

width judging means for judging whether a combination of the size and width calculated by said width calculating means is in a predetermined readable combination range;

magnification correcting means for magnifying the components parts at the predetermined magnification rate without changing a size of the character after being magnified while correcting the width of the line to be in the predetermined range when said width judging means judges that the combination is out of the predetermined range;

compositing means for compositing the character data including the component parts whose size and line width have been corrected by said magnification correcting means and the image data; and output means for visualizing and outputting the image data composited by said compositing means.

* * * * *